US012771930B2

(12) United States Patent
Dedonato et al.

(10) Patent No.: US 12,771,930 B2
(45) Date of Patent: Oct. 20, 2026

(54) DEVICES, METHODS, AND GRAPHICAL USER INTERFACES FOR GENERATING AND DISPLAYING A REPRESENTATION OF A USER

(71) Applicant: Apple Inc., Cupertino, CA (US)

(72) Inventors: Amy E. Dedonato, San Francisco, CA (US); Kristi E. Bauerly, Los Altos, CA (US); Rupert Burton, San Francisco, CA (US); Dorian D. Dargan, Oakland, CA (US); Jason D. Rickwald, Santa Cruz, CA (US); Giancarlo Yerkes, San Carlos, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/988,532

(22) Filed: Nov. 16, 2022

(65) Prior Publication Data

US 2023/0171484 A1 Jun. 1, 2023

Related U.S. Application Data

(60) Provisional application No. 63/283,969, filed on Nov. 29, 2021.

(51) Int. Cl.

*H04N 5/32* (2023.01)
*G06F 3/16* (2006.01)
*G06T 19/00* (2011.01)
*H04N 23/60* (2023.01)
*G06F 3/0482* (2013.01)

(52) U.S. Cl.

CPC ............. *H04N 23/64* (2023.01); *G06F 3/167* (2013.01); *G06T 19/00* (2013.01); *G06F 3/0482* (2013.01)

(58) Field of Classification Search

CPC ....... H04N 23/64; G06F 3/167; G06F 3/0482; G06T 19/00

See application file for complete search history.

(56) References Cited

U.S. PATENT DOCUMENTS 7,180,524 B1 2/2007 Axelrod
7,227,976 B1 6/2007 Jung et al.
7,894,638 B2 * 2/2011 Nakada ................ G09B 21/009 382/118
7,908,554 B1 3/2011 Blattner
8,169,438 B1 5/2012 Baraff et al.

(Continued)

FOREIGN PATENT DOCUMENTS

CN 101055646 A 10/2007
CN 101329707 A 12/2008

(Continued)

OTHER PUBLICATIONS

Corrected Notice of Allowance received for U.S. Appl. No. 18/138,634, mailed on May 2, 2024, 5 pages.

(Continued)

*Primary Examiner* — Stephen S Hong
*Assistant Examiner* — Darrin Hope
(74) *Attorney, Agent, or Firm* — YHE Law LLP

(57) ABSTRACT

In some examples, a computer system displays a prompt to remove the computer system from a body of a user while the computer system is placed on the body of the user so that the computer system can capture information about the user for generating a representation of the user.

46 Claims, 21 Drawing Sheets

(56) References Cited

U.S. PATENT DOCUMENTS

| | | | |
|---|---|---|---|
| 9,035,999 B2 | 5/2015 | Carpenter et al. | |
| 9,547,763 B1 | 1/2017 | Avital | |
| 9,686,466 B1 | 6/2017 | Billinghurst et al. | |
| 10,135,965 B2 | 11/2018 | Woolsey et al. | |
| 10,176,808 B1 | 1/2019 | Lovitt et al. | |
| 10,235,408 B1 | 3/2019 | Lao et al. | |
| 10,325,416 B1 | 6/2019 | Scapel et al. | |
| 10,325,417 B1 | 6/2019 | Scapel et al. | |
| 10,410,434 B1 | 9/2019 | Scapel et al. | |
| 10,496,244 B2 | 12/2019 | Reynolds et al. | |
| 10,580,221 B2 | 3/2020 | Scapel et al. | |
| 10,659,405 B1 | 5/2020 | Chang et al. | |
| 10,984,569 B2 | 4/2021 | Bondich et al. | |
| 11,217,036 B1 | 1/2022 | Albuz et al. | |
| 11,282,174 B1 | 3/2022 | Demaio | |
| 11,361,521 B2 | 6/2022 | Lee et al. | |
| 11,467,713 B2 | 10/2022 | Buzyn et al. | |
| 12,033,296 B2 | 7/2024 | Scapel et al. | |
| 2001/0050689 A1 | 12/2001 | Park | |
| 2006/0188144 A1 | 8/2006 | Sasaki et al. | |
| 2006/0294465 A1 | 12/2006 | Ronen et al. | |
| 2008/0052242 A1 | 2/2008 | Merritt et al. | |
| 2008/0309677 A1 | 12/2008 | Fleury et al. | |
| 2008/0316227 A1 | 12/2008 | Fleury et al. | |
| 2009/0027337 A1 | 1/2009 | Hildreth | |
| 2009/0079813 A1* | 3/2009 | Hildreth | G06F 3/017 348/E7.078 |
| 2009/0144173 A1 | 6/2009 | Mo et al. | |
| 2009/0202114 A1 | 8/2009 | Morin et al. | |
| 2009/0254843 A1 | 10/2009 | Van et al. | |
| 2009/0254859 A1 | 10/2009 | Arrasvuori et al. | |
| 2009/0297022 A1 | 12/2009 | Pettigrew et al. | |
| 2009/0300513 A1 | 12/2009 | Nims et al. | |
| 2010/0035682 A1 | 2/2010 | Gentile et al. | |
| 2010/0123915 A1 | 5/2010 | Kashimoto | |
| 2010/0203968 A1 | 8/2010 | Gill et al. | |
| 2011/0004524 A1 | 1/2011 | Paul et al. | |
| 2011/0007174 A1 | 1/2011 | Bacivarov et al. | |
| 2011/0009241 A1 | 1/2011 | Lane et al. | |
| 2011/0025689 A1 | 2/2011 | Perez et al. | |
| 2011/0074807 A1 | 3/2011 | Inada et al. | |
| 2011/0175809 A1 | 7/2011 | Markovic et al. | |
| 2011/0248992 A1* | 10/2011 | van Os | G06F 3/04817 345/650 |
| 2011/0252344 A1 | 10/2011 | Van | |
| 2012/0075328 A1 | 3/2012 | Goossens | |
| 2012/0079378 A1 | 3/2012 | Goossens | |
| 2012/0158515 A1 | 6/2012 | K | |
| 2012/0299945 A1 | 11/2012 | Aarabi | |
| 2013/0015946 A1 | 1/2013 | Lau et al. | |
| 2013/0227651 A1 | 8/2013 | Schultz et al. | |
| 2014/0078144 A1 | 3/2014 | Berriman et al. | |
| 2014/0137013 A1 | 5/2014 | Matas | |
| 2014/0267311 A1 | 9/2014 | Evertt et al. | |
| 2014/0336808 A1 | 11/2014 | Taylor et al. | |
| 2015/0036883 A1 | 2/2015 | Deri et al. | |
| 2015/0052462 A1 | 2/2015 | Kulkarni | |
| 2015/0334292 A1 | 11/2015 | Tartz et al. | |
| 2015/0366293 A1 | 12/2015 | Clarkson | |
| 2016/0006987 A1 | 1/2016 | Li et al. | |
| 2016/0030844 A1 | 2/2016 | Nair et al. | |
| 2016/0092043 A1 | 3/2016 | Missig et al. | |
| 2016/0110593 A1 | 4/2016 | Hoof et al. | |
| 2016/0134840 A1 | 5/2016 | McCulloch | |
| 2016/0217601 A1 | 7/2016 | Tsuda et al. | |
| 2016/0247309 A1 | 8/2016 | Li et al. | |
| 2016/0275724 A1 | 9/2016 | Adeyoola et al. | |
| 2016/0328875 A1 | 11/2016 | Fang et al. | |
| 2016/0357720 A1 | 12/2016 | Thimbleby | |
| 2017/0007183 A1* | 1/2017 | Dusan | A61B 5/6824 |
| 2017/0032554 A1 | 2/2017 | O'Donovan et al. | |
| 2017/0046065 A1 | 2/2017 | Zeng et al. | |
| 2017/0069124 A1 | 3/2017 | Tong et al. | |
| 2017/0083086 A1 | 3/2017 | Mazur et al. | |
| 2017/0140214 A1 | 5/2017 | Matas et al. | |
| 2017/0160819 A1 | 6/2017 | et al. | |
| 2017/0164888 A1 | 6/2017 | Matsuda et al. | |
| 2017/0193684 A1 | 7/2017 | Du et al. | |
| 2017/0206095 A1 | 7/2017 | Gibbs et al. | |
| 2017/0352091 A1 | 12/2017 | Chen et al. | |
| 2018/0004404 A1 | 1/2018 | Delfino et al. | |
| 2018/0024726 A1 | 1/2018 | Hviding | |
| 2018/0047200 A1 | 2/2018 | O'Hara et al. | |
| 2018/0091732 A1 | 3/2018 | Wilson et al. | |
| 2018/0165862 A1 | 6/2018 | Sawaki | |
| 2018/0189549 A1 | 7/2018 | Inomata | |
| 2018/0268589 A1 | 9/2018 | Grant | |
| 2018/0324353 A1 | 11/2018 | Kim et al. | |
| 2018/0335930 A1 | 11/2018 | Scapel et al. | |
| 2018/0336715 A1 | 11/2018 | Rickwald et al. | |
| 2018/0365904 A1 | 12/2018 | Holmes | |
| 2019/0080066 A1 | 3/2019 | Van Os et al. | |
| 2019/0094981 A1 | 3/2019 | Bradski et al. | |
| 2019/0158735 A1 | 5/2019 | Wilson et al. | |
| 2019/0266775 A1 | 8/2019 | Lee et al. | |
| 2019/0278894 A1 | 9/2019 | Andalo et al. | |
| 2019/0295056 A1 | 9/2019 | Wright | |
| 2019/0339847 A1 | 11/2019 | Scapel et al. | |
| 2019/0342507 A1 | 11/2019 | Dye et al. | |
| 2019/0347868 A1 | 11/2019 | Scapel et al. | |
| 2019/0354265 A1 | 11/2019 | Winnemoeller | |
| 2019/0369836 A1 | 12/2019 | Faulkner et al. | |
| 2019/0371033 A1 | 12/2019 | Scapel et al. | |
| 2020/0034025 A1 | 1/2020 | Brady et al. | |
| 2020/0053262 A1* | 2/2020 | Wexler | G06V 20/30 |
| 2020/0082135 A1 | 3/2020 | Tagawa et al. | |
| 2020/0104620 A1* | 4/2020 | Cohen | G06V 40/166 |
| 2020/0110864 A1 | 4/2020 | Casado et al. | |
| 2020/0117270 A1* | 4/2020 | Gibson | G06F 3/011 |
| 2020/0134383 A1 | 4/2020 | Rhee et al. | |
| 2020/0175772 A1* | 6/2020 | Hariton | H04L 67/131 |
| 2020/0202625 A1* | 6/2020 | Jones | G06T 19/006 |
| 2020/0234481 A1 | 7/2020 | Scapel et al. | |
| 2020/0264738 A1 | 8/2020 | Lee et al. | |
| 2020/0265234 A1 | 8/2020 | Lee et al. | |
| 2020/0358725 A1 | 11/2020 | Scapel et al. | |
| 2020/0402304 A1 | 12/2020 | Hwang et al. | |
| 2020/0409533 A1 | 12/2020 | Blackstock et al. | |
| 2021/0019541 A1 | 1/2021 | Wang et al. | |
| 2021/0056747 A1* | 2/2021 | Hefny | G06T 17/20 |
| 2021/0056769 A1 | 2/2021 | Scapel et al. | |
| 2021/0097766 A1 | 4/2021 | Palangie et al. | |
| 2021/0110015 A1 | 4/2021 | Mccarty et al. | |
| 2021/0312167 A1 | 10/2021 | Shirai | |
| 2021/0335055 A1 | 10/2021 | Scapel et al. | |
| 2021/0405831 A1 | 12/2021 | Mourkogiannis et al. | |
| 2021/0407215 A1 | 12/2021 | Evangelista et al. | |
| 2022/0012922 A1 | 1/2022 | Ishikawa | |
| 2022/0020220 A1 | 1/2022 | Lehman | |
| 2022/0083636 A1 | 3/2022 | Sarkis et al. | |
| 2022/0147148 A1 | 5/2022 | Begley | |
| 2022/0206675 A1 | 6/2022 | Hawkes | |
| 2022/0229546 A1 | 7/2022 | Lee et al. | |
| 2022/0262080 A1 | 8/2022 | Burton et al. | |
| 2022/0301041 A1 | 9/2022 | Lee et al. | |
| 2022/0319075 A1 | 10/2022 | Hu et al. | |
| 2022/0366626 A1 | 11/2022 | Miller et al. | |
| 2022/0374137 A1 | 11/2022 | Triverio et al. | |
| 2023/0103161 A1 | 3/2023 | Li et al. | |
| 2023/0305688 A1 | 9/2023 | Triverio et al. | |
| 2023/0343053 A1 | 10/2023 | Scapel et al. | |
| 2024/0372968 A1 | 11/2024 | Rickwald et al. | |
| 2025/0022237 A1 | 1/2025 | Burton et al. | |
| 2025/0029344 A1 | 1/2025 | Li et al. | |
| 2025/0037398 A1 | 1/2025 | Scapel et al. | |
| 2025/0044921 A1 | 2/2025 | Triverio et al. | |

FOREIGN PATENT DOCUMENTS

| | | |
|---|---|---|
| CN | 101692681 A | 4/2010 |
| CN | 101742053 A | 6/2010 |
| CN | 102035990 A | 4/2011 |
| CN | 102142149 A | 8/2011 |
| CN | 102298797 A | 12/2011 |

(56) References Cited

FOREIGN PATENT DOCUMENTS

| | | | |
|---|---|---|---|
| CN | 104376160 | A | 2/2015 |
| CN | 104753762 | A | 7/2015 |
| CN | 105100462 | A | 11/2015 |
| CN | 105391937 | A | 3/2016 |
| CN | 107924113 | A | 4/2018 |
| CN | 110046020 | A | 7/2019 |
| CN | 112634416 | A | 4/2021 |
| EP | 2416563 | A2 | 2/2012 |
| EP | 3627450 | A1 | 3/2020 |
| EP | 3537378 | B1 | 11/2021 |
| JP | 2000-76460 | A | 3/2000 |
| JP | 2003-219217 | A | 7/2003 |
| JP | 2004-519033 | A | 6/2004 |
| JP | 2005-532607 | A | 10/2005 |
| JP | 2006-520053 | A | 8/2006 |
| JP | 2007-528240 | A | 10/2007 |
| JP | 2008-27086 | A | 2/2008 |
| JP | 2011-517810 | A | 6/2011 |
| JP | 2011-525648 | A | 9/2011 |
| JP | 2012-38292 | A | 2/2012 |
| JP | 2012-223357 | A | 11/2012 |
| JP | 5219184 | B2 | 6/2013 |
| JP | 2014-206817 | A | 10/2014 |
| JP | 2016-136324 | A | 7/2016 |
| JP | 2016-528571 | A | 9/2016 |
| JP | 6240301 | B1 | 11/2017 |
| JP | 6266736 | B1 | 1/2018 |
| JP | 2018-50279 | A | 3/2018 |
| JP | 2018-106365 | A | 7/2018 |
| JP | 6535699 | B2 | 6/2019 |
| JP | 2020-525868 | A | 8/2020 |
| JP | 2020-156919 | A | 10/2020 |
| JP | 2020-187775 | A | 11/2020 |
| JP | 2021-527998 | A | 10/2021 |
| KR | 10-2016-0063058 | A | 6/2016 |
| KR | 10-2017-0007285 | A | 1/2017 |
| KR | 10-2017-0067077 | A | 6/2017 |
| KR | 10-2017-0117306 | A | 10/2017 |
| KR | 10-2020-0101206 | A | 8/2020 |
| KR | 10-2020-0117685 | A | 10/2020 |
| KR | 10-2020-0132995 | A | 11/2020 |
| WO | 2004/079530 | A2 | 9/2004 |
| WO | 2009/114239 | A1 | 9/2009 |
| WO | 2009/133710 | A1 | 11/2009 |
| WO | 2014/094199 | A1 | 6/2014 |
| WO | 2015/064144 | A1 | 5/2015 |
| WO | 2016/045005 | A1 | 3/2016 |
| WO | 2016/101124 | A1 | 6/2016 |
| WO | 2016/101131 | A1 | 6/2016 |
| WO | 2016/144975 | A2 | 9/2016 |
| WO | 2016/161556 | A1 | 10/2016 |
| WO | 2017/043314 | A1 | 3/2017 |
| WO | 2017/218193 | A1 | 12/2017 |
| WO | 2018/057272 | A1 | 3/2018 |
| WO | 2018/226265 | A1 | 12/2018 |
| WO | 2019/216999 | A1 | 11/2019 |
| WO | 2019/220742 | A1 | 11/2019 |
| WO | 2020/075308 | A1 | 4/2020 |
| WO | 2020/129959 | A1 | 6/2020 |
| WO | 2020/226785 | A1 | 11/2020 |
| WO | 2021/145067 | A1 | 7/2021 |

OTHER PUBLICATIONS

Decision to Grant received for Japanese Patent Application No. 2023-572180, mailed on Apr. 22, 2024, 3 pages (1 page of English Translation and 2 pages of Official Copy).
Office Action received for European Patent Application No. 23168077.8, mailed on Apr. 25, 2024, 7 pages.
Applicant-Initiated Interview Summary received for U.S. Appl. No. 16/519,850, mailed on Jun. 26, 2020, 4 pages.
Applicant-Initiated Interview Summary received for U.S. Appl. No. 17/370,505, mailed on Oct. 17, 2022, 4 pages.
Applicant-Initiated Interview Summary received for U.S. Appl. No. 17/746,179, mailed on Nov. 28, 2022, 4 pages.
Brief Communication Regarding Oral Proceedings received for European Patent Application No. 19172407.9, mailed on Nov. 9, 2020, 1 page.
Brief Communication Regarding Oral Proceedings received for European Patent Application No. 19172407.9, mailed on Nov. 20, 2020, 2 pages.
Brief Communication Regarding Oral Proceedings received for European Patent Application No. 19181242.9, mailed on Oct. 5, 2022, 4 pages.
Certificate of Examination received for Australian Patent Application No. 2019100497, mailed on Jul. 29, 2019, 2 pages.
Certificate of Examination received for Australian Patent Application No. 2019101019, mailed on Nov. 12, 2019, 2 pages.
Certificate of Examination received for Australian Patent Application No. 2019101667, mailed on Mar. 20, 2020, 2 pages.
Certificate of Examination received for Australian Patent Application No. 2020100675, mailed on Jun. 30, 2020, 2 pages.
Certificate of Examination received for Australian Patent Application No. 2020101715, mailed on Oct. 6, 2020, 2 pages.
Chan et al., "FrontFace", Facilitating Communication Between HMD Users and Outsiders Using Front-Facing-Screen HMDs, Sep. 4-7, 2017, 5 pages.
Corrected Notice of Allowance received for U.S. Appl. No. 16/142,288, mailed on Jul. 30, 2019, 5 pages.
Corrected Notice of Allowance received for U.S. Appl. No. 16/519,850, mailed on Nov. 2, 2020, 5 pages.
Corrected Notice of Allowance received for U.S. Appl. No. 16/519,850, mailed on Sep. 8, 2020, 5 pages.
Corrected Notice of Allowance received for U.S. Appl. No. 17/091,460, mailed on Feb. 16, 2022, 6 pages.
Corrected Notice of Allowance received for U.S. Appl. No. 17/091,460, mailed on Feb. 25, 2022, 6 pages.
Decision to Grant received for Danish Patent Application No. PA201870372, mailed on Jun. 17, 2020, 2 pages.
Decision to Grant received for Danish Patent Application No. PA201870375, mailed on Jul. 24, 2019, 2 pages.
Decision to Grant received for Danish Patent Application No. PA201870377, mailed on May 14, 2019, 2 pages.
Decision to Grant received for European Patent Application No. 19172407.9, mailed on Jun. 17, 2021, 2 pages.
Decision to Grant received for European Patent Application No. 20168021.2, mailed on Feb. 3, 2022, 2 pages.
Enterbrain, "No. 5 Create your own Avatar Mii Studio", vol. 26, No. 11, p. 138, Feb. 24, 2011, 4 pages (Official Copy Only) (See Communication under 37 CFR § 1.98(a) (3)).
European Search Report received for European Patent Application No. 19172407.9, mailed on Oct. 9, 2019, 4 pages.
European Search Report received for European Patent Application No. 19181242.9, mailed on Nov. 27, 2019, 4 pages.
European Search Report received for European Patent Application No. 20168021.2, mailed on Jul. 8, 2020, 4 pages.
Extended European Search Report received for European Patent Application No. 22154034.7, mailed on May 11, 2022, 14 pages.
Final Office Action received for U.S. Appl. No. 16/116,221, mailed on Mar. 22, 2019, 35 pages.
Flatlinevertigo, "Black Desert Online :: Intro to Hair Customization", Online Available at: <https://www.youtube.com/watch?v=9MCbfd_eMEg>, Sep. 9, 2015, 3 pages.
Here are Warez Files:Eve Online Character Creator, Online Available at: <http://theherearewarezfiles.blogspot.com/2014/03/eve-online-character-creator-download.html>, Mar. 3, 2014, 7 pages.
Intention to Grant received for Danish Patent Application No. PA201870372, mailed on Feb. 13, 2020, 2 pages.
Intention to Grant received for Danish Patent Application No. PA201870375, mailed on Jun. 3, 2019, 2 pages.
Intention to Grant received for Danish Patent Application No. PA201870375, mailed on Mar. 26, 2019, 2 pages.
Intention to Grant received for Danish Patent Application No. PA201870377, mailed on Mar. 26, 2019, 2 pages.
Intention to Grant received for European Patent Application No. 19172407.9, mailed on Feb. 11, 2021, 9 pages.

(56) References Cited

OTHER PUBLICATIONS

Intention to Grant received for European Patent Application No. 19181242.9, mailed on Nov. 17, 2022, 9 pages.
Intention to Grant received for European Patent Application No. 19181242.9, mailed on Oct. 28, 2021, 16 pages.
Intention to Grant received for European Patent Application No. 20168021.2, mailed on Apr. 15, 2021, 8 pages.
Intention to Grant received for European Patent Application No. 20168021.2, mailed on Sep. 20, 2021, 8 pages.
International Preliminary Report on Patentability received for PCT Patent Application No. PCT/US2019/023793, mailed on Nov. 19, 2020, 12 pages.
International Preliminary Report on Patentability received for PCT Patent Application No. PCT/US2022/016451, mailed on Aug. 25, 2022, 9 pages.
International Search Report and Written Opinion received for PCT Patent Application No. PCT/US2019/023793, mailed on Aug. 27, 2019, 17 pages.
International Search Report and Written Opinion received for PCT Patent Application No. PCT/US2022/016451, mailed on Jun. 24, 2022, 18 pages.
International Search Report and Written Opinion received for PCT Patent Application No. PCT/US2022/029811, mailed on Nov. 7, 2022, 15 pages.
Invitation to Pay Additional Fees and Partial International Search Report received for PCT Patent Application No. PCT/US2022/029811, mailed on Sep. 14, 2022, 9 pages.
Invitation to Pay Additional Fees received for PCT Patent Application No. PCT/US2019/023793, mailed on Jul. 5, 2019, 11 pages.
Invitation to Pay Additional Fees received for PCT Patent Application No. PCT/US2022/016451, mailed on Apr. 28, 2022, 11 pages.
Koti, Kotresh, "Colour with Asian Paints.A Mobail App by Android Application-2018", Available Online at <https://www.youtube.com/watch?v=M6EIO7ErYd0&feature=youtu.be&t=81>, May 6, 2018, 2 pages.
Kyoko, Makino, "How to Make a Lookalike Face Icon for Your Friend", ASCII, Japan Weekly, ASCII Media Works Inc., vol. 24, pp. 90-93, Jul. 17, 2014, 7 pages (Official Copy Only) (See Communication under 37 CFR § 1.98(a) (3)).
Mai et al., "Frontal Screens on Head-Mounted Displays to Increase Awareness of the HMD Users' State in Mixed Presence Collaboration", May 15, 2019, 10 pages.
Mai et al., "TransparentHMD", Revealing the HMD User's Face to Bystanders, Nov. 26-29, 2017, 6 pages.
Minutes of the Oral Proceedings received for European Patent Application No. 19181242.9, mailed on Dec. 15, 2020, 6 pages.
Mitsuru, Takeuchi, "Face Shape Selection for Automatic Avatar Generation", 13th Annual Conference Proceedings of Virtual Reality Society of Japan tournament Papers [DVD-ROM], The Virtual Reality Society of Japan, Sep. 24, 2008, 7 pages (Official Copy Only) (See Communication under 37 CFR § 1.98(a) (3)).
Non-Final Office Action received for U.S. Appl. No. 16/116,221, mailed on Nov. 13, 2018, 27 pages.
Non-Final Office Action received for U.S. Appl. No. 16/142,288, mailed on Nov. 20, 2018, 15 pages.
Non-Final Office Action received for U.S. Appl. No. 16/142,305, mailed on Nov. 23, 2018, 32 pages.
Non-Final Office Action received for U.S. Appl. No. 16/142,328, mailed on Nov. 8, 2018, 18 pages.
Non-Final Office Action received for U.S. Appl. No. 16/519,850, mailed on Mar. 23, 2020, 8 pages.
Non-Final Office Action received for U.S. Appl. No. 17/091,460, mailed on Sep. 10, 2021, 10 pages.
Non-Final Office Action received for U.S. Appl. No. 17/370,505, mailed on Jul. 6, 2022, 14 pages.
Non-Final Office Action received for U.S. Appl. No. 17/746,179, mailed on Oct. 25, 2022, 18 pages.
Notice of Acceptance received for Australian Patent Application No. 2019265357, mailed on Dec. 24, 2020, 3 pages.
Notice of Acceptance received for Australian Patent Application No. 2021202254, mailed on Nov. 16, 2022, 3 pages.
Notice of Allowance received for Chinese Patent Application No. 201910379481.4, mailed on Nov. 9, 2020, 6 pages (3 pages of English Translation and 3 pages of Official Copy).
Notice of Allowance received for Japanese Patent Application No. 2018-184254, mailed on Jun. 15, 2020, 5 pages (2 pages of English Translation and 3 pages of Official Copy).
Notice of Allowance received for Japanese Patent Application No. 2020-120086, mailed on Nov. 15, 2021, 5 pages (2 pages of English Translation and 3 pages of Official Copy).
Notice of Allowance received for Korean Patent Application No. 10-2020-7032147, mailed on May 12, 2021, 5 pages (2 pages of English Translation and 3 pages of Official Copy).
Notice of Allowance received for Korean Patent Application No. 10-2021-7023617, mailed on Dec. 21, 2021, 6 pages (2 pages of English Translation and 4 pages of Official Copy).
Notice of Allowance received for U.S. Appl. No. 16/116,221, mailed on Nov. 22, 2019, 13 pages.
Notice of Allowance received for U.S. Appl. No. 16/116,221, mailed on Sep. 20, 2019, 13 pages.
Notice of Allowance received for U.S. Appl. No. 16/142,288, mailed on Jun. 24, 2019, 10 pages.
Notice of Allowance received for U.S. Appl. No. 16/142,288, mailed on Mar. 27, 2019, 9 pages.
Notice of Allowance received for U.S. Appl. No. 16/142,288, mailed on May 1, 2019, 4 pages.
Notice of Allowance received for U.S. Appl. No. 16/142,305, mailed on Apr. 3, 2019, 5 pages.
Notice of Allowance received for U.S. Appl. No. 16/142,305, mailed on May 1, 2019, 2 pages.
Notice of Allowance received for U.S. Appl. No. 16/142,328, mailed on Apr. 5, 2019, 7 pages.
Notice of Allowance received for U.S. Appl. No. 16/519,850, mailed on Aug. 26, 2020, 8 pages.
Notice of Allowance received for U.S. Appl. No. 17/091,460, mailed on Apr. 28, 2022, 9 pages.
Notice of Allowance received for U.S. Appl. No. 17/091,460, mailed on Feb. 4, 2022, 10 pages.
Notice of Allowance received for U.S. Appl. No. 17/091,460, mailed on May 23, 2022, 9 pages.
Office Action received for Australian Patent Application No. 2021202254, mailed on Jun. 20, 2022, 2 pages.
Office Action received for Chinese Patent Application No. 201910379481.4, mailed on Mar. 2, 2020, 18 pages (10 pages of English Translation and 8 pages of Official Copy).
Office Action received for Chinese Patent Application No. 201910691865.X, mailed on Aug. 4, 2021, 10 pages (6 pages of English Translation and 4 pages of Official Copy).
Office Action received for Chinese Patent Application No. 201910691865.X, mailed on Feb. 4, 2021, 16 pages (9 pages of English Translation and 7 pages of Official Copy).
Office Action received for Chinese Patent Application No. 201910691865.X, mailed on Jul. 8, 2020, 17 pages (8 pages of English Translation and 9 pages of Official Copy).
Office Action received for Chinese Patent Application No. 201910691872.X, mailed on Jun. 3, 2020, 10 pages (5 pages of English Translation and 5 pages of Official Copy).
Office Action received for Chinese Patent Application No. 201910691872.X, mailed on Jun. 23, 2021, 10 pages (5 pages of English Translation and 5 pages of Official Copy).
Office Action received for Chinese Patent Application No. 201910691872.X, mailed on Mar. 24, 2021, 19 pages (9 pages of English Translation and 10 pages of Official Copy).
Office Action received for Chinese Patent Application No. 201910691872.X, mailed on Nov. 10, 2021, 16 pages (9 pages of English Translation and 7 pages of Official Copy).
Office Action received for Chinese Patent Application No. 202010330318.1, mailed on Jul. 13, 2021, 12 pages (6 pages of English Translation and 6 pages of Official Copy).
Office Action received for Chinese Patent Application No. 202010330318.1, mailed on Mar. 31, 2021, 13 pages (7 pages of English Translation and 6 pages of Official Copy).

(56) References Cited

OTHER PUBLICATIONS

Office Action received for Chinese Patent Application No. 202010330318.1, mailed on Nov. 19, 2020, 18 pages (9 pages of English Translation and 9 pages of Official Copy).
Office Action received for Chinese Patent Application No. 202110820692.4, mailed on Mar. 15, 2022, 18 pages (9 pages of English Translation and 9 pages of Official Copy).
Office Action received for Danish Patent Application No. PA201870372, mailed on Aug. 20, 2019, 2 pages.
Office Action received for Danish Patent Application No. PA201870372, mailed on Jan. 31, 2019, 4 pages.
Office Action received for Danish Patent Application No. PA201870374, mailed on Feb. 6, 2019, 5 pages.
Office Action received for Danish Patent Application No. PA201870374, mailed on Jun. 17, 2019, 5 pages.
Office Action received for Danish Patent Application No. PA201870375, mailed on Jan. 31, 2019, 4 pages.
Office Action received for Danish Patent Application No. PA201870377, mailed on Jan. 31, 2019, 4 pages.
Office Action received for European Patent Application No. 19172407.9, mailed on Oct. 18, 2019, 7 pages.
Office Action received for European Patent Application No. 19181242.9, mailed on Dec. 6, 2019, 9 pages.
Office Action received for European Patent Application No. 20168021.2, mailed on Jul. 22, 2020, 8 pages.
Office Action received for Indian Patent Application No. 201814036472, mailed on Jul. 8, 2021, 8 pages.
Office Action received for Japanese Patent Application No. 2018-184254, mailed on Mar. 2, 2020, 8 pages (4 pages of English Translation and 4 pages of Official Copy).
Office Action received for Japanese Patent Application No. 2020-120086, mailed on May 21, 2021, 6 pages (3 pages of English Translation and 3 pages of Official Copy).
Office Action received for Japanese Patent Application No. 2020-120086, mailed on Nov. 20, 2020, 6 pages (3 pages of English Translation and 3 pages of Official Copy).
Office Action received for Japanese Patent Application No. 2021-153573, mailed on Oct. 17, 2022, 4 pages (2 pages of English Translation and 2 pages of Official Copy).
Office Action received for Korean Patent Application No. 10-2020-7032147, mailed on Feb. 16, 2021, 6 pages (2 pages of English Translation and 4 pages of Official Copy).
PC World, “How to make AR Emojis on the Samsung Galaxy S9”, You Tube, Available Online: https://www.youtube.com/watch?v=8wQICfulkz0, Feb. 25, 2018, 2 pages.
Rekimoto et al., “Behind-the-Mask”, A Face-Through Head-Mounted Display, 18, May 29-Jun. 1, 2018, 5 pages.
Result of Consultation received for European Patent Application No. 19172407.9, mailed on Nov. 5, 2020, 17 pages.
Result of Consultation received for European Patent Application No. 19181242.9, mailed on Dec. 1, 2020, 12 pages.
Search Report and Opinion received for Danish Patent Application No. PA201870372, mailed on Sep. 14, 2018, 8 pages.
Search Report and Opinion received for Danish Patent Application No. PA201870372, mailed on Sep. 17, 2018, 10 pages.
Search Report and Opinion received for Danish Patent Application No. PA201870374, mailed on Aug. 27, 2018, 9 pages.
Search Report and Opinion received for Danish Patent Application No. PA201870375, mailed on Aug. 23, 2018, 8 pages.
Search Report and Opinion received for Danish Patent Application No. PA201870377, mailed on Sep. 4, 2018, 8 pages.
Slashgear, “Samsung AR Emoji demo on the Galaxy S9”, Available Online at <https://www.youtube.com/watch?v=GQwNKzY4C9Y>, Feb. 25, 2018, 3 pages.
Spellburst, “The Sims 3: Create a Sim With Me | #2—Dark Fairy + Full CC List!”, Available online at: <https://www.youtube.com/watch?v=Dy_5g9B-wkA>, Oct. 9, 2017, 2 pages.
Summons to Attend Oral Proceedings received for European Patent Application No. 19172407.9, mailed on Jun. 24, 2020, 14 pages.
Summons to Attend Oral Proceedings received for European Patent Application No. 19181242.9, mailed on Jun. 16, 2020, 12 pages.
Summons to Attend Oral Proceedings received for European Patent Application No. 19181242.9, mailed on May 19, 2022, 7 pages.
Tsuchihashi et al., “Generation of Caricatures by Automatic Selection of Templates for Shapes and Placement of Facial Parts”, Technical Report of the Institute of Image Information and Television Engineers, Japan, The Institute of Image Information and Television Engineers, vol. 33, No. 11, pp. 77-80., Feb. 8, 2009, 7 pages (Official Copy Only) (See Communication under 37 CFR § 1.98(a) (3)).
Applicant-Initiated Interview Summary received for U.S. Appl. No. 18/138,634, mailed on Feb. 9, 2024, 4 pages.
Office Action received for European Patent Application No. 22154034.7, mailed on Feb. 19, 2024, 8 pages.
Office Action received for Korean Patent Application No. 10-2023-7032383, mailed on Feb. 5, 2024, 16 pages (7 pages of English Translation and 9 pages of Official Copy).
Non-Final Office Action received for U.S. Appl. No. 17/944,911, mailed on Dec. 26, 2023, 21 pages.
Applicant-Initiated Interview Summary received for U.S. Appl. No. 17/667,350, mailed on May 24, 2024, 4 pages.
Applicant-Initiated Interview Summary received for U.S. Appl. No. 17/667,350, mailed on Jan. 18, 2024, 4 pages.
Non-Final Office Action received for U.S. Appl. No. 18/138,634, mailed on Jan. 16, 2024, 14 pages.
Alldieck et al., “Learning to Reconstruct People in Clothing from a Single RGB Camera”, Rxiv.Org, Cornell University Library, 201 Olin Library Cornell University Ithaca, NY 14853, 2019, 12 pages.
Applicant-Initiated Interview Summary received for U.S. Appl. No. 17/667,350, mailed on May 31, 2023, 4 pages.
Applicant-Initiated Interview Summary received for U.S. Appl. No. 17/667,350, mailed on Sep. 20, 2023, 4 pages.
Corrected Notice of Allowance received for U.S. Appl. No. 17/370,505, mailed on Apr. 4, 2023, 5 pages.
Corrected Notice of Allowance received for U.S. Appl. No. 17/370,505, mailed on Apr. 28, 2023, 5 pages.
Corrected Notice of Allowance received for U.S. Appl. No. 17/370,505, mailed on Mar. 8, 2023, 5 pages.
Decision to Grant received for European Patent Application No. 19181242.9, mailed on Mar. 23, 2023, 3 pages.
Extended European Search Report received for European Patent Application No. 23168077.8, mailed on Jul. 11, 2023, 12 pages.
Final Office Action received for U.S. Appl. No. 17/667,350, mailed on Jul. 26, 2023, 19 pages.
International Preliminary Report on Patentability received for PCT Patent Application No. PCT/US2022/016451, mailed on Aug. 31, 2023, 13 pages.
International Preliminary Report on Patentability received for PCT Patent Application No. PCT/US2022/029811, mailed on Nov. 30, 2023, 10 pages.
International Search Report and Written Opinion received for PCT Patent Application No. PCT/US2022/044194, mailed on Feb. 13, 2023, 18 pages.
International Search Report and Written Opinion received for PCT Patent Application No. PCT/US2022/050799, mailed on Apr. 3, 2023, 18 pages.
Invitation to Pay Additional Fees and Partial International Search Report received for PCT Patent Application No. PCT/US2022/044194, mailed on Dec. 15, 2022, 10 pages.
Office Action received for U.S. Appl. No. 17/667,350, mailed on Apr. 21, 2023, 16 pages.
Office Action received for U.S. Appl. No. 17/667,350, mailed on Oct. 12, 2023, 21 pages.
Notice of Acceptance received for Australian Patent Application No. 2023201250, mailed on Nov. 21, 2023, 3 pages.
Notice of Allowance received for Chinese Patent Application No. 202110820692.4, mailed on Nov. 16, 2022, 2 pages (1 page of English Translation and 1 page of Official Copy).
Notice of Allowance received for Japanese Patent Application No. 2021-153573, mailed on Feb. 17, 2023, 4 pages (1 page of English Translation and 3 pages of Official Copy).

(56) References Cited

OTHER PUBLICATIONS

Notice of Allowance received for Korean Patent Application No. 10-2022-7009437, mailed on Jun. 22, 2023, 7 pages (2 pages of English Translation and 5 pages of Official Copy).
Notice of Allowance received for U.S. Appl. No. 17/370,505, mailed on Feb. 2, 2023, 8 pages.
Notice of Allowance received for U.S. Appl. No. 17/746,179, mailed on Mar. 6, 2023, 8 pages.
Action received for Australian Patent Application No. 2023201250, mailed on Sep. 11, 2023, 3 pages.
Action received for European Patent Application No. 22154034.7, mailed on May 26, 2023, 10 pages.
Action received for Indian Patent Application No. 202015008747, mailed on Mar. 15, 2023, 10 pages.
Office Action received for Indian Patent Application No. 202215026505, mailed on Feb. 8, 2023, 9 pages.
Office Action received for Korean Patent Application No. 10-2022-7009437, mailed on Nov. 30, 2022, 6 pages (2 pages of English Translation and 4 pages of Official Copy).
Supplemental Notice of Allowance received for U.S. Appl. No. 17/746,179, mailed on Apr. 3, 2023, 2 pages.
Final Office Action received for U.S. Appl. No. 17/667,350, mailed on Mar. 21, 2024, 19 pages.
Non-Final Office Action received for U.S. Appl. No. 17/944,911, mailed on Mar. 26, 2024, 11 pages.
Office Action received for Korean Patent Application No. 10-2023-7039673, mailed on Feb. 20, 2024, 11 pages (2 pages of English Translation and 9 pages of Official Copy).
International Preliminary Report on Patentability received for PCT Patent Application No. PCT/US2022/044194, mailed on Apr. 4, 2024, 12 pages.
Notice of Allowance received for U.S. Appl. No. 18/138,634, mailed on Apr. 18, 2024, 9 pages.
Ff14startup, "How to create a character for beginners in FF14 and recommended races", Available online at: https://ff14startup.net/character-making-99/, Sep. 20, 2016, 16 pages (Official Copy only). (See Communication under Rule 37 CFR § 1.98(a) (3)).
Maruberi, "[App Introduction] #3 Luxambra (Selecting the game to play with Hotman next after Maruberi)", Available online at: https://www.youtube.com/watch?v=e4ukNZ-1OrY, Jun. 22, 2014, 2 pages (Official Copy only). (See Communication under Rule 37 CFR § 1.98(a) (3)}.
Notice of Allowance received for Japanese Patent Application No. 2023-043407, mailed on Jul. 26, 2024, 4 pages (1 page of English Translation and 3 pages of Official Copy).
Notice of Allowance received for U.S. Appl. No. 18/204,908, mailed on Jul. 24, 2024, 6 pages.
Office Action received for Japanese Patent Application No. 2023-548256, mailed on Aug. 5, 2024, 8 pages (4 pages of English Translation and 4 pages of Official Copy).
Supplemental Notice of Allowance received for U.S. Appl. No. 18/204,908, mailed on Sep. 26, 2024, 2 pages.
Office Action received for Chinese Patent Application No. 202280036173.1, mailed on Jul. 21, 2024, 12 pages (6 pages of English Translation and 6 pages of Official Copy).
Office Action received for Chinese Patent Application No. 202280036173.1, mailed on May 10, 2024, 16 pages (8 pages of English Translation and 8 pages of Official Copy).
Supplemental Notice of Allowance received for U.S. Appl. No. 18/204,908, mailed on Aug. 13, 2024, 2 pages.
International Preliminary Report on Patentability received for PCT Patent Application No. PCT/US2022/050799, mailed on Jun. 13, 2024, 10 pages.
Non-Final Office Action received for U.S. Appl. No. 18/204,908, mailed on Jun. 5, 2024, 16 pages.
Notice of Allowance received for Korean Patent Application No. 10-2023-7032383, mailed on Aug. 29, 2024, 10 pages (2 pages of English Translation and 8 pages of Official Copy).
Notice of Allowance received for Korean Patent Application No. 10-2023-7039673, mailed on Aug. 21, 2024, 4 pages (1 page of English Translation and 3 pages of Official Copy).
Applicant-Initiated Interview Summary received for U.S. Appl. No. 18/204,908, mailed on Jul. 2, 2024, 4 pages.
Notice of Allowance received for U.S. Appl. No. 17/667,350, mailed on Jul. 8, 2024, 10 pages.
Notice of Allowance received for U.S. Appl. No. 17/944,911, mailed on Jul. 9, 2024, 10 pages.
Corrected Notice of Allowance received for U.S. Appl. No. 18/138,634, mailed on May 20, 2024, 5 pages.
Notice of Hearing received for Indian Patent Application No. 201814036472, mailed on May 9, 2024, 2 pages.
Office Action received for European Patent Application No. 22729935.1, mailed on May 10, 2024, 7 pages.
Decision to Grant received for Japanese Patent Application No. 2023-548256, mailed on Feb. 17, 2025, 3 pages (1 pages of English Translation and 2 pages of Official Copy).
Intention to Grant received for European Patent Application No. 22729935.1, mailed on Nov. 22, 2024, 9 pages.
International Search Report and Written Opinion received for PCT Patent Application No. PCT/US2024/025380, mailed on Sep. 23, 2024, 23 pages.
Invitation to Pay Additional Fees and Partial International Search Report received for PCT Patent Application No. PCT/US2024/025380, mailed on Aug. 1, 2024, 15 pages.
Non-Final Office Action received for U.S. Appl. No. 18/677,585, mailed on Dec. 27, 2024, 14 pages.
Notice of Allowance received for Japanese Patent Application No. 2024-144411, mailed on Jan. 6, 2025, 4 pages (1 page of English Translation and 3 pages of Official Copy).
Office Action received for Australian Patent Application No. 2024201007, mailed on Feb. 7, 2025, 2 pages.
Office Action received for European Patent Application No. 22154034.7, mailed on Oct. 11, 2024, 8 pages.
Office Action received for European Patent Application No. 23168077.8, mailed on Nov. 21, 2024, 8 pages.
Office Action received for Japanese Patent Application No. 2023-548256, mailed on Nov. 11, 2024, 6 pages (3 pages of English Translation and 3 pages of Official Copy).
Office Action received for Japanese Patent Application No. 2024-144411, mailed on Nov. 25, 2024, 4 pages (2 pages of English Translation and 2 pages of Official Copy).
Office Action received for Japanese Patent Application No. 2024-531175, mailed on Feb. 3, 2025, 4 pages (2 pages of English Translation and 2 pages of Official Copy).
Supplemental Notice of Allowance received for U.S. Appl. No. 18/204,908, mailed on Oct. 9, 2024, 2 pages.
Office Action received for Japanese Patent Application No. 2024-083562, mailed on Jun. 26, 2025, 5 pages (3 pages of English Translation and 2 pages of Official Copy).
Office Action received for Australian Patent Application No. 2022398468, mailed on May 30, 2025, 4 pages.
Office Action received for Indian Patent Application No. 202315036344, mailed on May 22, 2025, 8 pages.
Invitation to Pay Search Fees received for European Patent Application No. 22706486.2, mailed on Jun. 11, 2025, 3 pages.
Intention to Grant received for European Patent Application No. 22154034.7, mailed on Feb. 26, 2025, 9 pages.
Notice of Allowance received for U.S. Appl. No. 18/677,585, mailed on Mar. 5, 2025, 9 pages.
Extended European Search Report received for European Patent Application No. 25160012.8, mailed on Jun. 10, 2025, 8 pages.
Intention to Grant received for European Patent Application No. 22154034.7, mailed on Jun. 12, 2025, 8 pages.
Office Action received for Chinese Patent Application No. 201910691872.X, mailed on May 15, 2025, 18 pages (10 pages of English Translation and 8 pages of Official Copy).
Corrected Notice of Allowance received for U.S. Appl. No. 18/677,585, mailed on Apr. 7, 2025, 5 pages.
Corrected Notice of Allowance received for U.S. Appl. No. 18/677,585, mailed on Mar. 31, 2025, 5 pages.

(56) References Cited

OTHER PUBLICATIONS

Corrected Notice of Allowance received for U.S. Appl. No. 18/677,585, mailed on May 7, 2025, 5 pages.
Decision to Grant received for European Patent Application No. 22729935.1, mailed on Mar. 27, 2025, 3 pages.
Intention to Grant received for European Patent Application No. 23168077.8, mailed on Apr. 7, 2025, 9 pages.
Notice of Acceptance received for Australian Patent Application No. 2024201007, mailed on Apr. 7, 2025, 3 pages.
Notice of Allowance received for Japanese Patent Application No. 2024-531175, mailed on Mar. 31, 2025, 4 pages (1 page of English Translation and 3 pages of Official Copy).
Notice of Allowance received for U.S. Appl. No. 18/677,585, mailed on May 19, 2025, 8 pages.
Office Action received for Chinese Patent Application No. 201910691865.X, mailed on Apr. 14, 2025, 14 pages (5 pages of English Translation and 9 pages of Official Copy).
Office Action received for Chinese Patent Application No. 202010330318.1, mailed on Mar. 6, 2025, 27 pages (15 pages of English Translation and 12 pages of Official Copy).
Notice of Allowance received for Korean Patent Application No. 10-2024-7018090, mailed on Aug. 21, 2025, 7 pages (2 pages of English Translation and 5 pages of Official Copy).
Notice of Acceptance received for Australian Patent Application No. 2022398468, mailed on Sep. 10, 2025, 3 pages.

* cited by examiner

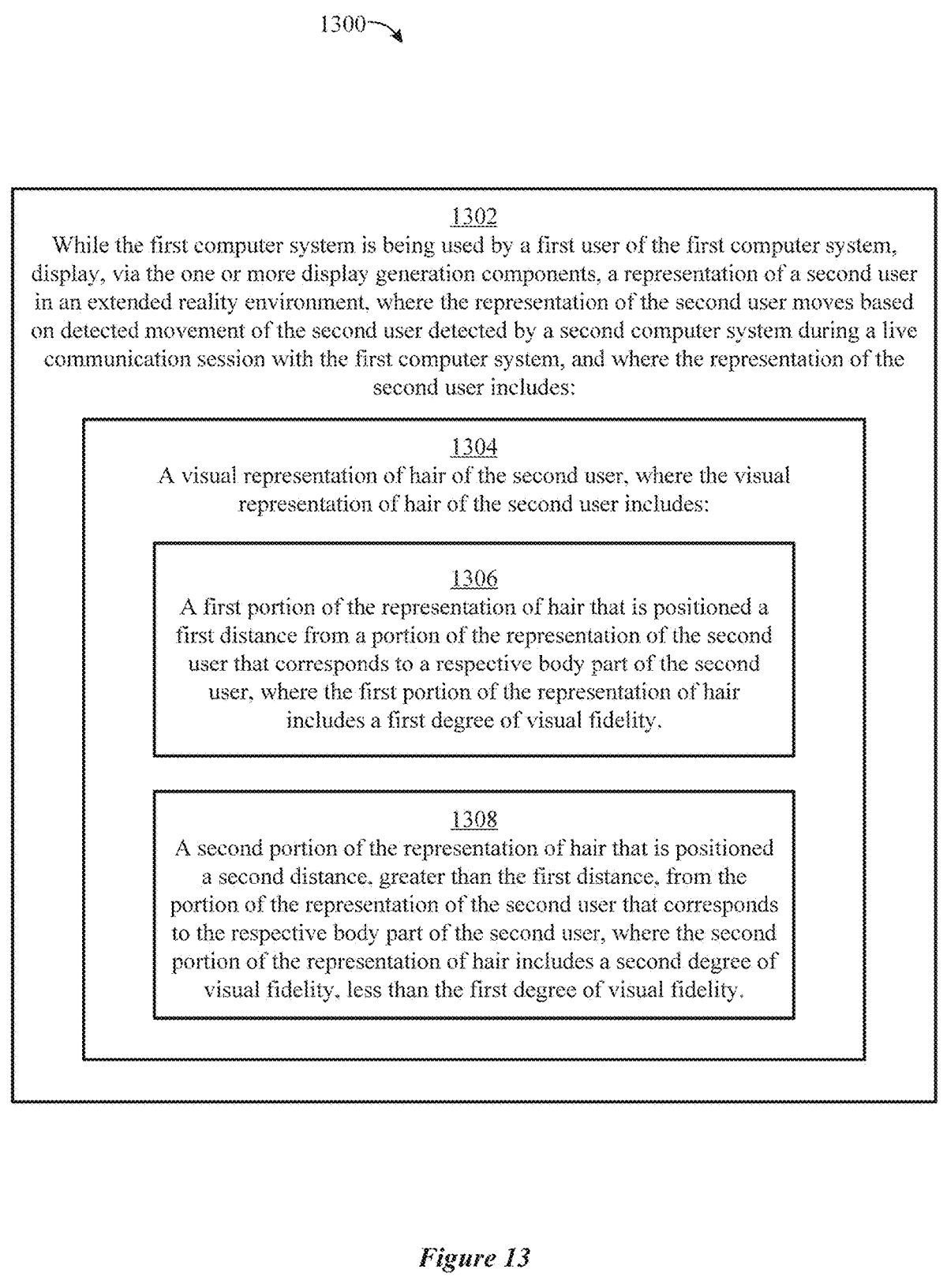

1300

1302
While the first computer system is being used by a first user of the first computer system, display, via the one or more display generation components, a representation of a second user in an extended reality environment, where the representation of the second user moves based on detected movement of the second user detected by a second computer system during a live communication session with the first computer system, and where the representation of the second user includes:

1304
A visual representation of hair of the second user, where the visual representation of hair of the second user includes:

1306
A first portion of the representation of hair that is positioned a first distance from a portion of the representation of the second user that corresponds to a respective body part of the second user, where the first portion of the representation of hair includes a first degree of visual fidelity.

1308
A second portion of the representation of hair that is positioned a second distance, greater than the first distance, from the portion of the representation of the second user that corresponds to the respective body part of the second user, where the second portion of the representation of hair includes a second degree of visual fidelity, less than the first degree of visual fidelity.

*Figure 13*

DEVICES, METHODS, AND GRAPHICAL USER INTERFACES FOR GENERATING AND DISPLAYING A REPRESENTATION OF A USER

CROSS-REFERENCE TO RELATED APPLICATIONS

This application claims priority to U.S. Patent Application Ser. No. 63/283,969, entitled "DEVICES, METHODS, AND GRAPHICAL USER INTERFACES FOR GENERATING AND DISPLAYING A REPRESENTATION OF A USER," filed on Nov. 29, 2021, the content of which is hereby incorporated by reference in its entirety.

TECHNICAL FIELD

The present disclosure relates generally to computer systems that provide computer-generated experiences, including, but not limited to, electronic devices that provide virtual reality and mixed reality experiences via a display.

BACKGROUND

The development of computer systems for augmented reality has increased significantly in recent years. Example augmented reality environments include at least some virtual elements that replace or augment the physical world. Input devices, such as cameras, controllers, joysticks, touch-sensitive surfaces, and touch-screen displays for computer systems and other electronic computing devices are used to interact with virtual/augmented reality environments. Example virtual elements include virtual objects, such as digital images, video, text, icons, and control elements such as buttons and other graphics.

SUMMARY

Some methods and interfaces for generating and/or displaying a representation of a user in environments that include at least some virtual elements (e.g., applications, augmented reality environments, mixed reality environments, and virtual reality environments) are cumbersome, inefficient, and limited. For example, systems that capture data for generating a representation of a user, systems that display the representation of the user, and/or systems that receive insufficient feedback while displaying the representation of the user are complex, tedious, and error-prone, create a significant cognitive burden on a user, and detract from the experience with the virtual/augmented reality environment. In addition, these methods take longer than necessary, thereby wasting energy of the computer system. This latter consideration is particularly important in battery-operated devices.

Accordingly, there is a need for computer systems with improved methods and interfaces for providing computer-generated experiences to users that enable creation and/or display of a representation of a user more efficient and intuitive for a user. Such methods and interfaces optionally complement or replace conventional methods for generating and/or displaying representations of users in environments that include at least some virtual elements. Such methods and interfaces reduce the number, extent, and/or nature of the inputs from a user by helping the user to understand the connection between provided inputs and device responses to the inputs, thereby creating a more efficient human-machine interface.

The above deficiencies and other problems associated with user interfaces for computer systems are reduced or eliminated by the disclosed systems. In some embodiments, the computer system is a desktop computer with an associated display. In some embodiments, the computer system is portable device (e.g., a notebook computer, tablet computer, or handheld device). In some embodiments, the computer system is a personal electronic device (e.g., a wearable electronic device, such as a watch, or a head-mounted device). In some embodiments, the computer system has a touchpad. In some embodiments, the computer system has one or more cameras. In some embodiments, the computer system has a touch-sensitive display (also known as a "touch screen" or "touch-screen display"). In some embodiments, the computer system has one or more eye-tracking components. In some embodiments, the computer system has one or more hand-tracking components. In some embodiments, the computer system has one or more output devices in addition to the display generation component, the output devices including one or more tactile output generators and/or one or more audio output devices. In some embodiments, the computer system has a graphical user interface (GUI), one or more processors, memory and one or more modules, programs or sets of instructions stored in the memory for performing multiple functions. In some embodiments, the user interacts with the GUI through a stylus and/or finger contacts and gestures on the touch-sensitive surface, movement of the user's eyes and hand in space relative to the GUI (and/or computer system) or the user's body as captured by cameras and other movement sensors, and/or voice inputs as captured by one or more audio input devices. In some embodiments, the functions performed through the interactions optionally include image editing, drawing, presenting, word processing, spreadsheet making, game playing, telephoning, video conferencing, e-mailing, instant messaging, workout support, digital photographing, digital videoing, web browsing, digital music playing, note taking, and/or digital video playing. Executable instructions for performing these functions are, optionally, included in a transitory and/or non-transitory computer readable storage medium or other computer program product configured for execution by one or more processors.

There is a need for electronic devices with improved methods and interfaces for generating and/or displaying representations of users. Such methods and interfaces may complement or replace conventional methods for generating and/or displaying representations of users. Such methods and interfaces reduce the number, extent, and/or the nature of the inputs from a user and produce a more efficient human-machine interface. Such methods and interfaces also display relevant portions of representations of users such that a processing power of the computer system is reduced, thereby producing a more efficient human-machine interface. For battery-operated computing devices, such methods and interfaces conserve power and increase the time between battery charges.

In accordance with some embodiments, a method is described. The method is performed at a computer system that is in communication with one or more display generation components. The method comprises: while the computer system is placed on a body of a user, displaying, via the one or more display generation components, a prompt instructing to remove the computer system from the body of the user and to use the computer system to capture information related to the user; subsequent to displaying the prompt instructing to remove the computer system from the body of the user, detecting that the computer system has been removed from the body of the user; and after detecting that the computer system has been removed from the body of the user, capturing information related to the user, wherein the computer system is configured to use the information to generate a representation of the user.

In accordance with some embodiments, a non-transitory computer-readable storage medium is described. The non-transitory computer-readable storage medium stores one or more programs configured to be executed by one or more processors of a computer system that is in communication with one or more display generation components, the one or more programs including instructions for: while the computer system is placed on a body of a user, displaying, via the one or more display generation components, a prompt instructing to remove the computer system from the body of the user and to use the computer system to capture information related to the user; subsequent to displaying the prompt instructing to remove the computer system from the body of the user, detecting that the computer system has been removed from the body of the user; and after detecting that the computer system has been removed from the body of the user, capturing information related to the user, wherein the computer system is configured to use the information to generate a representation of the user.

In accordance with some embodiments, a transitory computer-readable storage medium is described. The transitory computer readable storage medium stores one or more programs configured to be executed by one or more processors of a computer system that is in communication with one or more display generation components, the one or more programs including instructions for: while the computer system is placed on a body of a user, displaying, via the one or more display generation components, a prompt instructing to remove the computer system from the body of the user and to use the computer system to capture information related to the user; subsequent to displaying the prompt instructing to remove the computer system from the body of the user, detecting that the computer system has been removed from the body of the user; and after detecting that the computer system has been removed from the body of the user, capturing information related to the user, wherein the computer system is configured to use the information to generate a representation of the user.

In accordance with some embodiments, a computer system is described. The computer system is in communication with one or more display generation components. The computer system comprises: one or more processors; and memory storing one or more programs configured to be executed by the one or more processors, the one or more programs including instructions for: while the computer system is placed on a body of a user, displaying, via the one or more display generation components, a prompt instructing to remove the computer system from the body of the user and to use the computer system to capture information related to the user; subsequent to displaying the prompt instructing to remove the computer system from the body of the user, detecting that the computer system has been removed from the body of the user; and after detecting that the computer system has been removed from the body of the user, capturing information related to the user, wherein the computer system is configured to use the information to generate a representation of the user.

In accordance with some embodiments, a computer system is described. The computer system is in communication with one or more display generation components. The computer system comprises: while the computer system is placed on a body of a user, means for displaying, via the one or more display generation components, a prompt instructing to remove the computer system from the body of the user and to use the computer system to capture information related to the user; subsequent to displaying the prompt instructing to remove the computer system from the body of the user, means for detecting that the computer system has been removed from the body of the user; and after detecting that the computer system has been removed from the body of the user, means for capturing information related to the user, wherein the computer system is configured to use the information to generate a representation of the user.

In accordance with some embodiments, a method is described. The method is performed at a computer system that is in communication with one or more display generation components. The method comprises: during an enrollment process for generating a representation of a user, capturing information about one or more physical characteristics of a user of the computer system; after capturing the information about the one or more physical characteristics of the user of the computer system, generating the representation of the user based on the information about the one or more physical characteristics of the user including selecting one or more physical characteristics of the representation based on the one or more captured physical characteristics of the user; and after generating the representation of the user, displaying, via the one or more display generation components, at least a portion of the representation of the user in an extended reality environment.

In accordance with some embodiments, a non-transitory computer-readable storage medium is described. The non-transitory computer-readable storage medium stores one or more programs configured to be executed by one or more processors of a computer system that is in communication with one or more display generation components, the one or more programs including instructions for: during an enrollment process for generating a representation of a user, capturing information about one or more physical characteristics of a user of the computer system; after capturing the information about the one or more physical characteristics of the user of the computer system, generating the representation of the user based on the information about the one or more physical characteristics of the user including selecting one or more physical characteristics of the representation based on the one or more captured physical characteristics of the user; and after generating the representation of the user, displaying, via the one or more display generation components, at least a portion of the representation of the user in an extended reality environment.

In accordance with some embodiments, a transitory computer-readable storage medium is described. The transitory computer readable storage medium stores one or more programs configured to be executed by one or more processors of a computer system that is in communication with one or more display generation components, the one or more programs including instructions for: during an enrollment process for generating a representation of a user, capturing information about one or more physical characteristics of a user of the computer system; after capturing the information about the one or more physical characteristics of the user of the computer system, generating the representation of the user based on the information about the one or more physical characteristics of the user including selecting one or more physical characteristics of the representation based on the one or more captured physical characteristics of the user; and after generating the representation of the user, displaying, via the one or more display generation components, at least a portion of the representation of the user in an extended reality environment.

In accordance with some embodiments, a computer system is described. The computer system is in communication with one or more display generation components. The computer system comprises: one or more processors; and memory storing one or more programs configured to be executed by the one or more processors, the one or more programs including instructions for: during an enrollment process for generating a representation of a user, capturing information about one or more physical characteristics of a user of the computer system; after capturing the information about the one or more physical characteristics of the user of the computer system, generating the representation of the user based on the information about the one or more physical characteristics of the user including selecting one or more physical characteristics of the representation based on the one or more captured physical characteristics of the user; and after generating the representation of the user, displaying, via the one or more display generation components, at least a portion of the representation of the user in an extended reality environment.

In accordance with some embodiments, a computer system is described. The computer system is in communication with one or more display generation components. The computer system comprises: during an enrollment process for generating a representation of a user, means for capturing information about one or more physical characteristics of a user of the computer system; after capturing the information about the one or more physical characteristics of the user of the computer system, means for generating the representation of the user based on the information about the one or more physical characteristics of the user including selecting one or more physical characteristics of the representation based on the one or more captured physical characteristics of the user; and after generating the representation of the user, means for displaying, via the one or more display generation components, at least a portion of the representation of the user in an extended reality environment.

In accordance with some embodiments, a method is described. The method is performed at a first computer system that is in communication with one or more display generation components. The method comprises: while the first computer system is being used by a first user of the first computer system, displaying, via the one or more display generation components, a representation of a second user in an extended reality environment with a first degree of fidelity, wherein the representation of the second user moves based on detected movement of the second user detected by a second computer system during a live communication session with the first computer system; while displaying the representation of the second user in the extended reality environment, an amount of direct information about a state of the body of the second user changes; and in response to the amount of direct information about the state of the body of the second user changing, the first computer system starts to display, via the one or more display generation components, the representation of the second user with a different degree of fidelity, including: in accordance with a determination that the direct information about the state of the body of the second user is not received for a first amount of time that is greater than a first time threshold and less than a second time threshold, displaying, via the one or more display generation components, the representation of the second user with a second degree of fidelity that is less than the first degree of fidelity; and in accordance with a determination that direct information about the state of the body of the second user is not received for a second amount of time that is greater than the first time threshold and greater than the second time threshold, displaying, via the one or more display generation components, the representation of the second user with a third degree of fidelity that is less than the second degree of fidelity.

In accordance with some embodiments, a non-transitory computer-readable storage medium is described. The non-transitory computer-readable storage medium stores one or more programs configured to be executed by one or more processors of a first computer system that is in communication with one or more display generation components, the one or more programs including instructions for: while the first computer system is being used by a first user of the first computer system, displaying, via the one or more display generation components, a representation of a second user in an extended reality environment with a first degree of fidelity, wherein the representation of the second user moves based on detected movement of the second user detected by a second computer system during a live communication session with the first computer system; while displaying the representation of the second user in the extended reality environment, an amount of direct information about a state of the body of the second user changes; and in response to the amount of direct information about the state of the body of the second user changing, the first computer system starts to display, via the one or more display generation components, the representation of the second user with a different degree of fidelity, including: in accordance with a determination that the direct information about the state of the body of the second user is not received for a first amount of time that is greater than a first time threshold and less than a second time threshold, displaying, via the one or more display generation components, the representation of the second user with a second degree of fidelity that is less than the first degree of fidelity; and in accordance with a determination that direct information about the state of the body of the second user is not received for a second amount of time that is greater than the first time threshold and greater than the second time threshold, displaying, via the one or more display generation components, the representation of the second user with a third degree of fidelity that is less than the second degree of fidelity.

In accordance with some embodiments, a transitory computer-readable storage medium is described. The transitory computer readable storage medium stores one or more programs configured to be executed by one or more processors of a first computer system that is in communication with one or more display generation components, the one or more programs including instructions for: while the first computer system is being used by a first user of the first computer system, displaying, via the one or more display generation components, a representation of a second user in an extended reality environment with a first degree of fidelity, wherein the representation of the second user moves based on detected movement of the second user detected by a second computer system during a live communication session with the first computer system; while displaying the representation of the second user in the extended reality environment, an amount of direct information about a state of the body of the second user changes; and in response to the amount of direct information about the state of the body of the second user changing, the first computer system starts to display, via the one or more display generation components, the representation of the second user with a different degree of fidelity, including: in accordance with a determination that the direct information about the state of the body of the second user is not received for a first amount of time that is greater than a first time threshold and less than a second time threshold, displaying, via the one or more display generation components, the representation of the second user with a second degree of fidelity that is less than the first degree of fidelity; and in accordance with a determination that direct information about the state of the body of the second user is not received for a second amount of time that is greater than the first time threshold and greater than the second time threshold, displaying, via the one or more display generation components, the representation of the second user with a third degree of fidelity that is less than the second degree of fidelity.

In accordance with some embodiments, a first computer system is described. The first computer system is in communication with one or more display generation components. The first computer system comprises: one or more processors; and memory storing one or more programs configured to be executed by the one or more processors, the one or more programs including instructions for: while the first computer system is being used by a first user of the first computer system, displaying, via the one or more display generation components, a representation of a second user in an extended reality environment with a first degree of fidelity, wherein the representation of the second user moves based on detected movement of the second user detected by a second computer system during a live communication session with the first computer system; while displaying the representation of the second user in the extended reality environment, an amount of direct information about a state of the body of the second user changes; and in response to the amount of direct information about the state of the body of the second user changing, the first computer system starts to display, via the one or more display generation components, the representation of the second user with a different degree of fidelity, including: in accordance with a determination that the direct information about the state of the body of the second user is not received for a first amount of time that is greater than a first time threshold and less than a second time threshold, displaying, via the one or more display generation components, the representation of the second user with a second degree of fidelity that is less than the first degree of fidelity; and in accordance with a determination that direct information about the state of the body of the second user is not received for a second amount of time that is greater than the first time threshold and greater than the second time threshold, displaying, via the one or more display generation components, the representation of the second user with a third degree of fidelity that is less than the second degree of fidelity.

In accordance with some embodiments, a first computer system is described. The first computer system is in communication with one or more display generation components. The first computer system comprises: while the first computer system is being used by a first user of the first computer system, means for displaying, via the one or more display generation components, a representation of a second user in an extended reality environment with a first degree of fidelity, wherein the representation of the second user moves based on detected movement of the second user detected by a second computer system during a live communication session with the first computer system; means for, while displaying the representation of the second user in the extended reality environment, an amount of direct information about a state of the body of the second user changes; and means for, in response to the amount of direct information about the state of the body of the second user changing, the first computer system starts to display, via the one or more display generation components, the representation of the second user with a different degree of fidelity, including: in accordance with a determination that the direct information about the state of the body of the second user is not received for a first amount of time that is greater than a first time threshold and less than a second time threshold, displaying, via the one or more display generation components, the representation of the second user with a second degree of fidelity that is less than the first degree of fidelity; and in accordance with a determination that direct information about the state of the body of the second user is not received for a second amount of time that is greater than the first time threshold and greater than the second time threshold, displaying, via the one or more display generation components, the representation of the second user with a third degree of fidelity that is less than the second degree of fidelity.

In accordance with some embodiments, a method is described. The method is performed at a first computer system that is in communication with one or more display generation components. The method comprises: while the first computer system is being used by a first user of the first computer system, displaying, via the one or more display generation components, a representation of the second user in an extended reality environment, wherein the representation of the second user moves based on detected movement of the second user detected by a second computer system during a live communication session with the first computer system; while displaying the representation of the second user in the extended reality environment, receiving information corresponding to an utterance of the second user; and in response to receiving the information corresponding to the utterance of the second user, updating an appearance of the representation of the second user based on the information corresponding to the utterance of the second user, including: in accordance with a determination that information about a detected physical state of a mouth of the second user does not satisfy a set of one or more criteria, displaying, via the one or more display generation components, a first mouth representation of the representation of the second user, wherein the first mouth representation is generated based on audio information corresponding to the utterance of the second user; and in accordance with a determination that information about the detected physical state of the mouth of the second user satisfies the set of one or more criteria, displaying, via the one or more display generation components, a second mouth representation of the representation of the second user, wherein the second mouth representation is generated based on the information about the detected physical state of the mouth of the second user without using audio information corresponding to the utterance of the second user to generate the second mouth representation.

In accordance with some embodiments, a non-transitory computer-readable storage medium is described. The non-transitory computer-readable storage medium stores one or more programs configured to be executed by one or more processors of a first computer system that is in communication with one or more display generation components, the one or more programs including instructions for: while the first computer system is being used by a first user of the first computer system, displaying, via the one or more display generation components, a representation of the second user in an extended reality environment, wherein the representation of the second user moves based on detected movement of the second user detected by a second computer system during a live communication session with the first computer system; while displaying the representation of the second user in the extended reality environment, receiving information corresponding to an utterance of the second user; and in response to receiving the information corresponding to the utterance of the second user, updating an appearance of the representation of the second user based on the information corresponding to the utterance of the second user, including: in accordance with a determination that information about a detected physical state of a mouth of the second user does not satisfy a set of one or more criteria, displaying, via the one or more display generation components, a first mouth representation of the representation of the second user, wherein the first mouth representation is generated based on audio information corresponding to the utterance of the second user; and in accordance with a determination that information about the detected physical state of the mouth of the second user satisfies the set of one or more criteria, displaying, via the one or more display generation components, a second mouth representation of the representation of the second user, wherein the second mouth representation is generated based on the information about the detected physical state of the mouth of the second user without using audio information corresponding to the utterance of the second user to generate the second mouth representation.

In accordance with some embodiments, a transitory computer-readable storage medium is described. The transitory computer readable storage medium stores one or more programs configured to be executed by one or more processors of a first computer system that is in communication with one or more display generation components, the one or more programs including instructions for: while the first computer system is being used by a first user of the first computer system, displaying, via the one or more display generation components, a representation of the second user in an extended reality environment, wherein the representation of the second user moves based on detected movement of the second user detected by a second computer system during a live communication session with the first computer system; while displaying the representation of the second user in the extended reality environment, receiving information corresponding to an utterance of the second user; and in response to receiving the information corresponding to the utterance of the second user, updating an appearance of the representation of the second user based on the information corresponding to the utterance of the second user, including: in accordance with a determination that information about a detected physical state of a mouth of the second user does not satisfy a set of one or more criteria, displaying, via the one or more display generation components, a first mouth representation of the representation of the second user, wherein the first mouth representation is generated based on audio information corresponding to the utterance of the second user; and in accordance with a determination that information about the detected physical state of the mouth of the second user satisfies the set of one or more criteria, displaying, via the one or more display generation components, a second mouth representation of the representation of the second user, wherein the second mouth representation is generated based on the information about the detected physical state of the mouth of the second user without using audio information corresponding to the utterance of the second user to generate the second mouth representation.

In accordance with some embodiments, a first computer system is described. The first computer system is in communication with one or more display generation components. The first computer system comprises: one or more processors; and memory storing one or more programs configured to be executed by the one or more processors, the one or more programs including instructions for: while the first computer system is being used by a first user of the first computer system, displaying, via the one or more display generation components, a representation of the second user in an extended reality environment, wherein the representation of the second user moves based on detected movement of the second user detected by a second computer system during a live communication session with the first computer system; while displaying the representation of the second user in the extended reality environment, receiving information corresponding to an utterance of the second user; and in response to receiving the information corresponding to the utterance of the second user, updating an appearance of the representation of the second user based on the information corresponding to the utterance of the second user, including: in accordance with a determination that information about a detected physical state of a mouth of the second user does not satisfy a set of one or more criteria, displaying, via the one or more display generation components, a first mouth representation of the representation of the second user, wherein the first mouth representation is generated based on audio information corresponding to the utterance of the second user; and in accordance with a determination that information about the detected physical state of the mouth of the second user satisfies the set of one or more criteria, displaying, via the one or more display generation components, a second mouth representation of the representation of the second user, wherein the second mouth representation is generated based on the information about the detected physical state of the mouth of the second user without using audio information corresponding to the utterance of the second user to generate the second mouth representation.

In accordance with some embodiments, a first computer system is described. The first computer system is in communication with one or more display generation components. The first computer system comprises: while the first computer system is being used by a first user of the first computer system, means for displaying, via the one or more display generation components, a representation of the second user in an extended reality environment, wherein the representation of the second user moves based on detected movement of the second user detected by a second computer system during a live communication session with the first computer system; while displaying the representation of the second user in the extended reality environment, means for receiving information corresponding to an utterance of the second user; and in response to receiving the information corresponding to the utterance of the second user, means for updating an appearance of the representation of the second user based on the information corresponding to the utterance of the second user, including: in accordance with a determination that information about a detected physical state of a mouth of the second user does not satisfy a set of one or more criteria, displaying, via the one or more display generation components, a first mouth representation of the representation of the second user, wherein the first mouth representation is generated based on audio information corresponding to the utterance of the second user; and in accordance with a determination that information about the detected physical state of the mouth of the second user satisfies the set of one or more criteria, displaying, via the one or more display generation components, a second mouth representation of the representation of the second user, wherein the second mouth representation is generated based on the information about the detected physical state of the mouth of the second user without using audio information corresponding to the utterance of the second user to generate the second mouth representation.

In accordance with some embodiments, a method is described. The method is performed at a first computer system that is in communication with one or more display generation components. The method comprises: while the first computer system is being used by a first user of the first computer system, displaying, via the one or more display generation components, a representation of the second user in an extended reality environment, wherein the representation of the second user moves based on detected movement of the second user detected by a second computer system during a live communication session with the first computer system, and wherein the representation of the second user includes: a visual representation of hair of the second user, wherein the visual representation of hair of the second user includes: a first portion of the representation of hair that is positioned a first distance from a portion of the representation of the second user that corresponds to a respective body part of the second user, wherein the first portion of the representation of hair includes a first degree of visual fidelity; and a second portion of the representation of hair that is positioned a second distance, greater than the first distance, from the portion of the representation of the second user that corresponds to the respective body part of the second user, wherein the second portion of the representation of hair includes a second degree of visual fidelity, less than the first degree of visual fidelity.

In accordance with some embodiments, a non-transitory computer-readable storage medium is described. The non-transitory computer-readable storage medium stores one or more programs configured to be executed by one or more processors of a first computer system that is in communication with one or more display generation components, the one or more programs including instructions for: while the first computer system is being used by a first user of the first computer system, displaying, via the one or more display generation components, a representation of the second user in an extended reality environment, wherein the representation of the second user moves based on detected movement of the second user detected by a second computer system during a live communication session with the first computer system, and wherein the representation of the second user includes: a visual representation of hair of the second user, wherein the visual representation of hair of the second user includes: a first portion of the representation of hair that is positioned a first distance from a portion of the representation of the second user that corresponds to a respective body part of the second user, wherein the first portion of the representation of hair includes a first degree of visual fidelity; and a second portion of the representation of hair that is positioned a second distance, greater than the first distance, from the portion of the representation of the second user that corresponds to the respective body part of the second user, wherein the second portion of the representation of hair includes a second degree of visual fidelity, less than the first degree of visual fidelity.

In accordance with some embodiments, a transitory computer-readable storage medium is described. The transitory computer readable storage medium stores one or more programs configured to be executed by one or more processors of a first computer system that is in communication with one or more display generation components, the one or more programs including instructions for: while the first computer system is being used by a first user of the first computer system, displaying, via the one or more display generation components, a representation of the second user in an extended reality environment, wherein the representation of the second user moves based on detected movement of the second user detected by a second computer system during a live communication session with the first computer system, and wherein the representation of the second user includes: a visual representation of hair of the second user, wherein the visual representation of hair of the second user includes: a first portion of the representation of hair that is positioned a first distance from a portion of the representation of the second user that corresponds to a respective body part of the second user, wherein the first portion of the representation of hair includes a first degree of visual fidelity; and a second portion of the representation of hair that is positioned a second distance, greater than the first distance, from the portion of the representation of the second user that corresponds to the respective body part of the second user, wherein the second portion of the representation of hair includes a second degree of visual fidelity, less than the first degree of visual fidelity.

In accordance with some embodiments, a first computer system is described. The first computer system is in communication with one or more display generation components. The first computer system comprises: one or more processors; and memory storing one or more programs configured to be executed by the one or more processors, the one or more programs including instructions for: while the first computer system is being used by a first user of the first computer system, displaying, via the one or more display generation components, a representation of the second user in an extended reality environment, wherein the representation of the second user moves based on detected movement of the second user detected by a second computer system during a live communication session with the first computer system, and wherein the representation of the second user includes: a visual representation of hair of the second user, wherein the visual representation of hair of the second user includes: a first portion of the representation of hair that is positioned a first distance from a portion of the representation of the second user that corresponds to a respective body part of the second user, wherein the first portion of the representation of hair includes a first degree of visual fidelity; and a second portion of the representation of hair that is positioned a second distance, greater than the first distance, from the portion of the representation of the second user that corresponds to the respective body part of the second user, wherein the second portion of the representation of hair includes a second degree of visual fidelity, less than the first degree of visual fidelity.

In accordance with some embodiments, a first computer system is described. The first computer system is in communication with one or more display generation components. The first computer system comprises: while the first computer system is being used by a first user of the first computer system, means for displaying, via the one or more display generation components, a representation of the second user in an extended reality environment, wherein the representation of the second user moves based on detected movement of the second user detected by a second computer system during a live communication session with the first computer system, and wherein the representation of the second user includes: a visual representation of hair of the second user, wherein the visual representation of hair of the second user includes: a first portion of the representation of hair that is positioned a first distance from a portion of the representation of the second user that corresponds to a respective body part of the second user, wherein the first portion of the representation of hair includes a first degree of visual fidelity; and a second portion of the representation of hair that is positioned a second distance, greater than the first distance, from the portion of the representation of the second user that corresponds to the respective body part of the second user, wherein the second portion of the representation of hair includes a second degree of visual fidelity, less than the first degree of visual fidelity.

In accordance with some embodiments, a method is described. The method is performed at a first computer system that is in communication with one or more display generation components. The method comprises: while the first computer system is being used by a first user of the first computer system, displaying, via the one or more display generation components, a representation of the second user in an extended reality environment, wherein the representation of the second user moves based on detected movement of the second user detected by a second computer system during a live communication session with the first computer system, and wherein the representation of the second user includes: a first portion of the representation of the second user that corresponds to a boundary between the representation of the second user and other portions of the extended reality environment, wherein the first portion of the representation of the second user is displayed with a first visual appearance; and a second portion of the representation of the second user that does not correspond to the boundary between the representation of the second user and other portions of the extended reality environment, wherein the second portion of the representation of the second user is displayed with a second visual appearance, wherein the first visual appearance is emphasized as compared to the second visual appearance.

In accordance with some embodiments, a non-transitory computer-readable storage medium is described. The non-transitory computer-readable storage medium stores one or more programs configured to be executed by one or more processors of a first computer system that is in communication with one or more display generation components, the one or more programs including instructions for: while the first computer system is being used by a first user of the first computer system, displaying, via the one or more display generation components, a representation of the second user in an extended reality environment, wherein the representation of the second user moves based on detected movement of the second user detected by a second computer system during a live communication session with the first computer system, and wherein the representation of the second user includes: a first portion of the representation of the second user that corresponds to a boundary between the representation of the second user and other portions of the extended reality environment, wherein the first portion of the representation of the second user is displayed with a first visual appearance; and a second portion of the representation of the second user that does not correspond to the boundary between the representation of the second user and other portions of the extended reality environment, wherein the second portion of the representation of the second user is displayed with a second visual appearance, wherein the first visual appearance is emphasized as compared to the second visual appearance.

In accordance with some embodiments, a transitory computer-readable storage medium is described. The transitory computer readable storage medium stores one or more programs configured to be executed by one or more processors of a first computer system that is in communication with one or more display generation components, the one or more programs including instructions for: while the first computer system is being used by a first user of the first computer system, displaying, via the one or more display generation components, a representation of the second user in an extended reality environment, wherein the representation of the second user moves based on detected movement of the second user detected by a second computer system during a live communication session with the first computer system, and wherein the representation of the second user includes: a first portion of the representation of the second user that corresponds to a boundary between the representation of the second user and other portions of the extended reality environment, wherein the first portion of the representation of the second user is displayed with a first visual appearance; and a second portion of the representation of the second user that does not correspond to the boundary between the representation of the second user and other portions of the extended reality environment, wherein the second portion of the representation of the second user is displayed with a second visual appearance, wherein the first visual appearance is emphasized as compared to the second visual appearance.

In accordance with some embodiments, a first computer system is described. The first computer system is in communication with one or more display generation components. The first computer system comprises: one or more processors; and memory storing one or more programs configured to be executed by the one or more processors, the one or more programs including instructions for: while the first computer system is being used by a first user of the first computer system, displaying, via the one or more display generation components, a representation of the second user in an extended reality environment, wherein the representation of the second user moves based on detected movement of the second user detected by a second computer system during a live communication session with the first computer system, and wherein the representation of the second user includes: a first portion of the representation of the second user that corresponds to a boundary between the representation of the second user and other portions of the extended reality environment, wherein the first portion of the representation of the second user is displayed with a first visual appearance; and a second portion of the representation of the second user that does not correspond to the boundary between the representation of the second user and other portions of the extended reality environment, wherein the second portion of the representation of the second user is displayed with a second visual appearance, wherein the first visual appearance is emphasized as compared to the second visual appearance.

In accordance with some embodiments, a first computer system is described. The first computer system is in communication with one or more display generation components. The first computer system comprises: while the first computer system is being used by a first user of the first computer system, means for displaying, via the one or more display generation components, a representation of the second user in an extended reality environment, wherein the representation of the second user moves based on detected movement of the second user detected by a second computer system during a live communication session with the first computer system, and wherein the representation of the second user includes: a first portion of the representation of the second user that corresponds to a boundary between the representation of the second user and other portions of the extended reality environment, wherein the first portion of the representation of the second user is displayed with a first visual appearance; and a second portion of the representation of the second user that does not correspond to the boundary between the representation of the second user and other portions of the extended reality environment, wherein the second portion of the representation of the second user is displayed with a second visual appearance, wherein the first visual appearance is emphasized as compared to the second visual appearance.

Note that the various embodiments described above can be combined with any other embodiments described herein. The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

FIG. 13 is a flow diagram of methods of displaying a hair representation of a representation of a user, in accordance with various embodiments.

DESCRIPTION OF EMBODIMENTS

Figure 1:
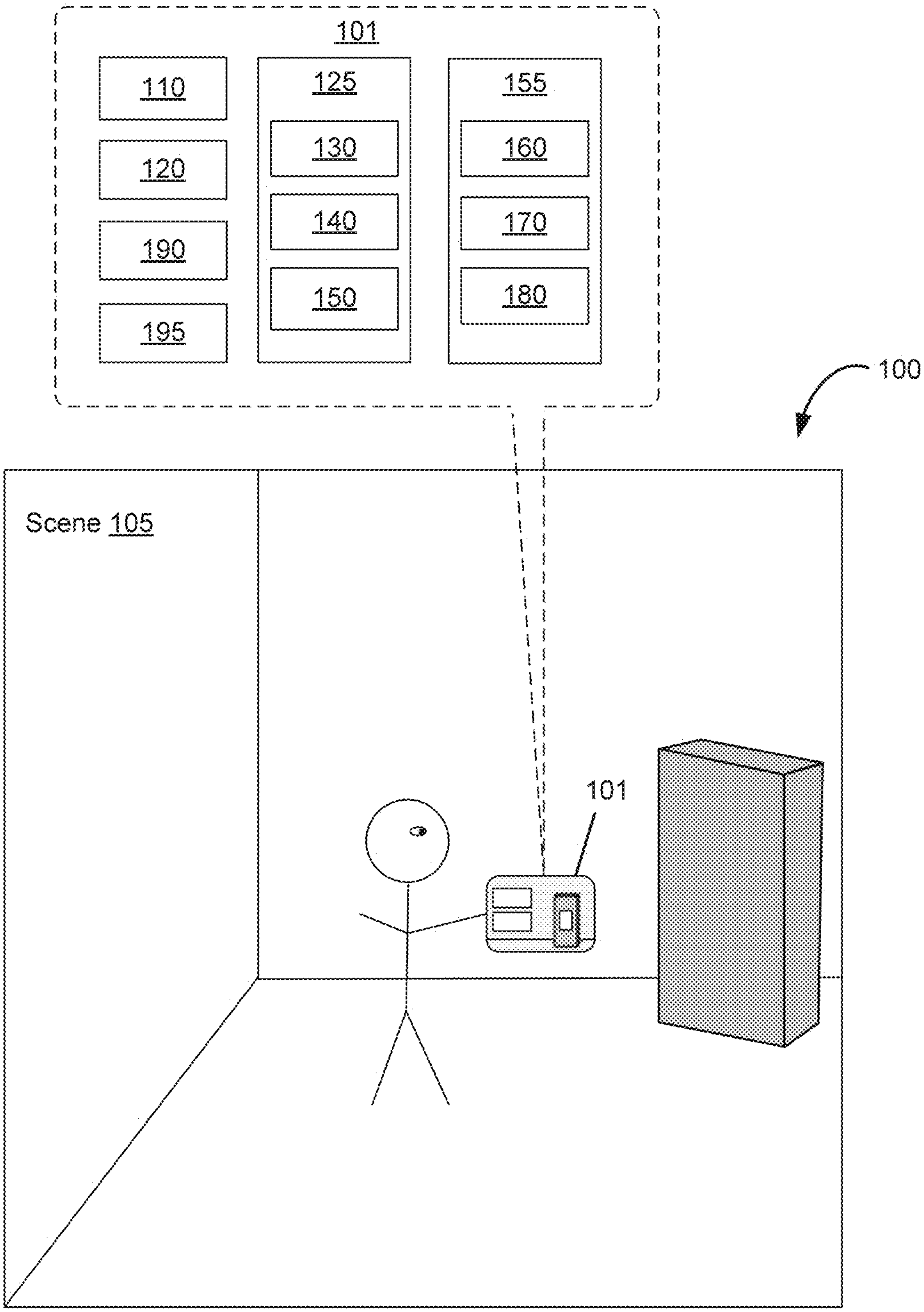
FIG. 1 is a block diagram illustrating an operating environment of a computer system for providing XR experiences in accordance with some embodiments.

The present disclosure relates to user interfaces for providing an extended reality (XR) experience to a user, in accordance with some embodiments.

The systems, methods, and GUIs described herein improve user interface interactions with virtual/augmented reality environments in multiple ways.

In some embodiments, a computer system captures information related to a user and uses the captured information to generate a representation of the user. While the computer system is placed on a body of the user, the computer system prompts a user to remove the computer system from the body of the user and to use the computer system to capture the information related to the user. The computer system detects that the computer system has been removed from the body of the user and, after detecting that the computer system has been removed from the body of the user, captures the information related to the user. In some embodiments, the computer system is wearable computer system, such as a head-mounted display generation component and/or watch, that can be worn with a respective orientation and/or position relative to the body of the user. In some embodiments, the computer system captures information related to a head and/or face of the user while the computer system is removed from the body of the user and captures information related to hands of the user while the computer system is placed on the body of the user. In some embodiments, the computer system displays a first prompt on a first display generation component that prompts the user to remove the computer system from the body of the user and a displays a second prompt on a second display generation component that provides instructions for capturing the information related to the user while the computer system is removed from the body of the user.

In some embodiments, a computer system captures information about one or more physical characteristics of a user, generates a representation of the user based on the information about the one or more physical characteristics of the user, and displays the representation of the user in an extended reality environment, such an augmented reality environment and/or a virtual reality environment. In some embodiments, the computer system displays the representation of the user to include a representative state that is a mirror image of a physical state of the user in a physical environment. In some embodiments, the computer system animates and/or displays movement of the representation that is based on physical movement of the user in the physical environment. In some embodiments, the computer system provides, while displaying the representation of the user in the extended reality environment, selectable options for editing the representation of the user and/or for recapturing the information about the one or more physical characteristics of the user.

In some embodiments, a first computer system that is being used by a first user displays a representation of a second user in an extended reality environment and adjusts an appearance of the representation of the second user based on an amount of direct information about a state of the body of the second user. For instance, the computer system displays the representation of the second user with a first degree of visual fidelity and/or precision. When the direct information about the state of the body of the second user is not received for a first amount of time that is greater than a first time threshold and less than a second time threshold, the computer system displays the representation of the second user with a second degree of visual fidelity and/or precision that is less than the first degree of visual fidelity and/or precision. When the direct information about the state of the body of the second user is not received for a second amount of time that is greater than the first time threshold and greater than the second time threshold, the computer system displays the representation of the second user with a third degree of visual fidelity and/or precision that is less than the first degree of visual fidelity and/or precision and less than the second degree of visual fidelity and/or precision. In some embodiments, when the direct information about the state of the body of the second user is not received for the second amount of time, the computer system displays the representation of the second user in a presentation mode, such that the representation of the second user does not have anthropomorphic features and/or is an inanimate object within the extended reality environment.

In some embodiments, a first computer system that is being used by a first user displays a representation of a second user in an extended reality environment and displays a mouth representation of the representation of the second user based on one or more of audio information corresponding to an utterance of the second user and/or information about a detected physical state of a mouth of the second user. The computer system receives the audio information corresponding to the utterance of the second user and updates an appearance of the representation of the second user based on the audio information corresponding to the utterance of the user. When the information about the detected physical state of the mouth of the second user does not satisfy a set of one or more criteria, such as the information about the detected physical state of the mouth of the second user being below a confidence level threshold, the computer system displays the representation of the second user having a first mouth representation that is generated based on the audio information corresponding to the utterance of the second user. When the information about the detected physical state of the mouth of the second user satisfies the set of one or more criteria, such as the information about the detected physical state of the mouth of the second user is above the confidence level threshold, the computer system displays the representation of the second user having a second mouth representation that is generated based on the information about the detected physical state of the mouth of the second user without using the audio information corresponding to the utterance of the second user. In some embodiments, the first mouth representation is a combination and/or overlay of a third mouth representation that is generated based on the audio information corresponding to the utterance of the second user and a fourth mouth representation that is generated based on the information about the detected physical state of the mouth of the second user. In some embodiments, the first mouth representation is generated using different amounts of the third mouth representation and the fourth mouth representation based on a confidence level of the information about the detected physical state of the mouth of the second user.

In some embodiments, a first computer system that is being used by a first user displays a representation of a second user in an extended reality environment and displays the representation of the second user including a visual representation of hair of the second user. The visual representation of the hair of the second user includes a first portion that is positioned a first distance from a portion of the representation of the second user corresponding to a respective body part of the second user, such as a face and/or neck, and includes a first degree of visual fidelity and/or precision. The visual representation of the hair includes a second portion that is positioned a second distance, greater than the first distance, from the portion of the representation of the second user corresponding to the respective body part of the second user and includes a second degree of visual fidelity and/or precision that is less than the first degree of visual fidelity and/or precision. As such, the visual representation of the hair of the second user becomes less clear the further the visual representation of the hair is positioned away from the portion of the representation of the second user corresponding to the respective body part of the second user. In some embodiments, the visual representation of the hair corresponds to facial hair and/or to only a beard of the second user.

In some embodiments, a first computer system that is being used by a first user displays a representation of a second user in an extended reality environment and displays different portions of the representation of the second user with different levels and/or degrees of visual emphasis. For instance, a first portion of the representation of the second user that corresponds to a boundary between the representation of the second user and other portions of the extended reality environment is displayed with a first visual appearance. A second portion of the representation of the second user that does not correspond to the boundary between the representation of the second user and the other portions of the extended reality environment is displayed with a second visual appearance, where the first visual appearance is visually emphasized as compared to the second visual appearance. In some embodiments, the computer system adjusts an appearance of the representation of the second user based on a change in a displayed viewpoint and/or perspective of the representation of the second user, such that the first portion and the second portion of the representation of the second user change based on the change in the displayed viewpoint and/or perspective. In some embodiments, the computer system displays the representation of the second user in a presentation mode when the representation of the second user is displayed at a rearward orientation, where the presentation mode includes displaying the representation of the second user without anthropomorphic features and/or as an inanimate object.

Figure 8:
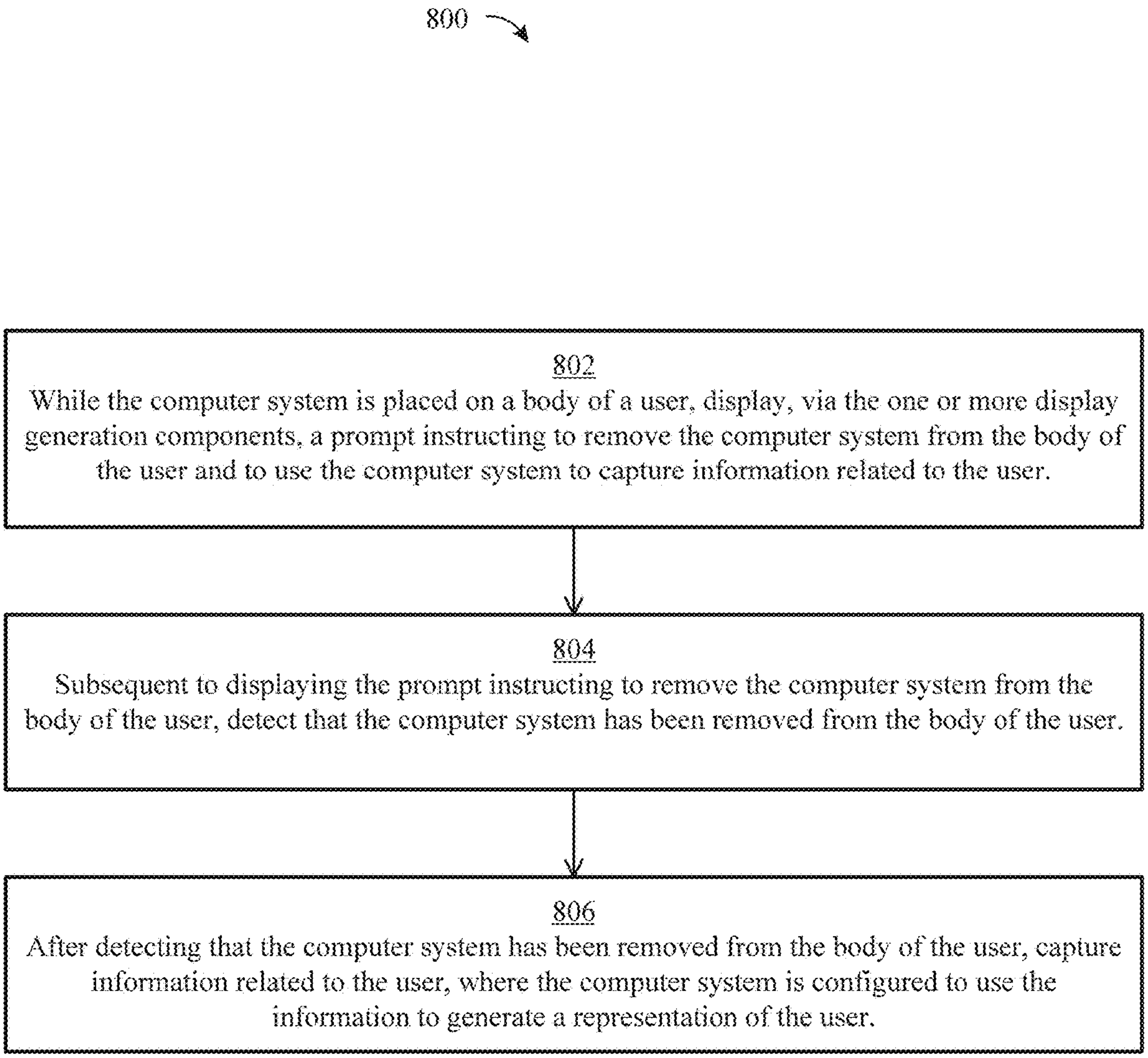
FIG. 8 is a flow diagram of methods of generating a representation of a user, in accordance with various embodiments.
Figure 9:
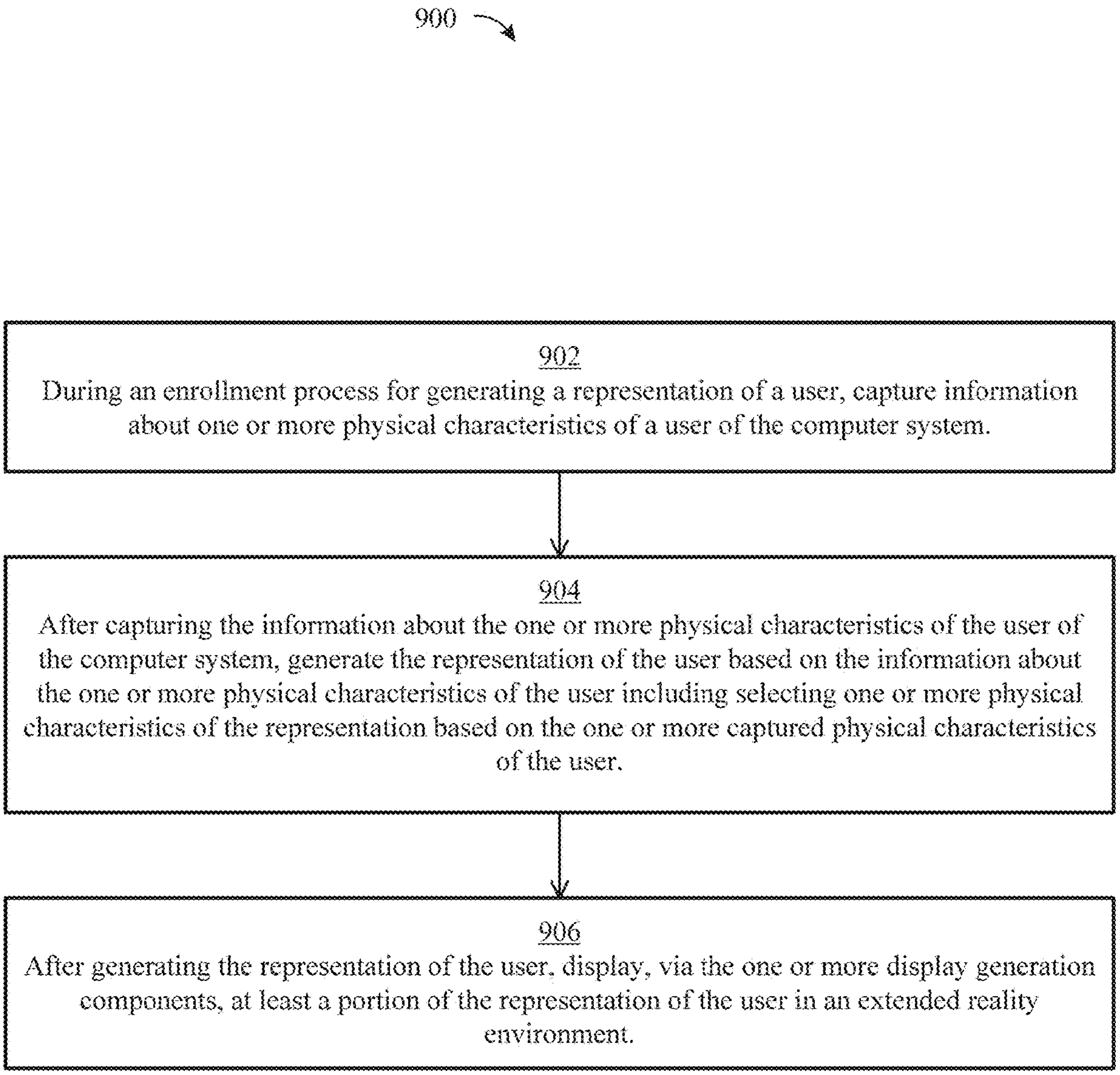
FIG. 9 is a flow diagram of methods of displaying a representation of a user, in accordance with various embodiments.
Figure 11:
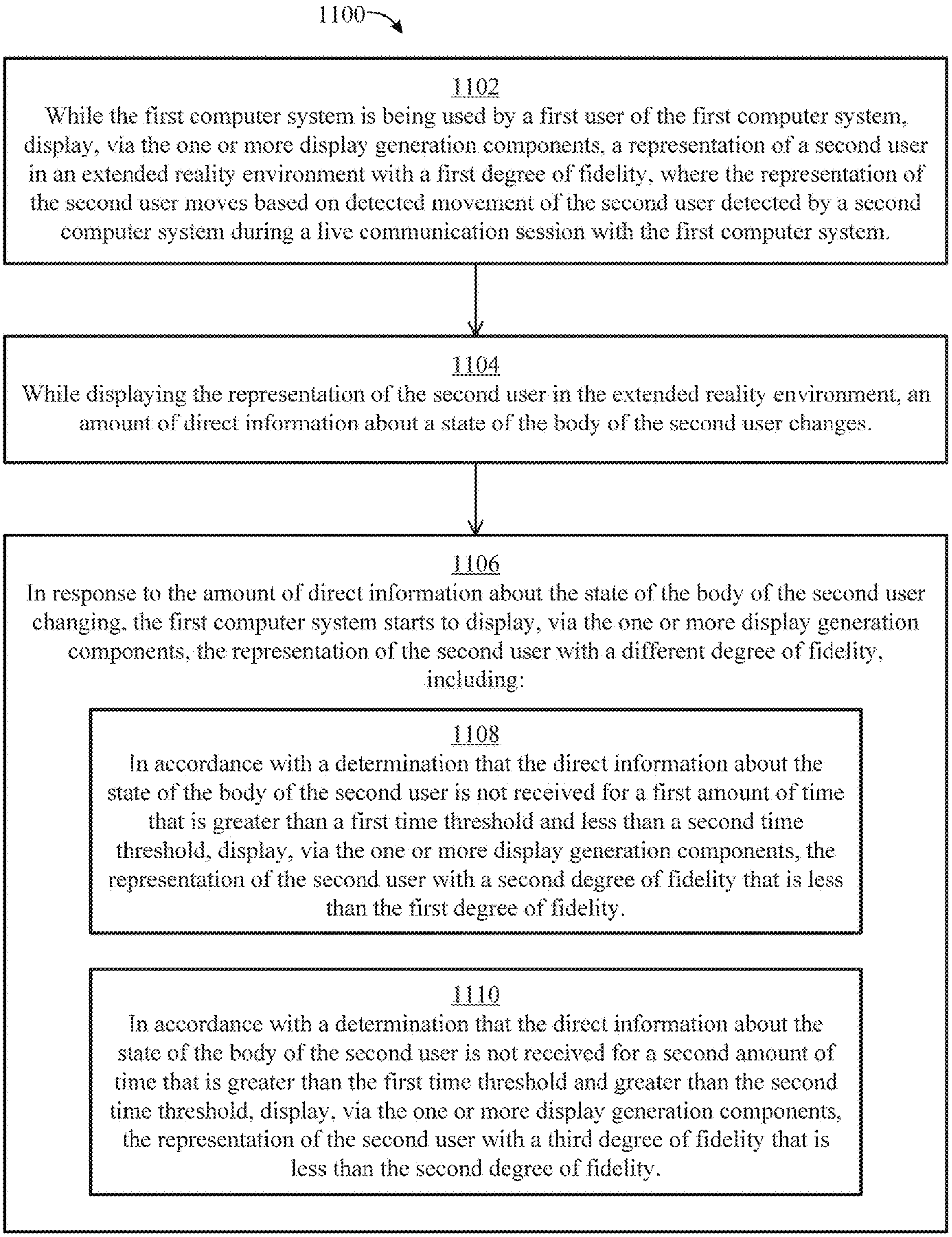
FIG. 11 is a flow diagram of methods of adjusting an appearance of a representation of a user, in accordance with various embodiments.
Figure 12:
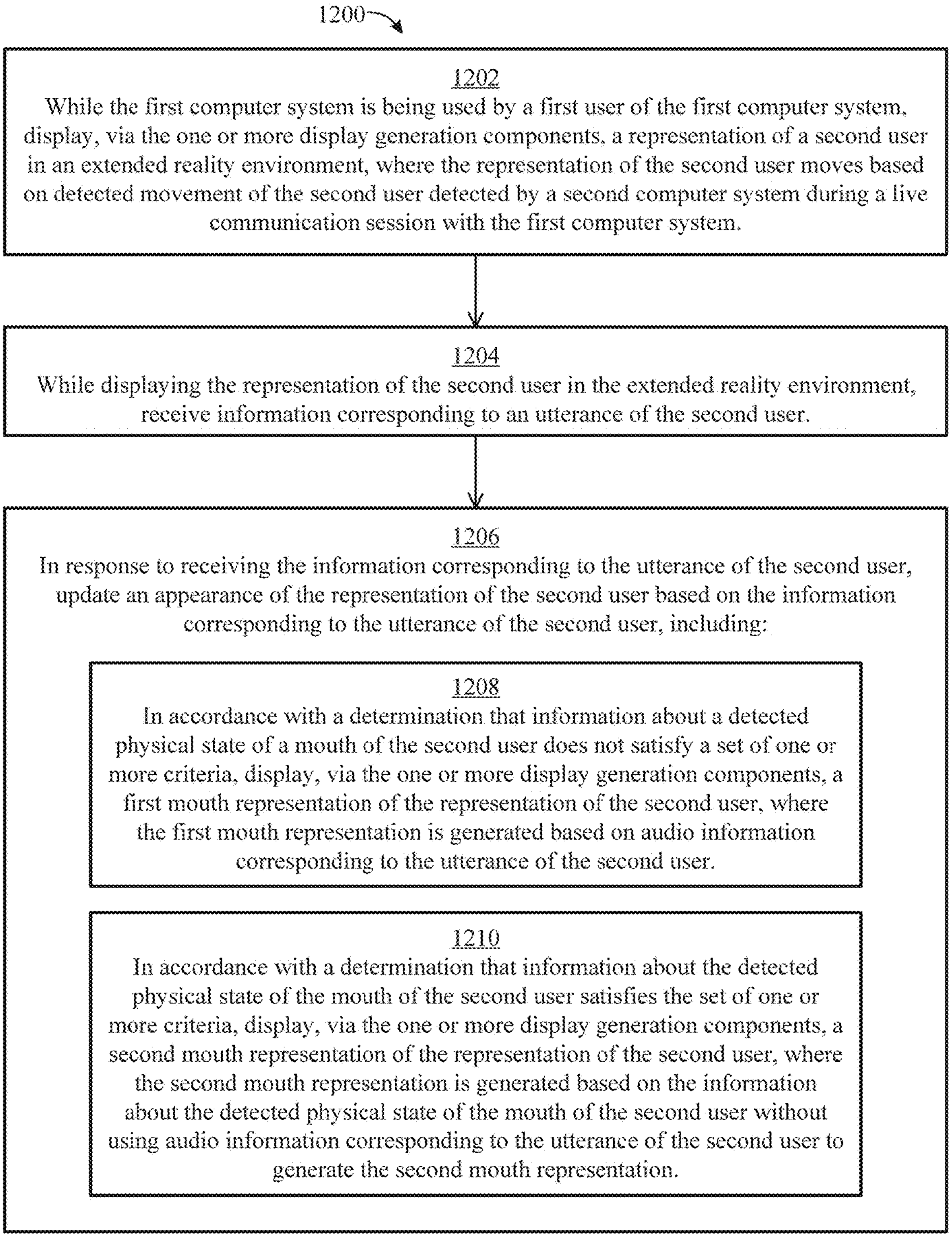
FIG. 12 is a flow diagram of methods of displaying a mouth representation of a representation of a user, in accordance with various embodiments.
Figure 14:
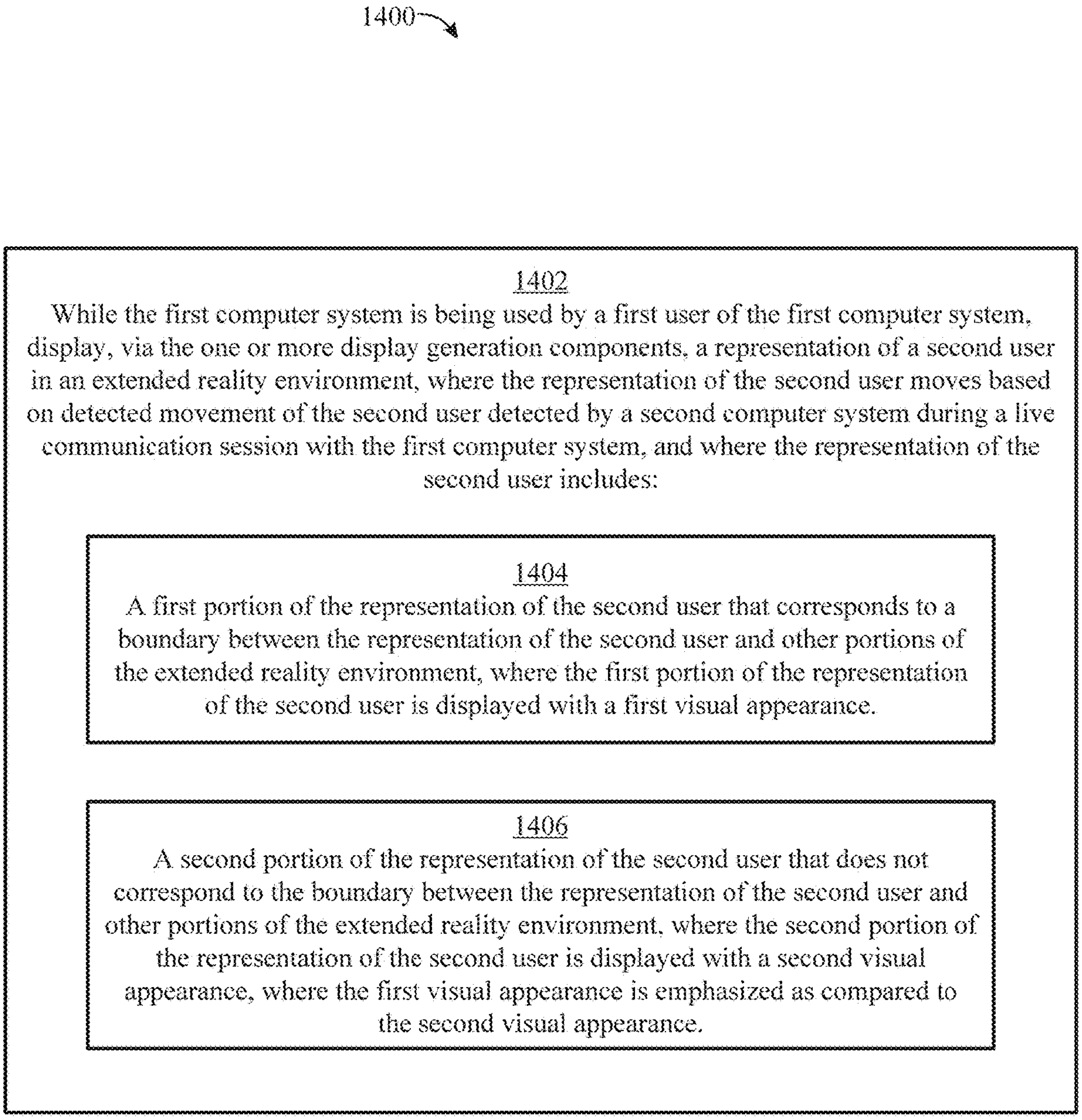
FIG. 14 is a flow diagram of methods of displaying a portion of a representation of a user with a visual emphasis, in accordance with various embodiments.

FIGS. 1-6 provide a description of example computer systems for providing XR experiences to users. FIGS. 7A-7J illustrate example techniques for generating a representation of a user and displaying the representation of the user, in accordance with some embodiments. FIG. 8 is a flow diagram of methods of generating a representation of a user, in accordance with various embodiments. FIG. 9 is a flow diagram of methods of displaying a representation of a user, in accordance with various embodiments. The user interfaces in FIGS. 7A-7J are used to illustrate the processes in FIGS. 8 and 9. FIGS. 10A-10I illustrate example techniques for adjusting an appearance of a representation of a user, in accordance with some embodiments. FIG. 11 is a flow diagram of methods of adjusting an appearance of a representation of a user, in accordance with various embodiments. FIG. 12 is a flow diagram of methods of displaying a mouth representation of a representation of a user, in accordance with various embodiments. FIG. 13 is a flow diagram of methods of displaying a hair representation of a representation of a user, in accordance with various embodiments. FIG. 14 is a flow diagram of methods of displaying a portion of a representation of a user with a visual emphasis, in accordance with various embodiments. The user interfaces in FIGS. 10A-10I are used to illustrate the processes in FIGS. 11-14.

The processes described below enhance the operability of the devices and make the user-device interfaces more efficient (e.g., by helping the user to provide proper inputs and reducing user mistakes when operating/interacting with the device) through various techniques, including by providing improved visual feedback to the user, reducing the number of inputs needed to perform an operation, providing additional control options without cluttering the user interface with additional displayed controls, performing an operation when a set of conditions has been met without requiring further user input, improving privacy and/or security, providing a more varied, detailed, and/or realistic user experience while saving storage space, and/or additional techniques. These techniques also reduce power usage and improve battery life of the device by enabling the user to use the device more quickly and efficiently. Saving on battery power, and thus weight, improves the ergonomics of the device. These techniques also enable real-time communication, allow for the use of fewer and/or less precise sensors resulting in a more compact, lighter, and cheaper device, and enable the device to be used in a variety of lighting conditions. These techniques reduce energy usage, thereby reducing heat emitted by the device, which is particularly important for a wearable device where a device well within operational parameters for device components can become uncomfortable for a user to wear if it is producing too much heat.

In addition, in methods described herein where one or more steps are contingent upon one or more conditions having been met, it should be understood that the described method can be repeated in multiple repetitions so that over the course of the repetitions all of the conditions upon which steps in the method are contingent have been met in different repetitions of the method. For example, if a method requires performing a first step if a condition is satisfied, and a second step if the condition is not satisfied, then a person of ordinary skill would appreciate that the claimed steps are repeated until the condition has been both satisfied and not satisfied, in no particular order. Thus, a method described with one or more steps that are contingent upon one or more conditions having been met could be rewritten as a method that is repeated until each of the conditions described in the method has been met. This, however, is not required of system or computer readable medium claims where the system or computer readable medium contains instructions for performing the contingent operations based on the satisfaction of the corresponding one or more conditions and thus is capable of determining whether the contingency has or has not been satisfied without explicitly repeating steps of a method until all of the conditions upon which steps in the method are contingent have been met. A person having ordinary skill in the art would also understand that, similar to a method with contingent steps, a system or computer readable storage medium can repeat the steps of a method as many times as are needed to ensure that all of the contingent steps have been performed.

In some embodiments, as shown in FIG. 1, the XR experience is provided to the user via an operating environment 100 that includes a computer system 101. The computer system 101 includes a controller 110 (e.g., processors of a portable electronic device or a remote server), a display generation component 120 (e.g., a head-mounted device (HMD), a display, a projector, a touch-screen, etc.), one or more input devices 125 (e.g., an eye tracking device 130, a hand tracking device 140, other input devices 150), one or more output devices 155 (e.g., speakers 160, tactile output generators 170, and other output devices 180), one or more sensors 190 (e.g., image sensors, light sensors, depth sensors, tactile sensors, orientation sensors, proximity sensors, temperature sensors, location sensors, motion sensors, velocity sensors, etc.), and optionally one or more peripheral devices 195 (e.g., home appliances, wearable devices, etc.). In some embodiments, one or more of the input devices 125, output devices 155, sensors 190, and peripheral devices 195 are integrated with the display generation component 120 (e.g., in a head-mounted device or a handheld device).

When describing a XR experience, various terms are used to differentially refer to several related but distinct environments that the user may sense and/or with which a user may interact (e.g., with inputs detected by a computer system 101 generating the XR experience that cause the computer system generating the XR experience to generate audio, visual, and/or tactile feedback corresponding to various inputs provided to the computer system 101). The following is a subset of these terms:

Physical environment: A physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

Extended reality: In contrast, an extended reality (XR) environment refers to a wholly or partially simulated environment that people sense and/or interact with via an electronic system. In XR, a subset of a person's physical motions, or representations thereof, are tracked, and, in response, one or more characteristics of one or more virtual objects simulated in the XR environment are adjusted in a manner that comports with at least one law of physics. For example, a XR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in a XR environment may be made in response to representations of physical motions (e.g., vocal commands). A person may sense and/or interact with a XR object using any one of their senses, including sight, sound, touch, taste, and smell. For example, a person may sense and/or interact with audio objects that create a 3D or spatial audio environment that provides the perception of point audio sources in 3D space. In another example, audio objects may enable audio transparency, which selectively incorporates ambient sounds from the physical environment with or without computer-generated audio. In some XR environments, a person may sense and/or interact only with audio objects.

Examples of XR include virtual reality and mixed reality.

Virtual reality: A virtual reality (VR) environment refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

Mixed reality: In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end. In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationary with respect to the physical ground.

Examples of mixed realities include augmented reality and augmented virtuality.

Augmented reality: An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment. An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

Augmented virtuality: An augmented virtuality (AV) environment refers to a simulated environment in which a virtual or computer-generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

Viewpoint-locked virtual object: A virtual object is viewpoint-locked when a computer system displays the virtual object at the same location and/or position in the viewpoint of the user, even as the viewpoint of the user shifts (e.g., changes). In embodiments where the computer system is a head-mounted device, the viewpoint of the user is locked to the forward facing direction of the user's head (e.g., the viewpoint of the user is at least a portion of the field-of-view of the user when the user is looking straight ahead); thus, the viewpoint of the user remains fixed even as the user's gaze is shifted, without moving the user's head. In embodiments where the computer system has a display generation component (e.g., a display screen) that can be repositioned with respect to the user's head, the viewpoint of the user is the augmented reality view that is being presented to the user on a display generation component of the computer system. For example, a viewpoint-locked virtual object that is displayed in the upper left corner of the viewpoint of the user, when the viewpoint of the user is in a first orientation (e.g., with the user's head facing north) continues to be displayed in the upper left corner of the viewpoint of the user, even as the viewpoint of the user changes to a second orientation (e.g., with the user's head facing west). In other words, the location and/or position at which the viewpoint-locked virtual object is displayed in the viewpoint of the user is independent of the user's position and/or orientation in the physical environment. In embodiments in which the computer system is a head-mounted device, the viewpoint of the user is locked to the orientation of the user's head, such that the virtual object is also referred to as a "head-locked virtual object."

Environment-locked virtual object: A virtual object is environment-locked (alternatively, "world-locked") when a computer system displays the virtual object at a location and/or position in the viewpoint of the user that is based on (e.g., selected in reference to and/or anchored to) a location and/or object in the three-dimensional environment (e.g., a physical environment or a virtual environment). As the viewpoint of the user shifts, the location and/or object in the environment relative to the viewpoint of the user changes, which results in the environment-locked virtual object being displayed at a different location and/or position in the viewpoint of the user. For example, an environment-locked virtual object that is locked onto a tree that is immediately in front of a user is displayed at the center of the viewpoint of the user. When the viewpoint of the user shifts to the right (e.g., the user's head is turned to the right) so that the tree is now left-of-center in the viewpoint of the user (e.g., the tree's position in the viewpoint of the user shifts), the environment-locked virtual object that is locked onto the tree is displayed left-of-center in the viewpoint of the user. In other words, the location and/or position at which the environment-locked virtual object is displayed in the viewpoint of the user is dependent on the position and/or orientation of the location and/or object in the environment onto which the virtual object is locked. In some embodiments, the computer system uses a stationary frame of reference (e.g., a coordinate system that is anchored to a fixed location and/or object in the physical environment) in order to determine the position at which to display an environment-locked virtual object in the viewpoint of the user. An environment-locked virtual object can be locked to a stationary part of the environment (e.g., a floor, wall, table, or other stationary object) or can be locked to a movable part of the environment (e.g., a vehicle, animal, person, or even a representation of portion of the users body that moves independently of a viewpoint of the user, such as a user's hand, wrist, arm, or foot) so that the virtual object is moved as the viewpoint or the portion of the environment moves to maintain a fixed relationship between the virtual object and the portion of the environment.

In some embodiments a virtual object that is environment-locked or viewpoint-locked exhibits lazy follow behavior which reduces or delays motion of the environment-locked or viewpoint-locked virtual object relative to movement of a point of reference which the virtual object is following. In some embodiments, when exhibiting lazy follow behavior the computer system intentionally delays movement of the virtual object when detecting movement of a point of reference (e.g., a portion of the environment, the viewpoint, or a point that is fixed relative to the viewpoint, such as a point that is between 5-300 cm from the viewpoint) which the virtual object is following. For example, when the point of reference (e.g., the portion of the environment or the viewpoint) moves with a first speed, the virtual object is moved by the device to remain locked to the point of reference but moves with a second speed that is slower than the first speed (e.g., until the point of reference stops moving or slows down, at which point the virtual object starts to catch up to the point of reference). In some embodiments, when a virtual object exhibits lazy follow behavior the device ignores small amounts of movement of the point of reference (e.g., ignoring movement of the point of reference that is below a threshold amount of movement such as movement by 0-5 degrees or movement by 0-50 cm). For example, when the point of reference (e.g., the portion of the environment or the viewpoint to which the virtual object is locked) moves by a first amount, a distance between the point of reference and the virtual object increases (e.g., because the virtual object is being displayed so as to maintain a fixed or substantially fixed position relative to a viewpoint or portion of the environment that is different from the point of reference to which the virtual object is locked) and when the point of reference (e.g., the portion of the environment or the viewpoint to which the virtual object is locked) moves by a second amount that is greater than the first amount, a distance between the point of reference and the virtual object initially increases (e.g., because the virtual object is being displayed so as to maintain a fixed or substantially fixed position relative to a viewpoint or portion of the environment that is different from the point of reference to which the virtual object is locked) and then decreases as the amount of movement of the point of reference increases above a threshold (e.g., a "lazy follow" threshold) because the virtual object is moved by the computer system to maintain a fixed or substantially fixed position relative to the point of reference. In some embodiments the virtual object maintaining a substantially fixed position relative to the point of reference includes the virtual object being displayed within a threshold distance (e.g., 1, 2, 3, 5, 15, 20, 50 cm) of the point of reference in one or more dimensions (e.g., up/down, left/right, and/or forward/backward relative to the position of the point of reference).

Hardware: There are many different types of electronic systems that enable a person to sense and/or interact with various XR environments. Examples include head-mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head-mounted system may include speakers and/or other audio output devices integrated into the head-mounted system for providing audio output. A head-mounted system may have one or more speaker(s) and an integrated opaque display. Alternatively, a head-mounted system may be configured to accept an external opaque display (e.g., a smartphone). The head-mounted system may incorporate one or more imaging sensors to capture images or video of the physical environment, and/or one or more microphones to capture audio of the physical environment. Rather than an opaque display, a head-mounted system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface. In some embodiments, the controller 110 is configured to manage and coordinate a XR experience for the user. In some embodiments, the controller 110 includes a suitable combination of software, firmware, and/or hardware. The controller 110 is described in greater detail below with respect to FIG. 2. In some embodiments, the controller 110 is a computing device that is local or remote relative to the scene 105 (e.g., a physical environment). For example, the controller 110 is a local server located within the scene 105. In another example, the controller 110 is a remote server located outside of the scene 105 (e.g., a cloud server, central server, etc.). In some embodiments, the controller 110 is communicatively coupled with the display generation component 120 (e.g., an HMD, a display, a projector, a touch-screen, etc.) via one or more wired or wireless communication channels 144 (e.g., BLUETOOTH, IEEE 802.11x, IEEE 802.16x, IEEE 802.3x, etc.). In another example, the controller 110 is included within the enclosure (e.g., a physical housing) of the display generation component 120 (e.g., an HMD, or a portable electronic device that includes a display and one or more processors, etc.), one or more of the input devices 125, one or more of the output devices 155, one or more of the sensors 190, and/or one or more of the peripheral devices 195, or share the same physical enclosure or support structure with one or more of the above.

In some embodiments, the display generation component 120 is configured to provide the XR experience (e.g., at least a visual component of the XR experience) to the user. In some embodiments, the display generation component 120 includes a suitable combination of software, firmware, and/or hardware. The display generation component 120 is described in greater detail below with respect to FIG. 3. In some embodiments, the functionalities of the controller 110 are provided by and/or combined with the display generation component 120.

According to some embodiments, the display generation component 120 provides a XR experience to the user while the user is virtually and/or physically present within the scene 105.

In some embodiments, the display generation component is worn on a part of the user's body (e.g., on his/her head, on his/her hand, etc.). As such, the display generation component 120 includes one or more XR displays provided to display the XR content. For example, in various embodiments, the display generation component 120 encloses the field-of-view of the user. In some embodiments, the display generation component 120 is a handheld device (such as a smartphone or tablet) configured to present XR content, and the user holds the device with a display directed towards the field-of-view of the user and a camera directed towards the scene 105. In some embodiments, the handheld device is optionally placed within an enclosure that is worn on the head of the user. In some embodiments, the handheld device is optionally placed on a support (e.g., a tripod) in front of the user. In some embodiments, the display generation component 120 is a XR chamber, enclosure, or room configured to present XR content in which the user does not wear or hold the display generation component 120. Many user interfaces described with reference to one type of hardware for displaying XR content (e.g., a handheld device or a device on a tripod) could be implemented on another type of hardware for displaying XR content (e.g., an HMD or other wearable computing device). For example, a user interface showing interactions with XR content triggered based on interactions that happen in a space in front of a handheld or tripod mounted device could similarly be implemented with an HMD where the interactions happen in a space in front of the HMD and the responses of the XR content are displayed via the HMD. Similarly, a user interface showing interactions with XR content triggered based on movement of a handheld or tripod mounted device relative to the physical environment (e.g., the scene 105 or a part of the user's body (e.g., the user's eye(s), head, or hand)) could similarly be implemented with an HMD where the movement is caused by movement of the HMD relative to the physical environment (e.g., the scene 105 or a part of the user's body (e.g., the user's eye(s), head, or hand)).

While pertinent features of the operating environment 100 are shown in FIG. 1, those of ordinary skill in the art will appreciate from the present disclosure that various other features have not been illustrated for the sake of brevity and so as not to obscure more pertinent aspects of the example embodiments disclosed herein.

Figure 2:
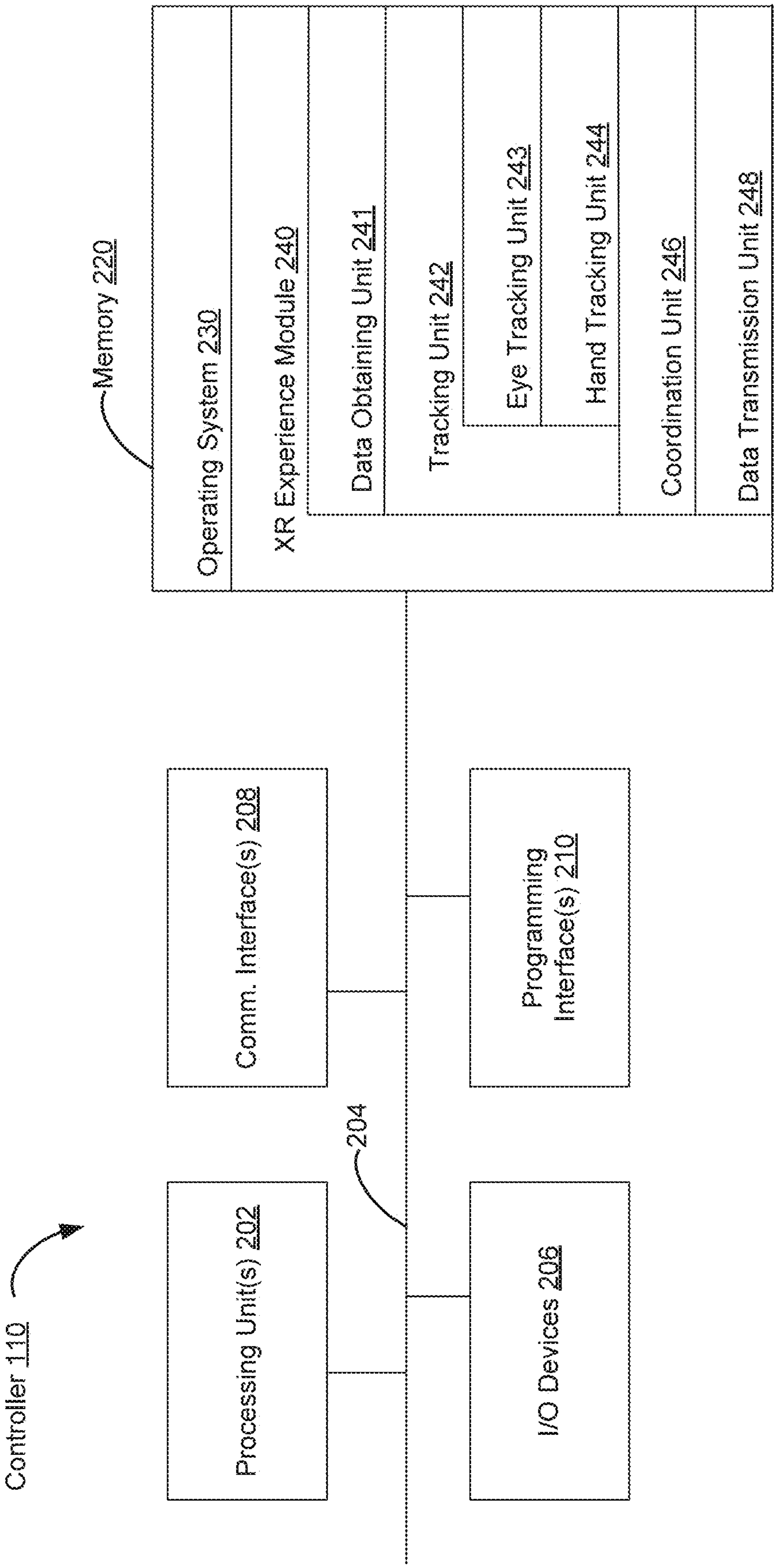
FIG. 2 is a block diagram illustrating a controller of a computer system that is configured to manage and coordinate a XR experience for the user in accordance with some embodiments.

FIG. 2 is a block diagram of an example of the controller 110 in some embodiments. While certain specific features are illustrated, those skilled in the art will appreciate from the present disclosure that various other features have not been illustrated for the sake of brevity, and so as not to obscure more pertinent aspects of the embodiments disclosed herein. To that end, as a non-limiting example, in some embodiments, the controller 110 includes one or more processing units 202 (e.g., microprocessors, application-specific integrated-circuits (ASICs), field-programmable gate arrays (FPGAs), graphics processing units (GPUs), central processing units (CPUs), processing cores, and/or the like), one or more input/output (I/O) devices 206, one or more communication interfaces 208 (e.g., universal serial bus (USB), FIREWIRE, THUNDERBOLT, IEEE 802.3x, IEEE 802.11x, IEEE 802.16x, global system for mobile communications (GSM), code division multiple access (CDMA), time division multiple access (TDMA), global positioning system (GPS), infrared (IR), BLUETOOTH, ZIGBEE, and/or the like type interface), one or more programming (e.g., I/O) interfaces 210, a memory 220, and one or more communication buses 204 for interconnecting these and various other components.

In some embodiments, the one or more communication buses 204 include circuitry that interconnects and controls communications between system components. In some embodiments, the one or more I/O devices 206 include at least one of a keyboard, a mouse, a touchpad, a joystick, one or more microphones, one or more speakers, one or more image sensors, one or more displays, and/or the like.

The memory 220 includes high-speed random-access memory, such as dynamic random-access memory (DRAM), static random-access memory (SRAM), double-data-rate random-access memory (DDR RAM), or other random-access solid-state memory devices. In some embodiments, the memory 220 includes non-volatile memory, such as one or more magnetic disk storage devices, optical disk storage devices, flash memory devices, or other non-volatile solid-state storage devices. The memory 220 optionally includes one or more storage devices remotely located from the one or more processing units 202. The memory 220 comprises a non-transitory computer readable storage medium. In some embodiments, the memory 220 or the non-transitory computer readable storage medium of the memory 220 stores the following programs, modules and data structures, or a subset thereof including an optional operating system 230 and a XR experience module 240.

The operating system 230 includes instructions for handling various basic system services and for performing hardware dependent tasks. In some embodiments, the XR experience module 240 is configured to manage and coordinate one or more XR experiences for one or more users (e.g., a single XR experience for one or more users, or multiple XR experiences for respective groups of one or more users). To that end, in various embodiments, the XR experience module 240 includes a data obtaining unit 241, a tracking unit 242, a coordination unit 246, and a data transmitting unit 248.

In some embodiments, the data obtaining unit 241 is configured to obtain data (e.g., presentation data, interaction data, sensor data, location data, etc.) from at least the display generation component 120 of FIG. 1, and optionally one or more of the input devices 125, output devices 155, sensors 190, and/or peripheral devices 195. To that end, in various embodiments, the data obtaining unit 241 includes instructions and/or logic therefor, and heuristics and metadata therefor.

In some embodiments, the tracking unit 242 is configured to map the scene 105 and to track the position/location of at least the display generation component 120 with respect to the scene 105 of FIG. 1, and optionally, to one or more of the input devices 125, output devices 155, sensors 190, and/or peripheral devices 195. To that end, in various embodiments, the tracking unit 242 includes instructions and/or logic therefor, and heuristics and metadata therefor. In some embodiments, the tracking unit 242 includes hand tracking unit 244 and/or eye tracking unit 243. In some embodiments, the hand tracking unit 244 is configured to track the position/location of one or more portions of the user's hands, and/or motions of one or more portions of the user's hands with respect to the scene 105 of FIG. 1, relative to the display generation component 120, and/or relative to a coordinate system defined relative to the user's hand. The hand tracking unit 244 is described in greater detail below with respect to FIG. 4. In some embodiments, the eye tracking unit 243 is configured to track the position and movement of the user's gaze (or more broadly, the user's eyes, face, or head) with respect to the scene 105 (e.g., with respect to the physical environment and/or to the user (e.g., the user's hand)) or with respect to the XR content displayed via the display generation component 120. The eye tracking unit 243 is described in greater detail below with respect to FIG. 5.

In some embodiments, the coordination unit 246 is configured to manage and coordinate the XR experience presented to the user by the display generation component 120, and optionally, by one or more of the output devices 155 and/or peripheral devices 195. To that end, in various embodiments, the coordination unit 246 includes instructions and/or logic therefor, and heuristics and metadata therefor.

In some embodiments, the data transmitting unit 248 is configured to transmit data (e.g., presentation data, location data, etc.) to at least the display generation component 120, and optionally, to one or more of the input devices 125, output devices 155, sensors 190, and/or peripheral devices 195. To that end, in various embodiments, the data transmitting unit 248 includes instructions and/or logic therefor, and heuristics and metadata therefor.

Although the data obtaining unit 241, the tracking unit 242 (e.g., including the eye tracking unit 243 and the hand tracking unit 244), the coordination unit 246, and the data transmitting unit 248 are shown as residing on a single device (e.g., the controller 110), it should be understood that in other embodiments, any combination of the data obtaining unit 241, the tracking unit 242 (e.g., including the eye tracking unit 243 and the hand tracking unit 244), the coordination unit 246, and the data transmitting unit 248 may be located in separate computing devices.

Moreover, FIG. 2 is intended more as functional description of the various features that may be present in a particular implementation as opposed to a structural schematic of the embodiments described herein. As recognized by those of ordinary skill in the art, items shown separately could be combined and some items could be separated. For example, some functional modules shown separately in FIG. 2 could be implemented in a single module and the various functions of single functional blocks could be implemented by one or more functional blocks in various embodiments. The actual number of modules and the division of particular functions and how features are allocated among them will vary from one implementation to another and, in some embodiments, depends in part on the particular combination of hardware, software, and/or firmware chosen for a particular implementation.

Figure 3:
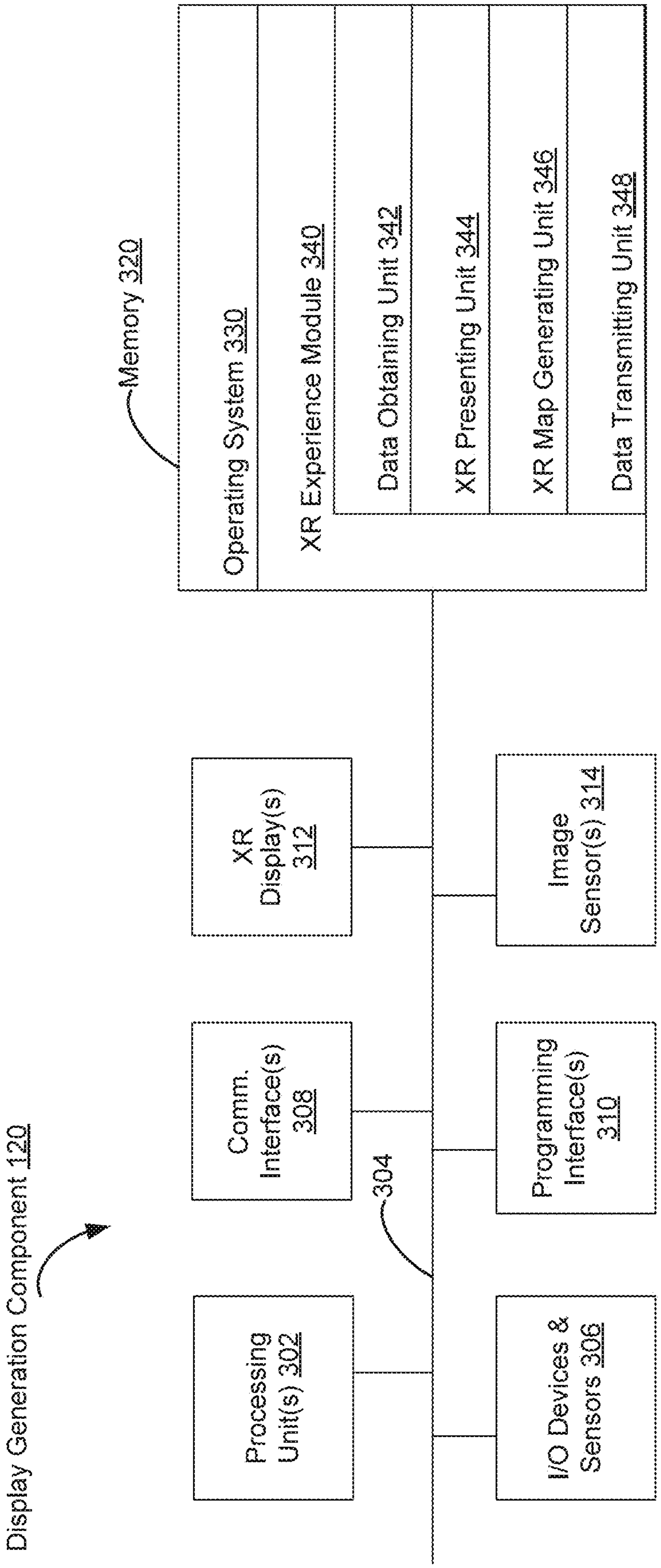
FIG. 3 is a block diagram illustrating a display generation component of a computer system that is configured to provide a visual component of the XR experience to the user in accordance with some embodiments.

FIG. 3 is a block diagram of an example of the display generation component 120 in some embodiments. While certain specific features are illustrated, those skilled in the art will appreciate from the present disclosure that various other features have not been illustrated for the sake of brevity, and so as not to obscure more pertinent aspects of the embodiments disclosed herein. To that end, as a non-limiting example, in some embodiments the display generation component 120 (e.g., HMD) includes one or more processing units 302 (e.g., microprocessors, ASICs, FPGAs, GPUs, CPUs, processing cores, and/or the like), one or more input/output (I/O) devices and sensors 306, one or more communication interfaces 308 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, and/or the like type interface), one or more programming (e.g., I/O) interfaces 310, one or more XR displays 312, one or more optional interior- and/or exterior-facing image sensors 314, a memory 320, and one or more communication buses 304 for interconnecting these and various other components.

In some embodiments, the one or more communication buses 304 include circuitry that interconnects and controls communications between system components. In some embodiments, the one or more I/O devices and sensors 306 include at least one of an inertial measurement unit (IMU), an accelerometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, one or more depth sensors (e.g., a structured light, a time-of-flight, or the like), and/or the like.

In some embodiments, the one or more XR displays 312 are configured to provide the XR experience to the user. In some embodiments, the one or more XR displays 312 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electro-mechanical system (MEMS), and/or the like display types. In some embodiments, the one or more XR displays 312 correspond to diffractive, reflective, polarized, holographic, etc. waveguide displays. For example, the display generation component 120 (e.g., HMD) includes a single XR display. In another example, the display generation component 120 includes a XR display for each eye of the user. In some embodiments, the one or more XR displays 312 are capable of presenting MR and VR content. In some embodiments, the one or more XR displays 312 are capable of presenting MR or VR content.

In some embodiments, the one or more image sensors 314 are configured to obtain image data that corresponds to at least a portion of the face of the user that includes the eyes of the user (and may be referred to as an eye-tracking camera). In some embodiments, the one or more image sensors 314 are configured to obtain image data that corresponds to at least a portion of the user's hand(s) and optionally arm(s) of the user (and may be referred to as a hand-tracking camera). In some embodiments, the one or more image sensors 314 are configured to be forward-facing so as to obtain image data that corresponds to the scene as would be viewed by the user if the display generation component 120 (e.g., HMD) was not present (and may be referred to as a scene camera). The one or more optional image sensors 314 can include one or more RGB cameras (e.g., with a complimentary metal-oxide-semiconductor (CMOS) image sensor or a charge-coupled device (CCD) image sensor), one or more infrared (IR) cameras, one or more event-based cameras, and/or the like.

The memory 320 includes high-speed random-access memory, such as DRAM, SRAM, DDR RAM, or other random-access solid-state memory devices. In some embodiments, the memory 320 includes non-volatile memory, such as one or more magnetic disk storage devices, optical disk storage devices, flash memory devices, or other non-volatile solid-state storage devices. The memory 320 optionally includes one or more storage devices remotely located from the one or more processing units 302. The memory 320 comprises a non-transitory computer readable storage medium. In some embodiments, the memory 320 or the non-transitory computer readable storage medium of the memory 320 stores the following programs, modules and data structures, or a subset thereof including an optional operating system 330 and a XR presentation module 340.

The operating system 330 includes instructions for handling various basic system services and for performing hardware dependent tasks. In some embodiments, the XR presentation module 340 is configured to present XR content to the user via the one or more XR displays 312. To that end, in various embodiments, the XR presentation module 340 includes a data obtaining unit 342, a XR presenting unit 344, a XR map generating unit 346, and a data transmitting unit 348.

In some embodiments, the data obtaining unit 342 is configured to obtain data (e.g., presentation data, interaction data, sensor data, location data, etc.) from at least the controller 110 of FIG. 1. To that end, in various embodiments, the data obtaining unit 342 includes instructions and/or logic therefor, and heuristics and metadata therefor.

In some embodiments, the XR presenting unit 344 is configured to present XR content via the one or more XR displays 312. To that end, in various embodiments, the XR presenting unit 344 includes instructions and/or logic therefor, and heuristics and metadata therefor.

In some embodiments, the XR map generating unit 346 is configured to generate a XR map (e.g., a 3D map of the mixed reality scene or a map of the physical environment into which computer-generated objects can be placed to generate the extended reality) based on media content data. To that end, in various embodiments, the XR map generating unit 346 includes instructions and/or logic therefor, and heuristics and metadata therefor.

In some embodiments, the data transmitting unit 348 is configured to transmit data (e.g., presentation data, location data, etc.) to at least the controller 110, and optionally one or more of the input devices 125, output devices 155, sensors 190, and/or peripheral devices 195. To that end, in various embodiments, the data transmitting unit 348 includes instructions and/or logic therefor, and heuristics and metadata therefor.

Although the data obtaining unit 342, the XR presenting unit 344, the XR map generating unit 346, and the data transmitting unit 348 are shown as residing on a single device (e.g., the display generation component 120 of FIG. 1), it should be understood that in other embodiments, any combination of the data obtaining unit 342, the XR presenting unit 344, the XR map generating unit 346, and the data transmitting unit 348 may be located in separate computing devices.

Moreover, FIG. 3 is intended more as a functional description of the various features that could be present in a particular implementation as opposed to a structural schematic of the embodiments described herein. As recognized by those of ordinary skill in the art, items shown separately could be combined and some items could be separated. For example, some functional modules shown separately in FIG. 3 could be implemented in a single module and the various functions of single functional blocks could be implemented by one or more functional blocks in various embodiments. The actual number of modules and the division of particular functions and how features are allocated among them will vary from one implementation to another and, in some embodiments, depends in part on the particular combination of hardware, software, and/or firmware chosen for a particular implementation.

Figure 4:
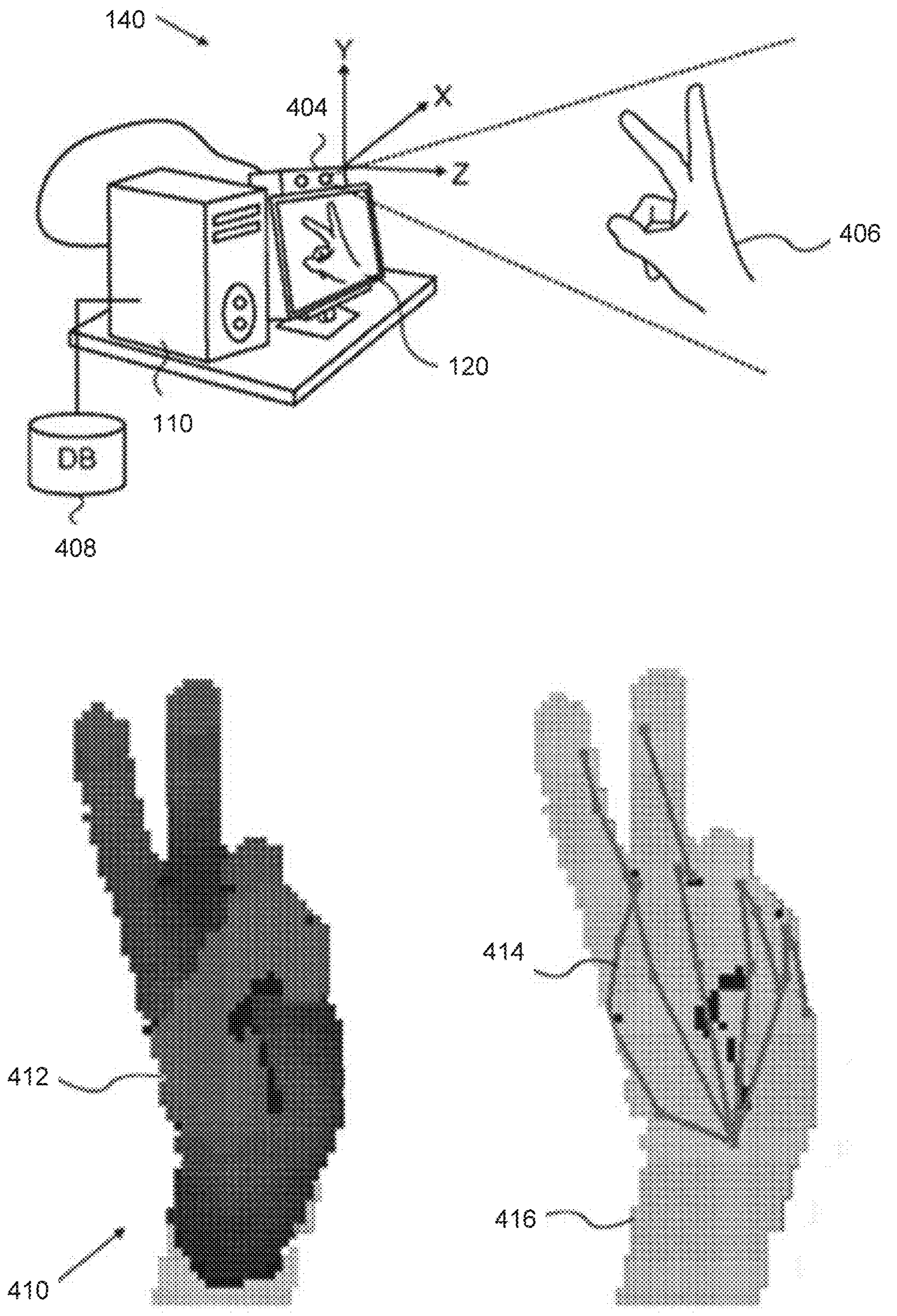
FIG. 4 is a block diagram illustrating a hand tracking unit of a computer system that is configured to capture gesture inputs of the user in accordance with some embodiments.

FIG. 4 is a schematic, pictorial illustration of an example embodiment of the hand tracking device 140. In some embodiments, hand tracking device 140 (FIG. 1) is controlled by hand tracking unit 244 (FIG. 2) to track the position/location of one or more portions of the user's hands, and/or motions of one or more portions of the user's hands with respect to the scene 105 of FIG. 1 (e.g., with respect to a portion of the physical environment surrounding the user, with respect to the display generation component 120, or with respect to a portion of the user (e.g., the user's face, eyes, or head), and/or relative to a coordinate system defined relative to the user's hand). In some embodiments, the hand tracking device 140 is part of the display generation component 120 (e.g., embedded in or attached to a head-mounted device). In some embodiments, the hand tracking device 140 is separate from the display generation component 120 (e.g., located in separate housings or attached to separate physical support structures).

In some embodiments, the hand tracking device 140 includes image sensors 404 (e.g., one or more IR cameras, 3D cameras, depth cameras, and/or color cameras, etc.) that capture three-dimensional scene information that includes at least a hand 406 of a human user. The image sensors 404 capture the hand images with sufficient resolution to enable the fingers and their respective positions to be distinguished. The image sensors 404 typically capture images of other parts of the user's body, as well, or possibly all of the body, and may have either zoom capabilities or a dedicated sensor with enhanced magnification to capture images of the hand with the desired resolution. In some embodiments, the image sensors 404 also capture 2D color video images of the hand 406 and other elements of the scene. In some embodiments, the image sensors 404 are used in conjunction with other image sensors to capture the physical environment of the scene 105, or serve as the image sensors that capture the physical environments of the scene 105. In some embodiments, the image sensors 404 are positioned relative to the user or the user's environment in a way that a field of view of the image sensors or a portion thereof is used to define an interaction space in which hand movement captured by the image sensors are treated as inputs to the controller 110.

In some embodiments, the image sensors 404 output a sequence of frames containing 3D map data (and possibly color image data, as well) to the controller 110, which extracts high-level information from the map data. This high-level information is typically provided via an Application Program Interface (API) to an application running on the controller, which drives the display generation component 120 accordingly. For example, the user may interact with software running on the controller 110 by moving his hand 406 and changing his hand posture.

In some embodiments, the image sensors 404 project a pattern of spots onto a scene containing the hand 406 and capture an image of the projected pattern. In some embodiments, the controller 110 computes the 3D coordinates of points in the scene (including points on the surface of the user's hand) by triangulation, based on transverse shifts of the spots in the pattern. This approach is advantageous in that it does not require the user to hold or wear any sort of beacon, sensor, or other marker. It gives the depth coordinates of points in the scene relative to a predetermined reference plane, at a certain distance from the image sensors 404. In the present disclosure, the image sensors 404 are assumed to define an orthogonal set of x, y, z axes, so that depth coordinates of points in the scene correspond to z components measured by the image sensors. Alternatively, the image sensors 404 (e.g., a hand tracking device) may use other methods of 3D mapping, such as stereoscopic imaging or time-of-flight measurements, based on single or multiple cameras or other types of sensors.

In some embodiments, the hand tracking device 140 captures and processes a temporal sequence of depth maps containing the user's hand, while the user moves his hand (e.g., whole hand or one or more fingers). Software running on a processor in the image sensors 404 and/or the controller 110 processes the 3D map data to extract patch descriptors of the hand in these depth maps. The software matches these descriptors to patch descriptors stored in a database 408, based on a prior learning process, in order to estimate the pose of the hand in each frame. The pose typically includes 3D locations of the user's hand joints and finger tips.

The software may also analyze the trajectory of the hands and/or fingers over multiple frames in the sequence in order to identify gestures. The pose estimation functions described herein may be interleaved with motion tracking functions, so that patch-based pose estimation is performed only once in every two (or more) frames, while tracking is used to find changes in the pose that occur over the remaining frames. The pose, motion, and gesture information are provided via the above-mentioned API to an application program running on the controller 110. This program may, for example, move and modify images presented on the display generation component 120, or perform other functions, in response to the pose and/or gesture information.

In some embodiments, a gesture includes an air gesture. An air gesture is a gesture that is detected without the user touching (or independently of) an input element that is part of a device (e.g., computer system 101, one or more input device 125, and/or hand tracking device 140) and is based on detected motion of a portion (e.g., the head, one or more arms, one or more hands, one or more fingers, and/or one or more legs) of the user's body through the air including motion of the user's body relative to an absolute reference (e.g., an angle of the user's arm relative to the ground or a distance of the user's hand relative to the ground), relative to another portion of the user's body (e.g., movement of a hand of the user relative to a shoulder of the user, movement of one hand of the user relative to another hand of the user, and/or movement of a finger of the user relative to another finger or portion of a hand of the user), and/or absolute motion of a portion of the user's body (e.g., a tap gesture that includes movement of a hand in a predetermined pose by a predetermined amount and/or speed, or a shake gesture that includes a predetermined speed or amount of rotation of a portion of the user's body).

In some embodiments, input gestures used in the various examples and embodiments described herein include air gestures performed by movement of the user's finger(s) relative to other finger(s) (or part(s) of the user's hand) for interacting with an XR environment (e.g., a virtual or mixed-reality environment), in some embodiments. In some embodiments, an air gesture is a gesture that is detected without the user touching an input element that is part of the device (or independently of an input element that is a part of the device) and is based on detected motion of a portion of the user's body through the air including motion of the user's body relative to an absolute reference (e.g., an angle of the user's arm relative to the ground or a distance of the user's hand relative to the ground), relative to another portion of the user's body (e.g., movement of a hand of the user relative to a shoulder of the user, movement of one hand of the user relative to another hand of the user, and/or movement of a finger of the user relative to another finger or portion of a hand of the user), and/or absolute motion of a portion of the user's body (e.g., a tap gesture that includes movement of a hand in a predetermined pose by a predetermined amount and/or speed, or a shake gesture that includes a predetermined speed or amount of rotation of a portion of the user's body).

In some embodiments in which the input gesture is an air gesture (e.g., in the absence of physical contact with an input device that provides the computer system with information about which user interface element is the target of the user input, such as contact with a user interface element displayed on a touchscreen, or contact with a mouse or trackpad to move a cursor to the user interface element), the gesture takes into account the user's attention (e.g., gaze) to determine the target of the user input (e.g., for direct inputs, as described below). Thus, in implementations involving air gestures, the input gesture is, for example, detected attention (e.g., gaze) toward the user interface element in combination (e.g., concurrent) with movement of a user's finger(s) and/or hands to perform a pinch and/or tap input, as described in more detail below.

In some embodiments, input gestures that are directed to a user interface object are performed directly or indirectly with reference to a user interface object. For example, a user input is performed directly on the user interface object in performing the input gesture with the user's hand at a position that corresponds to the position of the user interface object in the three-dimensional environment (e.g., as determined based on a current viewpoint of the user). In some embodiments, the input gesture is performed indirectly on the user interface object in accordance with the user performing the input gesture while a position of the user's hand is not at the position that corresponds to the position of the user interface object in the three-dimensional environment while detecting the user's attention (e.g., gaze) on the user interface object. For example, for direct input gesture, the user is enabled to direct the user's input to the user interface object by initiating the gesture at, or near, a position corresponding to the displayed position of the user interface object (e.g., within 0.5 cm, 1 cm, 5 cm, or a distance between 0-5 cm, as measured from an outer edge of the option or a center portion of the option). For an indirect input gesture, the user is enabled to direct the user's input to the user interface object by paying attention to the user interface object (e.g., by gazing at the user interface object) and, while paying attention to the option, the user initiates the input gesture (e.g., at any position that is detectable by the computer system) (e.g., at a position that does not correspond to the displayed position of the user interface object).

In some embodiments, input gestures (e.g., air gestures) used in the various examples and embodiments described herein include pinch inputs and tap inputs, for interacting with a virtual or mixed-reality environment, in some embodiments. For example, the pinch inputs and tap inputs described below are performed as air gestures.

In some embodiments, a pinch input is part of an air gesture that includes one or more of: a pinch gesture, a long pinch gesture, a pinch and drag gesture, or a double pinch gesture. For example, a pinch gesture that is an air gesture includes movement of two or more fingers of a hand to make contact with one another, that is, optionally, followed by an immediate (e.g., within 0-1 seconds) break in contact from each other. A long pinch gesture that is an air gesture includes movement of two or more fingers of a hand to make contact with one another for at least a threshold amount of time (e.g., at least 1 second), before detecting a break in contact with one another. For example, a long pinch gesture includes the user holding a pinch gesture (e.g., with the two or more fingers making contact), and the long pinch gesture continues until a break in contact between the two or more fingers is detected. In some embodiments, a double pinch gesture that is an air gesture comprises two (e.g., or more) pinch inputs (e.g., performed by the same hand) detected in immediate (e.g., within a predefined time period) succession of each other. For example, the user performs a first pinch input (e.g., a pinch input or a long pinch input), releases the first pinch input (e.g., breaks contact between the two or more fingers), and performs a second pinch input within a predefined time period (e.g., within 1 second or within 2 seconds) after releasing the first pinch input.

In some embodiments, a pinch and drag gesture that is an air gesture includes a pinch gesture (e.g., a pinch gesture or a long pinch gesture) performed in conjunction with (e.g., followed by) a drag input that changes a position of the user's hand from a first position (e.g., a start position of the drag) to a second position (e.g., an end position of the drag). In some embodiments, the user maintains the pinch gesture while performing the drag input, and releases the pinch gesture (e.g., opens their two or more fingers) to end the drag gesture (e.g., at the second position). In some embodiments, the pinch input and the drag input are performed by the same hand (e.g., the user pinches two or more fingers to make contact with one another and moves the same hand to the second position in the air with the drag gesture). In some embodiments, the pinch input is performed by a first hand of the user and the drag input is performed by the second hand of the user (e.g., the user's second hand moves from the first position to the second position in the air while the user continues the pinch input with the user's first hand). In some embodiments, an input gesture that is an air gesture includes inputs (e.g., pinch and/or tap inputs) performed using both of the user's two hands. For example, the input gesture includes two (e.g., or more) pinch inputs performed in conjunction with (e.g., concurrently with, or within a predefined time period of) each other. For example, a first pinch gesture performed using a first hand of the user (e.g., a pinch input, a long pinch input, or a pinch and drag input), and, in conjunction with performing the pinch input using the first hand, performing a second pinch input using the other hand (e.g., the second hand of the user's two hands). In some embodiments, movement between the user's two hands (e.g., to increase and/or decrease a distance or relative orientation between the user's two hands).

In some embodiments, a tap input (e.g., directed to a user interface element) performed as an air gesture includes movement of a user's finger(s) toward the user interface element, movement of the user's hand toward the user interface element optionally with the user's finger(s) extended toward the user interface element, a downward motion of a user's finger (e.g., mimicking a mouse click motion or a tap on a touchscreen), or other predefined movement of the user's hand. In some embodiments a tap input that is performed as an air gesture is detected based on movement characteristics of the finger or hand performing the tap gesture movement of a finger or hand away from the viewpoint of the user and/or toward an object that is the target of the tap input followed by an end of the movement. In some embodiments the end of the movement is detected based on a change in movement characteristics of the finger or hand performing the tap gesture (e.g., an end of movement away from the viewpoint of the user and/or toward the object that is the target of the tap input, a reversal of direction of movement of the finger or hand, and/or a reversal of a direction of acceleration of movement of the finger or hand).

In some embodiments, attention of a user is determined to be directed to a portion of the three-dimensional environment based on detection of gaze directed to the portion of the three-dimensional environment (optionally, without requiring other conditions). In some embodiments, attention of a user is determined to be directed to a portion of the three-dimensional environment based on detection of gaze directed to the portion of the three-dimensional environment with one or more additional conditions such as requiring that gaze is directed to the portion of the three-dimensional environment for at least a threshold duration (e.g., a dwell duration) and/or requiring that the gaze is directed to the portion of the three-dimensional environment while the viewpoint of the user is within a distance threshold from the portion of the three-dimensional environment in order for the device to determine that attention of the user is directed to the portion of the three-dimensional environment, where if one of the additional conditions is not met, the device determines that attention is not directed to the portion of the three-dimensional environment toward which gaze is directed (e.g., until the one or more additional conditions are met).

In some embodiments, the detection of a ready state configuration of a user or a portion of a user is detected by the computer system. Detection of a ready state configuration of a hand is used by a computer system as an indication that the user is likely preparing to interact with the computer system using one or more air gesture inputs performed by the hand (e.g., a pinch, tap, pinch and drag, double pinch, long pinch, or other air gesture described herein). For example, the ready state of the hand is determined based on whether the hand has a predetermined hand shape (e.g., a pre-pinch shape with a thumb and one or more fingers extended and spaced apart ready to make a pinch or grab gesture or a pre-tap with one or more fingers extended and palm facing away from the user), based on whether the hand is in a predetermined position relative to a viewpoint of the user (e.g., below the user's head and above the user's waist and extended out from the body by at least 15, 20, 25, 30, or 50 cm), and/or based on whether the hand has moved in a particular manner (e.g., moved toward a region in front of the user above the user's waist and below the user's head or moved away from the user's body or leg). In some embodiments, the ready state is used to determine whether interactive elements of the user interface respond to attention (e.g., gaze) inputs.

In some embodiments, the software may be downloaded to the controller 110 in electronic form, over a network, for example, or it may alternatively be provided on tangible, non-transitory media, such as optical, magnetic, or electronic memory media. In some embodiments, the database 408 is likewise stored in a memory associated with the controller 110. Alternatively or additionally, some or all of the described functions of the computer may be implemented in dedicated hardware, such as a custom or semi-custom integrated circuit or a programmable digital signal processor (DSP). Although the controller 110 is shown in FIG. 4, by way of example, as a separate unit from the image sensors 404, some or all of the processing functions of the controller may be performed by a suitable microprocessor and software or by dedicated circuitry within the housing of the image sensors 404 (e.g., a hand tracking device) or otherwise associated with the image sensors 404. In some embodiments, at least some of these processing functions may be carried out by a suitable processor that is integrated with the display generation component 120 (e.g., in a television set, a handheld device, or head-mounted device, for example) or with any other suitable computerized device, such as a game console or media player. The sensing functions of image sensors 404 may likewise be integrated into the computer or other computerized apparatus that is to be controlled by the sensor output.

FIG. 4 further includes a schematic representation of a depth map 410 captured by the image sensors 404, in some embodiments. The depth map, as explained above, comprises a matrix of pixels having respective depth values. The pixels 412 corresponding to the hand 406 have been segmented out from the background and the wrist in this map. The brightness of each pixel within the depth map 410 corresponds inversely to its depth value, i.e., the measured z distance from the image sensors 404, with the shade of gray growing darker with increasing depth. The controller 110 processes these depth values in order to identify and segment a component of the image (i.e., a group of neighboring pixels) having characteristics of a human hand. These characteristics, may include, for example, overall size, shape and motion from frame to frame of the sequence of depth maps.

FIG. 4 also schematically illustrates a hand skeleton 414 that controller 110 ultimately extracts from the depth map 410 of the hand 406, in some embodiments. In FIG. 4, the hand skeleton 414 is superimposed on a hand background 416 that has been segmented from the original depth map. In some embodiments, key feature points of the hand (e.g., points corresponding to knuckles, finger tips, center of the palm, end of the hand connecting to wrist, etc.) and optionally on the wrist or arm connected to the hand are identified and located on the hand skeleton 414. In some embodiments, location and movements of these key feature points over multiple image frames are used by the controller 110 to determine the hand gestures performed by the hand or the current state of the hand, in some embodiments.

Figure 5:
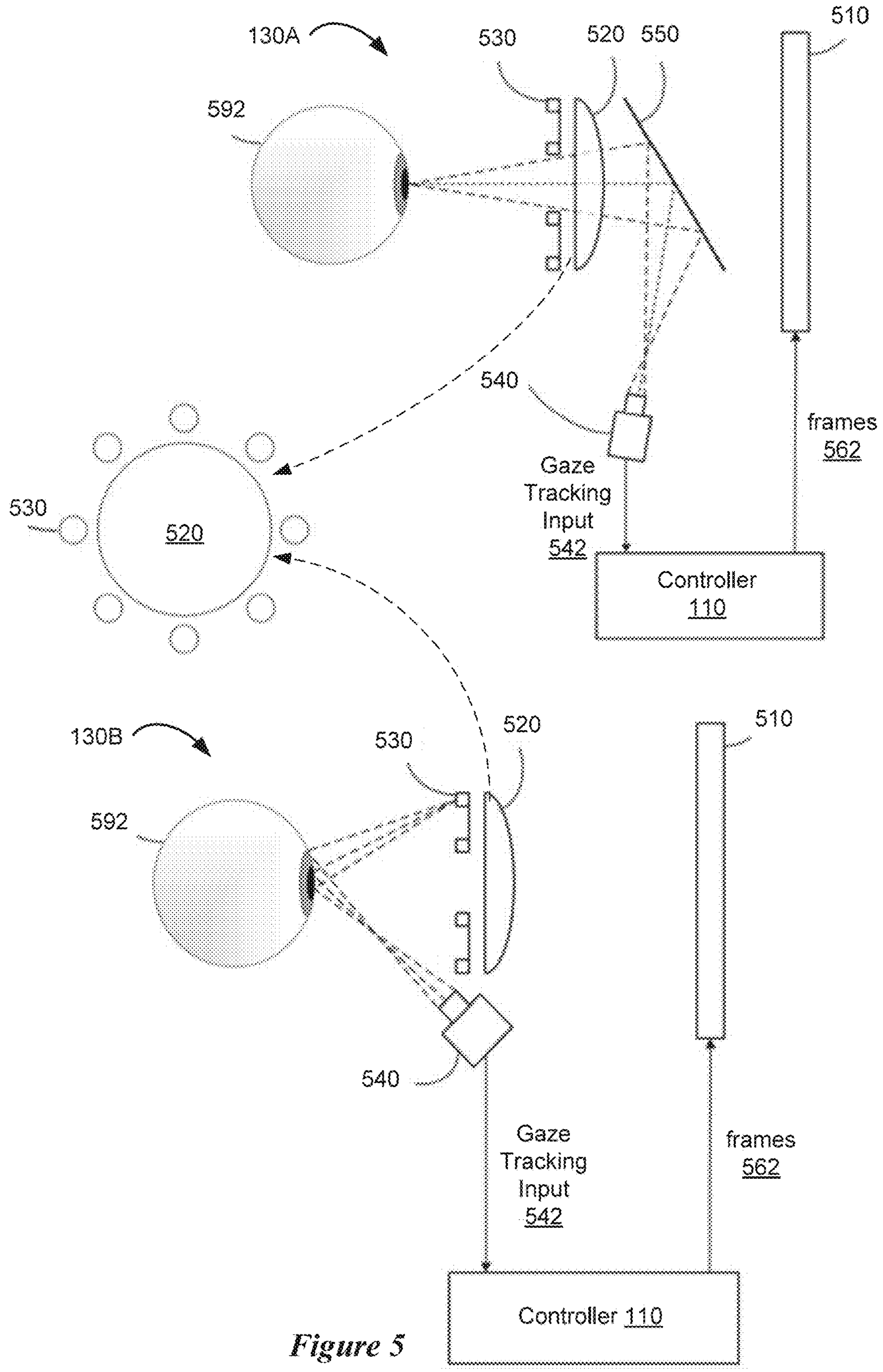
FIG. 5 is a block diagram illustrating an eye tracking unit of a computer system that is configured to capture gaze inputs of the user in accordance with some embodiments.

FIG. 5 illustrates an example embodiment of the eye tracking device 130 (FIG. 1). In some embodiments, the eye tracking device 130 is controlled by the eye tracking unit 243 (FIG. 2) to track the position and movement of the user's gaze with respect to the scene 105 or with respect to the XR content displayed via the display generation component 120. In some embodiments, the eye tracking device 130 is integrated with the display generation component 120. For example, in some embodiments, when the display generation component 120 is a head-mounted device such as headset, helmet, goggles, or glasses, or a handheld device placed in a wearable frame, the head-mounted device includes both a component that generates the XR content for viewing by the user and a component for tracking the gaze of the user relative to the XR content. In some embodiments, the eye tracking device 130 is separate from the display generation component 120. For example, when display generation component is a handheld device or a XR chamber, the eye tracking device 130 is optionally a separate device from the handheld device or XR chamber. In some embodiments, the eye tracking device 130 is a head-mounted device or part of a head-mounted device. In some embodiments, the head-mounted eye-tracking device 130 is optionally used in conjunction with a display generation component that is also head-mounted, or a display generation component that is not head-mounted. In some embodiments, the eye tracking device 130 is not a head-mounted device, and is optionally used in conjunction with a head-mounted display generation component. In some embodiments, the eye tracking device 130 is not a head-mounted device, and is optionally part of a non-head-mounted display generation component.

In some embodiments, the display generation component 120 uses a display mechanism (e.g., left and right near-eye display panels) for displaying frames including left and right images in front of a user's eyes to thus provide 3D virtual views to the user. For example, a head-mounted display generation component may include left and right optical lenses (referred to herein as eye lenses) located between the display and the user's eyes. In some embodiments, the display generation component may include or be coupled to one or more external video cameras that capture video of the user's environment for display. In some embodiments, a head-mounted display generation component may have a transparent or semi-transparent display through which a user may view the physical environment directly and display virtual objects on the transparent or semi-transparent display. In some embodiments, display generation component projects virtual objects into the physical environment. The virtual objects may be projected, for example, on a physical surface or as a holograph, so that an individual, using the system, observes the virtual objects superimposed over the physical environment. In such cases, separate display panels and image frames for the left and right eyes may not be necessary.

As shown in FIG. 5, in some embodiments, eye tracking device 130 (e.g., a gaze tracking device) includes at least one eye tracking camera (e.g., infrared (IR) or near-IR (NIR) cameras), and illumination sources (e.g., IR or NIR light sources such as an array or ring of LEDs) that emit light (e.g., IR or NIR light) towards the user's eyes. The eye tracking cameras may be pointed towards the user's eyes to receive reflected IR or NIR light from the light sources directly from the eyes, or alternatively may be pointed towards "hot" mirrors located between the user's eyes and the display panels that reflect IR or NIR light from the eyes to the eye tracking cameras while allowing visible light to pass. The eye tracking device 130 optionally captures images of the user's eyes (e.g., as a video stream captured at 60-120 frames per second (fps)), analyze the images to generate gaze tracking information, and communicate the gaze tracking information to the controller 110. In some embodiments, two eyes of the user are separately tracked by respective eye tracking cameras and illumination sources. In some embodiments, only one eye of the user is tracked by a respective eye tracking camera and illumination sources.

In some embodiments, the eye tracking device 130 is calibrated using a device-specific calibration process to determine parameters of the eye tracking device for the specific operating environment 100, for example the 3D geometric relationship and parameters of the LEDs, cameras, hot mirrors (if present), eye lenses, and display screen. The device-specific calibration process may be performed at the factory or another facility prior to delivery of the AR/VR equipment to the end user. The device-specific calibration process may be an automated calibration process or a manual calibration process. A user-specific calibration process may include an estimation of a specific user's eye parameters, for example the pupil location, fovea location, optical axis, visual axis, eye spacing, etc. Once the device-specific and user-specific parameters are determined for the eye tracking device 130, images captured by the eye tracking cameras can be processed using a glint-assisted method to determine the current visual axis and point of gaze of the user with respect to the display, in some embodiments.

As shown in FIG. 5, the eye tracking device 130 (e.g., 130A or 130B) includes eye lens(es) 520, and a gaze tracking system that includes at least one eye tracking camera 540 (e.g., infrared (IR) or near-IR (NIR) cameras) positioned on a side of the user's face for which eye tracking is performed, and an illumination source 530 (e.g., IR or NIR light sources such as an array or ring of NIR light-emitting diodes (LEDs)) that emit light (e.g., IR or NIR light) towards the user's eye(s) 592. The eye tracking cameras 540 may be pointed towards mirrors 550 located between the user's eye(s) 592 and a display 510 (e.g., a left or right display panel of a head-mounted display, or a display of a handheld device, a projector, etc.) that reflect IR or NIR light from the eye(s) 592 while allowing visible light to pass (e.g., as shown in the top portion of FIG. 5), or alternatively may be pointed towards the user's eye(s) 592 to receive reflected IR or NIR light from the eye(s) 592 (e.g., as shown in the bottom portion of FIG. 5).

In some embodiments, the controller 110 renders AR or VR frames 562 (e.g., left and right frames for left and right display panels) and provides the frames 562 to the display 510. The controller 110 uses gaze tracking input 542 from the eye tracking cameras 540 for various purposes, for example in processing the frames 562 for display. The controller 110 optionally estimates the user's point of gaze on the display 510 based on the gaze tracking input 542 obtained from the eye tracking cameras 540 using the glint-assisted methods or other suitable methods. The point of gaze estimated from the gaze tracking input 542 is optionally used to determine the direction in which the user is currently looking.

The following describes several possible use cases for the user's current gaze direction, and is not intended to be limiting. As an example use case, the controller 110 may render virtual content differently based on the determined direction of the user's gaze. For example, the controller 110 may generate virtual content at a higher resolution in a foveal region determined from the user's current gaze direction than in peripheral regions. As another example, the controller may position or move virtual content in the view based at least in part on the user's current gaze direction. As another example, the controller may display particular virtual content in the view based at least in part on the user's current gaze direction. As another example use case in AR applications, the controller 110 may direct external cameras for capturing the physical environments of the XR experience to focus in the determined direction. The autofocus mechanism of the external cameras may then focus on an object or surface in the environment that the user is currently looking at on the display 510. As another example use case, the eye lenses 520 may be focusable lenses, and the gaze tracking information is used by the controller to adjust the focus of the eye lenses 520 so that the virtual object that the user is currently looking at has the proper vergence to match the convergence of the user's eyes 592. The controller 110 may leverage the gaze tracking information to direct the eye lenses 520 to adjust focus so that close objects that the user is looking at appear at the right distance.

In some embodiments, the eye tracking device is part of a head-mounted device that includes a display (e.g., display 510), two eye lenses (e.g., eye lens(es) 520), eye tracking cameras (e.g., eye tracking camera(s) 540), and light sources (e.g., light sources 530 (e.g., IR or NIR LEDs)), mounted in a wearable housing. The light sources emit light (e.g., IR or NIR light) towards the user's eye(s) 592. In some embodiments, the light sources may be arranged in rings or circles around each of the lenses as shown in FIG. 5. In some embodiments, eight light sources 530 (e.g., LEDs) are arranged around each lens 520 as an example. However, more or fewer light sources 530 may be used, and other arrangements and locations of light sources 530 may be used.

In some embodiments, the display 510 emits light in the visible light range and does not emit light in the IR or NIR range, and thus does not introduce noise in the gaze tracking system. Note that the location and angle of eye tracking camera(s) 540 is given by way of example, and is not intended to be limiting. In some embodiments, a single eye tracking camera 540 is located on each side of the user's face. In some embodiments, two or more NIR cameras 540 may be used on each side of the user's face. In some embodiments, a camera 540 with a wider field of view (FOV) and a camera 540 with a narrower FOV may be used on each side of the user's face. In some embodiments, a camera 540 that operates at one wavelength (e.g., 850 nm) and a camera 540 that operates at a different wavelength (e.g., 940 nm) may be used on each side of the user's face.

Embodiments of the gaze tracking system as illustrated in FIG. 5 may, for example, be used in computer-generated reality, virtual reality, and/or mixed reality applications to provide computer-generated reality, virtual reality, augmented reality, and/or augmented virtuality experiences to the user.

Figure 6:
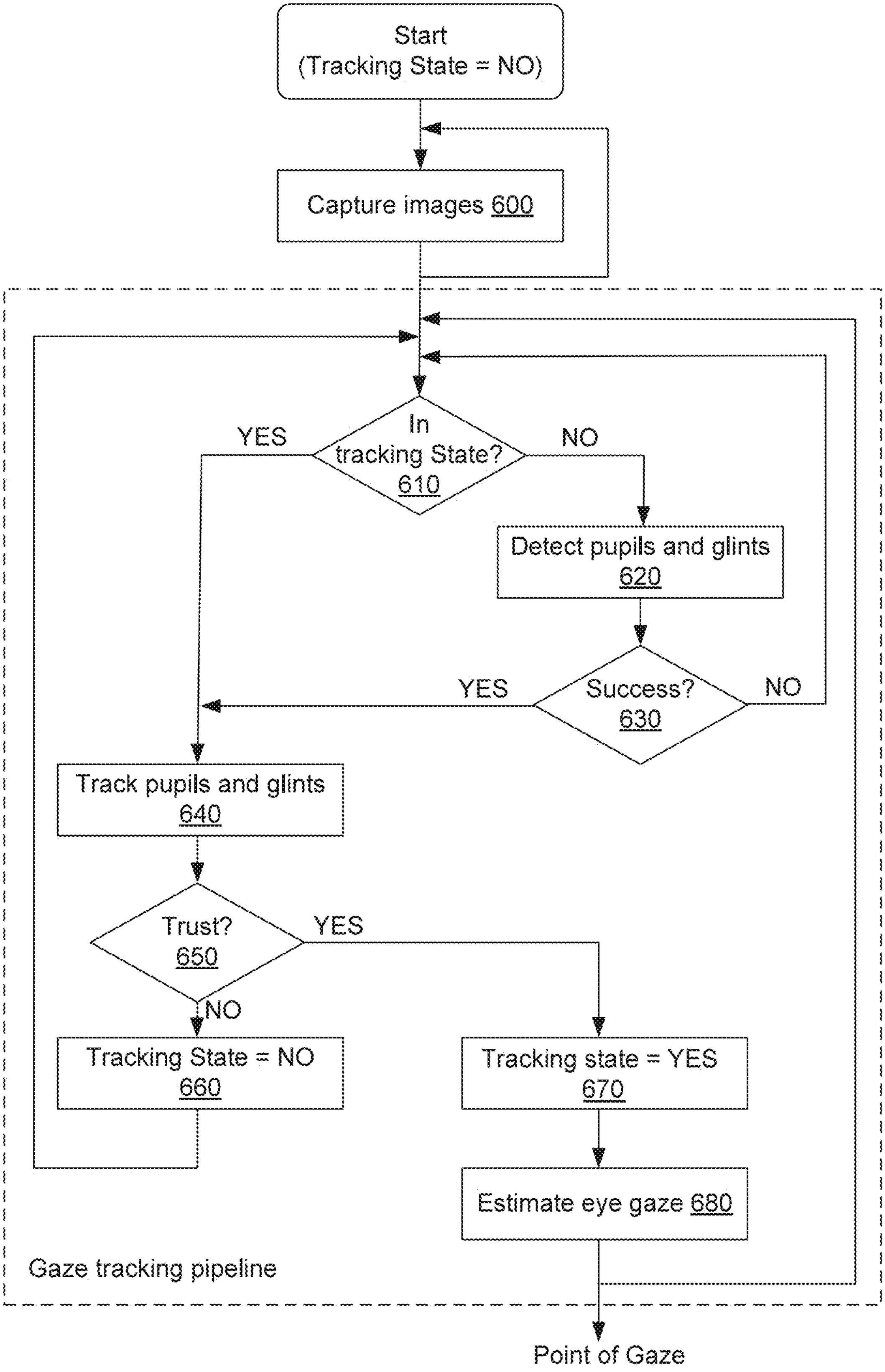
FIG. 6 is a flow diagram illustrating a glint-assisted gaze tracking pipeline in accordance with some embodiments.

FIG. 6 illustrates a glint-assisted gaze tracking pipeline, in some embodiments. In some embodiments, the gaze tracking pipeline is implemented by a glint-assisted gaze tracking system (e.g., eye tracking device 130 as illustrated in FIGS. 1 and 5). The glint-assisted gaze tracking system may maintain a tracking state. Initially, the tracking state is off or "NO". When in the tracking state, the glint-assisted gaze tracking system uses prior information from the previous frame when analyzing the current frame to track the pupil contour and glints in the current frame. When not in the tracking state, the glint-assisted gaze tracking system attempts to detect the pupil and glints in the current frame and, if successful, initializes the tracking state to "YES" and continues with the next frame in the tracking state.

As shown in FIG. 6, the gaze tracking cameras may capture left and right images of the user's left and right eyes. The captured images are then input to a gaze tracking pipeline for processing beginning at 610. As indicated by the arrow returning to element 600, the gaze tracking system may continue to capture images of the user's eyes, for example at a rate of 60 to 120 frames per second. In some embodiments, each set of captured images may be input to the pipeline for processing. However, in some embodiments or under some conditions, not all captured frames are processed by the pipeline.

At 610, for the current captured images, if the tracking state is YES, then the method proceeds to element 640. At 610, if the tracking state is NO, then as indicated at 620 the images are analyzed to detect the user's pupils and glints in the images. At 630, if the pupils and glints are successfully detected, then the method proceeds to element 640. Otherwise, the method returns to element 610 to process next images of the user's eyes.

At 640, if proceeding from element 610, the current frames are analyzed to track the pupils and glints based in part on prior information from the previous frames. At 640, if proceeding from element 630, the tracking state is initialized based on the detected pupils and glints in the current frames. Results of processing at element 640 are checked to verify that the results of tracking or detection can be trusted. For example, results may be checked to determine if the pupil and a sufficient number of glints to perform gaze estimation are successfully tracked or detected in the current frames. At 650, if the results cannot be trusted, then the tracking state is set to NO at element 660, and the method returns to element 610 to process next images of the user's eyes. At 650, if the results are trusted, then the method proceeds to element 670. At 670, the tracking state is set to YES (if not already YES), and the pupil and glint information is passed to element 680 to estimate the user's point of gaze.

FIG. 6 is intended to serve as one example of eye tracking technology that may be used in a particular implementation. As recognized by those of ordinary skill in the art, other eye tracking technologies that currently exist or are developed in the future may be used in place of or in combination with the glint-assisted eye tracking technology describe herein in the computer system 101 for providing XR experiences to users, in some embodiments.

In the present disclosure, various input methods are described with respect to interactions with a computer system. When an example is provided using one input device or input method and another example is provided using another input device or input method, it is to be understood that each example may be compatible with and optionally utilizes the input device or input method described with respect to another example. Similarly, various output methods are described with respect to interactions with a computer system. When an example is provided using one output device or output method and another example is provided using another output device or output method, it is to be understood that each example may be compatible with and optionally utilizes the output device or output method described with respect to another example. Similarly, various methods are described with respect to interactions with a virtual environment or a mixed reality environment through a computer system. When an example is provided using interactions with a virtual environment and another example is provided using mixed reality environment, it is to be understood that each example may be compatible with and optionally utilizes the methods described with respect to another example. As such, the present disclosure discloses embodiments that are combinations of the features of multiple examples, without exhaustively listing all features of an embodiment in the description of each example embodiment.

User Interfaces and Associated Processes

Attention is now directed towards embodiments of user interfaces ("UI") and associated processes that may be implemented on a computer system, such as a portable multifunction device or a head-mounted device, in communication with one or more display generation components.

FIGS. 7A-7J illustrate examples of generating a representation of a user and displaying the representation of the user. FIG. 8 is a flow diagram of an exemplary method 800 for generating the representation of the user. FIG. 9 is a flow diagram of an exemplary method 900 for displaying the representation of the user. The user interfaces in FIGS. 7A-7J are used to illustrate the processes described below, including the processes in FIGS. 8 and 9.

FIGS. 7A-7J illustrate examples for capturing information that is used to generate a representation of a user. In some embodiments, the representation of the user is displayed and/or otherwise used to communicate during a real-time communication session. In some embodiments, a real-time communication session includes real-time communication between the user of the electronic device and a second user associated with a second electronic device, different from the first electronic device, and the real-time communication session includes displaying and/or otherwise communicating, via the electronic device and/or the second electronic device, representations of the user's facial and/or body expressions to the second user via the representation of the user. In some embodiments, the real-time communication session includes displaying the representation of the user and/or outputting audio corresponding to utterances of the user in real time. In some embodiments, the first electronic device and the second electronic device are in communication with one another (e.g., wireless communication) to enable information indicative of the representation of the user and/or audio corresponding to utterances of the user to be transmitted between one another. In some embodiments, the real-time communication session includes displaying the representation of the user (and, optionally, a representation of the second user) in an extended reality environment via display devices of the first electronic device and the second electronic device).

Figure 7A:
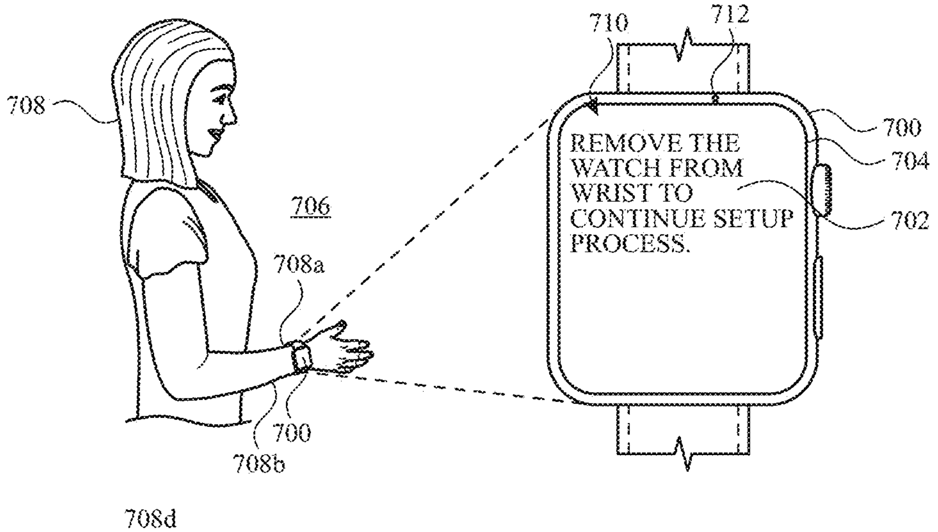
FIGS. 7A-7J illustrate example techniques for generating a representation of a user and displaying the representation of the user, in accordance with some embodiments.

FIG. 7A illustrates electronic device 700 (e.g., a watch and/or a smart watch) displaying prompt 702 on display 704. In addition, FIG. 7A shows physical environment 706 of user 708 who is using and/or associated with electronic device 700. At FIG. 7A, electronic device 700 is being worn on wrist 708*a* of user 708 within physical environment 706. Electronic device 700 is a wearable device that is configured to be worn on the body of user 708 (e.g., on wrist 708*a* of user 708). At FIG. 7A, electronic device 700 is a watch (e.g., a smart watch). In some embodiments, electronic device 700 is a headset, helmet, goggles, glasses, or a handheld device placed in a wearable frame. In some embodiments, electronic device 700 is configured to be primarily used when worn on the body of user 708, but electronic device 700 can also be used (e.g., interacted with via user 708 and/or used to capture information) when electronic device 700 is removed from the body of user 708.

FIG. 7A illustrates first portion 710 (e.g., a first face and/or first side; a front side; and/or an interior portion of a head-mounted device (HMD)) of electronic device 700, which includes display 704 and sensor 712 (e.g., an image sensor, such as a camera). When electronic device 700 is worn on wrist 708*a* (or another portion of the body of user 708, such as head 708*d* and/or face 708*c*) of user 708, first portion 710 of device 700 is visible and/or unobstructed by wrist 708*a* and/or arm 708*b* of user 708. In other words, first portion 710 of device is configured to be positioned so that display 704 is visible to user 708 (e.g., display 704 faces a direction that is opposite of wrist 708*a* and/or display 704 is positioned over and/or in front of eyes of user 708) when electronic device 700 is positioned on wrist 708*a* of user 708 (or another portion of the body of user 708, such as head 708*d* and/or face 708*c* of user 708). As set forth below, electronic device 700 also includes second portion 714 (e.g., a second face and/or second side; a back side; and/or an exterior portion of the HMD), which is illustrated at FIG. 7D. When electronic device 700 is worn on wrist 708*a* of user 708 (or another portion of the body of user 708, such as head 708*d* and/or face 708*c* of user 708), second portion 714 of electronic device 700 is obstructed by (e.g., resting on, contacting, and/or otherwise, positioned near) wrist 708*a* and/or arm 708*b* of user 708 (e.g., second portion 714 of the HMD is not visible to user when the HMD is placed on head 708*d* of user 708 because first portion 710 is covering and/or in front of the eyes of user 708). In other words, second portion 714 of electronic device 700 is positioned so that a surface of second portion 714 faces a direction toward wrist 708*a* of user 708 (e.g., away from the face of the user) while electronic device 700 is worn on wrist 708*a* of user 708.

While FIGS. 7A-7J illustrate electronic device 700 as a watch, in some embodiments, electronic device 700 is a head-mounted device (HMD). The HMD is configured to be worn on head 708*d* of user 708 and includes a first display on and/or in an interior portion of the HMD. The first display is visible to user 708 when user 708 is wearing the HMD on head 708*d* of user 708. For instance, the HMD at least partially covers the eyes of user 708 when placed on head 708*d* of user 708, such that the first display is positioned over and/or in front of the eyes of user 708. In some embodiments, the HMD also includes a second display that is positioned on and/or in an exterior portion of the HMD. In some embodiments, the second display is not visible to user 708 when the HMD is placed on head 708*d* of user 708. Accordingly, the first display of the HMD displays prompt 702 instructing user 708 to remove the HMD from head 708*d* of user 708 and the second display of the HMD displays one or more additional prompts (e.g., content 722*a*) providing user 708 with instructions and/or guidance for using the HMD to capture the one or more physical characteristics of user 708, as set forth below.

At FIG. 7A, electronic device 700 is worn on the body (e.g., wrist 708*a* and/or another portion of the body, such as head 708*d* and/or face 708*c*) of user 708 and is displaying prompt 702 on display 704. Prompt 702 includes an indication (e.g., text and/or images) instructing user 708 to remove electronic device 700 from the body of user 708 (e.g., remove electronic device 700 from wrist 708*a* of user 708 and/or remove electronic device 700 from another portion of the body of user 708, such as head 708*d* and/or face 708*c* of user 708) to continue an enrollment process (e.g., a setup process) of electronic device 700. At FIG. 7A, electronic device 700 is undergoing the enrollment process, which is a process that includes capturing one or more physical characteristics of user 708 for generating representation 726 of user 708 (e.g., a virtual representation, such as an avatar, that includes an appearance that is based on the captured one or more physical characteristics of user 708). As set forth below, electronic device 700 captures at least a portion of the one or more physical characteristics of user 708 with sensors 720*a*-720*j* that are inaccessible, obstructed, and/or otherwise in a position with respect to user 708 that is not suitable for capturing the one or more physical characteristics of user 708 when electronic device 700 is being worn on the body of user 708 (e.g., sensors 720*a*-720*j* of the HMD are not directed toward a respective body part of user 708 when the HMD is worn on head 708*d* of user 708). Accordingly, electronic device 700 outputs prompt 702 instructing user 708 to remove electronic device 700 from the body of user 708 so that one or more of sensors 720*a*-720*j* can be effectively used to capture at least a portion of the one or more physical characteristics of user 708. While FIG. 7A illustrates prompt 702 as a being displayed on display 704 of electronic device 700, in some embodiments, prompt 702 includes audio output (e.g., via a speaker of electronic device 700) and/or haptic output (e.g., via one or more haptic output devices of electronic device 700) that instructs user 708 to remove electronic device 700 from the body (e.g., wrist 708*a* and/or another portion of the body, such as head 708*d* and/or face 708*c*) of user 708.

In some embodiments, electronic device 700 initiates the enrollment process when and/or in response to electronic device 700 being powered on (e.g., first being powered on prior to user 708 signing into an account associated with electronic device 700 and/or being powered on while electronic device 700 is in a setup mode of operation). In some embodiments, the enrollment process is included within an initial setup process of electronic device 700. In some embodiments, the initial setup process of electronic device 700 includes capturing the one or more physical characteristics of user 708 (e.g., via sensor 712 and/or sensors 720*a*-720*j*), capturing biometric information (e.g., facial features, eye features, and/or fingerprints) of user 708, an input calibration process (e.g., electronic device 700 captures information that enables electronic device 700 to detect, recognize, and/or respond to user inputs, such as eye gaze user inputs, air gestures, voice commands, and/or tap gestures), and/or a spatial audio calibration process (e.g., a process including electronic device 700 outputting audio so as to simulate audio being produced from a location within physical environment 706 that is not a location of a speaker of electronic device 700 and, optionally, detecting one or more user inputs corresponding to a perceived location of the output audio). In some embodiments, electronic device 700 initiates the enrollment process based on one or more user inputs requesting that the enrollment process be started.

Figure 7B:
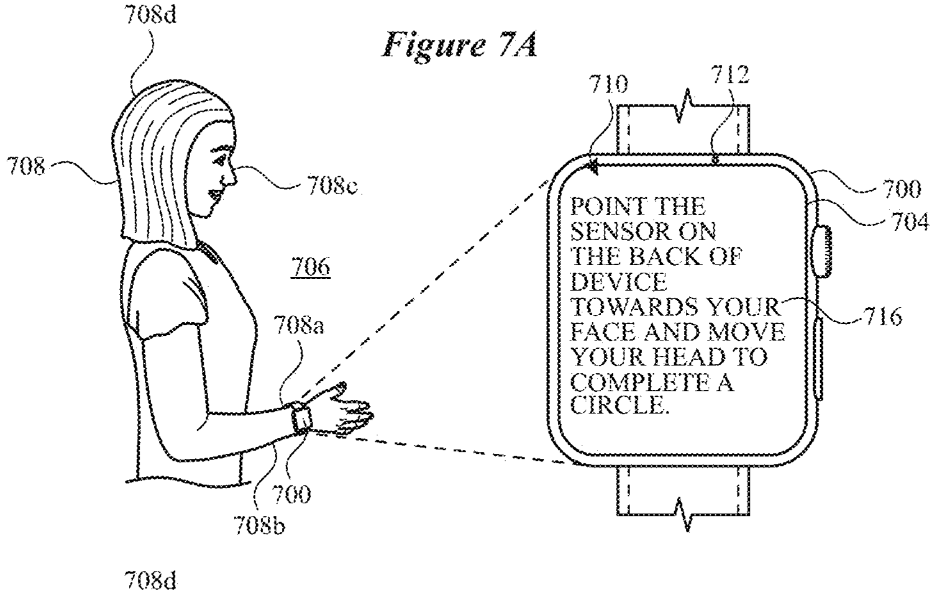

At FIG. 7B, electronic device 700 remains positioned on the body (e.g., wrist 708*a* and/or another portion of the body, such as head 708*d* and/or face 708*c*) of user 708 and displays, via display 704, instructions 716 (such as directions). In some embodiments, electronic device 700 displays instructions 716 when electronic device 700 has not been removed from the body (e.g., wrist 708*a* and/or another portion of the body, such as head 708*d* and/or face 708*c*) of user 708 after a predetermined amount of time (e.g., 10 seconds, 15 seconds, 30 seconds, and/or 60 seconds) has passed since displaying prompt 702. Instructions 716 include additional information, suggestions, and/or tips that provide guidance to user 708 for completing the enrollment process. At FIG. 7B, instructions 716 include text that provides context to user 708 about the enrollment process and informs user 708 about how to use electronic device 700 for completing at least a portion of the enrollment process. At FIG. 7B, instructions 716 prompt user 708 to point sensors (e.g., sensors 720*a*-720*j*) on a back portion, such as second portion 714 (e.g., an exterior portion of the HMD), of electronic device 700 toward face 708*c* and/or head 708*d* of user 708. While FIG. 7B illustrates instructions 716 including text displayed on display 704 of electronic device 700, in some embodiments, instructions 716 include images, symbols, videos, animations, audio, and/or text providing user 708 with guidance on how to orient and/or use electronic device 700 to complete at least a portion of the enrollment process. For instance, in some embodiments, instructions 716 include a video and/or an animated series of images that provide a visual example to user 708 for using electronic device 700 to complete at least a portion of the enrollment process. In some such embodiments, the video and/or animated series of images include a visual indication of a person removing electronic device 700 from a body of the person, orienting electronic device 700 (e.g., second portion 714) toward a portion of the body of the person, and/or the person moving and/or orienting portions of their body so that user 708 can better understand how to complete at least a portion of the enrollment process.

In some embodiments, instructions 716 include information indicating that the one or more physical characteristics of user 708 captured during at least the portion of the enrollment process are used to generate representation 726.

In some embodiments, instructions 716 include information about using representation 726 in a real-time communication session with another user associated with an external electronic device, which provides context to user 708 about the purpose for capturing the one or more physical characteristics of user 708.

Figure 7C:
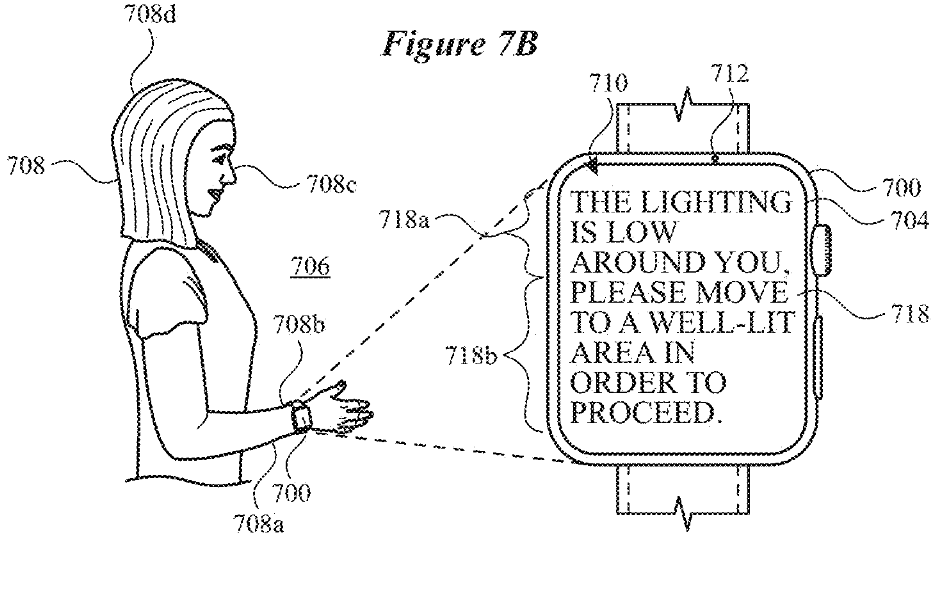
Figure 7D:
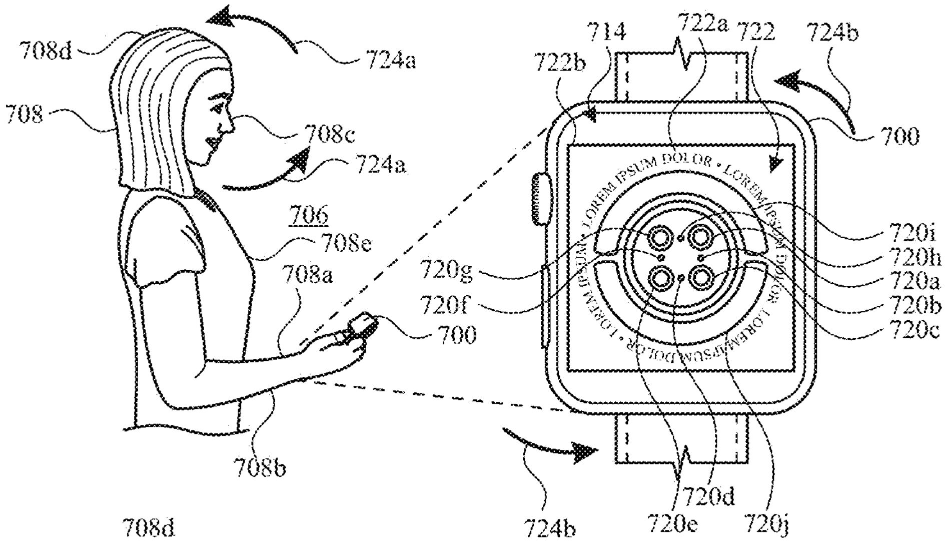

At FIG. 7C, electronic device 700 remains positioned on the body (e.g., wrist 708*a* and/or another portion of the body, such as head 708*d* and/or face 708*c*) of user 708 and displays, via display 704, prompt 718. At FIG. 7C, prompt 718 includes an indication (e.g., text) related to a condition of physical environment 706 in which user 708 is located. In some embodiments, sensor 712 (and/or other sensors) of electronic device 700 captures information about physical environment 706 and electronic device 700 determines whether the captured information is indicative of one or more conditions that could affect capturing the one or more physical characteristics of user 708. At FIG. 7C, electronic device 700 determines that information about physical environment 706 indicates that physical environment 706 includes low lighting (e.g., light emitted from one or more light sources, such as a light bulb, a lamp, and/or the sun, is not reaching the user in sufficient quantities to enable the electronic device to effectively capture the one or more physical characteristics of user 708). As such, electronic device 700 outputs prompt 718 to warn and/or advise user 708 that a lighting condition in physical environment 706 could affect capturing the one or more physical characteristics of user 708. While FIG. 7C shows electronic device 700 providing prompt 718 related to a low lighting condition of physical environment 706, in some embodiments, electronic device 700 is configured to output prompts related to one or more other conditions of physical environment 706, such as a harsh lighting condition, an object positioned between electronic device 700 and user 708 (e.g., an object obstructing an area in which one or more sensors of electronic device 700 are configured to capture information), and/or an object and/or accessory positioned on a respective portion of the body of user 708 (e.g., glasses, a face covering, a head covering, and/or a hat). In some embodiments, electronic device 700 is configured to output a prompt when electronic device 700 determines that a set of one or more criteria is satisfied, such as when electronic device 700 includes an amount of power and/or battery life below a threshold amount.

At FIG. 7C, prompt 718 includes first portion 718*a* (e.g., a first portion of text) indicative of the condition in physical environment 706 that could affect capturing the one or more physical characteristics of user 708. In addition, prompt 718 includes second portion 718*b* (e.g., a second portion of text) providing a suggestion and/or guidance to user 708 about correcting the condition that could affect capturing the one or more physical characteristics of user 708. At FIG. 7C, second portion 718*b* includes a suggestion for user 708 to move to an area of physical environment 706 that includes an increased amount of lighting (e.g., an area that is brighter). In some embodiments, second portion 718*b* includes a suggestion to turn on an additional light source and/or increase an amount of power supplied to a light source. In some embodiments, second portion 718*b* includes a suggestion to correct and/or adjust another condition, such as moving to an area within physical environment 706 that includes less harsh lighting (e.g., cooler and/or dimmer lighting), removing and/or moving an object between electronic device 700 and user 708, removing and/or moving an object and/or accessory on a respective portion of the body of user 708, and/or charging electronic device 700.

In some embodiments, prompt 718 includes, either in lieu of text and/or in addition to text, visual prompts, such as videos, images, symbols, emojis, animations, audio prompts, and/or haptic prompts that inform and/or alert user 708 about the condition affecting capturing the one or more physical characteristics of user 708.

At FIG. 7D, user 708 has removed electronic device 700 from the body (e.g., wrist 708*a* and/or another portion of the body, such as head 708*d* and/or face 708*c*) of user 708 in physical environment 706. In addition, FIG. 7D illustrates second portion 714 (e.g., a backside and/or an exterior portion of the HMD) of electronic device 700 that is accessible and/or visible after user 708 removed electronic device 700 from the body (e.g., wrist 708*a* and/or another portion of the body, such as head 708*d* and/or face 708*c*). Second portion 714 of electronic device 700 includes sensors 720*a*-720*j* that are configured to capture various information about user 708. In some embodiments, sensors 720*a*-720*j* include one or more image sensors (e.g., IR cameras, 3D cameras, depth cameras, color cameras, RGB cameras (e.g., with a complimentary metal-oxide-semiconductor (CMOS) image sensor or a charge-coupled device (CCD) image sensor), one or more infrared (IR) cameras, and/or one or more event-based cameras), an inertial measurement unit (IMU), an accelerometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, one or more depth sensors (e.g., a structured light, a time-of-flight, and/or two or more cameras that determine depth based on differences in perspectives of the two or more cameras), one or more light sensors, one or more tactile sensors, one or more orientation sensors, one or more proximity sensors, one or more location sensors, one or more motion sensors, and/or one or more velocity sensors.

At FIG. 7D, second portion 714 includes area 722 (e.g., a portion of second portion 714 that does not include sensors 720*a*-720*j* and/or an exterior portion of the HMD that includes a display that is different from display 704). Area 722 includes content 722*a* (e.g., text as shown at FIG. 7D) that is able to be viewed and/or perceived by user 708. In some embodiments, area 722 includes one or more display generation components 722*b* that display content 722*a*. For example, area 722 is a display. In some embodiments, electronic device 700 causes one or more display generation components 722*b* to display visual indications that provide instructions and/or otherwise guide user 708 to use electronic device 700 to capture one or more physical characteristics of user 708 (e.g., via sensors 720*a*-720*j*).

In some embodiments, electronic device 700 detects that electronic device 700 has been removed from the body (e.g., wrist 708*a* and/or another portion of the body, such as head 708*d* and/or face 708*c*) of user 708. In response to detecting that electronic device 700 has been removed from the body (e.g., wrist 708*a* and/or another portion of the body, such as head 708*d* and/or face 708*c*) of user 708, electronic device 700 causes one or more display generation components 722*b* to display one or more prompts instructing and/or guiding user 708 to use electronic device 700 to capture the one or more physical characteristics of user 708. In some embodiments, the one or more prompts include text, images, symbols, videos, animations, and/or other visual cues prompting user 708 to move electronic device 700 and/or move a portion of the body of user 708 to a particular orientation (e.g., move electronic device 700 to a particular orientation with respect to the body of user 708 and/or move the portion of the body of user 708 to a particular orientation with respect to electronic device 700). For example, in some embodiments, the one or more prompts instruct user 708 to adjust positions of electronic device 700 and/or the body of user 708 within physical environment 706 so that one or more of sensors 720*a*-720*j* are directed toward a particular body part of user, such as face 708*c* and/or head 708*d* of user 708. In some embodiments, the one or more prompts instruct user 708 to move a particular body part of user 708 (e.g., face 708*c* and/or head 708*d*) with respect to electronic device 700 so that sensors 720*a*-720*j* capture features of the particular body part of user 708. In some embodiments, the one or more prompts instruct user 708 to rotate head 708*d* of user 708 (and, optionally, at a particular speed) with respect to electronic device 700 so that sensors 720*a*-720*j* capture physical characteristics about face 708*c* of user 708. In some embodiments, the one or more prompts instruct user 708 to move and/or orient electronic device 700 so that sensors 720*a*-720*j* are directed toward a torso 708*e* (e.g., shoulders and/or chest) of user 708 so that electronic device 700 captures physical characteristics about torso 708*e* and/or clothing that user 708 is wearing (e.g., clothing covering and/or placed on torso 708*e*).

In some embodiments, electronic device 700 provides the one or more prompts (e.g., via one or more display generation components 722*b*) to instruct user 708 to make one or more particular facial expressions (e.g., smile, frown, open mouth, and/or raise and/or lower eyebrows) to capture one or more physical characteristics of face 708*c* of user 708. In some embodiments, the one or more prompts include information about a condition of physical environment 706 affecting the capturing of information about the one or more physical characteristics and/or information about adjusting and/or correcting the condition, similar to prompt 718. In some embodiments, the one or more prompts instruct user 708 to move a portion of the body of user 708 and/or move electronic device 700 so that a respective portion of the body of user 708 is within a frame (e.g., a frame, such as a box and/or an outline, displayed via one or more display generation components 722*b*). In some embodiments, the one or more prompts instruct user 708 to move closer to and/or further away from electronic device 700 and/or to move electronic device 700 closer to and/or further away from user 708. In some embodiments, the one or more prompts provided by electronic device 700 are displayed via one or more display generation components 722*b* of area 722. In some embodiments, the one or more prompts are audio prompts (e.g., output via a speaker of electronic device 700) and/or haptic prompts (e.g., output via one or more haptic output devices of electronic device 700) that provide instructions and/or guidance to user 708 about capturing the one or more physical characteristics of user 708.

At FIG. 7D, user 708 moves head 708*d* and/or moves electronic device 700 as indicated by arrows 724*a* and/or 724*b*, respectively. While user 708 moves head 708*d* (and, optionally, other portions of the body of user 708) and/or electronic device 700, sensors 720*a*-720*j* capture information about the one or more physical characteristics of user 708. Sensors 720*a*-720*j* of electronic device 700 capture information about one or more physical characteristics of user 708, such as one or more facial features, one or more features of hair of user 708 (e.g., hair on head 708*d* of user 708 and/or facial hair of user 708), one or more features of torso 708*e* (e.g., shoulders, chest, and/or clothing) of user 708, and/or other physical characteristics of user 708 that would otherwise be inaccessible and/or outside of a capturing area of sensors 720*a*-720*j* while electronic device 700 is placed on the body (e.g., wrist 708*a* and/or another portion of the body, such as head 708*d* and/or face 708*c*) of user 708. For instance, while user 708 is wearing electronic device 700 on the body (e.g., wrist 708*a* and/or another portion of the body, such as head 708*d* and/or face 708*c*), capturing areas and/or fields of sensors 720*a*-720*j* are not directed toward a particular portion of the body of user 708 (e.g., face 708*c*, head 708*d*, and/or torso 708*e*) and/or are blocked from capturing the one or more physical characteristics of user 708. As set forth below, electronic device 700 uses the captured information about the one or more physical characteristics of user 708 to generate representation 726 of user 708.

Figure 7E:
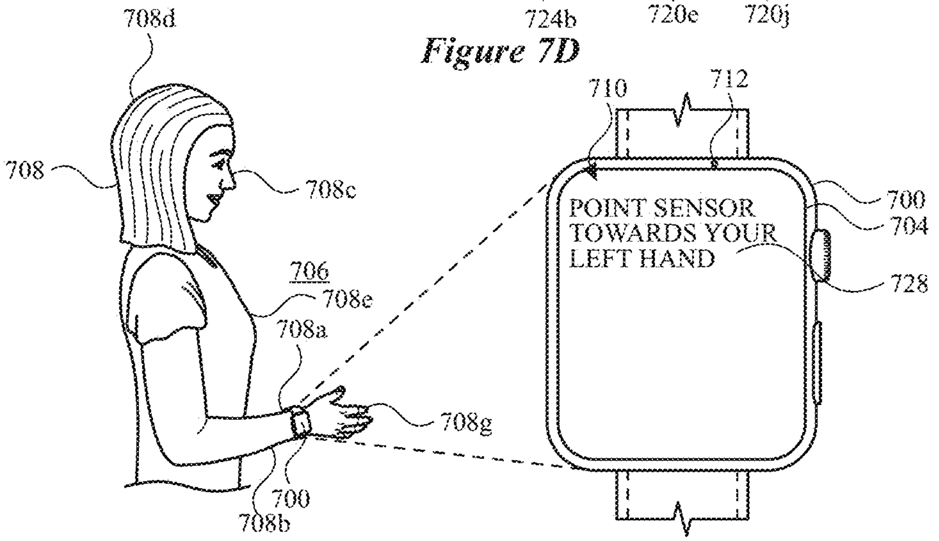

At FIG. 7E, user 708 has placed electronic device 700 back on the body (e.g., wrist 708 and/or another portion of the body, such as head 708*d* and/or face 708*c*) of user 708. In some embodiments, after capturing the one or more physical characteristics of user 708, electronic device 700 outputs (e.g., displays via one or more display generation components 722*b* and/or outputs audio and/or haptics) a prompt instructing user 708 to place electronic device 700 back on the body (e.g., wrist 708*a* and/or another portion of the body, such as head 708*d* and/or face 708*c*) of user 708 to continue the enrollment process. At FIG. 7E, electronic device 700 determines and/or detects that electronic device 700 is positioned on the body (e.g., wrist 708*a* and/or another portion of the body, such as head 708*d* and/or face 708*c*) of user 708. In response to determining that electronic device 700 is positioned on the body (e.g., wrist 708*a* and/or another portion of the body, such as head 708*d* and/or face 708*c*) of user 708 (and, optionally, in response to detecting that the one or more physical characteristics of user 708 have been captured), electronic device 700 displays prompt 728, via display 704.

At FIG. 7E, prompt 728 includes an indication (e.g., text) instructing user 708 to move and/or orient electronic device 700 (and/or a portion of the body of user 708) so that sensor 712 is facing in a direction toward left hand 708*f* of user 708 (e.g., sensor 712 of the HMD is a camera and while the HMD is worn on head 708*d* of user 708, user 708 can direct head 708*d*, left hand 708*f*, and/or their eyes so that left hand 708*f* is within a field of view of the camera). In some embodiments, electronic device 700 captures first information about one or more first physical characteristics of user 708 via sensors 720*a*-720*j* while electronic device 700 is removed from the body (e.g., wrist 708*a* and/or another portion of the body, such as head 708*d* and/or face 708*c*) of user 708 and captures second information about one or more second physical characteristics of user 708 via sensor 712 while electronic device 700 is placed on the body (e.g., wrist 708*a* and/or another portion of the body, such as head 708*d* and/or face 708*c*) of user 708. In some embodiments, electronic device 700 uses at least a portion of both the one or more first physical characteristics of user 708 and the one or more second physical characteristics of user 708 to generate representation 726. In some embodiments, electronic device 700 uses only one of the one or more first physical characteristics of user 708 and the one or more second physical characteristics of user 708 to generate representation 726. In some embodiments, the one or more first physical characteristics of user 708 correspond to physical characteristics of portions of the body of user 708 that are inaccessible and/or outside of a capturing area and/or field of sensors 720*a*-720*j* while electronic device 700 is on the body (e.g., wrist 708*a* and/or another portion of the body, such as head 708*d* and/or face 708*c*) of user 708, such as physical characteristics of face 708*c*, head 708*d*, and/or torso 708*e*. In some embodiments, the one or more first physical characteristics of user 708 correspond to physical characteristics of portions of the body of user 708 that are inaccessible and/or otherwise not suitable for capturing via sensor 712 while electronic device 700 is on the body (e.g., wrist 708*a* and/or another portion of the body, such as head 708*d* and/or face 708*c*) of user 708 (e.g., portions of the body of user 708 that are covered by electronic device 700 when it is on the body of user 708 (e.g., face 708*c* and/or head 708*d* of user 708 are covered by the HMD when it is worn on head 708*d* of user 708). In some embodiments, the one or more second physical characteristics of user 708 correspond to physical characteristics of portions of the body of user 708 that are accessible and/or suitable for capturing via sensor 712 while electronic device 700 is on the body (e.g., wrist 708*a* and/or another portion of the body, such as head 708*d* and/or face 708*c*) of user 708, such as left hand 708*f* and/or right hand 708*g* (e.g., left hand 708*f* and/or right hand 708*g* can be captured via a camera (e.g., sensor 712) of the HMD while the HMD is worn on head 708*d* of user 708). Accordingly, electronic device 700 outputs one or more prompts instructing user to remove electronic device 700 from the body (e.g., wrist 708*a* and/or another portion of the body, such as head 708*d* and/or face 708*c*) of user 708 and/or to place electronic device 700 on the body (e.g., wrist 708*a* and/or another portion of the body, such as head 708*d* and/or face 708*c*) of user 708 in order to capture the one or more first physical characteristics of user 708 and/or the one or more second physical characteristics of user 708.

Figure 7F:
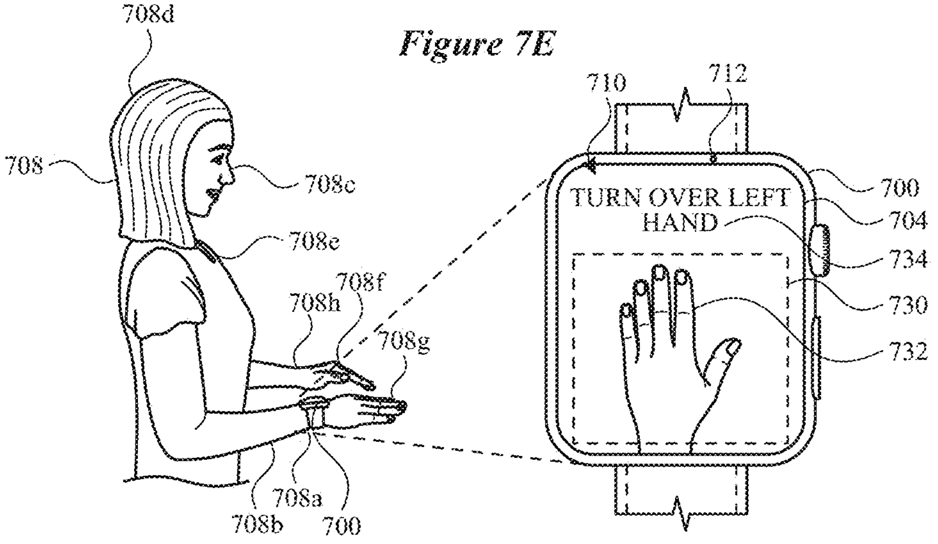

At FIG. 7F, user 708 has positioned electronic device 700, left hand 708*f*, and/or right hand 708*g* so that sensor 712 is in a position where the capturing area and/or field of sensor 712 is directed toward left hand 708*f* (e.g., sensor 712 of the HMD is a camera and user 708 has adjusted a position of head 708*d*, a position of left hand 708*f*, and/or a position of a gaze of their eyes so that left hand 708*f* is within the field of view of the camera). In addition, electronic device 700 displays, via display 704, frame 730 indicative of a target position of left hand 708*f* with respect to electronic device 700 (e.g., sensor 712 of electronic device 700). At FIG. 7F, sensor 712 includes an image sensor, such as a camera, and electronic device 700 displays information captured via sensor 712 on display 704. Accordingly, electronic device 700 displays hand representation 732 on display 704 indicating that sensor 712 has captured and/or otherwise detected left hand 708*f* of user 708. In some embodiments, user 708 can adjust a position of left hand 708*f* and/or electronic device 700 so that hand representation 732 is within frame 730 on display 704. In some embodiments, when hand representation 732 is within frame 730, left hand 708*f* of user 708 is positioned within a target area with respect to electronic device 700 that enables sensor 712 to capture information about one or more physical characteristics of left hand 708*f* In some embodiments, electronic device 700 causes sensor 712 to capture the information about the one or more physical characteristics of left hand 708*f* of user 708 in response to hand representation 732 being within frame 730 and/or in response to hand representation 732 being within frame 730 for a predetermined amount of time.

After and/or while electronic device 700 captures the information about the one or more physical characteristics of left hand 708*f*, electronic device 700 displays prompt 734, via display 704. At FIG. 7F, prompt 734 includes an indication (e.g., text) instructing user 708 to adjust a position of left hand 708*f* to turn left hand 708*f* over (e.g., rotate left hand 708*f* approximately 180 degrees with respect to electronic device 700 and/or sensor 712). In some embodiments, in response to detecting that left hand 708*f* of user has been rotated and/or turned over, electronic device 700 captures, via sensor 712, additional one or more physical characteristics about left hand 708*f* of user 708. In some embodiments, electronic device 700 uses the one or more physical characteristics about left hand 708*f* of user 708 and/or the additional one or more physical characteristics about left hand 708*f* of user 708 to generate a portion of representation 726. In some embodiments, electronic device 700 uses the one or more physical characteristics about left hand 708*f* of user 708 and/or the additional one or more physical characteristics about left hand 708*f* of user 708 as part of an input calibration process.

In some embodiments, electronic device 700 captures information about one or more physical characteristics about right hand 708*g* of user 708 while electronic device 700 is placed on the body (e.g., wrist 708*a*, wrist 708*h*, and/or another portion of the body, such as head 708*d* and/or face 708*c*) of user 708. In some embodiments, electronic device 700 captures information about right hand 708*g* of user 708 while electronic device 700 is removed from the body (e.g., wrist 708*a*, wrist 708*h*, and/or another portion of the body, such as head 708*d* and/or face 708*c*) of user 708 (e.g., captures information about right hand 708*g* of user 708 via sensors 720*a*-720*j*).

Figure 7G:
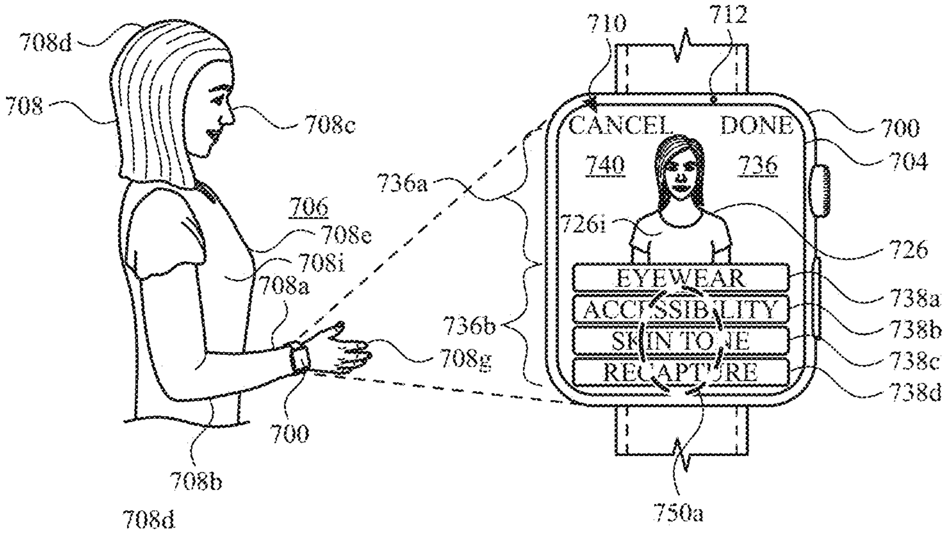

After capturing information about left hand 708*f* of user 708 (and, optionally, after completion of capturing information about the one or more physical characteristics of user 708 and/or after detecting that electronic device 700 is placed on the body (e.g., wrist 708*a* and/or another portion of the body, such as head 708*d* and/or face 708*c*) of user 708), electronic device 700 displays, via display 704, user interface 736 including representation 726, as shown at FIG. 7G. At FIG. 7G, representation 726 includes an appearance that is based on the captured one or more physical characteristics of user 708, such that representation 726 resembles and/or otherwise appears similar to user 708. For instance, clothing representation 726*i* of representation 726 includes an appearance that includes one or more attributes that are based on one or more physical attributes of clothing 708*i* worn by user 708. In some embodiments, electronic device 700 generates representation 726 stereoscopically (e.g., combining and/or overlaying two or more two-dimensional images of user 708 to create an appearance that representation 726 is three-dimensional) using the captured one or more physical characteristics of user 708.

At FIG. 7G, electronic device 700 displays representation 726 at first region 736*a* of user interface 736 and displays selectable options 738*a*-738*d* at second region 736*b* of user interface 736. As discussed below, electronic device 700 is configured to edit an appearance of representation 726 and/or initiate a process to recapture the one or more physical characteristics of user 708 in response to detecting user input selecting one or more of selectable options 738*a*-738*d*.

At FIG. 7G, representation 726 is displayed within environment 740 of first region 726*a*. In some embodiments, environment 740 is a virtual reality environment. In some embodiments, environment 740 is an augmented reality environment 740. In some embodiments, environment 740 is a static background. In some embodiments, environment 740 includes one or more objects (e.g., virtual objects), such as a frame and/or a mirror.

In some embodiments, while displaying representation 726, electronic device 700 receives information indicative of movement of user 708 within physical environment 706. In response to receiving the information indicative of movement of user 708 within physical environment 706, electronic device 700 displays movement of representation 726 within environment 740. In some embodiments, electronic device 700 displays the movement of representation 726 within environment 740 to mirror the physical movement of user 708 within physical environment 706. In other words, electronic device 700 displays movement of representation 726 as if user 708 were viewing representation 726 in a mirror (e.g., as user 708 moves right hand 708*g* in physical environment 706, electronic device displays movement of a left hand of representation 726). In some embodiments, electronic device 700 displays a frame and/or mirror (e.g., a virtual frame and/or a virtual mirror) in environment 740 to indicate to user 708 that representation 726 is displayed as a mirror image representation of the physical body of user 708.

In some embodiments, electronic device 700 displays representation 726 as a preview of content that will be displayed to another user, via an external electronic device, while user 708 is participating in a real-time communication session with the other user. In some embodiments, electronic device 700 displays representation 726 and/or at least a portion of representation 726 via one or more display generation components 722*b* while electronic device 700 is removed from the body (e.g., wrist 708*a* and/or another portion of the body, such as head 708*d* and/or face 708*c*) of user 708. In some embodiments, electronic device 700 displays representation 726 when electronic device 700 detects that electronic device 700 is placed on the body (e.g., wrist 708*a* and/or another portion of the body, such as head 708*d* and/or face 708*c*) of user 708 and does not display representation 726 when electronic device 700 detects that electronic device 700 is removed from the body (e.g., wrist 708*a* and/or another portion of the body, such as head 708*d* and/or face 708*c*) of user 708.

As set forth above, electronic device 700 displays selectable options 738*a*-738*d* at second region 736*b* of user interface 736, which enable user 708 to edit an appearance of representation 726 and/or initiate a process to recapture the one or more physical characteristics of user 708. At FIG. 7G, first selectable option 738*a* corresponds to an option to edit eyewear (e.g., glasses, sunglasses, bifocals, monocles, goggles, and/or headsets) of representation 726. In response to detecting user input selecting first selectable option 738*a*, electronic device 700 enables an appearance of representation 726 to be adjusted and/or changed so that representation 726 is wearing (e.g., includes) or not wearing (e.g., does not include) a selected type of eyewear. In some embodiments, electronic device 700 captures the one or more physical characteristics of user 708 while user 708 is wearing eyewear, and thus, first electable option 738*a* enables user 708 to select whether representation 726 is or is not wearing eyewear that includes an appearance based on the captured one or more physical characteristics of user 708 (e.g., representation 726 is wearing eyewear that includes an appearance having one or more attributes corresponding to the physical eyewear in which user 708 was wearing while electronic device 700 captured the one or more physical characteristics of user 708).

Second selectable option 738*b* corresponds to an option to edit accessibility accessories (e.g., eyepatches, prosthetic appendages, and/or hearing aids) of representation 726. In response to detecting user input selecting second selectable option 738*b*, electronic device 700 enables an appearance of representation 726 to be adjusted and/or changed so that representation 726 is wearing (e.g., includes) or not wearing (e.g., does not include) a selected accessibility accessory. In some embodiments, electronic device 700 captures the one or more physical characteristics of user 708 while user 708 is wearing an accessibility accessory, and thus, second electable option 738*b* enables user 708 to select whether representation 726 is or is not wearing an accessibility accessory that includes an appearance based on the captured one or more physical characteristics of user 708 (e.g., representation 726 is wearing an accessibility accessory that includes an appearance having one or more attributes corresponding to the physical accessibility accessory in which user 708 was wearing while electronic device 700 captured the one or more physical characteristics of user 708).

Third selectable option 738*c* corresponds to an option to edit a skin tone (e.g., a color, hue, shade, brightness, and/or darkness of a skin representation) of representation 726. In response to detecting user input selecting third selectable option 738*c*, electronic device 700 enables an appearance of representation 726 to be adjusted and/or changed so that a skin tone of one or more portions of representation 726 is adjusted. In some embodiments, the captured one or more physical characteristics of user 708 do not include information about one or more physical skin tones of user 708 and/or a displayed skin tone of representation 726 does not otherwise accurately reflect the one or more physical skin tones of user 708. Thus, third selectable option 738*c* enables user 708 to change and/or adjust a skin tone representation of representation 726 so that representation 726 includes a skin tone representation that accurately resembles a physical skin tone of user 708.

Fourth selectable option 738*d* corresponds to an option to recapture the one or more physical characteristics of user 708 so that electronic device 700 can regenerate and/or update representation 726 based on recaptured one or more physical characteristics of user 708. In some embodiments, in response to detecting user input selecting fourth selectable option 738*d*, electronic device 700 displays prompt 702, as shown at FIG. 7A, and/or otherwise initiates a process for recapturing the one or more physical characteristics of user 708.

At FIG. 7G, electronic device 700 detects user input 750*a* corresponding to selection of third selectable option 738*c*. In response to detecting user input 750*a*, electronic device 700 displays, via display, user interface 742 including representation 726 and selectable skin tone options 742*a* and 742*b*, as shown at FIG. 7H.

Figure 7H:
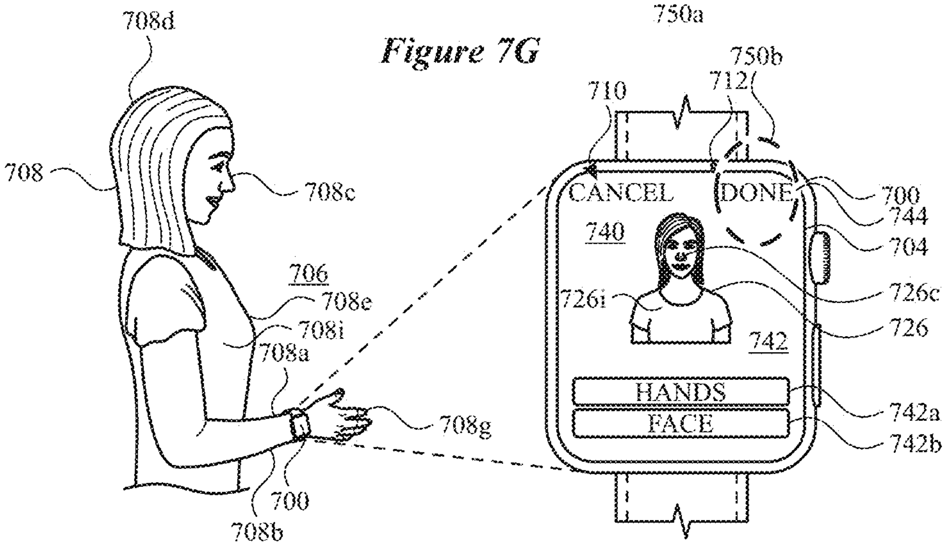

At FIG. 7H, electronic device 700 displays first skin tone option 742*a* and second skin tone option 742*b* for editing a skin tone of different portions of representation 726 so that representation 726 can include different portions having different skin tones (e.g., colors, hues, brightness, and/or darkness of skin representations on different representations of body parts of representation 726). First skin tone option 742*a* corresponds to editing a skin tone of hands representation of representation 726. In response to detecting user input selecting first skin tone option 742*a*, electronic device 700 enables an appearance of representation 726 to be adjusted and/or changed so that a skin tone of hands representations of representation 726 are adjusted. Second skin tone option 742*b* corresponds to editing a skin tone of face representation 726*c* of representation 726. In response to detecting user input selecting second skin tone option 742*b*, electronic device 700 enables an appearance of representation 726 to be adjusted and/or changed so that a skin tone of face representation 726*c* of representation 726 is adjusted. While FIG. 7H illustrates user interface 742 including two selectable skin tone options 742*a* and 742*b*, in some embodiments, user interface 742 includes more than two selectable skin tone options corresponding to editing the skin tone of different portions of representation 726.

Figure 7I:
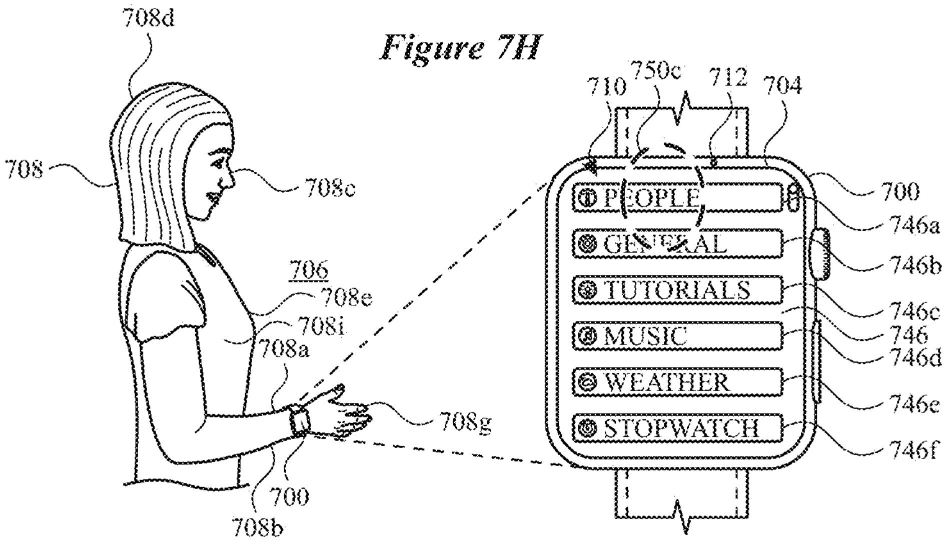

At FIG. 7H, electronic device 700 detects user input 750*b* corresponding to selection of done user interface object 744. After detecting user input 750*b*, electronic device 700 displays menu user interface 746, as shown at FIG. 7I. At FIG. 7I, menu user interface 746 includes menu user interface objects 746*a*-746*f* corresponding to various functions, user interfaces, and/or applications configured to be executed and/or displayed by electronic device 700. In some embodiments, menu user interface 746 is a home user interface and/or default user interface of an operating system of electronic device 700.

Figure 7J:
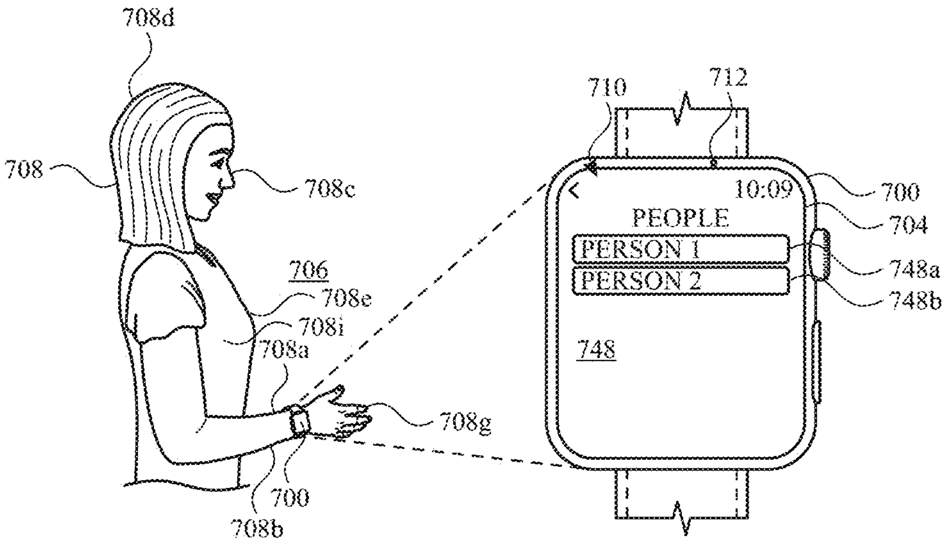

At FIG. 7I, electronic device 700 detects user input 750*c* corresponding to selection of first menu user interface object 746*a* (e.g., "People"). In response to detecting user input 750*c*, electronic device 700 displays, via display 704, people user interface 748 (e.g., representation user interface), as shown at FIG. 7J. People user interface 748 corresponds to different representations of user 708 (and, optionally, other users of electronic device 700) generated by electronic device 700. At FIG. 7J, people user interface 748 includes first person user interface object 748*a* corresponding to a first representation (e.g., representation 726) generated by electronic device 700 and second person user interface object 748*b* corresponding to a second representation (e.g., a representation different from representation 726) generated by electronic device 700. In some embodiments, first representation and/or second representation correspond to representations of users that are generated by electronic device 700 based on one or more captured physical characteristics of respective users.

In some embodiments, in response to detecting user input corresponding to selection of first person user interface object 748*a*, electronic device 700 displays user interface 736 including the first representation (e.g., representation 726) corresponding to first person user interface object 748*a*. Similarly, in response to detecting user input corresponding to selection of second person user interface object 748*b*, electronic device 700 displays user interface 736 including the second representation (e.g., a representation different from representation 726) corresponding to second person user interface object 748*b*.

Additional descriptions regarding FIGS. 7A-7J are provided below in reference to methods 800 and 900 described with respect to FIGS. 7A-7J.

FIG. 8 is a flow diagram of an exemplary method 800 for generating a representation of a user, in accordance with some embodiments. In some embodiments, method 800 is performed at a computer system (e.g., 101, 700 and/or 1000) (e.g., a smartphone, tablet, head-mounted display generation component) including one or more display generation components (e.g., 120, 704, 722, 722*b*, and/or 1000*a*) (e.g., a visual output device, a 3D display, and/or a display having at least a portion that is transparent or translucent on which images can be projected (e.g., a see-through display), a projector, a heads-up display, and/or a display controller) (and, optionally, that is in communication with and one or more cameras (e.g., an infrared camera; a depth camera; and/or a visible light camera)). In some embodiments, the method 800 is governed by instructions that are stored in a non-transitory (or transitory) computer-readable storage medium and that are executed by one or more processors of a computer system, such as the one or more processors 202 of computer system 101 (e.g., control 110 in FIG. 1A). Some operations in method 800 are, optionally, combined and/or the order of some operations is, optionally, changed.

While the computer system (e.g., 101, 700, and/or 1000) is placed on a body (e.g., 708*a*) of a user (e.g., 708) (e.g., the computer system is worn with a respective orientation and/or position relative to a respective portion of the user's body) (e.g., the computer system is a wearable computer system (e.g., a head-mounted display generation component, glasses, a headset, and/or a watch) that is configured to be worn on a body part of a user of the computer system) (in some embodiments, the computer system is a watch configured to be worn on a wrist (e.g., 708*a*) of the user of the computer system) (in some embodiments, the computer system is in communication with one or more sensors that capture data indicative of whether the computer system is in the wearable position), the computer system (e.g., 101, 700, and/or 1000) displays (802), via the one or more display generation components (e.g., 120, 704, 722, 722*b*, and/or 1000*a*) a prompt (e.g., 702) (e.g., text, images, and/or user interface objects that include instructions) instructing to remove the computer system (e.g., 101, 700, and/or 1000) from the body (e.g., 708*a*) of the user (e.g., 708) (e.g., take off the wearable computer system so that it is no longer worn on the body part of the user) and to use the computer system (e.g., 101, 700, and/or 1000) (e.g., one or more sensors of the computer system) to capture information related to the user (e.g., 708) (e.g., information about one or more physical characteristics of a user of the computer system).

In some embodiments, the computer system (e.g., 101, 700, and/or 1000) displays the prompt (e.g., 702) to remove the computer system from the wearable position during an enrollment process (e.g., a process that includes capturing data (e.g., image data, sensor data, and/or depth data) indicative of a size, shape, position, pose, color, depth and/or other characteristic of one or more body parts and/or features of body parts of a user) for generating a representation (e.g., 726) of a user.

Subsequent to (e.g., while) displaying the prompt (e.g., 702) instructing to remove the computer system (e.g., 101, 700, and/or 1000) from the body (e.g., 708*a*) of the user (e.g., 708), the computer system (e.g., 101, 700, and/or 1000) detects (804) that the computer system (e.g., 101, 700, and/or 1000) has been removed from the body (e.g., 708*a*) of the user (e.g., 708) (e.g., receiving data captured via one or more sensors that are in communication with the computer system, where the data indicates that the computer system is not being worn on a body part (e.g., a particular body part) of the user).

After (e.g., in response to) detecting that the computer system (e.g., 101, 700, and/or 1000) has been removed from the body (e.g., 708*a*) of the user (e.g., 708), the computer system captures (806) (e.g., via the one or more sensors such as cameras) information related to (e.g., about) the user (e.g., 708) (e.g., image data, sensor data, and/or depth data indicative of a size, shape, position, pose, color, depth, and/or other characteristic of one or more body parts (e.g., a head and/or a face) of the user) (e.g., information about one or more physical characteristics of a user of the computer system). The computer system (e.g., 101, 700, and/or 1000) is configured to use the information to generate a representation (e.g., 726) (e.g., a (2D or 3D) virtual representation, a (2D or 3D) avatar) of the user (e.g., 708) (e.g., the computer system generates a representation (e.g., an avatar) of the user that is based on the information related to the user, such that the representation of the user includes visual indications based on (e.g., with similar) sizes, shapes, positions, poses, colors, depths, and/or other characteristics of a body, hair, clothing, and/or other features of the user).

Capturing the information related to the user after detecting that the computer system has been removed from the body of the user enables the computer system to capture information about portions of a body of the user that would otherwise not be accessible to the computer system while the computer system is placed on the body of the user. Accordingly, the computer system is able to capture the information related to the user without additional and/or external devices and/or sensors. In addition, the computer system is able to capture more information related to the user that is used to generate a more accurate representation of the user.

In some embodiments, the representation (e.g., 726) of the user (e.g., 708) is configured to be displayed in an augmented reality environment (e.g., 740 and/or 1008) (e.g., a simulated environment in which one or more virtual objects are superimposed over a physical environment, or a representation thereof and/or a simulated environment in which a representation of a physical environment is transformed by computer-generated sensory information) and/or a virtual reality environment (e.g., 740 and/or 1008) (e.g., a simulated environment that is designed to be based entirely on computer-generated sensory inputs for one or more senses that includes a plurality of virtual objects with which a person may sense and/or interact).

In some embodiments, the representation (e.g., 726) of the user (e.g., 708) is configured to be displayed in the augmented reality environment (e.g., 740 and/or 1008) and/or the virtual reality environment (e.g., 740 and/or 1008) during a real-time communication session between the user (e.g., 708) and a second user (e.g., a user associated with second representation 1012) associated with a second computer system that is different from the computer system (e.g., 101, 700, and/or 1000).

Displaying the representation of the user in an augmented reality environment and/or a virtual reality environment enables a user viewing the representation to gain context about a state of the device, thereby providing improved feedback about the state of the device.

In some embodiments, the computer system (e.g., 101, 700, and/or 1000) is configured to generate the representation (e.g., 726) of the user (e.g., 708) stereoscopically (e.g., the representation is a series of two-dimensional images that when viewed together and/or combined with one another cause the representation to appear as existing in three dimensions in an environment in which the representation is displayed). Generating the representation of the user stereoscopically enables the computer system to generate a more accurate and/or realistic representation of the user.

In some embodiments, prior to detecting that the computer system (e.g., 101, 700, and/or 1000) has been removed from the body (e.g., 708*a*) of the user (e.g., 708) (e.g., while the computer system is placed on the body of the user), the computer system (e.g., 101, 700, and/or 1000) provides (e.g., outputting and/or displaying separately or concurrently with the prompt instructing to remove the computer system from the body of the user and to use the computer system to capture information related to the user) instructions (e.g., 716) (e.g., text instructions, image instructions, video instructions, animated instructions, audio instructions, and/or other instructions) for using the computer system (e.g., 101, 700, and/or 1000) to capture the information related to the user (e.g., 708) (e.g., instructions explaining how the user of the computer system should use, manipulate, and/or otherwise position the computer system and/or the user's body to capture the information related to the user). In some embodiments, the instructions (e.g., 716) for using the computer system (e.g., 101, 700, and/or 1000) to capture the information related to the user (e.g., 708) include a series of images, text instructions, and/or a video providing an example of how the user is supposed to use the computer system (e.g., 101, 700, and/or 1000) in order to capture the information related to the user (e.g., 708). For example, in some embodiments, the instructions (e.g., 716) include an example of using the computer system (e.g., 101, 700, and/or 1000) and/or motions that the user (e.g., 708) should imitate in order to capture the information related to the user (e.g., 708).

Providing instructions for using the computer system to capture the information related to the user facilitates a user's ability to use the computer system to capture the information related to the user, thereby reducing the number of inputs and/or the amount of time needed to capture the information related to the user.

In some embodiments, providing the instructions (e.g., 716) includes the computer system (e.g., 101, 700, and/or 1000) displaying, via the one or more display generation components, an animation (e.g., 716) (e.g., a series of visual indications and/or a video) that demonstrates (e.g., provides a visual example of) using the computer system (e.g., 101, 700, and/or 1000) to capture the information related to the user (e.g., 708) (e.g., instructions explaining how the user of the computer system should use, manipulate, and/or otherwise position the computer system and/or the user's body to capture the information related to the user). Displaying an animation that demonstrates using the computer system to capture the information related to the user facilitates a user's ability to use the computer system to capture the information related to the user, thereby reducing the number of inputs and/or the amount of time needed to capture the information related to the user.

In some embodiments, prior to detecting that the computer system (e.g., 101, 700, and/or 1000) has been removed from the body (e.g., 708*a*) of the user (e.g., 708) (e.g., while the computer system is placed on the body of the user) and in accordance with a determination that a set of criteria is met (e.g., receiving information and/or data from one or more sensors in communication with the computer system indicating that the computer system has low power and/or low battery life (e.g., an amount of power and/or battery life below a threshold amount), that an object is blocking one or more portions of the user's body (e.g., glasses, a hat, and/or a face covering), that an environment in which the user is located includes harsh lighting (e.g., bright lighting that could affect capturing the information related to the user), that the environment in which the user is located includes low lighting (e.g., not enough lighting to accurately and/or completely capture the information related to the user), and/or that another condition of the environment in which the user is located could affect capturing the information related to the user), the computer system (e.g., 101, 700, and/or 1000) displays, via the one or more display generation components (e.g., 120, 704, 722, 722*b*, and/or 1000*a*), an indication (e.g., 718) (e.g., an alert, such as a visual notification and/or an audio notification) associated with a condition affecting the capturing of information related to the user (e.g., 708) (e.g., the computer system has low power, an object is blocking one or more portions of the user's body, the environment in which the user is located includes harsh lighting, the environment in which the user is located includes low lighting, and/or the environment in which the user is located includes another condition that could affect capturing the information related to the user).

Prior to detecting that the computer system (e.g., 101, 700, and/or 1000) has been removed from the body of the user (e.g., 708) (e.g., while the computer system is placed on the body of the user) and in accordance with a determination that the set of criteria is not met, the computer system (e.g., 101, 700, and/or 1000) forgoes displaying the indication (e.g., 718) associated with the condition affecting the capturing of information related to the user (e.g., 708) (and, optionally, maintains displaying the prompt (e.g., 702) instructing to remove the computer system from the body of the user and to use the computer system to capture information related to the user).

In some embodiments, the set of criteria is a first set of criteria corresponding to a first condition affecting the capturing of information related to the user and the indication is a first indication associated with the first condition affecting the capturing of information related to the user. In accordance with a second set of criteria being met, where the second set of criteria correspond to a second condition affecting the capturing of information related to the user, different from the first set of criteria, the computer system (e.g., 101, 700, and/or 1000) displays (e.g., concurrently with the first indication, before and/or after the first indication, and/or in lieu of the first indication) (in some embodiments, the computer system displays a respective indication that includes a higher priority than one or more other indications, where the priority of the respective indication is based on the respective condition affecting the capturing of information related to the user (e.g., when the second condition has a higher priority than the first condition because the second condition is associated with a condition that is more likely to affect or will affect capturing of information related to the user to a higher degree, the computer system displays the second indication in lieu of the first indication)) a second indication associated with the second condition affecting the capturing of information related to the user. In accordance with a determination that the set of criteria is not met, the computer system (e.g., 101, 700, and/or 1000) forgoes displaying the second indication associated with the second condition affecting the capturing of information related to the user.

Displaying the indication associated with the condition affecting the capturing of information related to the user enables a user to preemptively address the condition affecting the capturing of information, thereby reducing the amount of time needed to capture the information related to the user.

In some embodiments, the indication (e.g., 718) associated with the condition affecting the capturing of information related to the user (e.g., 708) includes information (e.g., 718*b*) (e.g., a suggestion and/or instructions) about taking action that would help to correct (e.g., correcting and/or otherwise adjusting the condition so that it no longer affects capturing of information related to the user) the condition (e.g., one or more steps and/or suggestions that would facilitate and/or otherwise improve capturing the information related to the user, such as information suggesting to charge the computer system, information suggesting that the user remove an object blocking one or more portions of the body of the user, and/or information suggesting that the user adjust lighting conditions and/or move to a different location and/or environment that includes improved lighting conditions). Including the information about taking action that would help to correct the condition enables a user to preemptively address the condition affecting the capturing of information, thereby reducing the amount of time needed to capture the information related to the user.

In some embodiments, in response to detecting that the computer system (e.g., 101, 700, and/or 1000) has been removed from the body (e.g., 708*a*) of the user (e.g., 708), the computer system (e.g., 101, 700, and/or 1000) initiates a process for capturing the information related to the user (e.g., 708) (e.g., the process for capturing the information related to the user is triggered, initiated, and/or started in response to detecting that the computer system has been removed from the body of the user). Initiating the process for capturing the information related to the user in response to detecting that the computer system has been removed from the body of the user reduces the number of inputs needed to capture the information related to the user.

In some embodiments, after detecting that the computer system (e.g., 101, 700, and/or 1000) has been removed from the body (e.g., 708*a*) of the user (e.g., 708) (e.g., prior to, concurrently, and/or after capturing at least a portion of the information related to the user), the computer system (e.g., 101, 700, and/or 1000) provides a second prompt (e.g., 722*a*) including instructions for capturing the information related to the user (e.g., 708) (e.g., text, images, videos, audio, and/or haptic outputs that provide instructions, suggestions, and/or examples for using the computer system to capture the information related to the user). In some embodiments, the second prompt (e.g., 722*a*) includes a plurality of prompts including different instructions for capturing the information related to the user (e.g., 708). In some embodiments, the second prompt (e.g., 722*a*) includes a sequence of second prompts including instructions for capturing the information related to the user (e.g., 708).

Providing the second prompt including instructions for capturing the information related to the user facilitates a user's ability to use the computer system to capture the information related to the user, thereby reducing the number of inputs and/or the amount of time needed to capture the information related to the user.

In some embodiments, providing the second prompt (e.g., 722*a*) includes the computer system (e.g., 101, 700, and/or 1000) displaying, via the one or more display generation components (e.g., 120, 704, 722, 722*b*, and/or 1000*a*), a visual prompt with one or more enrollment instructions (e.g., text, one or more images, and/or a video that provides information, instructions, suggestions, and/or examples that facilitate a user's ability to capture the information related to the user). In some embodiments, the visual prompt (e.g., 722*a*) includes a plurality of visual prompts including visual indications of instructions for capturing the information related to the user. In some embodiments, the visual prompt (e.g., 722*a*) includes a sequence of visual prompts including visual indications of instructions for capturing the information related to the user. Displaying the visual prompt facilitates a user's ability to use the computer system to capture the information related to the user, thereby reducing the number of inputs and/or the amount of time needed to capture the information related to the user.

In some embodiments, the prompt (e.g., 702) instructing to remove the computer system (e.g., 101, 700, and/or 1000) from the body of the user (e.g., 708) and to use the computer system (e.g., 101, 700, and/or 1000) to capture information related to the user (e.g., 708) is displayed via a first display generation component (e.g., 704) of the one or more display generation components (e.g., 120, 704, 722, 722*b*, and/or 1000*a*) (e.g., a first display device that is in communication with the computer system and/or is included at a first location on and/or within a housing of the computer system) (in some embodiments, the first display generation component is inside of the computer system when the computer system is placed on the body of the user) (in some embodiments, the computer system is a head-mounted device and the first display generation component is a display generation component that is configured to be viewed by the user when the head-mounted device is placed on the head of the user and/or over the eyes of the user) and the visual prompt (e.g., 722*a*) is displayed via a second display generation component (e.g., 722 and/or 722*b*), different from the first display generation component (e.g., 704), of the one or more display generation components (e.g., 120, 704, 722, 722*b*, and/or 1000*a*) (e.g., a second display device that is in communication with the computer system and/or is included at a second location, different from the first location, on and/or within the housing of the computer system) (in some embodiments, the second display generation component is outside of the computer system when the computer system is placed on the body of the user) (in some embodiments, the computer system is a head-mounted device and the second display generation component is a display generation component that is configured to be viewed by the user when the head-mounted device is not placed on the head of the user and/or over the eyes of the user and/or the second display generation component is not configured to be viewed by the user when the head-mounted device is placed on the head of the user and/or over the eyes of the user).

Displaying the prompt instructing to remove the computer system from the body of the user via a first display generation component and displaying the visual prompt via a second display generation component, different from the first display generation component, displays information to the user on a respective display generation component that is likely to be within a viewpoint of the user, thereby reducing the amount of time needed to capture the information related to the user.

In some embodiments, providing the second prompt (e.g., 722*a*) includes outputting, via an audio device (e.g., a speaker and/or headphones) in communication with the computer system (e.g., 101, 700, and/or 1000), an audio prompt with one or more enrollment instructions (e.g., an audio alert, audio including voice instructions, and/or audio produced so as to simulate audio being produced from a particular location in an environment in which the user is located). Outputting the audio prompt with one or more enrollment instructions facilitates a user's ability to use the computer system to capture the information related to the user, thereby reducing the number of inputs and/or the amount of time needed to capture the information related to the user.

In some embodiments, providing the second prompt (e.g., 722*a*) includes providing an indication (e.g., 722*a*) (e.g., text, an image, a video, audio, and/or a user interface object) instructing the user (e.g., 708) to orient a portion of the body of the user (e.g., 708) (e.g., a face, a hand, and/or a torso) within a target location with respect to the computer system (e.g., 101, 700, and/or 1000) (e.g., a location with respect to one or more sensors in communication with the computer system that facilitates capturing information about the portion of the body of the user). In some embodiments, the indication includes a frame and/or other user interface object displayed, via the one or more display generation components (e.g., 120, 704, 722, 722*b*, and/or 1000*a*), that provides a visual indication to the user (e.g., 708) of the target location with which to move and/or orient the portion of the body of the user (e.g., 708) with respect to the computer system (e.g., 101, 700, and/or 1000).

Providing the indication instructing the user to orient the portion of the body of the user within a target location with respect to the computer system facilitates a user's ability to use the computer system to capture the information related to the user, thereby reducing the number of inputs and/or the amount of time needed to capture the information related to the user.

In some embodiments, providing the second prompt (e.g., 722*a*) includes providing an indication (e.g., 718 and/or 722*a*) (e.g., text, an image, a video, audio, and/or a user interface object) instructing the user (e.g., 708) to adjust a condition (e.g., the computer system has low power, an object is blocking one or more portions of the user's body, the environment in which the user is located includes harsh lighting, the environment in which the user is located includes low lighting, and/or the environment in which the user is located includes another condition that could affect capturing the information related to the user) affecting the capturing of information of the user (e.g., 708) (e.g., one or more steps and/or suggestions that would facilitate and/or otherwise improve capturing the information related to the user, such as information suggesting to charge the computer system, information suggesting that the user remove an object blocking one or more portions of the body of the user, and/or information suggesting that the user adjust lighting conditions and/or move to a different location and/or environment that includes improved lighting conditions).

Providing the indication instructing the user to adjust the condition affecting the capturing of information of the user facilitates a user's ability to use the computer system to capture the information related to the user, thereby reducing the number of inputs and/or the amount of time needed to capture the information related to the user. In addition, providing the indication instructing the user to adjust the condition affecting the capturing of information of the user enables the computer system to capture more accurate information related to the user, which enables the computer system to generate a more accurate representation of the user.

In some embodiments, providing the second prompt (e.g., 722*a*) includes providing an indication (e.g., 722*a*) (e.g., text, an image, a video, audio, and/or a user interface object) instructing the user (e.g., 708) to move a position of a head (e.g., 708*d*) of the user (e.g., 708) (e.g., move the head of the user with respect to the computer system and/or with respect to one or more sensors in communication with the computer system, such that the computer system can capture information about the head of the user from a particular angle and/or when the head of the user is positioned at a particular orientation). Providing the indication instructing the user to move a position of the head of the user facilitates a user's ability to use the computer system to capture the information related to the user, thereby reducing the number of inputs and/or the amount of time needed to capture the information related to the user.

In some embodiments, providing the second prompt (e.g., 722*a*) includes providing an indication (e.g., 722*a*) (e.g., text, an image, a video, audio, and/or a user interface object) instructing the user (e.g., 708) to position a set of one or more of the user's facial features (e.g., 708*c*) (e.g., eyes, cheeks, forehead, nose, mouth, and/or lips) in a predefined set of one or more facial expressions (e.g., text, an image, a video, audio, and/or a user interface object instructing the user to make a particular facial expression with eyes, cheeks, forehead, nose, mouth, and/or lips of the user). Providing the indication instructing the user to position the set of one or more of the user's facial features in the predefined set of one or more facial expressions facilitates a user's ability to use the computer system to capture the information related to the user, thereby reducing the number of inputs and/or the amount of time needed to capture the information related to the user.

In some embodiments, providing the second prompt (e.g., 722*a*) includes providing an indication (e.g., 722*a*) (e.g., text, an image, a video, audio, and/or a user interface object) instructing the user (e.g., 708) to adjust a position of the computer system (e.g., 101, 700, and/or 1000) (e.g., move the computer system with respect to the body of the user) to orient the computer system (e.g., 101, 700, and/or 1000) (e.g., orient one or more sensors in communication with the computer system) toward a predefined portion (e.g., 708*e*) of a body of the user (e.g., 708) (e.g., a waist and/or torso of the user) (e.g., a predefined portion of the body of the user that includes clothing such as a shirt, a dress, pants, shorts, a skirt, a jacket, and/or clothing accessories). Providing the indication instructing the user to adjust a position of the computer to orient the computer system toward a predefined portion of the body of the user facilitates a user's ability to use the computer system to capture the information related to the user, thereby reducing the number of inputs and/or the amount of time needed to capture the information related to the user.

In some embodiments, the prompt (e.g., 702) instructing to remove the computer system (e.g., 101, 700, and/or 1000) from the body (e.g., 708*a*) of the user (e.g., 708) and to use the computer system (e.g., 101, 700, and/or 1000) to capture information related to the user (e.g., 708) is displayed, via a first display generation component (e.g., 704) of the one or more display generation components (e.g., 120, 704, 722, 722*b*, and/or 1000*a*) (e.g., a first display device that is in communication with the computer system and/or is included at a first location on and/or within a housing of the computer system). After capturing the information related to the user (e.g., 708), the computer system (e.g., 101, 700, and/or 1000) displays, via a second display generation component (e.g., 722 and/or 722*b*) (e.g., a second display device that is in communication with the computer system and/or is included at a second location, different from the first location, on and/or within the housing of the computer system), different from the first display generation component (e.g., 704), of the one or more display generation components (e.g., 120, 704, 722, 722*b*, and/or 1000*a*), a preview of the representation (e.g., 726) of the user (e.g., 708) (e.g., an image representative of the user (e.g., an avatar) that includes an appearance based on the information related to the user) (in some embodiments, the preview of the representation of the user is an initial and/or preliminary representation of the user that can be modified and/or regenerated based on one or more user inputs provided by the user).

Displaying the preview of the representation of the user via the second display generation component enables the user to view the generated representation of the user on a display generation component that is likely within a viewpoint of the user and allows the user to determine an accuracy of the generated representation of the user, thereby providing improved visual feedback.

In some embodiments, after capturing the information related to the user (e.g., 708), the computer system (e.g., 101, 700, and/or 1000) detects (e.g., via one or more sensors in communication with the computer system) that the computer system (e.g., 101, 700, and/or 1000) has been placed on the body (e.g., 708*a*) of the user (e.g., 708) (e.g., the computer system is worn with a respective orientation and/or position relative to a respective portion of the user's body) (e.g., the computer system is a wearable computer system (e.g., a head-mounted display generation component, glasses, a headset, and/or a watch) that is configured to be worn on a body part of a user of the computer system). After detecting that the computer system (e.g., 101, 700, and/or 1000) has been placed on the body (e.g., 708*a*) of the user (e.g., 708), the computer system (e.g., 101, 700, and/or 1000) displays, via the one or more display generation components (e.g., 120, 704, 722, and/or 722*b*), a preview of the representation (e.g., 726) of the user (e.g., 708) (e.g., an image representative of the user (e.g., an avatar) that includes an appearance based on the information related to the user) (in some embodiments, the preview of the representation of the user is an initial and/or preliminary representation of the user that can be modified and/or regenerated based on one or more user inputs provided by the user). In some embodiments, the preview of the representation (e.g., 726) of the user (e.g., 708) is not displayed (e.g., via the first display generation component and/or via the second display generation component) prior to detecting that the computer system (e.g., 101, 700, and/or 1000) has been placed on the body (e.g., 708*a*) of the user (e.g., 708) (after capturing the information related to the user).

Displaying the preview of the representation of the user allows the user to determine an accuracy of the generated representation of the user, thereby providing improved visual feedback.

In some embodiments, capturing the information related to the user (e.g., 708) includes the computer system (e.g., 101, 700, and/or 1000) capturing first information (e.g., one or more facial features of a face of the user) about a first portion (e.g., 708*c*, 708*d*, and/or 708*e*) of a body of the user (e.g., 708) (e.g., a face and/or head of the user). After capturing the first information related to the first portion (e.g., 708*c*, 708*d*, and/or 708*e*) of the body of the user (e.g., 708), the computer system (e.g., 101, 700, and/or 1000) detects (e.g., via one or more sensors in communication with the computer system) that the computer system (e.g., 101, 700, and/or 1000) has been placed on the body (e.g., 708*a*) of the user (e.g., 708) (e.g., the computer system is worn with a respective orientation and/or position relative to a respective portion of the user's body) (e.g., the computer system is a wearable computer system (e.g., a head-mounted display generation component, glasses, a headset, and/or a watch) that is configured to be worn on a body part of a user of the computer system). After (e.g., in response to) detecting that the computer system (e.g., 101, 700, and/or 1000) has been placed on the body (e.g., 708*a*) of the user (e.g., 708), the computer system (e.g., 101, 700, and/or 1000) initiates a process for capturing second information (e.g., one or more features of a hand of the user) related to a second portion (e.g., 708*b*, 708*f*, and/or 708*g*) of the body of the user (e.g., 708) (e.g., a hand and/or an arm of the user), different from the first portion (e.g., 708*c*, 708*d*, and/or 708*e*) of the body of the user (e.g., 708). In some embodiments, the second information related to the second portion (e.g., 708*b*, 708*f*, and/or 708*g*) of the body of the user (e.g., 708) is captured while the system (e.g., 101, 700, and/or 1000) is placed on the body (e.g., 708*a*) of the user (e.g., 708).

Initiating the process for capturing the second information related to the second portion of the body of the user after detecting that the computer system has been placed on the body of the user reduces the number of inputs needed to perform the capturing of the second information related to the second portion of the body of the user.

In some embodiments, initiating the process for capturing the second information related to the second portion (e.g., 708*b*, 708*f*, and/or 708*g*) of the body of the user (e.g., 708)

includes the computer system (e.g., 101, 700, and/or 1000) displaying, via the one or more display generation components (e.g., 120, 704, 722, 722*b*, and/or 1000*a*), a visual indication (e.g., 730) (e.g., an outline, a user interface object that includes a shape of a human hand) indicating a location (e.g., with respect to the computer system and/or with respect to one or more sensors in communication with the computer system) for the user (e.g., 708) to position the second portion (e.g., 708*b*, 708*f*, and/or 708*g*) of the body of the user (e.g., 708) (e.g., with respect to the computer system and/or with respect to one or more sensors in communication with the computer system).

Displaying the visual indication indicating the location for the user to position the second portion of the body of the user facilitates a user's ability to use the computer system to capture the second information related to the second portion of the body of the user, thereby reducing the amount of time needed to capture the second information related to the second portion of the body of the user.

In some embodiments, initiating the process for capturing the second information related to the second portion (e.g., 708*b*, 708*f*, and/or 708*g*) of the body of the user (e.g., 708) includes the computer system (e.g., 101, 700, and/or 1000) providing a prompt (e.g., 734) (e.g., via a visual prompt, such as text, an image, a video, and/or a user interface object, and/or via an audio prompt) instructing the user (e.g., 708) to adjust an orientation (e.g., a position and/or location of a hand of the user with respect to the computer system and/or with respect to one or more sensors in communication with the computer system) of the second portion (e.g., 708*b*, 708*f*, and/or 708*g*) of the body of the user (e.g., 708). In some embodiments, prompting the user (e.g., 708) to adjust the orientation of the second portion (e.g., 708*b*, 708*f*, and/or 708*g*) of the body of the user (e.g., 708) includes providing instructions (e.g., 734) to the user to flip over the hand (e.g., 708*f* and/or 708*g*) of the user (e.g., 708) so that information about a palm side and/or a backside of the hand (e.g., 708*f* and/or 708*g*) can be captured.

Providing the prompt instructing the user to adjust the orientation of the second portion of the body of the user facilitates a user's ability to use the computer system to capture the second information related to the second portion of the body of the user, thereby reducing the amount of time needed to capture the second information related to the second portion of the body of the user.

In some embodiments, after (e.g., in response to) capturing the second information related to the second portion (e.g., 708*b*, 708*f*, and/or 708*g*) of the body of the user (e.g., 708), the computer system (e.g., 101, 700, and/or 1000) displays, via the one or more display generation components (e.g., 120, 704, 722, 722*b*, and/or 1000*a*), the representation (e.g., 726) of the user (e.g., 708) in an extended reality environment (e.g., 740 and/or 1008) (e.g., a wholly or partially simulated environment that people sense and/or interact with via an electronic system, where a subset of a person's physical motions, or representations thereof, are tracked, and, in response, one or more characteristics of one or more virtual objects simulated in the extend reality environment are adjusted in a manner that comports with at least one law of physics). In some embodiments, the representation (e.g., 726) of the user (e.g., 708) includes a face representation (e.g., 726*c*) and a hands representation that are based on the captured information related to the user (e.g., 708) and/or the captured second information related to the second portion (e.g., 708*b*, 708*g*, and/or 708*f*) of the body of the user (e.g., 708). Displaying the representation of the user in the extended reality environment after capturing the second information related to the second portion of the body of the user allows the user to determine an accuracy of the generated representation of the user, thereby providing improved visual feedback.

In some embodiments, aspects/operations of methods 900, 1100, 1200, 1300, and/or 1400 may be interchanged, substituted, and/or added between these methods. For example, the computer system of method 800 can be used to display a representation of the user, adjust an appearance of the representation of the user, display a mouth representation of the representation of the user, display a hair representation of the representation of the user, and/or display a portion of the representation of the user having a visual emphasis. For brevity, these details are not repeated here.

FIG. 9 is a flow diagram of an exemplary method 900 for displaying a representation of a user, in accordance with some embodiments. In some embodiments, method 900 is performed at a computer system (e.g., 101, 700, and/or 1000) (e.g., a smartphone, tablet, head-mounted display generation component) including one or more display generation components (e.g., 120, 704, 722, 722*b*, and/or 1000*a*) (e.g., a visual output device, a 3D display, a display having at least a portion that is transparent or translucent on which images can be projected (e.g., a see-through display), a projector, a heads-up display, and/or a display controller) (and, optionally, that is in communication with and one or more cameras (e.g., an infrared camera; a depth camera; a visible light camera)). In some embodiments, the method 900 is governed by instructions that are stored in a non-transitory (or transitory) computer-readable storage medium and that are executed by one or more processors of a computer system, such as the one or more processors 202 of computer system 101 (e.g., control 110 in FIG. 1A). Some operations in method 900 are, optionally, combined and/or the order of some operations is, optionally, changed.

During an enrollment process (e.g., a process that includes capturing data (e.g., image data, sensor data, and/or depth data) indicative of a size, shape, position, pose, color, depth and/or other characteristic of one or more body parts and/or features of body parts of a user) for generating a representation (e.g., 726) of a user (e.g., 708) (e.g., an avatar and/or a virtual representation of at least a portion of the first user), the computer system (e.g., 101, 700, and/or 1000) detects (902) (e.g., via the one or more cameras) information about one or more physical characteristics of a user (e.g., 708) of the computer system (e.g., 101, 700, and/or 1000) (e.g., data (e.g., image data, sensor data, and/or depth data) that represents a size, shape, position, pose, color, depth, and/or other characteristics of one or more body parts and/or features of body parts of the user).

After capturing the information about the one or more physical characteristics of the user (e.g., 708) of the computer system (e.g., 101, 700, and/or 1000), the computer system (e.g., 101, 700, and/or 1000) generates (904) the representation (e.g., 726) of the user (e.g., 708) based on the information about the one or more physical characteristics of the user (e.g., 708) including selecting one or more physical characteristics of the representation (e.g., 726) based on the one or more captured physical characteristics of the user (e.g., 708) (e.g., the computer system uses the information related to the user of the computer system to generate a representation (e.g., an avatar) of the user that includes visual indications similar to the captured and/or detected size, shape, position, pose, color, depth, and/or other characteristics of a body, clothing, hair, and/or features of the first user).

After generating the representation (e.g., 726) of the user (e.g., 708), the computer system (e.g., 101, 700, and/or 1000) displays (906), via the one or more display generation components (e.g., 120, 704, 722, 722*b*, and/or 1000*a*), at least a portion of the representation (e.g., 726) of the user (e.g., 708) in an extended reality environment (e.g., 740) (e.g., a wholly or partially simulated environment that people sense and/or interact with via an electronic system, where a subset of a person's physical motions, or representations thereof, are tracked, and, in response, one or more characteristics of one or more virtual objects simulated in the extend reality environment are adjusted in a manner that comports with at least one law of physics). In some embodiments, the computer system (e.g., 101, 700, and/or 1000) displays the representation (e.g., 726) of the user (e.g., 708) in the extended reality environment (e.g., 740) after the enrollment process is completed, such that the user (e.g., 708) can view the representation (e.g., 726), and, in some embodiments, edit and/or modify the representation (e.g., 726).

Displaying at least the portion of the representation of the user in the extended reality environment after generating the representation of the user allows the user to determine an accuracy of the generated representation of the user and to determine whether to request that the computer system recapture the information related to the user, thereby providing improved visual feedback.

In some embodiments, the extended reality environment (e.g., 740) includes an augmented reality environment (e.g., a simulated environment in which one or more virtual objects are superimposed over a physical environment, or a representation thereof and/or a simulated environment in which a representation of a physical environment is transformed by computer-generated sensory information). Displaying the representation of the user in an augmented reality environment enables a user viewing the representation to gain context about a state of the device, thereby providing improved feedback about the state of the device.

In some embodiments, the extended reality environment (e.g., 740) includes a virtual reality environment (e.g., a simulated environment that is designed to be based entirely on computer-generated sensory inputs for one or more senses that includes a plurality of virtual objects with which a person may sense and/or interact). Displaying the representation of the user in a virtual reality environment enables a user viewing the representation to gain context about a state of the device, thereby providing improved feedback about the state of the device.

In some embodiments, capturing the information about one or more physical characteristics of the user (e.g., 708) of the computer system (e.g., 101, 700, and/or 1000) includes the computer system (e.g., 101, 700, and/or 1000) capturing the information about one or more physical characteristics of the user (e.g., 708) of the computer system (e.g., 101, 700, and/or 1000) while the computer system (e.g., 101, 700, and/or 1000) is removed from a body (e.g., 708*a*) of the user (e.g., 708) (e.g., the computer system receives data captured via one or more sensors that are in communication with the computer system, where the data indicates that the computer system is not being worn on a body part (e.g., a particular body part) of the user) (e.g., the computer system is a wearable computer system (e.g., a head-mounted display generation component, glasses, a headset, and/or a watch) that is configured to be worn on a body part of a user of the computer system) (in some embodiments, the computer system is a watch configured to be worn on a wrist of the user of the computer system). Displaying at least the portion of the representation (e.g., 726) of the user (e.g., 708) in the extended reality environment (e.g., 740) includes the computer system (e.g., 101, 700, and/or 1000) displaying at least the portion of the representation (e.g., 726) of the user (e.g., 708) in the extended reality environment (e.g., 740) after (e.g., in response to) the computer system (e.g., 101, 700, and/or 1000) detects that the computer system (e.g., 101, 700, and/or 1000) has been placed on the body (e.g., 708*a*) of the user (e.g., 708) (e.g., the computer system is worn with a respective orientation and/or position relative to a respective portion of the user's body).

Capturing the information about the one or more physical characteristics of the user while the computer system is removed from the body of the user enables the computer system to capture information about portions of a body of the user that would otherwise not be accessible to the computer system while the computer system is placed on the body of the user. Accordingly, the computer system is able to capture the information related to the user without additional and/or external devices and/or sensors. In addition, the computer system is able to capture more information related to the user that is used to generate a more accurate representation of the user.

In some embodiments, displaying at least the portion of the representation (e.g., 726) of the user (e.g., 708) in the extended reality environment (e.g., 740) includes the computer system (e.g., 101, 700, and/or 1000) animating (e.g., displaying the movement of the representation that mirrors and/or imitates movement of the user) the representation (e.g., 726) based on movement of the user (e.g., 708) relative to at least a portion of the computer system (e.g., 101, 700, and/or 1000) (e.g., in a physical environment in which the user is located) (e.g., the computer system receives information about a state of the body of the user, including movement of the user, and displays at least the portion of the representation of the user in the extended reality environment based on the received information). In some embodiments, the animation of the representation (e.g., 726) is displayed in conjunction with the detected movement of the user (e.g., 708) (e.g., matches the movement of the user). Animating the representation based on the movement of the user relative to at least a portion of the computer system allows the user to comprehend that the representation is associated with the user, thereby providing improved feedback about a state of the device.

In some embodiments, animating the representation (e.g., 726) includes the computer system (e.g., 101, 700, and/or 1000) displaying movement of the representation (e.g., 726) that is a mirror image of the movement of the user (e.g., 708) relative to at least the portion of the computer system (e.g., 101, 700, and/or 1000) (e.g., in the physical environment) (e.g., movement of the representation is displayed to the user as if the user is viewing their reflection in a mirror). In some embodiments, the animation of the representation (e.g., 726) is displayed in conjunction with the detected movement of the user (e.g., 708) (e.g., matches the movement of the user). Displaying the movement of the representation as a mirror image of the movement of the user relative to at least the portion of the computer system allows the user to comprehend that the representation is associated with the user, thereby providing improved feedback about a state of the device.

In some embodiments, displaying at least the portion of the representation (e.g., 726) of the user (e.g., 708) in the extended reality environment (e.g., 740) includes the computer system (e.g., 101, 700, and/or 1000) displaying the representation (e.g., 726) with a first orientation (e.g., posture, position, pose, and/or stance) that is a mirror image of (e.g., displayed as if the user is viewing the representation as a reflection of the user in a mirror and/or displayed as if the representation of the user has been flipped over a vertical axis without being flipped over a horizontal axis) a second orientation (e.g., posture, position, pose, and/or stance) of the user (e.g., 708) in a physical environment (e.g., 706) in which the user (e.g., 708) is located (e.g., the computer system receives information about a state of the body of the user and displays at least the portion of the representation of the user in the extended reality environment based on the received information). Displaying the representation with the first orientation that is the mirror image of the second orientation of the user in the physical environment in which the user is located allows the user to comprehend that the representation is associated with the user, thereby providing improved feedback about a state of the device.

In some embodiments, displaying at least the portion of the representation (e.g., 726) of the user (e.g., 708) in the extended reality environment (e.g., 740) includes the computer system (e.g., 101, 700, and/or 1000) displaying a frame (e.g., a user interface object that resembles a frame surrounding a mirror and/or a reflective surface) around the representation (e.g., 726) in the extended reality environment (e.g., 740). The frame indicates (e.g., indicates to the user) that the representation (e.g., 726) of the user (e.g., 708) in the extended reality environment (e.g., 740) has an orientation (e.g., posture, position, pose, and/or stance) that is a mirror image of (e.g., displayed as if the user is viewing the representation as a reflection in a mirror that is surrounded by the frame) an orientation (e.g., a physical and/or actual posture, position, pose, and/or stance) of the user (e.g., 708) in a physical environment (e.g., 706) in which the user (e.g., 708) is located. Displaying the frame around the representation in the extended reality environment allows the user to comprehend that the representation is associated with the user, thereby providing improved feedback about a state of the device.

In some embodiments, while displaying at least a portion of the representation (e.g., 726) of the user (e.g., 708) in the extended reality environment (e.g., 740), the computer system (e.g., 101, 700, and/or 1000) displays, via the one or more display generation components (e.g., 120, 704, 722, 722*b*, and/or 1000*a*), one or more selectable options (e.g., 738*a*-738*d*) (e.g., selectable user interface objects, such as virtual buttons and/or text) for editing a visual characteristic of the representation (e.g., 726) (e.g., modifying, adjusting, and/or changing a visual appearance of the representation to add and/or remove accessories (e.g., headwear, head coverings, eyewear, and/or clothing), add and/or remove prosthetics, eyepatches, and/or hearing aids, adjust a skin tone of one or more portions of a body of the representation, adjust a hair color and/or hair style of the representation, adjust facial hair features of the representation, recapture information about the one or more physical characteristics of the user, and/or restart the capturing of information about the one or more physical characteristics of the user). Displaying the one or more selectable options for editing the visual characteristic of the representation enables the representation to be edited without requiring additional user inputs to navigate to a separate editing user interface, thereby reducing the number of inputs needed to edit the visual characteristic of the representation.

In some embodiments, the one or more selectable options (e.g., 738*a*-738*d*) include an eyewear selectable option (e.g., 738*a*) (e.g., a selectable user interface object, such as a virtual button and/or text) for editing eyewear of the representation (e.g., 726) (e.g., whether or not the representation of the user is wearing glasses (and, optionally, the type of glasses), a headset, a monocle, and/or sunglasses and/or selecting a type, shape (e.g., frame shape), color, and/or size of the eyewear included on the representation). Including the eyewear selectable option enables eyewear of the representation to be edited without requiring additional user inputs to navigate to a separate editing user interface, thereby reducing the number of inputs needed to edit the eyewear of the representation.

In some embodiments, the one or more selectable options (e.g., 738*a*-738*d*) include an accessory selectable option (e.g., 738*b*) (e.g., a selectable user interface object, such as a virtual button and/or text) for editing an accessory of the representation (e.g., 726) (e.g., whether or not the representation of the user includes an eyepatch, a prosthetic appendage, and/or a hearing aid). Including the accessory selectable option enables an accessory of the representation to be edited without requiring additional user inputs to navigate to a separate editing user interface, thereby reducing the number of inputs needed to edit the accessory of the representation.

In some embodiments, the one or more selectable options (e.g., 738*a*-738*d*) include one or more skin tone selectable options (e.g., 738*c*, 742*a*, and/or 742*b*) (e.g., selectable user interface objects, such as virtual buttons and/or text) for editing a skin tone of the representation (e.g., 726) (e.g., adjusting, modifying, and/or changing a hue and/or color of a skin representation included on one or more portions of the representation of the user). Including the one or more skin tone selectable option enables a skin tone of the representation to be edited without requiring additional user inputs to navigate to a separate editing user interface, thereby reducing the number of inputs needed to edit the skin tone of the representation.

In some embodiments, the one or more skin tone selectable options (e.g., 738*c*, 742*a*, and/or 742*b*) (e.g., selectable user interface objects, such as virtual buttons and/or text) include a first skin tone selectable option (e.g., 742*a*) (e.g., a selectable user interface object, such as a virtual button and/or text) for editing a skin tone of a face (e.g., 726*c*) of the representation (e.g., 726) and a second skin tone selectable option (e.g., 724*b*) (e.g., a selectable user interface object, such as a virtual button and/or text) for editing a skin tone of hands of the representation (e.g., 726). In some embodiments, a user's skin tone is different on different parts of the user's body, and thus, providing multiple skin tone selectable options enables a user (e.g., 708) to modify an appearance of the representation (e.g., 726) of the user (e.g., 708) to more accurately reflect an actual appearance of the user (e.g., 708). Including the first skin tone selectable option for editing a skin tone of the face of the representation and the second skin tone selectable option for editing a skin tone of hands of the representation option enables a skin tone of different portions of the representation to be edited without requiring additional user inputs to navigate to a separate editing user interface, thereby reducing the number of inputs needed to edit the skin tone of the representation.

In some embodiments, the one or more selectable options (e.g., 738*a*-738*d*) include a recapture selectable option (e.g., 738*d*) (e.g., a selectable user interface object, such as a virtual button and/or text) that, when selected, initiates a process for recapturing information about the one or more physical characteristics of the user (e.g., 708) (e.g., selection of the recapture selectable option causes the computer system to display a user interface and/or otherwise initiate a process for recapturing information about one or more of the one or more physical characteristics of the user). In some embodiments, an initial capturing of the information about the one or more physical characteristics of the user (e.g., 708) may be inaccurate and/or otherwise incomplete, and thus, providing the user (e.g., 708) an ability to recapture at least a portion of the information about the one or more physical characteristics of the user (e.g., 708) enables the computer system (e.g., 101, 700, and/or 1000) to generate the representation (e.g., 726) to more accurately reflect an actual appearance of the user (e.g., 708). Including the recapture selectable option enables information about the one or more physical characteristics of the user to be recaptured without requiring additional user inputs to navigate to a separate user interface, thereby reducing the number of inputs needed to recapture information about the one or more physical characteristics of the user.

In some embodiments, the one or more selectable options (e.g., 738*a*-738*d*) include a restart selectable option (e.g., 738*d*) (e.g., a selectable user interface object, such as a virtual button and/or text) that, when selected, initiates a step of the enrollment process that includes capturing second information about the one or more physical characteristics of the user (e.g., 708) of the computer system (e.g., 101, 700, and/or 1000) (e.g., selection of the restart selectable option causes the computer system to restart the capturing of information about the one or more physical characteristics of the user of the computer system using one or more sensors of the computer system and, optionally, causes the computer system to delete and/or otherwise not use the initially captured information about the one or more physical characteristics of the user for generating the representation of the user). Including the restart selectable option enables second information about the one or more physical characteristics of the user to be captured without requiring additional user inputs to navigate to a separate user interface, thereby reducing the number of inputs needed to capture second information about the one or more physical characteristics of the user.

In some embodiments, the one or more physical characteristics of the user (e.g., 708) include one or more first features (e.g., facial features) of a face (e.g., 708*c*) of the user (e.g., 708) and one or more second features (e.g., size, shape, skin tone, and/or contours) of a hand (e.g., 708*f* and/or 708*g*) of the user (e.g., 708). During the enrollment process for generating the representation (e.g., 726) of the user (e.g., 708) and while the computer system (e.g., 101, 700, and/or 1000) is removed from a body (e.g., 708*a*) of the user (e.g., 708) (e.g., the computer system receives data captured via one or more sensors that are in communication with the computer system, where the data indicates that the computer system is not being worn on a body part (e.g., a particular body part) of the user) (e.g., the computer system is a wearable computer system (e.g., a head-mounted display generation component, glasses, a headset, and/or a watch) that is configured to be worn on a body part of a user of the computer system) (in some embodiments, the computer system is a watch configured to be worn on a wrist of the user of the computer system) (in some embodiments, the computer system is in communication with one or more sensors that capture data indicative of whether the computer system is in the wearable position), the computer system (e.g., 101, 700, and/or 1000) captures the one or more first features of the face (e.g., 708*c*) of the user (e.g., 708) (e.g., without capturing features of the hand of the user). After capturing the one or more first features of the face (e.g., 708*c*) of the user (e.g., 708), the computer system (e.g., 101, 700, and/or 1000) detects that the computer system (e.g., 101, 700, and/or 1000) is placed on the body (e.g., 708*a*) of the user (e.g., 708) (e.g., the computer system is worn with a respective orientation and/or position relative to a respective portion of the user's body). After (e.g., in response to and/or while) detecting that the computer system (e.g., 101, 700, and/or 1000) is placed on the body (e.g., 708*a*) of the user (e.g., 708), the computer system (e.g., 101, 700, and/or 1000) captures the one or more second features of the hand (e.g., 708*f* and/or 708*g*) of the user (e.g., 708) (e.g., without capturing features of the face of the user) (e.g., capturing the one or more second features of the hand of the user via one or more sensors (e.g., cameras) in communication with the computer system).

Capturing the one or more first features of the face of the user while the computer system is removed from the body of the user and capturing the one or more second features of the hand of the user while the computer system is placed on the body of the user facilitates the computer system's ability to capture information about different portions of a body of the user, thereby reducing an amount of time needed to capture the information about the one or more physical characteristics of the user.

In some embodiments, the enrollment process is part of a setup process for the computer system (e.g., 101, 700, and/or 1000) (e.g., a setup process that is initiated when the computer system is first turned on and/or a setup process that is initiated when a user of the computer system is creating and/or first signing into an account for using the computer system). During the setup process for the computer system (e.g., 101, 700, and/or 1000), the computer system (e.g., 101, 700, and/or 1000) captures one or more biometric features of the user (e.g., one or more features of a face of the user, one or more features of eyes of the user, one or more features of hands and/or fingers of the user, and/or one or more features of a voice of the user). Capturing the one or more biometric features of the user during the setup process for the computer system allows the computer system to obtain additional information without requiring additional user inputs, thereby reducing the number of inputs needed to capture the one or more biometric features of the user.

In some embodiments, the enrollment process is part of a setup process for the computer system (e.g., 101, 700, and/or 1000) (e.g., a setup process that is initiated when the computer system is first turned on and/or a setup process that is initiated when a user of the computer system is creating and/or first signing into an account for using the computer system). During the setup process for the computer system (e.g., 101, 700, and/or 1000), the computer system (e.g., 101, 700, and/or 1000) performs an input calibration process that enables the computer system (e.g., 101, 700, and/or 1000) to calibrate detection of one or more inputs techniques (e.g., a process that includes detecting, observing, and/or capturing information about an eye gaze of the user (e.g., the user is attempting to provide a known and/or predetermined sequence of eye gaze inputs, the detected, observed, and/or captured information about the eye gaze of the user is compared to the known and/or predetermined sequence of eye gaze inputs, and the comparison is used to adjust how the computer system interprets eye gaze inputs so that the detected, observed, and/or captured information about the eye gaze of the user matches the known and/or predetermined sequence of eye gaze inputs) and/or detecting and/or capturing information about a hand of the user, movement of the hand of the user, and/or gestures made by the hand of the user (e.g., the user is attempting to provide a known and/or predetermined sequence of hand gesture inputs, the detected, observed, and/or captured information about the hand of the user is compared to the known and/or predetermined sequence of hand gesture inputs, and the comparison is used to adjust how the computer system interprets hand gesture inputs so that the detected, observed, and/or captured information about the hand of the user matches the known and/or predetermined sequence of hand gesture inputs) so that the computer system can detect and perform one or more functions based on the input and/or so that the computer system can more accurately detect the inputs).

Performing the input calibration process during the setup process for the computer system allows the computer system to obtain additional information without requiring additional user inputs, thereby reducing the number of inputs needed to perform the input calibration process.

In some embodiments, the enrollment process is part of a setup process for the computer system (e.g., 101, 700, and/or 1000) (e.g., a setup process that is initiated when the computer system is first turned on and/or a setup process that is initiated when a user of the computer system is creating and/or first signing into an account for using the computer system). During the setup process for the computer system (e.g., 101, 700, and/or 1000), the computer system (e.g., 101, 700, and/or 1000) performs a spatial audio calibration process (e.g., a process that includes outputting audio, via an audio output device (e.g., a speaker and/or headphones) in communication with the computer system, where the output audio is produced so as to simulate audio being produced from at least one location that is different than an actual location of the audio output device) (in some embodiments, the spatial audio calibration includes outputting audio and detecting feedback and/or one or more user inputs corresponding to a perceived location of the output audio and calibrating the perceived location to cause the output audio so as to simulate audio being produced from a target location).

Performing the spatial audio calibration process during the setup process for the computer system allows the computer system to obtain additional information without requiring additional user inputs, thereby reducing the number of inputs needed to perform the spatial audio calibration.

In some embodiments, the enrollment process is part of a setup process for the computer system (e.g., 101, 700, and/or 1000) (e.g., a setup process that is initiated when the computer system is first turned on and/or a setup process that is initiated when a user of the computer system is creating and/or first signing into an account for using the computer system). During the setup process for the computer system (e.g., 101, 700, and/or 1000), the computer system (e.g., 101, 700, and/or 1000) provides (e.g., via the one or more display generation components) an indication of instructions for using the representation (e.g., 726) during a real-time communication session (e.g., instructions explaining how the user of the computer system can use the representation to communicate with one or more additional users (e.g., additional users associated with external computer systems) during a real-time communication session (e.g., a real-time communication session between the user of the computer system and a second user associated with a second computer system, different from the first computer system, where the real-time communication session includes displaying and/or otherwise communicating, via the computer system and/or the second computer system, representations of the user's facial and/or body expressions to the second user)).

Providing the indication of instructions for using the representation during the real-time communication session during the setup process for the computer system causes the device to automatically perform an operation that provides additional context to the user about how the representation can be used.

In some embodiments, the one or more physical characteristics of the user (e.g., 708) include clothing (e.g., **708*i*) of the user (e.g., 708) (e.g., physical clothing which the user is wearing in a physical environment in which the user is located), and the representation (e.g., 726) includes a clothing representation (e.g., 726*i*) based on the clothing (e.g., 708*i*) of the user (e.g., 708) that was detected during the enrollment process for generating the representation (e.g., 726) of the user (e.g., 708**) (e.g., a visual image and/or indication of clothing that resembles and/or includes one or more similar attributes of the physical clothing of the user). The representation including the clothing representation that is based on the clothing of the user allows an appearance of the representation to more closely resemble an actual appearance of the user, thereby providing improved visual feedback.

In some embodiments, after displaying at least the portion of the representation (e.g., 726) of the user (e.g., 708) in the extended reality environment (e.g., 740), the computer system (e.g., 101, 700, and/or 1000) displays, via the one or more display generation components (e.g., 120, 704, 722, **722*b*, and/or 1000*a*), a menu user interface (e.g., 746 and/or 748) (e.g., a user interface that includes one or more selectable options for performing functions of the computer system, such as initiating a real-time communication session, editing and/or modifying the representation, and/or initiating a game). The menu user interface (e.g., 746 and/or 748) includes a selectable option (e.g., 746*a*, 748*a*, and/or 748*b*) (e.g., a selectable user interface object, such as a virtual button and/or text) that, when selected, causes the computer system (e.g., 101, 700, and/or 1000) to display at least the portion of the representation (e.g., 726) of the user (e.g., 708) (e.g., mirrored and/or within a frame indicating (e.g., indicates to the user) that the representation of the user in the extended reality environment has an orientation (e.g., posture, position, pose, and/or stance) that is a mirror image of (e.g., displayed as if the user is viewing the representation as a reflection in a mirror that is surrounded by the frame) an orientation (e.g., a physical and/or actual posture, position, pose, and/or stance) of the user in a physical environment in which the user is located) in the extended reality environment (e.g., 740) (e.g., display and/or re-display the representation of the user in the extended reality environment and, optionally, display one or more selectable options for editing the representation of the user). In some embodiments, the representation (e.g., 726) of the user (e.g., 708) is animated and is displayed in conjunction with detected movement of the user (e.g., 708) (e.g., matches the movement of the user). In some embodiments, physical movement of the user (e.g., 708) relative to a portion of the computer system (e.g., 101, 700, and/or 1000) in a physical environment (e.g., 706) in which the user (e.g., 708) is located is displayed via movement of the representation (e.g., 726) within the extended reality environment (e.g., 740). In some embodiments, displaying movement of the representation (e.g., 726) within the extended reality environment (e.g., 740) includes displaying movement of the representation (e.g., 726) that is a mirror image of the physical movement of the user (e.g., 708) relative to the portion of the computer system (e.g., 101, 700, and/or 1000) within the physical environment (e.g., 706) in which the user (e.g., 708**) is located.

Displaying the menu user interface including the selectable option allows the computer system to quickly and easily display at least the portion of the representation of the user in the extended reality environment, thereby reducing the number of inputs needed to display the representation of the user in the extended reality environment.

FIGS. 10A-10I illustrate examples of techniques for adjusting an appearance of a representation of a user. FIG. 11 is a flow diagram of an exemplary method 1100 for adjusting an appearance of a representation of a user. FIG. 12 is a flow diagram of an exemplary method 1200 for displaying a mouth representation of a representation of a user. FIG. 13 is a flow diagram of an exemplary method 1300 for displaying a hair representation of a representation of a user. FIG. 14 is a flow diagram of an exemplary method 1400 for displaying a portion of a representation of a user with a visual emphasis. The user interfaces in FIGS. 10A-10I are used to illustrate the processes described below, including the processes in FIGS. 11-14.

FIGS. 10A-10I illustrate examples of electronic device 1000 displaying representation 1002 of one or more portions of a body of user 1004 with different appearances based on information received by electronic device 1000. FIGS. 10A-10I also illustrate examples of electronic device 1000 displaying, via display **1000*a*, communication interface 1006, which includes first participant region 1006*a* corresponding to user 1004 and second participant region 1006*b* corresponding to a second user (e.g., a second user associated with and/or using electronic device 1000). At FIG. 10A, first participant region 1006*a* includes extended reality environment 1008, as well as representation 1002 of user 1004 and table representation 1010 (e.g., an image representative of a virtual table and/or representative of table 1016 within physical environment 1014) within extended reality environment 1008. In addition, second participant region 1006*b* includes second representation 1012 (e.g., an avatar and/or an image representative of) of second user. In some embodiments, user 1004 is participating in a real-time communication session, such as a video conference and/or a virtual video conference, with the second user (e.g., electronic device 1000 communicates with an external electronic device of user 1004 and enables user 1004 and/or the second user to communicate with one another via audio, video, and/or images displayed on electronic device 1000** and/or the external electronic device).

FIGS. 10A-10I also illustrate user 1004 within physical environment 1014 (e.g., an actual environment in which user 1004 is physically located), where physical environment 1014 includes user 1004 and table 1016 (e.g., a physical table). Electronic device 1000 is in communication with (e.g., wireless communication via an external electronic device that user 1004 is associated with and/or using) sensor **1018*a* and sensor 1018*b* that are positioned within physical environment 1014. In some embodiments, sensors 1018*a* and 1018*b* include a camera, an image sensor, a light sensor, a depth sensor, a tactile sensor, an orientation sensor, a proximity sensor, a temperature sensor, a location sensor, a motion sensor, and/or a velocity sensor. Sensors 1018*a* and 1018*b* are configured to capture data and/or information related to a state (e.g., position, orientation, posture, and/or pose) of user 1004 within physical environment 1014. For example, sensors 1018*a* and 1018*b* are configured to detect and capture information related to a position and/or movement of various body parts of user 1004 within physical environment 1014. While FIGS. 10A-10I illustrate electronic device 1000 being in communication with two sensors (e.g., sensor 1018*a* and sensor 1018*b*), in some embodiments, electronic device 1000 is in communication with any suitable number of sensors (e.g., via an external electronic device associated with user 1004**).

While FIGS. 10A-10I illustrate electronic device 1000 displaying representation 1002 of user 1004, in some embodiments, electronic device 700 displays communication interface 1006 including representation 1002 of user 1004 via display 704. In some embodiments, electronic device 1000 is configured to capture the one or more physical characteristics of user 708 (and/or user 1004), generate representation 726 (and/or representation 1002), and/or display representation 726 (and/or representation 1002) on display **1000*a* of electronic device 1000, as set forth above with reference to FIGS. 7A-7J. In some embodiments, the same electronic device (e.g., electronic device 700 and/or electronic device 1000) is used to generate and display representation 726, as set forth above with reference to FIGS. 7A-7J, and used to display representation 1002, as set forth below with reference to FIGS. 10A-10I**.

Figure 10A:
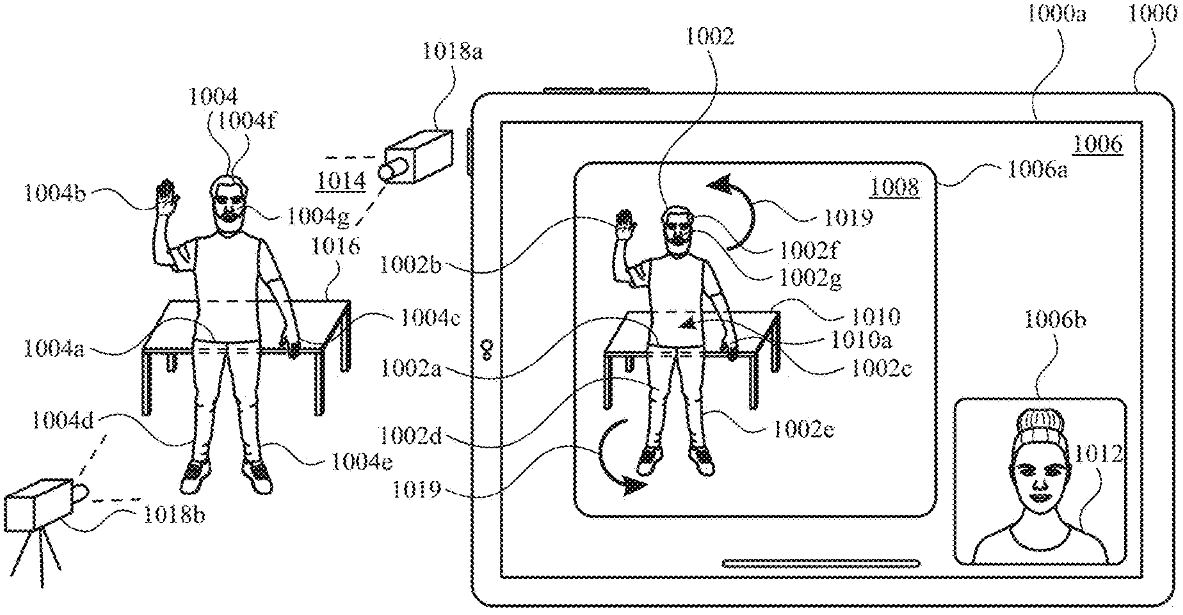
FIGS. 10A-10I illustrate example techniques for adjusting an appearance of a representation of a user, in accordance with some embodiments.

At FIG. 10A, electronic device 1000 receives information indicative of a state of one or more body parts of user 1004 within physical environment 1014 (e.g., via sensors **1018*a* and/or 1018*b* and/or via an external device). In response to receiving the information, electronic device 1000 displays representation 1002 within extended reality environment 1008 of first participant region 1006*a*. As shown at FIG. 10A, representation 1002 includes an appearance that imitates a physical appearance of user 1004 in physical environment 1014. For instance, first representation 1002 includes waist 1002*a*, hand 1002*b*, hand 1002*c*, leg 1002*d*, leg 1002*e*, head 1002*f*, and face 1002*g* corresponding to waist 1004*a*, hand 1004*b*, hand 1004*c*, leg 1004*d*, leg 1004*e*, head 1004*f*, and face 1004*g* of user 900. In particular, hand 1002*b* of representation 1002 is raised above waist 1002*a* within extended reality environment 1008 similar to hand 1004*b* of user 1004 in physical environment 1014. Hand 1002*c* of representation 1002 is positioned at and/or near waist 1002*a* of representation 1002 within extended reality environment 1008 similar to hand 1004*c* of user 1004 that is positioned at and/or near waist 1004*a* of user 1004 in physical environment 1014**.

At FIG. 10A, electronic device 1000 receives information indicative of the state (e.g., position, orientation, posture, and/or pose) of the body of user 1004. Based on the received information, electronic device 1000 displays representation 1002 as having a first appearance within extended reality environment 1008 (e.g., as indicated by solid lines illustrated in FIG. 10A). At FIG. 10A, electronic device 1000 displays representation 1002 with a first amount of visual fidelity and/or without blur applied to at least a portion of representation 1002. In some embodiments, electronic device 1000 displays representation 1002 as an anatomically accurate representation of user 1004 without applying any amount of blur to representation 1002. In some embodiments, the received information is indicative of the state of a portion of the body of user 1004. In some such embodiments, electronic device 1000 displays a first portion of representation 1002 corresponding to the portion of the body of user 1004 with the first appearance and displays a second portion of representation 1002 that does not correspond to the portion of the body of user 1004 with a second appearance, different from the first appearance.

At FIG. 10A, electronic device 1000 displays movement of representation 1002 within extended reality environment 1008, as indicated by arrows 1019. When electronic device 1000 receives the information indicative of the state of user 1004 and the information indicative of the state of user 1004 includes direct information (e.g., information directly captured via sensors 1018*a* and/or 1018*b* indicating a position of a portion of the body of user 1004 within physical environment 1014) about a state of at least a portion of the body of user 1004 that is received within a first predetermined amount of time, electronic device 1000 maintains display of representation 1002 with the first appearance. In some embodiments, the first appearance of representation 1002 does not include transparency (e.g., a zero amount of transparency applied to representation 1002), such that portion 1010*a* of table representation 1010 is obscured and/or otherwise blocked by representation 1002. In some embodiments, as electronic device 1000 displays movement of representation 1002 within extended reality environment 1008, electronic device 1000 displays representation 1002 as obscuring and/or otherwise blocking other portions of table representation 1010.

Figure 10B:
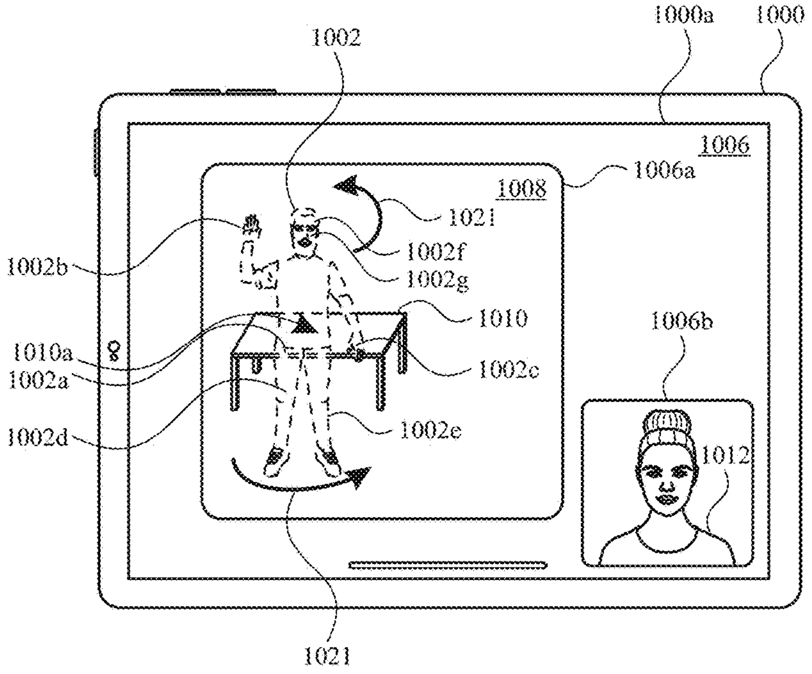

At FIG. 10B, electronic device 1000 receives information indicative of the state of user 1004 within physical environment 1014. However, the information indicative of the state of user 1004 within physical environment 1014 does not include direct information (e.g., information directly captured via sensors 1018*a* and/or 1018*b* indicating a position of a portion of the body of user 1004 within physical environment 1014) about a state of at least a portion of the body of user 1004. In some embodiments, electronic device 1000 determines that the information indicative of the state of user 1004 within physical environment 1014 does not include the direct information about the state of at least the portion of the body of user 1004 and/or has not included the direct information about the state of at least the portion of the body of user 1004 for a first predetermined amount of time. In some embodiments, the information indicative of the state of user 1004 within physical environment 1014 includes instructions and/or additional information indicating to electronic device 1000 that the direct information about the state of at least the portion of the body of user 1004 is not available and/or has not been available for the first predetermined amount of time.

At FIG. 10B, electronic device 1000 displays representation 1002 as having a second appearance, different from the first appearance, based on the direct information about the state of at least the portion of the body of user 1004 not having been received and/or available for the first predetermined amount of time. In some embodiments, the first predetermined amount of time is an amount of time that is greater than a first time threshold, such as 1 second, 5 seconds, 10 seconds, and/or 30 seconds, but is less than a second time threshold, such as 45 seconds, 60 seconds, 90 second, and/or 120 seconds. In some embodiments, when the direct information about the state of at least the portion of the body of user 1004 has been received (e.g., received by electronic device 1000 and/or received by another electronic device in communication with electronic device 1000) at a time before the first predetermined amount of time has elapsed (e.g., within an amount of time that is less than the first predetermined amount of time), electronic device 1000 maintains display of representation 1002 with the first appearance, as shown at FIG. 10A.

When the direct information about the state of at least the portion of the body of user 1004 has not been received (e.g., received by electronic device 1000 and/or received by another electronic device in communication with electronic device 1000) for the first predetermined amount of time, electronic device 1000 displays representation 1002 with the second appearance, as shown at FIG. 10B. For instance, at FIG. 10B, representation 1002 is shown as being displayed by electronic device 1000 with first dashed lines to indicate that electronic device is displaying representation 1002 with the second appearance. In some embodiments, the second appearance includes displaying representation 1002 with a second amount of visual fidelity (e.g., precision and/or clarity) and/or with an increased amount of blur as compared to the first amount of visual fidelity. In some embodiments, the second appearance includes displaying representation 1002 with a particle size that is greater than a particle size of the first appearance. Accordingly, in some embodiments, electronic device 1000 displays a less accurate version of representation 1002 when the direct information about the state of at least the portion of the body of user 1004 has not been received (e.g., received by electronic device 1000 and/or received by another electronic device in communication with electronic device 1000) for the first predetermined amount of time. While FIG. 10B illustrates the entire representation 1002 as having the second appearance, in some embodiments, electronic device 1000 displays a first portion of representation 1002 (e.g., a portion of representation 1002 corresponding to the portion of the body of user 1004 for which direct information is not received) with the second appearance and a second portion of representation 1002 with the first appearance.

In some embodiments, when the direct information about the state of at least the portion of the body of user 1004 has not been received (e.g., received by electronic device 1000 and/or received by another electronic device in communication with electronic device 1000) for the first predetermined amount of time, electronic device 1000 displays representation 1002 as static and/or stationary within extended reality environment 1008. For instance, in some embodiments, the information about the state of user 1004 and/or the direct information about the state of at least the portion of the body of user 1004 includes information indicative of movement of user 1004 (e.g., movement of one or more body parts of user 1004) within physical environment 1014. In some embodiments, when electronic device 1000 receives the direct information about the state of at least the portion of the body of user 1004 within an amount of time that is less than the first predetermined amount of time, electronic device 1000 displays movement of representation 1002 based on the direct information about the state of at least the portion of the body of user 1004 indicative of physical movement of user 1004 within physical environment 1014. However, in some embodiments, when electronic device does not receive the direct information about the state of at least the portion of the body of user 1004 for the first predetermined amount of time, electronic device 1000 maintains display of representation 1002 at a position within extended reality environment 1008 and does not otherwise display movement of representation 1002 (e.g., even when user 1004 moves within physical environment 1014).

In some embodiments, electronic device 1000 displays representation 1002 with the second appearance and maintains a general shape of representation 1002. In other words, electronic device 1000 displays representation 1002 with the first appearance and displays representation 1002 with the second appearance as each having the same shape (e.g., a shape that resembles and/or otherwise includes a similar appearance as a shape and/or silhouette of user 1004).

In some embodiments, electronic device 1000 displays movement of representation 1002 having the second appearance within extended reality environment 1008, as indicated by arrows 1021. In some embodiments, the second appearance of representation 1002 includes a first amount of transparency (e.g., a non-zero amount of transparency applied to representation 1002), such that portion 1010*a* of table representation 1010 is at least partially visible and/or discernable through representation 1002. In some embodiments, as electronic device 1000 displays movement of representation 1002 within extended reality environment 1008, electronic device 1000 displays other portions of table representation 1010 through representation 1002 when electronic device 1000 is displaying representation 1002 with the second appearance.

Figure 10C:
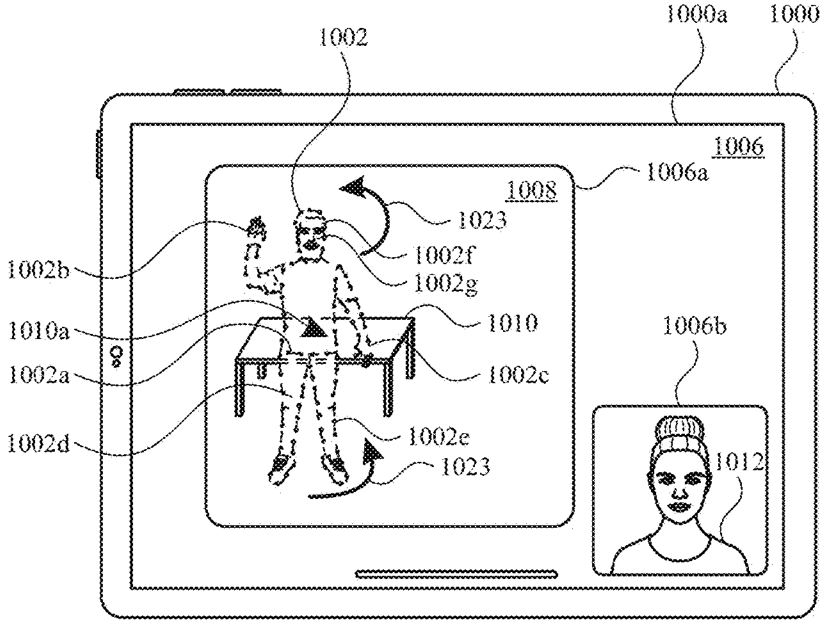

At FIG. 10C, electronic device 1000 receives information indicative of the state of user 1004 within physical environment 1014. However, the information indicative of the state of user 1004 within physical environment 1014 does not include direct information (e.g., information directly captured via sensors 1018*a* and/or 1018*b* indicating a position of a portion of the body of user 1004 within physical environment 1014) about a state of at least a portion of the body of user 1004. In some embodiments, electronic device 1000 determines that the information indicative of the state of user 1004 within physical environment 1014 does not include the direct information about the state of at least the portion of the body of user 1004 and/or has not included the direct information about the state of at least the portion of the body of user 1004 for a second predetermined amount of time that is longer than the first predetermined amount of time. In some embodiments, the information indicative of the state of user 1004 within physical environment 1014 includes instructions and/or additional information indicating to electronic device 1000 that the direct information about the state of at least the portion of the body of user 1004 is not available and/or has not been available for the second predetermined amount of time.

At FIG. 10C, electronic device 1000 displays representation 1002 as having a third appearance, different from the first appearance and the second appearance, based on the direct information about the state of at least the portion of the body of user 1004 not having been received and/or not being available for the second predetermined amount of time. In some embodiments, the second predetermined amount of time is an amount of time that is greater than the first time threshold, such as 1 second, 5 seconds, 10 seconds, and/or 30 seconds, and is also greater than the second time threshold, such as 45 seconds, 60 seconds, 90 second, and/or 120 seconds. In some embodiments, when the direct information about the state of at least the portion of the body of user 1004 has been received within a time that is before the second predetermined amount of time (e.g., within an amount of time that is less than the second predetermined amount of time), electronic device 1000 maintains display of representation 1002 with the first appearance, as shown at FIG. 10A, and/or maintains display of representation 1002 with the second appearance, as shown at FIG. 10B. In some embodiments, electronic device 100 displays representation 1002 with the second appearance when the direct information about at least the portion of the body of user 1004 has not been received for the first predetermined amount of time and electronic device 1000 displays representation 1002 with the third appearance (e.g., transitions from displaying representation 1002 with the second appearance to displaying representation 1002 with the third appearance) when the direct information about at least the portion of the body of user 1004 has not been received for the second predetermined amount of time. In some embodiments, electronic device 1000 displays representation 1002 with the second appearance when the direct information about at least the portion of the body of user 1004 has not been received for the first predetermined amount of time and electronic device 1000 displays representation 1002 with the first appearance (e.g., transitions from displaying representation 1002 with the second appearance to displaying representation with the first appearance) when the direct information about at least the portion of the body of user 1004 is received within an amount of time before the second predetermined amount of time, but after the first predetermined amount of time has already passed.

When the direct information about the state of at least the portion of the body of user 1004 has not been received (e.g., received by electronic device 1000 and/or received by another electronic device in communication with electronic device 1000) for the second predetermined amount of time, electronic device 1000 displays representation 1002 with the third appearance, as shown at FIG. 10C. For instance, at FIG. 10C, representation 1002 is shown as being displayed by electronic device 1000 with second dashed lines to indicate that electronic device is displaying representation 1002 with the third appearance. In some embodiments, the third appearance includes displaying representation 1002 with a third amount of visual fidelity (e.g., precision and/or clarity) and/or with an increased amount of blur as compared to the first amount of visual fidelity and/or the second amount of visual fidelity. In some embodiments, the third appearance includes displaying representation 1002 with a particle size that is greater than a particle size of the first appearance and/or greater than a particle size of the second appearance. Accordingly, in some embodiments, electronic device 1000 displays a less accurate version of representation 1002 when the direct information about the state of at least the portion of the body of user 1004 has not been received by electronic device 1000 for the second predetermined amount of time. While FIG. 10C illustrates the entire representation 1002 as having the third appearance, in some embodiments, electronic device 1000 displays a first portion of representation 1002 (e.g., a portion of representation 1002 corresponding to the portion of the body of user 1004 for which direct information is not received) with the third appearance and a second portion of representation 1002 with the first appearance and/or the second appearance.

In some embodiments, when the direct information about the state of at least the portion of the body of user 1004 has not been received (e.g., received by electronic device 1000 and/or received by another electronic device in communication with electronic device 1000) for the second predetermined amount of time, electronic device 1000 displays representation 1002 in a presentation mode. In some embodiments, the presentation mode includes displaying representation 1002 as a blurred orb and/or other non-anatomically accurate representation of user 1004. In some embodiments, the presentation mode includes displaying representation 1002 in an audio presence mode, where representation 1002 includes an icon and/or monogram having an appearance that is based on a detected utterance of user 1004 in physical environment 1014. In some embodiments, the presentation mode includes displaying representation 1002 as having a shape that is not visually reactive to changes in movement of user 1004. In some embodiments, the presentation mode includes displaying representation 1002 with a size that is less than a size of representation 1002 when displayed with the first appearance and/or with the second appearance.

In some embodiments, electronic device 1000 maintains display of representation 1002 with the third appearance when the direct information about the state of at least the portion of the body of user 1004 is not received for an amount of time that is greater than the second predetermined amount of time. In other words, so long as the direct information about the state of at least the portion of the body of user 1004 is not received after the second predetermined amount of time has passed, electronic device 1000 maintains display of representation 1002 with the third appearance. In some embodiments, electronic device 1000 transitions from displaying representation 1002 with the third appearance to displaying representation 1002 with the first appearance upon receiving the direct information about the state of at least the portion of the body of user 1004.

In some embodiments, electronic device 1000 displays movement of representation 1002 having the third appearance within extended reality environment 1008, as indicated by arrows 1023. In some embodiments, the third appearance of representation 1002 includes a second amount of transparency (e.g., a non-zero amount of transparency applied to representation 1002 that is greater than the first amount of transparency), such that portion 1010*a* of table representation 1010 is at least partially visible and/or discernable through representation 1002. In some embodiments, portion 1010*a* of table representation 1010 is more visible and/or discernable through representation 1002 when electronic device 1000 displays representation 1002 with the third appearance as compared to displaying representation 1002 with the second appearance. In some embodiments, as electronic device 1000 displays movement of representation 1002 within extended reality environment 1008, electronic device 1000 displays other portions of table representation 1010 through representation 1002 when electronic device 1000 is displaying representation 1002 with the third appearance.

Figure 10D:
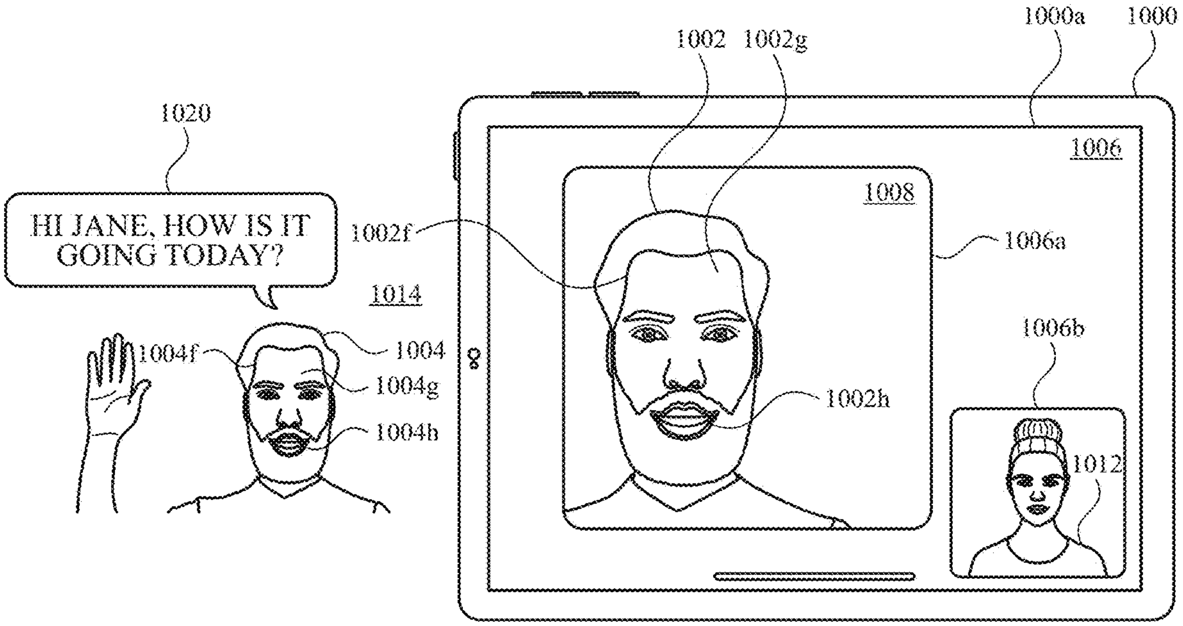

At FIG. 10D, electronic device 1000 displays a zoomed in view of representation 1002 within extended reality environment 1008 in first participant region 1006*a*. In some embodiments, electronic device 1000 zooms first participant region 1006*a* to a particular portion of extended reality environment 1008 in response to user input (e.g., a tap gesture, a voice command, and/or an air gesture). In some embodiments, electronic device 1000 zooms first participant region 1006*a* to a particular portion of extended reality environment 1008 when a condition is satisfied, such as when user 1004 is outputting (e.g., speaking and/or producing) an utterance (e.g., speech, humming, grunting, and/or otherwise orally creating other sound).

At FIG. 10D, user 1004 is outputting speech 1020 ("Hi Jane, how is it going today?") within physical environment 1014. Accordingly, mouth 1004*h* of user is open indicating that user 1004 is speaking speech 1020. At FIG. 10D, electronic device 1000 receives information indicative of a state of mouth 1004*h* of user 1004 within physical environment 1014. In addition, electronic device 1000 receives audio information (e.g., via a speaker of an electronic device 1000 associated with user 1004 and/or via sensors 1018*a* and/or 1018*b*) indicative of user 1004 outputting speech 1020. Based on the received information indicative of the state of mouth 1004*h* of user 1004 and/or based on the received audio information indicative of user 1004 outputting speech 1020, electronic device 1000 displays representation 1002 having mouth 1002*h* with a first appearance and in an open position, as shown at FIG. 10D.

At FIG. 10D, electronic device 1000 displays mouth 1002*h* of representation 1002 with a first amount of visual fidelity (e.g., precision and/or clarity). In some embodiments, electronic device 1000 displays mouth 1002*h* of representation 1002 as an anatomically accurate representation of mouth 1004*h* of user 1004 without applying any amount of blur to mouth 1002*h*.

In some embodiments, electronic device 1000 displays mouth 1002*h* of representation 1002 in the open position based on the received information indicative of the state of mouth 1004*h* of user 1004 and not based on the received audio information indicative of user 1004 outputting speech 1020. In some embodiments, electronic device 1000 outputs, via a speaker, audio corresponding to speech 1020 while displaying mouth 1002*h* of representation 1002 in the open position.

Figure 10E:
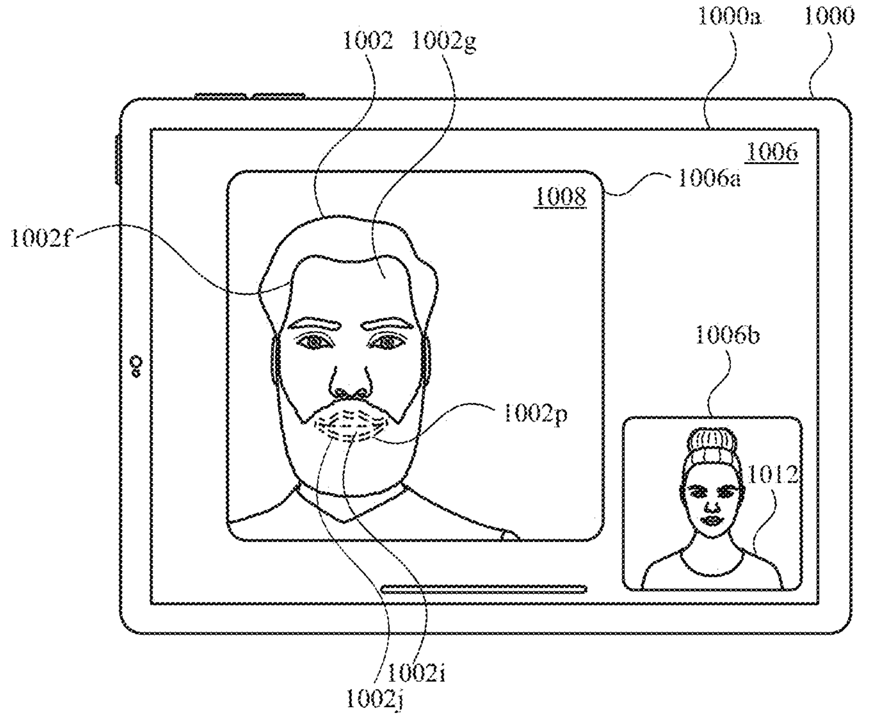

At FIG. 10E, electronic device 1000 receives the information indicative of the state of mouth 1004*h* of user 1004, but the information indicative of the state of mouth 1004*h* of user 1004 does not satisfy a set of one or more criteria. For example, in some embodiments, the set of one or more criteria includes a first criterion that is satisfied when the information indicative of the state of mouth 1004*h* of user 1004 is received within a predetermined period of time (e.g., within recurring predetermined time intervals, such as every 1 second, every 5 seconds, and/or every 10 seconds), a second criterion that is satisfied when the information indicative of the state of mouth 1004*h* of user 1004 includes information indicating movement of mouth 1004*h* at a time corresponding to a time at which speech 1020 was output by user 1004 (e.g., a time at which speech 1020 was detected via a microphone and/or sensors 1018*a* and/or 1018*b*), and/or a third criterion that is satisfied when the information indicative of the state of mouth 1004*h* of user 1004 includes an amount of accuracy above a threshold amount of accuracy (e.g., the information includes data indicating a position, pose, orientation, and/or expression of mouth 1004*h* that is above a confidence level threshold that is determined based at least in part on an amount of the information, an amount of the information received over time, and/or a precision and/or accuracy of the information with respect to detecting and/or estimating the actual state of mouth 1004*h*).

When the information indicative of the state of mouth 1004*h* of user 1004 does not satisfy the set of one or more criteria, electronic device 1000 displays mouth 1002*p* of representation 1002 having a second appearance. For instance, at FIG. 10E, mouth 1002*p* of representation 1002 is shown as being displayed by electronic device 1000 with dashed lines to indicate that electronic device is displaying mouth 1002*p* of representation 1002 with the second appearance. In some embodiments, the second appearance includes displaying mouth 1002*p* of representation 1002 with a second amount of visual fidelity (e.g., precision and/or clarity) and/or with an increased amount of blur as compared to the first amount of visual fidelity.

In some embodiments, the second appearance includes displaying mouth 1002*p* of representation 1002 based at least partially on the audio information corresponding to speech 1020. For example, electronic device 1000 displays mouth 1002*p* of representation 1002 to include a particular pose, orientation, expression, and/or position based at least partially on the audio information corresponding to speech 1020 (e.g., an estimated, extrapolated, and/or predicted pose, orientation, expression, and/or position based on the audio information corresponding to speech 1020). In some embodiments, electronic device 1000 displays mouth 1002*p* of representation 1002 based on both the audio information corresponding to speech 1020 and the information indicative of the state of mouth 1004*h* of user 1004 when the information indicative of the state of mouth 1004*h* does not satisfy the set of one or more criteria. In some embodiments, when the information indicative of the state of mouth 1004*h* does not satisfy the set of one or more criteria, electronic device 1000 displays mouth 1002*p* of representation 1002 as being a combination of a first portion (e.g., mouth 1002*h* having the first appearance) that is generated based on the information indicative of the state of mouth 1004*h* of user 1004 and a second portion that is generated based on the audio information corresponding to speech 1020. For instance, in some embodiments, the first portion and the second portion are combined, overlayed on one another, and/or otherwise used in order to generate mouth 1002*p* of representation 1002 displayed by electronic device 1000. In some embodiments, the first portion is a static representation and the second portion is a dynamic representation. In some embodiments, the first portion and the second portion are both dynamic representations.

In some embodiments, mouth 1002*p* of representation 1002 includes different amounts and/or degrees of emphases of the first portion and the second portion based on the information indicative of the state of mouth 1004*h* of user 1004. For example, in some embodiments, when the set of one or more criteria is not satisfied and when the information indicative of the state of mouth 1004*h* of user 1004 is determined (e.g., via electronic device 1000 and/or via another electronic device associated with user 1004) to include a confidence level below a confidence level threshold, mouth 1002*p* of representation 1002 is generated using the first portion with a first amount of emphasis (e.g., a first amount of visual emphasis and/or a first weight) and the second portion with a second amount of emphasis (e.g., a second amount of visual emphasis and/or a second weight) that is greater than the first amount of emphasis. Similarly, in some embodiments, when the set of one or more criteria is not satisfied and when the information indicative of the state of mouth 1004*h* of user 1004 is determined (e.g., via electronic device 1000 and/or via another electronic device associated with user 1004) to include a confidence level above the confidence level threshold, mouth 1002*p* of representation 1002 is generated using the first portion with a third amount of emphasis (e.g., a third amount of visual emphasis and/or a third weight) and the second portion with a fourth amount of emphasis (e.g., a fourth amount of visual emphasis and/or a fourth weight) that is less than the third amount of emphasis. In some embodiments, electronic device 1000 changes and/or updates display of mouth 1002*p* of representation 1002 as the confidence level of the information indicative of the state of the mouth 1004*h* changes.

In some embodiments, the confidence level of the information indicative of the state of mouth 1004*h* is determined (e.g., via electronic device 1000 and/or via another electronic device associated with user 1004) based on the audio information corresponding to speech 1020. For example, in some embodiments, the information indicative of the state of the mouth 1004*h* includes information related to movement of mouth 1004*h*, a position of mouth 1004*h* at a given time, an expression of mouth 1004*h* at a given time, and/or an orientation of mouth 1004*h* at a given time. In some embodiments, the audio information corresponding to speech 1020 includes information related to words and/or sounds included in speech 1020. In some embodiments, the information related to words and/or sounds included in speech 1020 is used to estimate, extrapolate, and/or otherwise approximate a position of mouth 1004*h* of user 1004 while user 1004 outputs speech 1020. The estimated position of mouth 1004*h* of user based on the audio information corresponding to speech 1020 is then compared to a position of mouth 1004*h* of user 1004 based on the information indicative of the state of mouth 1004*h* of user 1004 to determine whether the information indicative of the state of mouth 1004*h* of user 1004 corresponds to the audio information corresponding to speech 1020 (e.g., whether a tracked and/or detected position of mouth 1004*h* corresponds and/or matches an estimated position of mouth 1004*h* based on the audio information corresponding to speech 1020). In some embodiments, the confidence level of the information indicative of the state of mouth 1004*h* is determined based on an amount of correspondence (e.g., similarities, matches, and/or likenesses) between the information indicative of the state of mouth 1004*h* of user 1004 and the audio information corresponding to speech 1020.

In some embodiments, mouth 1002*p* of representation 1002 includes a third appearance when a second set of one or more criteria is met. In some embodiments, the third appearance includes a non-zero amount of transparency, such that a portion of extended reality environment 1008 that is positioned behind mouth 1002*p* of representation 1002 is at least partially visible. In some embodiments, the second set of one or more criteria include a first criterion that is met when electronic device 1000 displays at least a portion of head 1002*f* of representation 1002 with a non-zero amount of transparency and/or a second criterion that is met when electronic device 1000 displays mouth 1002*p* of representation 1002 in an open position. In some embodiments, an interior portion 1002*i* of mouth 1002*p* is displayed as having the third appearance and a perimeter portion 1002*j* of mouth 1002*p* is displayed as having the first appearance and/or the second appearance when the second set of one or more criteria is met.

Electronic device 1000 is also configured to display representation 1002 having one or more representations of hair of user 1004. At FIG. 10F, electronic device 1000 displays representation 1002 having first hair representation 1002*k* corresponding to hair 1004*k* on head 1004*f* of user 1004 and second hair representation 1002*l* corresponding to beard 1004*l* on face 1004*g* of user 1004. First hair representation 1002*k* includes a first appearance within extended reality environment 1008 (e.g., as indicated by first hatching illustrated in FIG. 10F). In some embodiments, the first appearance includes displaying first hair representation 1002*k* with a first amount of visual fidelity and/or without blur applied to first hair representation 1002*k*. In some embodiments, first hair representation 1002*k* is based on information indicative of the state of user 1004 within physical environment 1014, such that an appearance of first hair representation 1002*k* is based on an appearance of hair 1004*k*.

Figure 10F:
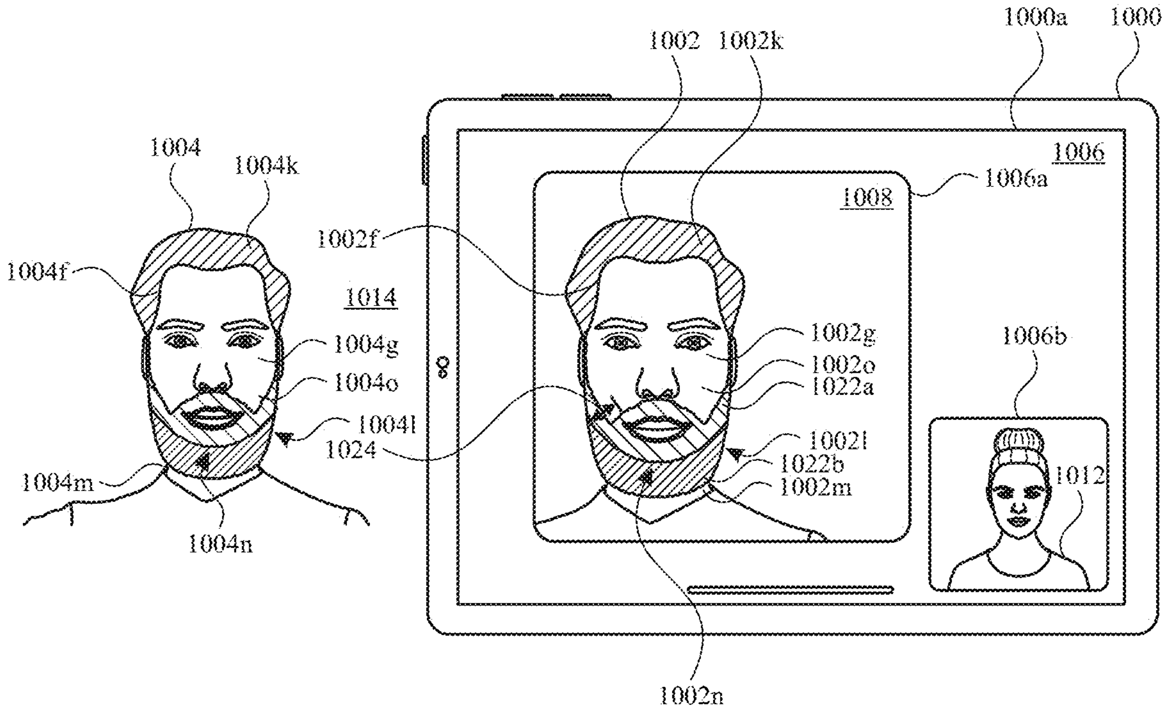

At FIG. 10F, second hair representation 10021 includes first portion 1022*a* having a second appearance (e.g., as indicated by second hatching in FIG. 10F) and second portion 1022*b* having a third appearance (e.g., as indicated by third hatching in FIG. 10F). In some embodiments, first portion 1022*a* and second portion 1022*b* of second hair representation 10021 are determined (e.g., via electronic device 1000 and/or via another electronic device associated with user 1004) based on a distance from face 1002*g* and/or neck 1002*m* of representation 1002. For instance, at FIG. 10F, first portion 1022*a* of second hair representation 10021 is located within distance 1024 of face 1002*g* and/or neck 1002*m* of representation 1002 and second portion 1022*b* of second hair representation 10021 is located further than distance 1024 from face 1002*g* and/or neck 1002*m* of representation 1002. In some embodiments, distance 1024 is a distance that extends uniformly from any portion of face 1002*g* and/or neck 1002*m* of representation 1002. In some embodiments, distance 1024 is a non-uniform distance that extends a longer distance from chin 1002*n* and/or neck 1002*m* of representation 1002 and a shorter distance from cheeks 10020 of representation 1002. In some embodiments, electronic device 1000 displays first hair representation 1002*k* with first and second portions having different appearances and/or different amounts of visual fidelity based on a distance from head 1002*f* of representation 1002. In some embodiments, electronic device 1000 only displays second hair representation 10021 corresponding to facial hair (e.g., beard 10041) of user 1004 with first portion 1022*a* and second portion 1022*b* having different appearances and/or different amounts of visual fidelity based on distance 1024 at which first portion 1022*a* and second portion 1022*b* are positioned from face 1002*g* of representation 1002. In some embodiments, electronic device 1000 displays second hair representation 10021 as having more than two portions that include different appearances and/or different amounts of visual fidelity based on distance 1024 and/or another distance at which the portions are positioned from face 1002*g* of representation 1002.

At FIG. 10F, the second appearance includes a second amount of visual fidelity and/or a first amount of blur applied to first portion 1022*a* of second hair representation 1002*l*. The third appearance includes a third amount of visual fidelity and/or a second amount of blur, greater than the first amount of blur, applied to second portion 1022*b* of second hair representation 1002*l*. In some embodiments, the second appearance includes displaying first portion 1022*a* with a first particle size and the third appearance includes displaying second portion 1022*b* with a second particle size that is greater than the first particle size. In some embodiments, the second appearance includes displaying first portion 1022*a* with a first amount of opacity and the third appearance includes displaying second portion 1022*b* with a second amount of opacity that is less than the first amount of opacity. In some embodiments, the second appearance includes displaying first portion 1022*a* with a first amount of transparency and the third appearance includes displaying second portion 1022*b* with a second amount of transparency that is greater than the first amount of transparency.

In some embodiments, electronic device 1000 displays second hair representation 1002*l* with a fourth appearance when a length of beard 1004*l* of user 1004 exceeds a predefined length and displays second hair representation 1002*l* with a fifth appearance when the length of beard 1004*l* of user 1004 is less than the predefined length. In some such embodiments, the fourth appearance includes a three-dimensional representation that extends along three separate axes within extended reality environment 1008. In some embodiments, the fifth appearance includes a textured appearance and/or a two-dimensional representation that extends along two axes within extended reality environment. In some embodiments, the fourth appearance including the three-dimensional representation is separate from other portions of representation 1002, such as head 1002*f*, face 1002*g*, neck 1002*m*, chin 1002*n*, and/or cheeks 1002*o* of representation 1002.

Electronic device 1000 is also configured to display at least a portion of representation 1002 that includes a visual emphasis so that representation 1002 can be viewed more clearly when extended reality environment 1008 includes an increased darkness and/or a reduced brightness, for example. At FIG. 10G, electronic device 1000 displays first viewpoint 1025 of extended reality environment 1008, where representation 1002 is at first position 1027 in extended reality environment 1008 and includes first portion 1026*a* and second portion 1026*b*. First portion 1026*a* of representation 1002 includes a perimeter portion of representation 1002 and/or a portion of representation 1002 that includes a boundary between representation 1002 and extended reality environment 1008. Second portion 1026*b* of representation 1002 includes an interior portion of representation 1002 and/or a portion of representation 1002 that does not include the boundary between representation 1002 and extended reality environment 1008.

Figure 10G:
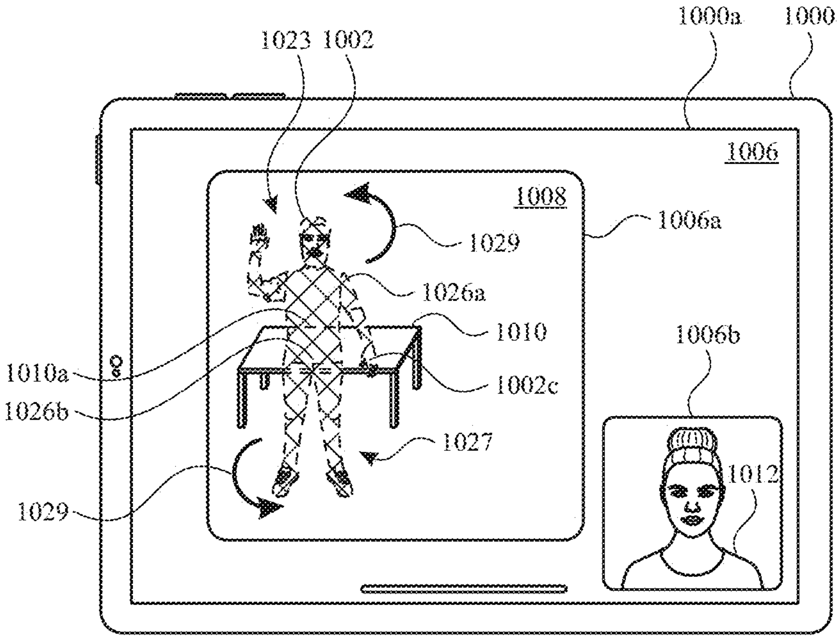

At FIG. 10G, first portion 1026*a* of representation 1002 includes a first appearance, as indicated by dashed lines, and second portion 1026*b* of representation 1002 includes a second appearance, as indicated by hatching. The first appearance is visually emphasized as compared to the second appearance so that first portion 1026*a* of representation 1002 is contrasted with respect to extended reality environment 1008 when compared to second portion 1026*b*. In some embodiments, the first appearance includes highlighting, an increased brightness, and and/or an increased clarity and/or visual fidelity when compared to the second appearance. In some embodiments, the first appearance includes a Fresnel visual effect. In some embodiments, the second appearance includes an amount of visual fidelity that includes a first amount of blurring, a first amount of transparency, and/or a first particle size. In some embodiments, the second appearance includes an amount of transparency, such that electronic device 1000 displays at least a portion of extended reality environment 1008 behind second portion 1026*b* of representation 1002. For instance, at FIG. 10G, extended reality environment 1008 includes table representation 1010 representative of table 1016 within physical environment 1014. In some embodiments, portion 1010*a* of table representation 1010 behind second portion 1026*b* of representation 1002 is at least partially visible through second portion 1026*b* of representation 1002. In some embodiments, electronic device 1000 displays different portions of table representation 1010 behind second portion 1026*b* of representation 1002 as representation 1002 moves within extended reality environment 1008, as indicated by arrows 1029. In some embodiments, electronic device 1000 displays different portions of table representation 1010 behind second portion 1026*b* of representation 1002 as a viewpoint of extended reality environment 1008 displayed by electronic device 1000 changes.

Figure 10H:
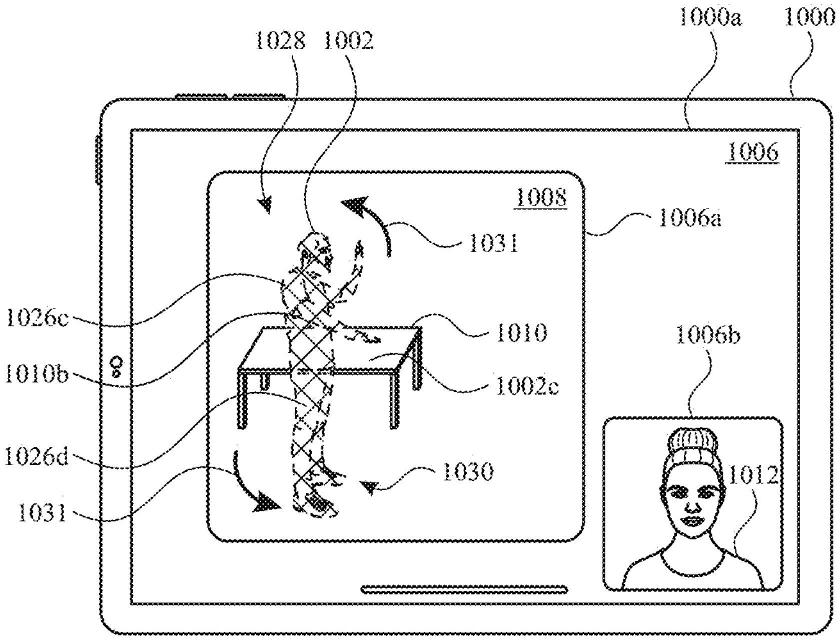

At FIG. 10H, electronic device 1000 displays second viewpoint 1028 of extended reality environment 1008, where representation 1002 is at second position 1030 within extended reality environment 1008. In some embodiments, electronic device 1000 transitions from displaying first viewpoint 1025 of extended reality environment 1008 to second viewpoint 1028 of extended reality environment 1008 based on user input requesting to change a vantage point, angle, and/or perspective of extended reality environment 1008. In some embodiments, electronic device 1000 transitions from displaying first viewpoint 1025 of extended reality environment 1008 to second viewpoint 1028 of extended reality environment 1008 based on movement of representation 1002 within extended reality environment. In some embodiments, first viewpoint 1025 and second viewpoint 1028 include the same vantage point, angle, and/or perspective of extended reality environment 1008, but electronic device 1000 displays representation 1002 at a different position with respect to one or more objects (e.g., table representation 1010) within extended reality environment 1008 (e.g., representation 1002 moves with respect to the one or more objects of extended reality environment 1008, but the vantage point, angle, and/or perspective of extended reality environment 1008 is maintained). In some embodiments, first viewpoint 1025 and second viewpoint 1028 include different vantage points, angles, and/or perspectives of extended reality environment 1008, but electronic device 1000 maintains display of representation 1002 at a particular position with respect to one or more objects (e.g., table representation 1010) within extended reality environment 1008 (e.g., representation 1002 does not move with respect to the one or more objects of extended reality environment 1008, but the displayed vantage point, angle, and/or perspective of extended reality environment 1008 changes). In some embodiments, first viewpoint 1025 and second viewpoint 1028 include different vantage points, angles, and/or perspectives of extended reality environment 1008 and representation 1002 is displayed at different positions within extended reality environment 1008 with respect to one or more objects (e.g., table representation 1010) within extended reality environment 1008 (e.g., the displayed vantage point, angle, and/or perspective of extended reality environment 1008 changes and the position of representation 1002 with respect to the one or more objects of extended reality environment 1008 changes).

At FIG. 10H, electronic device 1000 displays a side perspective of representation 1002 including third portion 1026*c* and fourth portion 1026*d*. Third portion 1026*c* of representation 1002 includes a perimeter portion of representation 1002 and/or a portion of representation 1002 that includes a boundary between representation 1002 and extended reality environment 1008. Fourth portion 1026*d* of representation 1002 includes an interior portion of representation 1002 and/or a portion of representation 1002 that does not include the boundary between representation 1002 and extended reality environment 1008. At FIG. 10H, third portion 1026*c* and fourth portion 1026*d* of representation 1002 are different from first portion 1026*a* and second portion 1026*b* of representation 1002 illustrated in FIG. 10G because electronic device 1000 displays second viewpoint 1028 of extended reality environment 1008 instead of first viewpoint 1025 of extended reality environment 1008. Accordingly, electronic device 1000 displays different portions of representation 1002 having the first appearance and the second appearance based on changes in the displayed viewpoint of extended reality environment 1008.

At FIG. 10H, third portion 1026*c* of representation 1002 includes the first appearance, as indicated by dashed lines, and fourth portion 1026*d* of representation 1002 includes the second appearance, as indicated by hatching. As set forth above, the first appearance is visually emphasized as compared to the second appearance so that third portion 1026*c* of representation 1002 is contrasted with respect to extended reality environment 1008 when compared to fourth portion 1026*d*. At FIG. 10H, extended reality environment 1008 includes table representation 1010 representative of table 1016 within physical environment 1014. In some embodiments, portion 1010*b* of table representation 1010 behind fourth portion 1026*d* of representation 1002 is at least partially visible through fourth portion 1026*d* of representation 1002. In some embodiments, electronic device 1000 displays different portions of table representation 1010 behind fourth portion 1026*d* of representation 1002 as representation 1002 moves within extended reality environment 1008, as indicated by arrows 1031. In some embodiments, electronic device 1000 displays different portions of table representation 1010 behind fourth portion 1026*d* of representation 1002 as a viewpoint of extended reality environment 1008 displayed by electronic device 1000 changes.

In some embodiments, electronic device 1000 gradually adjusts and/or changes the appearance of representation 1002 based on the change from displaying first viewpoint 1025 to second viewpoint 1028. For instance, electronic device 1000 gradually transitions from displaying first portion 1026*a* and second portion 1026*b* of representation 1002 to displaying third portion 1026*c* and fourth portion 1026*d* of representation 1002 as electronic device 1000 transitions from displaying first viewpoint 1025 to second viewpoint 1028. In some embodiments, electronic device 1000 gradually changes an amount of blurring applied to different portions of representation 1002 as electronic device 1000 transitions from displaying first viewpoint 1025 to second viewpoint 1028. In some embodiments, electronic device 1000 is configured to gradually change and/or adjust the appearance of representation 1002 as an angle of representation 1002 with respect to one or more objects (e.g., table representation 1010) within extended reality environment 1008 changes (e.g., as representation 1002 is displayed as moving within extended reality environment 1008).

Figure 10I:
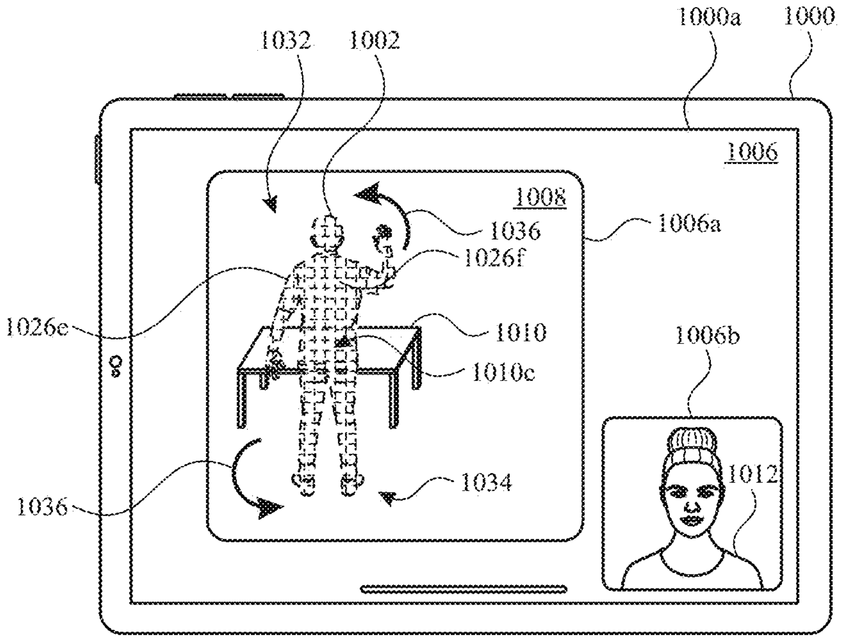

At FIG. 10I, electronic device 1000 displays third viewpoint 1032 of extended reality environment 1008, where representation 1002 is at third position 1034 within extended reality environment 1008. At FIG. 10I, electronic device 1000 displays a rearview (e.g., backwards facing) perspective of representation 1002 including fifth portion 1026*e* and sixth portion 1026*f*. When representation 1002 is displayed in the rearview perspective, fifth portion 1026*e* of representation 1002 includes a perimeter portion of representation 1002 and/or a portion of representation 1002 that includes a boundary between representation 1002 and extended reality environment 1008. Sixth portion 1026*f* of representation 1002 includes an interior portion of representation 1002 and/or a portion of representation 1002 that does not include the boundary between representation 1002 and extended reality environment 1008.

At FIG. 10H, fifth portion 1026*e* of representation 1002 includes a third appearance (e.g., the first appearance), as indicated by dashed lines, and sixth portion 1026*f* of representation 1002 includes a fourth appearance, as indicated by second hatching. In some embodiments, the third appearance is visually emphasized as compared to the fourth appearance so that fifth portion 1026*e* of representation 1002 is contrasted with respect to extended reality environment 1008 when compared to sixth portion 1026*f*. In some embodiments, the third appearance of fifth portion 1026*e* and the fourth appearance of sixth portion 1026*f* is the same. In some embodiments, the fourth appearance includes displaying sixth portion 1026*f* of representation 1002 in a presentation mode. In some embodiments, the presentation mode includes displaying sixth portion 1026*f* (and, optionally, fifth portion 1026*e*) of representation 1002 as a blurred orb and/or other non-anatomically accurate representation of user 1004. In some embodiments, the presentation mode includes displaying sixth portion 1026*f* (and, optionally, fifth portion 1026*e*) of representation 1002 in an audio presence mode, where representation 1002 includes an icon and/or monogram having an appearance that is based on a detected utterance of user 1004 in physical environment 1014. In some embodiments, the presentation mode includes displaying sixth portion 1026*f* (and, optionally, fifth portion 1026*e*) of representation 1002 as having a shape that is not visually reactive to changes in movement of user 1004. In some embodiments, the presentation mode includes displaying sixth portion 1026*f* (and, optionally, fifth portion 1026*e*) of representation 1002 with a size that is less than a size of second portion 1026*b* and/or fourth portion 1026*d* of representation 1002 when displayed with the second appearance.

In some embodiments, when electronic device 1000 transitions from displaying the rearview perspective of representation 1002 to a front perspective and/or a side perspective (e.g., a non-rearview perspective) of representation 1002, electronic device 1000 displays two portions of representation 1002 having the first appearance and the second appearance rather than fifth portion 1026*e* including the third appearance and sixth portion 1026*f* including the fourth appearance.

At FIG. 10I, extended reality environment 1008 includes table representation 1010 representative of table 1016 within physical environment 1014. In some embodiments, portion 1010*c* of table representation 1010 behind sixth portion 1026*f* (and, optionally, fifth portion 1026*e*) of representation 1002 is at least partially visible through sixth portion 1026*f* of representation 1002. In some embodiments, electronic device 1000 displays portion 1010*c* of table representation 1010 behind sixth portion 1026*f* with an increased level of visual fidelity when compared to displaying portion 1010*a* behind second portion 1026*b* and/or portion 1010*b* behind fourth portion 1026*d*. In some embodiments, electronic device 1000 displays different portions of table representation 1010 behind sixth portion 1026*f* of representation 1002 as representation 1002 moves within extended reality environment 1008, as indicated by arrows 1036. In some embodiments, electronic device 1000 displays different portions of table representation 1010 behind sixth portion 1026*f* of representation 1002 as a viewpoint of extended reality environment 1008 displayed by electronic device 1000 changes.

While FIGS. 10A-10I illustrate electronic device 1000 displaying representation 1002 of user 1004 during a real-time communication session with the second user (e.g., the user associated with representation 1012), in some embodiments, electronic device 1000 displays representation 1002 of user 1004 during a real-time communication session with additional users and/or participants (e.g., more than two users are participating in the real-time communication session). In some embodiments, electronic device 1000 concurrently displays multiple representations corresponding to multiple users that are participating in the real-time communication session, where a respective representation is based on information received and/or captured by a corresponding electronic device that is being used by the corresponding user (e.g., a first representation based on information received and/or captured by a first device that is being used by a first user, a second representation based on information received and/or captured by a second device that is being used by a second user, and/or a third representation based on information received and/or captured by a third device that is being used by a third user, where the first representation, the second representation and the third representation are different from each other, the first device, the second device, and the third device are different from each other, and the first user, the second user, and the third user are different from each other). In some embodiments, electronic device 1000 is configured to display one or more of the representations with an adjusted appearance based on the information received and/or captured by the respective electronic device in accordance with the techniques described above with reference to FIGS. 10A-10I. In other words, electronic device 1000 can display the representations as having the same and/or different appearances from one another and/or having the same and/or different visual effects based on the information received and/or captured by the respective electronic device. For example, in some embodiments, electronic device 1000 displays a first representation of a first user with the first appearance, as shown at FIG. 10A, when direct information about a state of at least a portion of a body of the first user has been received (e.g., received by an electronic device associated with and/or being used by the first user) at a time before the first predetermined amount of time has elapsed and displays a second representation of a second user with the second appearance, as shown at FIG. 10B, when direct information about a state of at least a portion of a body of the second user has not been received (e.g., not been received by the electronic device associated with and/or being used by the second user) for the first predetermined amount of time. In some embodiments, electronic device 1000 displays the first representation of the first user with a first mouth representation (e.g., mouth 1002*h*) that is based on received information (e.g., received by an electronic device associated with and/or being used by the first user) indicative of a state of the mouth of the first user and displays the second representation of the second user with a second mouth representation (e.g., mouth 1002*p*) that is based on the received audio information (e.g., received by an electronic device associated with and/or being used by the second user) indicative the second user outputting speech (e.g., speech 1020).

Additional descriptions regarding FIGS. 10A-10I are provided below in reference to methods 1100, 1200, 1300, and 1400 described with respect to FIGS. 10A-10I.

FIG. 11 is a flow diagram of an exemplary method 1100 for adjusting an appearance of a representation of a user, in accordance with some embodiments. In some embodiments, method 1100 is performed at a first computer system (e.g., 101, 700, and/or 1000) (e.g., a smartphone, tablet, head-mounted display generation component) including one or more display generation components (e.g., 120, 704, 722, 722*b*, and/or 1000*a*) (e.g., a visual output device, a 3D display, a display having at least a portion that is transparent or translucent on which images can be projected (e.g., a see-through display), a projector, a heads-up display, a display controller) (in some embodiments, the first computer system is in communication with a second computer system that is associated with a second user (e.g., that is being operated by the second user and/or the second user is logged into the second computer system (e.g., a user that is in a communication session (e.g., an extended reality and/or video conference) with the first user of the first computer system)). In some embodiments, the method 1100 is governed by instructions that are stored in a non-transitory (or transitory) computer-readable storage medium and that are executed by one or more processors of a computer system, such as the one or more processors 202 of computer system 101 (e.g., control 110 in FIG. 1A). Some operations in method 1100 are, optionally, combined and/or the order of some operations is, optionally, changed.

While the first computer system (e.g., 101, 700, and/or 1000) is being used by a first user (e.g., a user associated with second representation 1012) of the first computer system (e.g., 101, 700, and/or 1000), the first computer system (e.g., 101, 700, and/or 1000) displays (1102), via the one or more display generation components (e.g., 120, 704, 722, 722*b*, and/or 1000*a*), a representation (e.g., 1002) (e.g., an avatar; a virtual avatar (e.g., the avatar is a virtual representation of at least a portion of the second user)) of a second user (e.g., 1004) (e.g., a user of a second computer system) in an extended reality environment (e.g., 1008) (in some embodiments, the virtual avatar is displayed, in an extended reality environment, in lieu of the second user) with a first degree of fidelity (e.g., the first degree of fidelity shown at FIG. 10A) (e.g., an amount of blurriness, opacity, color, attenuation/density, and/or resolution that indicates a first estimated state of the representation based on information about the state of the body of the second user). The representation (e.g., 1002) of the second user (e.g., 1004) moves (e.g., moves within the extended reality environment) based on detected movement of the second user (e.g., 1004) (e.g., detected movement of the second user within a physical environment) detected by a second computer system during a live communication session with the first computer system (e.g., 101, 700, and/or 1000). In some embodiments, the representation (e.g., 1002) of the first user (e.g., 1004) is displayed in the extended reality environment (e.g., 1008) in response to receiving (e.g., based on user input at the computer system) a request to display the representation (e.g., 1002) of the first user (e.g., 1004).

While displaying the representation (e.g., 1002) of the second user (e.g., 1004) in the extended reality environment (e.g., 1008), an amount of direct information about a state of the body of the second user (e.g., 1004) changes (1104) (e.g., the first computer system determines that the amount of direct information about the state of the body of the second user changes and/or the second computer system determines that the amount of direct information about the state of the body of the second user changes).

In response to the amount of direct information about the state of the body of the second user (e.g., 1004) changing (e.g., determined and/or detected via the first computer system and/or the second computer system), the first computer system (e.g., 101, 700, and/or 1000) starts to display (1106), via the one or more display generation components (e.g., 120, 704, 722, 722*b*, and/or 1000*a*), the representation (e.g., 1002) of the second user (e.g., 1004) with a different degree of fidelity. In some embodiments, the first computer system (e.g., 101, 700, and/or 1000) (e.g., the receiving computer system) and/or the second computer system (e.g., the sending computer system) determines that the amount of direct information about the state of the body of the second user (e.g., 1004) changes and generates information about the degree of fidelity of the representation of the second user (e.g., 1004) that is used by the first computer system (e.g., 101, 700, and/or 1000) to display the representation (e.g., 1002) of the second user (e.g., 1004) with the different degree of fidelity.

In accordance with a determination that the direct information (e.g., information captured via one or more sensors in communication with the second computer system that includes information about the state of the body of the second user does not include data indicating a position, orientation, posture, and/or pose of at least a portion of (e.g., all of) the body of the second user) (e.g., the first computer system (e.g., the computer system receiving information) and/or the second computer system (e.g., the computer system transmitting information) determines that the direct information about the state of the body of the second user is not received for the first amount of time) about the state (e.g., position, orientation, posture, and/or pose) of the body of the second user (e.g., at least a portion of a physical body of the second user) is not received for a first amount of time that is greater than a first time threshold (e.g., 1 second, 5 seconds, 10 seconds, and/or 30 seconds) and less than a second time threshold (e.g., 45 seconds, 60 seconds, 90 seconds, and/or 120 seconds), the first computer system (e.g., 101, 700, and/or 1000) displays (1108), via the one or more display generation components (e.g., 120, 704, 722, 722*b*, and/or 1000*a*), the representation (e.g., 1002) of the second user (e.g., 1004) (e.g., at least a portion of the representation of the second user) with a second degree of fidelity (e.g., the second degree of fidelity shown at FIG. 10B) that is less than the first degree of fidelity (e.g., the portion of the representation of the second user is displayed with a non-zero amount of blurring).

In accordance with a determination that direct information (e.g., the information captured via one or more sensors in communication with the second computer system that includes information about the state of the body of the second user does not include data indicating a position, orientation, posture, and/or pose of at least a portion of the body of the second user) about the state (e.g., position, orientation, posture, and/or pose) (e.g., the first computer system (e.g., the computer system receiving information) and/or the second computer system (e.g., the computer system transmitting information) determines that the direct information about the state of the body of the second user is not received for the second amount of time) of the body of the second user (e.g., at least a portion of a physical body of the second user) is not received for a second amount of time that is greater than the first time threshold and greater than the second time threshold (e.g., 45 seconds, 60 seconds, 90 seconds, and/or 120 seconds), the first computer system (e.g., 101, 700, and/or 1000) displays (1110), via the one or more display generation components (e.g., 120, 704, 722, 722*b*, and/or 1000*a*), the representation (e.g., 1002) of the second user (e.g., 1004) (e.g., at least a portion of the representation of the second user) with a third degree of fidelity (e.g., the third degree of fidelity shown at FIG. 10C) that is less than the second degree of fidelity (e.g., the portion of the representation of the second user is displayed with a non-zero amount of blurring that is greater than the amount of blurring of the second degree of fidelity) (e.g., an audio presence mode; a mode in which the second user is represented in the extended reality environment by a rendering (e.g., an icon, a monogram) that does not have anthropomorphic features and/or is an inanimate object).

Displaying the representation of the second user with the second degree of fidelity in accordance with a determination that direct information about the state of the body of the second user is not received for a first amount of time and displaying the representation of the second user with the third degree of fidelity in accordance with a determination that direct information about the state of the body of the second user is not received for the second amount of time allows the first computer system to continue to display the representation of the second user even though the direct information about the state of the body of the second user is not received for the respective amount of time, thereby improving communication between the first user and the second user via the first computer system and the second computer system.

In some embodiments, displaying the representation (e.g., 1002) of the second user (e.g., 1004) in the extended reality environment (e.g., 1008) includes the first computer system (e.g., 101, 700, and/or 1000) displaying the representation (e.g., 1002) of the second user (e.g., 1004) during a real-time communication session with the first user. In some embodiments, the representation (e.g., 1002) of the second user (e.g., 1004) is displayed via a display generation component that is in communication with the second computer system (e.g., concurrently with the display of the representation of the second user via the one or more display generation components in communication with the first computer system). Displaying the representation of the second user in the extended reality environment during a real-time communication session allows the first computer system to display the representation of the second user even though the direct information about the state of the body of the second user is not received for a respective amount of time, thereby improving communication between the first user and the second user via the first computer system and the second computer system.

In some embodiments, in response to the amount of direct information about the state of the body of the second user (e.g., 1004) not changing (e.g., the first computer system and/or the second computer system determines that the amount of direct information about the state of the body of the second user is maintained and/or does not change), the first computer system (e.g., 101, 700, and/or 1000) maintains display of the representation (e.g., 1002) of the second user (e.g., 1004) in the extended reality environment (e.g., 1008) with the first degree of fidelity (e.g., the first degree of fidelity shown at FIG. 10A) (e.g., not displaying the representation of the second user with the second degree of fidelity and/or the third degree of fidelity). Maintaining displaying the representation of the second user in the extended reality environment with the first degree of fidelity in response to the amount of direct information about the state of the body of the second user not changing allows the first computer system to display a more accurate representation of the second user when direct information about the state of the body of the second user is available, thereby improving communication between the first user and the second user via the first computer system and the second computer system.

In some embodiments, displaying the representation (e.g., 1002) of the second user (e.g., 1004) with the second degree of fidelity (e.g., the second degree of fidelity shown at FIG. 10B) includes the first computer system (e.g., 101, 700, and/or 1000) displaying the representation (e.g., 1002) of the second user (e.g., 1004) with one or more anthropomorphic features (e.g., 1002*a*-1002*f*) (e.g., a face and/or hands). Displaying the representation (e.g., 1002) of the second user (e.g., 1004) with the third degree of fidelity (e.g., the third degree of fidelity shown at FIG. 10C) that is less than the second degree of fidelity includes the first computer system (e.g., 101, 700, and/or 1000) displaying, via the one or more display generation components (e.g., 120, 704, 722, 722*b*, and/or 1000*a*), the representation (e.g., 1002) of the second user (e.g., 1004) without a respective anthropomorphic feature of the one or more anthropomorphic features (e.g., 1002*a*-1002*f*) (e.g., without one or more hands and/or without a face). In some embodiments, displaying the representation (e.g., 1002) of the second user (e.g., 1004) with the third degree of fidelity (e.g., the third degree of fidelity shown at FIG. 10C) includes the first computer system (e.g., 101, 700, and/or 1000) displaying the representation (e.g., 1002) of the second user (e.g., 1004) in a presentation mode (e.g., an audio presence mode; a mode in which the first user is represented in the extended reality environment by a rendering (e.g., an icon, a monogram) that does not have anthropomorphic features and/or is an inanimate object), where the representation (e.g., 1002) of the second user (e.g., 1004), while in the presentation mode, has a shape (e.g., appearance; geometry (e.g., a disk, or spherical shape; a cube; a rectangular prism)) that is not visually reactive to changes in movement of the second user (e.g., 1004) (e.g., when in the presentation mode, the representation of the second user is not visually reactive in response to movement of the second user's body that is detected in a physical environment and/or the extended reality environment).

Displaying the representation of the second without the respective anthropomorphic feature of the one or more anthropomorphic features allows the computer system to continue to display the representation of the second user even when the direct information about the state of the body of the second user is not received for the second amount of time, thereby improving communication between the first user and the second user via the first computer system and the second computer system.

In some embodiments, displaying the representation (e.g., 1002) of the second user (e.g., 1004) without the respective anthropomorphic feature of the one or more anthropomorphic features (e.g., 1002*a*-1002*f*) (e.g., an audio presence mode; a mode in which the first user is represented in the extended reality environment by a rendering (e.g., an icon, a monogram) that does not have anthropomorphic features and/or is an inanimate object) includes the first computer system (e.g., 101, 700, and/or 1000) displaying the representation (e.g., 1002) of the second user (e.g., 1004) with a first size (e.g., with respect to edges and/or a size of the one or more display generation components and/or with respect to one or more objects within the extended reality environment) that is less than a second size (e.g., with respect to edges and/or a size of the one or more display generation components and/or with respect to the one or more objects within the extended reality environment) of the representation (e.g., 1002) of the second user (e.g., 1004) that is displayed when the representation (e.g., 1002) of the second user (e.g., 1004) is displayed with the one or more anthropomorphic features (e.g., 1002*a*-1002*f*) (e.g., when the representation of the second user is displayed with the first degree of fidelity and/or the second degree of fidelity).

Displaying the representation of the second user without the respective anthropomorphic feature of the one or more anthropomorphic features having a first size that is less than a second size of the representation of the second user that is displayed when the representation of the second user is displayed with the one or more anthropomorphic features reduces an amount of processing power required by the computer system to display the representation of the second user.

In some embodiments, displaying the representation (e.g., 1002) of the second user (e.g., 1004) with the one or more anthropomorphic features (e.g., 1002*a*-1002*f*) (e.g., a face and/or hands) includes the first computer system (e.g., 101, 700, and/or 1000) displaying a first portion (e.g., a perimeter portion and/or a portion that includes a boundary between the representation of the second user and the extended reality environment) of the representation (e.g., 1002) of the second user (e.g., 1004) with a fourth degree of visual fidelity (e.g., an amount of blurriness, opacity, color, attenuation/density, and/or resolution that indicates a first estimated state of the representation based on information about the state of the body of the second user). Displaying the representation (e.g., 1002) of the second user (e.g., 1004) without the respective anthropomorphic feature of the one or more anthropomorphic features (e.g., 1002*a*-1002*f*) (e.g., an audio presence mode; a mode in which the first user is represented in the extended reality environment by a rendering (e.g., an icon, a monogram) that does not have anthropomorphic features and/or is an inanimate object) includes the first computer system (e.g., 101, 700, and/or 1000) displaying the first portion (e.g., a perimeter portion and/or a portion that includes a boundary between the representation of the second user and the extended reality environment) of the representation (e.g., 1002) of the second user (e.g., 1004) with a fifth degree of visual fidelity (e.g., the first portion of the representation of the second user is displayed with a non-zero amount of blurring that is greater than the amount of blurring of the fourth degree of fidelity) that is less than the fourth degree of fidelity.

Displaying the first portion of the representation of the second user with the fifth degree of visual fidelity reduces an amount of processing power required by the computer system to display the representation of the second user.

In some embodiments, displaying the representation (e.g., 1002) of the second user (e.g., 1004) with the first degree of fidelity (e.g., the first degree of fidelity shown at FIG. 10A) includes the first computer system (e.g., 101, 700, and/or 1000) displaying, via the display generation component (e.g., 120, 704, 722, 722*b*, and/or 1000*a*), the representation (e.g., 1002) of the second user (e.g., 1004) with a first degree of accuracy (e.g., displaying the representation of the second user having one or more first physical characteristics that are intended to imitate and/or resemble physical characteristics of the second user, where the one or more first physical characteristics are based on one or more detected physical characteristics of the second user (e.g., one or more captured physical characteristics of a physical body of the second user)). Displaying the representation (e.g., 1002) of the second user (e.g., 1004) with the second degree of fidelity (e.g., the second degree of fidelity shown at FIG. 10B) includes the first computer system (e.g., 101, 700, and/or 1000) displaying, via the display generation component (e.g., 120, 704, 722, 722*b*, and/or 1000*a*), the representation (e.g., 1002) of the second user (e.g., 1004) with a second degree of accuracy (e.g., displaying the representation of the second user having one or more second physical characteristics that include less precision, such as increased blur, increased particle size, and/or increased transparency, when compared to the one or more first physical characteristics) (in some embodiments, the one or more second physical characteristics are based on the one or more detected physical characteristics of the second user (e.g., one or more captured physical characteristics of a physical body of the second user)), less than the first degree of accuracy.

Displaying the representation of the second user with a second degree of accuracy that is less than the first degree of accuracy allows the computer system to continue to display the representation of the second user even when the direct information about the state of the body of the second user is not received for the first amount of time, thereby improving communication between the first user and the second user via the first computer system and the second computer system.

In some embodiments, the first computer system (e.g., 101, 700, and/or 1000) detects a respective type of movement of the user (e.g., 1004) (e.g., movement of the body of the user in the physical environment in which the user is located or movement of an appendage of the user relative to a body of the user). In response to detecting the respective type of movement of the user (e.g., 1004) and in accordance with a determination that the representation (e.g., 1002) of the second user (e.g., 1004) is being displayed with the first degree of fidelity (e.g., the first degree of visual fidelity shown at FIG. 10A), the first computer system (e.g., 101, 700, and/or 1000) displays, via the one or more display generation components (e.g., 120, 704, 722, 722*b*, and/or 1000*a*), movement of the representation (e.g., 1002) of the second user (e.g., 1004) based on the respective type of movement of the user (e.g., 1004). In response to detecting the respective type of movement of the user (e.g., 1004) and in accordance with a determination that the representation (e.g., 1002) of the second user (e.g., 1004) is being displayed with the second degree of fidelity (e.g., the second degree of visual fidelity shown at FIG. 10B), the first computer system (e.g., 101, 700, and/or 1000) forgoes display of movement of the representation (e.g., 1002) based on the respective type of movement of the user (e.g., 1004) (e.g., the computer system does not cause display of the representation of the second user to move in the extended reality environment based on receiving information about physical movement of the second user in a physical environment in which the second user is located).

Displaying the representation of the second user with the second degree of fidelity including forgoing displaying movement of the representation of the second user based on the respective type of movement of the user reduces an amount of processing power required by the computer system to display the representation of the second user.

In some embodiments, displaying the representation (e.g., 1002) of the second user (e.g., 1004) with the first degree of fidelity (e.g., the first degree of fidelity shown at FIG. 10A) includes the first computer system (e.g., 101, 700, and/or 1000) displaying the representation (e.g., 1002) of the second user (e.g., 1004) with a plurality of particles having a first average particle size (e.g., the representation of the second user is displayed with a higher resolution and/or a larger number of pixels when compared to the second degree of accuracy). Displaying the representation (e.g., 1002) of the second user (e.g., 1004) with the second degree of fidelity (e.g., the second degree of fidelity shown at FIG. 10B) includes the first computer system (e.g., 101, 700, and/or 1000) displaying the representation (e.g., 1002) of the second user (e.g., 1004) with a plurality of particles having a second average particle size, greater than the first average particle size (e.g., the representation of the second user is displayed with a reduced resolution and/or a reduced number of pixels when compared to the first degree of accuracy).

The second degree of fidelity including a second average particle size that is greater than the first average particle size reduces an amount of processing power required by the computer system to display the representation of the second user.

In some embodiments, the first degree of fidelity (e.g., the first degree of fidelity shown at FIG. 10A) includes a first amount of blur (e.g., zero blurring and/or a non-zero amount of blurring that is less than the non-zero amount of blurring of the second degree of accuracy) and the second degree of fidelity (e.g., the second degree of fidelity shown at FIG. 10B) includes a second amount of blur, greater than the first amount of blur (e.g., a non-zero amount of blurring that is greater than the amount of blurring of the first degree of accuracy). The second degree of fidelity including a second amount of blur that is greater than the first amount of blur reduces an amount of processing power required by the computer system to display the representation of the second user.

In some embodiments, displaying the representation (e.g., 1002) of the second user (e.g., 1004) with the second degree of fidelity (e.g., the second degree of fidelity shown at FIG. 10B) includes the first computer system (e.g., 101, 700, and/or 1000) displaying the representation (e.g., 1002) of the second user (e.g., 1004) having a shape (e.g., a shape formed by a boundary between the representation of the second user and other portions of the extended reality environment) that is based on a shape of the second user (e.g., 1004) (e.g., a shape formed by a silhouette of a physical body of the second user). Displaying the representation of the second user with a second degree of fidelity including displaying the representation of the second user having the shape that is based on the shape of the second user allows the computer system to continue to display the representation of the second user even when the direct information about the state of the body of the second user is not received for the first amount of time, thereby improving communication between the first user and the second user via the first computer system and the second computer system.

In some embodiments, while displaying the representation (e.g., 1002) of the second user (e.g., 1004) with the second degree of fidelity (e.g., the second degree of fidelity shown at FIG. 10B) and in accordance with a determination that the direct information about the state of the body of the second user (e.g., 1004) is not received for the second amount of time (e.g., the first computer system (e.g., the receiving computer system) and/or the second computer system (e.g., the sending computer system) determines and/or detects that the amount of direct information about the state of the body of the second user is not received for the second amount of time), the first computer system (e.g., 101, 700, and/or 1000) displays, via the one or more display generation components (e.g., 120, 704, 722, 722*b*, and/or 1000*a*), the representation (e.g., 1002) of the second user (e.g., 1004) with the third degree of fidelity (e.g., the third degree of fidelity shown at FIG. 10C) that is less than the second degree of fidelity (e.g., the first computer system transitions from displaying the representation of the second user with the second degree of fidelity to displaying the representation of the second user with the third degree of fidelity in response to determining that the direct information about the state of the body of the second user is not received for the second amount of time).

Displaying the representation of the second user with the third degree of fidelity in accordance with a determination that that the direct information about the state of the body of the second user is not received for the second amount of time allows the computer system to continue to display the representation of the second user even when the direct information about the state of the body of the second user is not received for the second amount of time, thereby improving communication between the first user and the second user via the first computer system and the second computer system.

In some embodiments, the direct information about the state of the body of the second user (e.g., 1004) includes direct information about a state of a first portion (e.g., 1004*d* and/or 1004*e*) of the body of the second user (e.g., 1004) (e.g., parts of the body of the second user below a neck and/or shoulders of the second user, such as hands, arms, waist, torso, and/or legs) and the direct information about the state of the body of the second user (e.g., 1004) does not include direct information about a state of a second portion (e.g., 1004*b*, 1004*c*, 1004*g*, and/or 1004*f*) of the body of the second user (e.g., 1004), different from the first portion (e.g., 1004*d* and/or 1004*e*) of the body of the second user (e.g., 1004) (e.g., parts of the body of the second user above the neck and/or shoulders of the second user, such as a head and/or face). In some embodiments, displaying the representation (e.g., 1002) of the second user (e.g., 1004) with the second degree of fidelity (e.g., the second degree of fidelity shown at FIG. 10B) includes the first computer system (e.g., 101, 700, and/or 1000) displaying a first portion (e.g., 1002*d* and/or 1002*e*) of the representation (e.g., 1002) of the second user (e.g., 1004) associated with the first portion (e.g., 1004*d* and/or 1004*e*) of the body of the second user (e.g., 1004) with the second degree of fidelity (e.g., the second degree of fidelity shown at FIG. 10B) and displaying a second portion (e.g., 1002*b*, 1002*c*, 1002*g*, and/or 1002*f*) of the representation (e.g., 1002) of the second user (e.g., 1004) associated with the second portion (e.g., 1004*b*, 1004*c*, 1004*g*, and/or 1004*f*) of the body of the second user (e.g., 1004) with the first degree of fidelity (e.g., the first degree of fidelity shown at FIG. 10A). In some embodiments, displaying the representation (e.g., 1002) of the second user (e.g., 1004) with the third degree of fidelity (e.g., the third degree of fidelity shown at FIG. 10C) includes the first computer system (e.g., 101, 700, and/or 1000) displaying a first portion (e.g., 1002*d* and/or 1002*e*) of the representation (e.g., 1002) of the second user (e.g., 1004) associated with the first portion (e.g., 1004*d* and/or 1004*e*) of the body of the second user (e.g., 1004) with the third degree of fidelity (e.g., the third degree of fidelity shown at FIG. 10C) and the first computer system (e.g., 101, 700, and/or 1000) displaying a second portion (e.g., 1002*b*, 1002*c*, 1002*g*, and/or 1002*f*) of the representation (e.g., 1002) of the second user (e.g., 1002) associated with the second portion (e.g., 1004*b*, 1004*c*, 1004*g*, and/or 1004*f*) of the body of the second user (e.g., 1004) with the first degree of fidelity (e.g., the first degree of fidelity shown at FIG. 10A) and/or the second degree of fidelity (e.g., the second degree of fidelity shown at FIG. 10B).

The direct information about the state of the body of the second user including direct information about the state of the first portion of the body of the second user, but not including direct information about the state of the second portion of the body of the second user, allows the computer system to adjust an appearance of the representation of the second user based on available information so that the representation of the second user more accurately represents a state of at least a portion of the body of the second user, thereby improving communication between the first user and the second user via the first computer system and the second computer system.

FIG. 12 is a flow diagram of an exemplary method 1200 for displaying a mouth representation of a representation of a user, in accordance with some embodiments. In some embodiments, method 1200 is performed at a first computer system (e.g., 101, 700, and/or 1000) (e.g., a smartphone, tablet, head-mounted display generation component) including one or more display generation components (e.g., 120, 704, 722, 722*b*, and/or 1000*a*) (e.g., a visual output device, a 3D display, a display having at least a portion that is transparent or translucent on which images can be projected (e.g., a see-through display), a projector, a heads-up display, a display controller) (in some embodiments, the first computer system is in communication with a second computer system that is associated with a second user (e.g., that is being operated by the second user (e.g., a user that is in a communication session (e.g., an extended reality and/or video conference) with the first user of the first computer system)). In some embodiments, the method 1200 is governed by instructions that are stored in a non-transitory (or transitory) computer-readable storage medium and that are executed by one or more processors of a computer system, such as the one or more processors 202 of computer system 101 (e.g., control 110 in FIG. 1A). Some operations in method 1200 are, optionally, combined and/or the order of some operations is, optionally, changed.

While the first computer system (e.g., 101, 700, and/or 1000) is being used by a first user (e.g., a user associated with second representation 1012) of the first computer system (e.g., 101, 700, and/or 1000), the first computer system (e.g., 101, 700, and/or 1000) displays (1202), via the one or more display generation components (e.g., 120, 704, 722, 722*b*, and/or 1000*a*), a representation (e.g., 1002) (e.g., an avatar; a virtual avatar (e.g., the avatar is a virtual representation of at least a portion of the first user)) of the second user (e.g., 1004) (e.g., a user of the external computer system) in an extended reality environment (e.g., 1008) (in some embodiments, the virtual avatar is displayed, in an extended reality environment, in lieu of the first user). The representation (e.g., 1002) of the second user (e.g., 1004) moves (e.g., moves within the extended reality environment) based on detected movement of the second user (e.g., 1004) (e.g., detected movement of the second user within a physical environment) detected by a second computer system during a live communication session with the first computer system (e.g., 101, 700, and/or 1000). In some embodiments, the representation (e.g., 1002) of the second user (e.g., 1004) is displayed in the extended reality environment (e.g., 1008) in response to receiving (e.g., based on user input at the computer system) a request to display the representation (e.g., 1002) of the second user (e.g., 1004).

While displaying the representation (e.g., 1002) of the second user (e.g., 1004) in the extended reality environment (e.g., 1008), the first computer system (e.g., 101, 700, and/or 1000) receives (1204) information (e.g., audio information, motion information, information about a state of a mouth of the second user, and/or information about the representation of the second user generated by the second computer system) corresponding to an utterance (e.g., 1020) (e.g., speech) of the second user (e.g., 1004) (e.g., audio data captured via a microphone and/or other audio sensing device that is in communication with the computer system).

In response to receiving the information corresponding to the utterance (e.g., 1020) of the second user (e.g., 1004), the first computer system (e.g., 101, 700, and/or 1000) updates (1206) an appearance of the representation (e.g., 1002) of the second user (e.g., 1004) based on the information corresponding to the utterance (e.g., 1020) of the second user (e.g., 1004).

In accordance with a determination (e.g., the first computer system (e.g., the computer system receiving information) and/or the second computer system (e.g., the computer system transmitting information) determines that the information corresponding to the utterance of the second user includes information about a detected physical state of a mouth of the second user that does not satisfy the set of one or more criteria) that information about a detected physical state of a mouth (e.g., **1004*h*) of the second user (e.g., 1004) does not satisfy a set of one or more criteria (e.g., information about the detected physical state of the mouth is not received, information about the detected physical state of the mouth does not correspond to a same time as the utterance and/or the information about the detected physical state of the mouth of the second user includes an amount of accuracy below a threshold amount of accuracy (e.g., the information includes indirect data that infers and/or does not include captured data about a physical position, pose, orientation, and/or expression of the mouth and/or the data that indicates the position, pose, orientation, and/or expression of the mouth is below a confidence level threshold (e.g., the confidence level threshold is determined based at least in part on an amount of the data, an amount of the data over a predefined period of time, and/or a precision and/or accuracy of the data with respect to detecting and/or estimating the state of the actual mouth))), the first computer system (e.g., 101, 700, and/or 1000) displays (1208), via the one or more display generation components (e.g., 120, 704, 722, 722*b*, and/or 1000*a*), a first mouth representation (e.g., 1002*p*) (e.g., a visual indication of the actual mouth of the second user that is generated at least partially based on the information corresponding to the utterance of the second user by inferring, approximating, extrapolating, and/or estimating a position, pose, orientation, and/or expression of the mouth based on the information corresponding to the utterance of the second user) of the representation (e.g., 1002) of the second user (e.g., 1004). The first mouth representation (e.g., 1002*p*) is generated based on (e.g., at least partially based on and/or only based on) audio information corresponding to the utterance (e.g., 1020) of the second user (e.g., 1004**) (e.g., the computer system infers, approximates, extrapolates, and/or estimates a position, pose, orientation, and/or expression of the first mouth representation based on the audio information corresponding to the utterance of the second user) (in some embodiments, the computer system generates the first mouth representation based entirely on the audio information corresponding to the utterance of the second user and/or based on both the audio information corresponding to the utterance of the second user and information about the state of the mouth of the second user).

In accordance with a determination (e.g., the first computer system (e.g., the computer system receiving information) and/or the second computer system (e.g., the computer system transmitting information) determines that the information corresponding to the utterance of the second user includes information about a detected physical state of a mouth of the second user that satisfies the set of one or more criteria) that information about the detected physical state (e.g., position, orientation, posture, expression, and/or pose) of the mouth (e.g., **1004*h*) of the second user (e.g., 1004) satisfies the set of one or more criteria (e.g., the information about the detected physical state of the mouth is received, the information about the detected physical state of the mouth corresponds to a same time at which the utterance was spoken and/or the information about the detected physical state of the physical mouth includes an amount of accuracy above a threshold amount of accuracy (e.g., the information includes data that indicates the position, pose, orientation, and/or expression of the mouth above a confidence level threshold (e.g., the confidence level threshold is determined based at least in part on an amount of the data, an amount of the data over a predefined period of time, and/or a precision and/or accuracy of the data with respect to detecting and/or estimating the state of the actual mouth))), the first computer system (e.g., 101, 700, and/or 1000) displays (1210), via the one or more display generation components (e.g., 120, 704, 722, 722*b*, and/or 1000*a*), a second mouth representation (e.g., 1002*h*) (e.g., a visual indication of the actual mouth of the first user that is generated based on the data that indicates the position, pose, orientation, and/or expression of the physical mouth) of the representation (e.g., 1002) of the second user (e.g., 1004). The second mouth representation (e.g., 1002*h*) is generated based on the information about the detected physical state of the mouth (e.g., 1004*h*) of the second user (e.g., 1004) without using audio information corresponding to the utterance (e.g., 1020) of the second user (e.g., 1004) to generate the second mouth representation (e.g., 1002*h***) (e.g., the computer system does not use the audio information corresponding to the utterance of the second user to estimate and/or infer a state of the mouth and/or does not otherwise use the audio information corresponding to the utterance of the second user to generate the second mouth representation and display the second mouth representation having a position, pose, orientation, and/or expression within the extended reality environment).

Displaying the first mouth representation of the second user that is generated based on the audio information corresponding to the utterance of the second user allows the first computer system to display a mouth representation of the second user even when information about the detected physical state of the mouth of the second user is not available and/or is partially available, thereby improving communication between the first user and the second user via the first computer system and the second computer system.

In some embodiments, displaying the representation (e.g., 1002) of the second user (e.g., 1004) in the extended reality environment (e.g., 1008) includes displaying the representation (e.g., 1002) of the second user (e.g., 1004) during a real-time communication session with the first user. In some embodiments, the representation (e.g., 1002) of the second user (e.g., 1004) is displayed via a display generation component that is in communication with the second computer system (e.g., concurrently with the display of the representation of the second user via the one or more display generation components in communication with the first computer system). Displaying the representation of the second user in the extended reality environment during a real-time communication session allows the first computer system to display a mouth representation of the second user even when information about the detected physical state of the mouth of the second user is not available and/or is partially available, thereby improving communication between the first user and the second user via the first computer system and the second computer system.

In some embodiments, the first mouth representation (e.g., 1002*p*) includes a first portion (e.g., a first image and/or images of a mouth) that is generated based on the audio information corresponding to the utterance (e.g., 1020) of the second user (e.g., 1004) (e.g., an inferred, approximated, extrapolated, and/or estimated image of a position, pose, expression, and/or orientation of the mouth of the second user) and a second portion (e.g., a second image and/or images of a mouth) that is generated based on the information about the detected physical state of the mouth (e.g., 1004*h*) of the second user (e.g., 1004) (e.g., a detected, captured, and/or estimated image of the position, pose, expression, and/or orientation of the mouth of the second user based on direct information about the detected physical state of the mouth of the second user and/or based on indirect information about the detected physical state of the mouth of the second user). The first portion and the second portion are combined (e.g., overlaid on one another and/or merged together) to form the first mouth representation (e.g., 1002*p*). Displaying the first mouth representation of the second user with the first portion that is generated based on the audio information corresponding to the utterance of the second user and the second portion that is generated based on the information about the detected physical state of the mouth of the second user allows the first computer system to display an accurate mouth representation of the second user based on information that is available to the first computer system, thereby improving communication between the first user and the second user via the first computer system and the second computer system.

In some embodiments, the second portion is static (e.g., the second portion of the first mouth representation does not move with respect to other portions of the representation of the second user and/or with respect to the extended reality environment and/or the second portion of the first mouth representation does not move based on information about the detected physical state of the mouth of the second user indicating that the mouth of the second user is moving). Displaying the second portion of the first mouth representation as static allows the first computer system to display a mouth representation of the second user that includes an appearance based on captured and/or detected physical characteristics of a mouth of a user, thereby improving communication between the first user and the second user via the first computer system and the second computer system.

In some embodiments, the second portion moves (e.g., moves within the extended reality environment with respect to other portions of the representation of the second user and/or with respect to one or more objects within the extended reality environment) based on the information about the detected physical state of the mouth (e.g., 1004*h*) of the second user (e.g., 1004) (e.g., the information about the detected physical state of the mouth of the second user indicates that the mouth of the second user is moving over time (e.g., the user is speaking, yawning, lip-syncing, making an utterance, changing facial expressions, and/or otherwise moving the mouth)). Displaying movement of the second portion of the first mouth representation based on the information about the detected physical state of the mouth of the second user allows the first computer system to display a more accurate mouth representation of the second user, thereby improving communication between the first user and the second user via the first computer system and the second computer system.

In some embodiments, the first portion that is generated based on the audio information corresponding to the utterance (e.g., 1020) of the second user (e.g., 1004) includes a first degree of visual emphasis (e.g., the first mouth representation is generated using a first amount of the first portion and/or the first mouth representation includes a first amount of the first portion that is visibly distinguishable on the one or more display generation components), the second portion that is generated based on the information about the detected physical state of the mouth (e.g., 1004*h*) of the second user (e.g., 1004) includes a second degree of visual emphasis (e.g., the first mouth representation is generated using a second amount of the second portion and/or the first mouth representation includes a second amount of the second portion that is visibly distinguishable on the one or more display generation components), and a relative magnitude of the first degree of visual emphasis and the second degree of visual emphasis is based on the information about the detected physical state of the mouth (e.g., 1004*h*) of the second user (e.g., 1004) (e.g., the first mouth representation is generated using the first amount of the first portion and the second amount of the second portion, where the first amount of the first portion and the second amount of the second portion are determined based on the information about the detected physical state of the mouth of the second user). In some embodiments, the first mouth representation (e.g., 1002*p*) is generated using a larger amount of the first portion than the second portion when the information about the detected physical state of the mouth (e.g., 1004*h*) of the second user (e.g., 1004) includes a confidence level and/or accuracy below a threshold. In some embodiments, the first mouth representation (e.g., 1002*p*) is generated using a larger amount of the second portion than the first portion when the information about the detected physical state of the mouth (e.g., 1004*h*) of the second user (e.g., 1004) includes a confidence level and/or accuracy above the threshold.

Displaying the first mouth representation of the second user with the first portion having the first degree of visual emphasis and the second portion having the second degree of visual emphasis allows the first computer system to display an accurate mouth representation of the second user based on information that is available to the first computer system, thereby improving communication between the first user and the second user via the first computer system and the second computer system.

In some embodiments, the relative magnitude of the first degree of visual emphasis and the second degree of visual emphasis changes based on the information about the detected physical state of the mouth (e.g., 1004*h*) of the second user (e.g., 1004) (e.g., the first mouth representation changes over time and the amounts of the first portion and the second portion that are used to generate the first mouth representation change based on the confidence level and/or accuracy of the information about the detected physical state of the mouth of the second user). In some embodiments, a first magnitude of the first degree of visual emphasis increases and a second magnitude of the second degree of visual emphasis decreases (e.g., the first magnitude is greater than the second magnitude) when the information about the detected physical state of the mouth (e.g., 1004*h*) of the second user (e.g., 1004) includes a confidence level and/or accuracy below a threshold. In some embodiments, the first magnitude of the first degree of visual emphasis decreases and the second magnitude of the second degree of visual emphasis increases (e.g., the first magnitude is less than the second magnitude) when the information about the detected physical state of the mouth (e.g., 1004*h*) of the second user (e.g., 1004) includes a confidence level and/or accuracy above the threshold.

Changing the first degree of visual emphasis and the second degree of visual emphasis based on the information about the detected physical state of the mouth of the second user allows the first computer system to display an accurate mouth representation of the second user based on information that is available to the first computer system, thereby improving communication between the first user and the second user via the first computer system and the second computer system.

In some embodiments, the first computer system (e.g., 101, 700, and/or 1000) determines an accuracy of the information about the detected physical state of the mouth (e.g., 1004*h*) of the second user (e.g., 1004) based on the audio information corresponding to the utterance (e.g., 1020) of the second user (e.g., 1004) (e.g., a confidence level, accuracy, and/or precision of the information about the detected physical state of the mouth of the second user that can be used to generate the first mouth representation and/or the second mouth representation is determined (e.g., via the first computer system and/or the second computer system) based on the audio information corresponding to the utterance of the second user). In some embodiments, the information about the detected physical state of the mouth (e.g., 1004*h*) of the second user (e.g., 1004) is compared to the audio information corresponding to the utterance (e.g., 1020) of the second user (e.g., 1004) to determine whether the information about the detected physical state of the mouth (e.g., 1004*h*) of the second user (e.g., 1004) matches the audio information corresponding to the utterance (e.g., 1020) of the second user (e.g., 1004) to determine the confidence level and/or accuracy of the information about the detected physical state of the mouth (e.g., 1004*h*) of the second user (e.g., 1004). For instance, when the audio information corresponding to the utterance (e.g., 1020) of the second user (e.g., 1004) indicates that the second user (e.g., 1004) is speaking, the information about the detected physical state of the mouth (e.g., 1004*h*) of the second user (e.g., 1004) is assessed to determine whether the information about the detected physical state of the mouth (e.g., 1004*h*) of the second user (e.g., 1004) indicates movement of the mouth (e.g., 1004*h*) of the second user (e.g., 1004) that is consistent with the audio information corresponding to the utterance (e.g., 1020) of the second user (e.g., 1004) (e.g., a mouth shape that would be expected to be detected in order to make the detected utterance). In some embodiments, when the information about the detected physical state of the mouth (e.g., 1004*h*) of the second user (e.g., 1004) does not correspond to and/or match the audio information corresponding to the utterance (e.g., 1020) of the second user (e.g., 1004), the confidence level and/or accuracy of the information about the detected physical state of the mouth (e.g., 1004*h*) is reduced and/or determined to be lower than when the information about the detected physical state of the mouth (e.g., 1004*h*) of the second user (e.g., 1004) does correspond to and/or match the audio information corresponding to the utterance (e.g., 1020) of the second user (e.g., 1004).

Determining the accuracy of the information about the detected physical state of the mouth of the second user based on the audio information corresponding to the utterance of the second user allows the first computer system to display an accurate mouth representation of the second user based on information that is available to the first computer system, thereby improving communication between the first user and the second user via the first computer system and the second computer system.

In some embodiments, while displaying the first mouth representation (e.g., 1002*p*) of the representation (e.g., 1002) of the second user (e.g., 1004) and in accordance with a determination that a second set of one or more criteria is met (e.g., a head representation of the representation of the second user and/or another portion of the representation of the second user includes a non-zero amount of transparency and/or the first mouth representation is displayed as being open and/or partially open), the first computer system (e.g., 101, 700, and/or 1000) displays, via the one or more display generation components (e.g., 120, 704, 722, 722*b*, and/or 1000*a*), a first portion of the representation of the mouth (e.g., 1002*i*) (e.g., an interior portion) of the second user (e.g., 1004) with a first degree of transparency that is different from (e.g., greater than or less than) a second degree of transparency of a second portion of the representation of the mouth (e.g., 1002*j*) (e.g., an exterior portion) that is different from the first portion of the representation of the mouth (e.g., 1002*i*) (e.g., the first mouth representation includes a non-zero amount of transparency, such that at least a portion of the extended reality environment that is positioned behind the first mouth representation is visible, partially visible, partially uncovered, and/or distinguishable through the first mouth representation).

Displaying the first portion of the representation of the mouth having the first degree of transparency in accordance with a determination that a second set of one or more criteria is met allows the first computer system to display a mouth representation of the second user that blends with other portions of the representation of the second user and/or the extended reality environment, thereby improving communication between the first user and the second user via the first computer system and the second computer system.

FIG. 13 is a flow diagram of an exemplary method 1300 for displaying a hair representation of a representation of a user, in accordance with some embodiments. In some embodiments, method 1300 is performed at a first computer system (e.g., 101, 700, and/or 1000) (e.g., a smartphone, tablet, head-mounted display generation component) including one or more display generation components (e.g., 120, 704, 722, 722*b*, and/or 1000*a*) (e.g., a visual output device, a 3D display, a display having at least a portion that is transparent or translucent on which images can be projected (e.g., a see-through display), a projector, a heads-up display, a display controller) (in some embodiments, the first computer system is in communication with a second computer system that is associated with a second user (e.g., that is being operated by the second user (e.g., a user that is in a communication session (e.g., an extended reality and/or video conference) with the first user of the first computer system)). In some embodiments, the method 1300 is governed by instructions that are stored in a non-transitory (or transitory) computer-readable storage medium and that are executed by one or more processors of a computer system, such as the one or more processors 202 of computer system 101 (e.g., control 110 in FIG. 1A). Some operations in method 1300 are, optionally, combined and/or the order of some operations is, optionally, changed.

While the first computer system (e.g., 101, 700, and/or 1000) is being used by a first user (e.g., a user associated with second representation 1012) of the first computer system (e.g., 101, 700, and/or 1000), the first computer system (e.g., 101, 700, and/or 1000) displays (1302), via the one or more display generation components (e.g., 120, 704, 722, 722*b*, and/or 1000*a*), a representation (e.g., 1002) (e.g., an avatar; a virtual avatar (e.g., the avatar is a virtual representation of at least a portion of the first user)) of the second user (e.g., 1004) (e.g., a user of the external computer system) in an extended reality environment (e.g., 1008) (in some embodiments, the virtual avatar is displayed, in an extended reality environment, in lieu of the first user) (in some embodiments, the representation of the first user is displayed in the extended reality environment in response to receiving (e.g., based on user input at the computer system) a request to display the representation of the first user). The representation (e.g., 1002) of the second user (e.g., 1004) moves (e.g., moves within the extended reality environment) based on detected movement of the second user (e.g., 1004) (e.g., detected movement of the second user within a physical environment) detected by a second computer system during a live communication session with the first computer system (e.g., 101, 700, and/or 1000).

The representation (e.g., 1002) of the second user (e.g., 1004) includes a visual representation of hair (e.g., 1002*k* and/or 1002*l*) of the second user (e.g., 1004) (1304) (e.g., an image representing hair of the second user that is displayed in the extended reality environment, where the image representing the hair of the second user is not an actual image captured via a camera that is in communication with the second computer system).

The visual representation of hair (e.g., 1002*k* and/or 1002*l*) includes a first portion (e.g., 1022*a*) of the representation of hair (e.g., 1002*k* and/or 1002*l*) (1306) that is (e.g., a representation of a first portion of one or more strands of hair of the second user that are near to and/or connected to a body of the second user) positioned a first distance (e.g., within distance 1024) from a portion (e.g., 1002*g*, 1002*m*, 1002*n*, and/or 1002*o*) of the representation (e.g., 1002) of the second user (e.g., 1004) that corresponds to a respective body part (e.g., 1004*g*, 1004*m*, 1004*n*, and/or 1004*o*) of the second user (e.g., 1004) (e.g., a representation of a body part of the second user that is not hair of the second user). The first portion (e.g., 1022*a*) of the representation of hair (e.g., 1002*k* and/or 1002*l*) includes a first degree of visual fidelity (e.g., an amount of blurriness, opacity, color, attenuation/density, and/or resolution that indicates a first estimated state of the representation of hair based on information about the second user). In some embodiments, the first computer system (e.g., 101, 700, and/or 1000) (e.g., the computer system receiving information) and/or the second computer system (e.g., the computer system transmitting information) determine the first portion (e.g., 1022*a*) of the representation of hair (e.g., 1002*k* and/or 1002*l*) that includes the first degree of visual fidelity.

The visual representation of hair (e.g., 1002*k* and/or 1002*l*) includes a second portion (e.g., 1022*b*) of the representation of hair (e.g., 1002*k* and/or 1002*l*) (1308) that is (e.g., a representation of a second portion of the one or more strands of hair of the second user that extend away from and/or are positioned away from the body of the second user) positioned a second distance (e.g., beyond distance 1024), greater than the first distance, from the portion (e.g., 1002*g*, 1002*m*, 1002*n*, and/or 1002*o*) of the representation (e.g., 1002) of the second user (e.g., 1004) that corresponds to the respective body part (e.g., 1004*g*, 1004*m*, 1004*n*, and/or 10054*o*) of the second user (e.g., 1004). The second portion (e.g., 1022*b*) of the representation of hair (e.g., 1002*k* and/or 1002*l*) includes a second degree of visual fidelity (e.g., an amount of blurriness, opacity, color, attenuation/density, and/or resolution that indicates a second estimated state of the representation of hair based on information about the second user), less than the first degree of visual fidelity (e.g., the second portion is displayed with a non-zero amount of blurring and/or the second portion is displayed with an increased amount of transparency when compared to the first portion). In some embodiments, the visual indication of hair (e.g., 1002*k* and/or 1002*l*) of the second user (e.g., 1004) corresponds to facial hair. In some embodiments, the visual indication of hair (e.g., 1002*k* and/or 1002*l*) of the second user (e.g., 1004) is displayed with a variable amount of visual fidelity (e.g., a variable amount of precision and/or clarity) that varies based on a distance of the hair from a body of the user (e.g., 1004) (e.g., a first portion of a strand of hair of the first user that is near and/or in contact with the body of the first user is displayed with an increased amount of visual fidelity, whereas a second portion of the strand of hair of the first user that is at a position that is away from and/or not near to the body of the first user is displayed with a reduced amount of visual fidelity). In some embodiments, the first computer system (e.g., 101, 700, and/or 1000) (e.g., the computer system receiving information) and/or the second computer system (e.g., the computer system transmitting information) determine the second portion (e.g., 1022*b*) of the representation of hair (e.g., 1002*k* and/or 1002*l*) that includes the second degree of visual fidelity.

Displaying the first portion of the representation of hair with the first degree of visual fidelity and displaying the second portion of the representation of hair with the second degree of visual fidelity allows the first computer system to display a visual representation of hair of the second user without obstructing and/or blocking other portions of the representation of the second user and/or portions of the extended reality environment, thereby improving communication between the first user and the second user via the first computer system and the second computer system.

In some embodiments, displaying the representation (e.g., 1002) of the second user (e.g., 1004) in the extended reality environment (e.g., 1008) includes the first computer system (e.g., 101, 700, and/or 1000) displaying the representation (e.g., 1002) of the second user (e.g., 1004) during a real-time communication session with the first user. In some embodiments, the representation (e.g., 1002) of the second user (e.g., 1004) is displayed via a display generation component that is in communication with the second computer system (e.g., concurrently with the display of the representation of the second user via the one or more display generation components in communication with the first computer system). Displaying the representation of the second user in the extended reality environment during a real-time communication session allows the first computer system to display the visual representation of hair of the second user without obstructing and/or blocking other portions of the representation of the second user and/or portions of the extended reality environment, thereby improving communication between the first user and the second user via the first computer system and the second computer system.

In some embodiments, the visual representation of hair (e.g., **1002*l*) of the second user (e.g., 1004) is a visual representation of facial hair (e.g., 1004*l*) of the second user (e.g., 1004**) (e.g., an image indicative of a beard, mustache, goatee, and/or other hair on a face of the second user and/or extending from a face of the second user). The visual representation of hair of the second user being a visual representation of facial hair of the second user allows the first computer system to display a visual representation of facial hair of the second user, thereby improving visual feedback.

In some embodiments, the visual representation of hair (e.g., **1002*l*) of the second user (e.g., 1004) is a visual representation of a beard (e.g., 1004*l*) (e.g., hair on a face and/or neck of the second user and/or hair extending from the face and/or neck of the second user) of the second user (e.g., 1004) and not a visual representation of other hair (e.g., 1004*k*) of the second user (e.g., 1004**) (e.g., does not apply to visual representations of hair that is not a beard and/or does not apply to hair on and/or extending from a top of a head of the second user and/or hair that is on and/or extending from any other part of the body of the second user other than the face and/or neck of the user). The visual representation of hair of the second user being a visual representation of a beard of the second user allows the first computer system to display a visual representation of a beard of the second user, thereby improving visual feedback.

In some embodiments, the first degree of visual fidelity includes a first amount of blurring (e.g., a zero amount of blurring and/or a non-zero amount of blurring that is less than the second amount of blurring) and the second degree of visual fidelity includes a second amount of blurring (e.g., a non-zero amount of blurring that is greater than (e.g., blurrier than) the first amount of blurring), greater than the first amount of blurring. The second degree of visual fidelity including a second amount of blurring that is greater than the first amount of blurring reduces an amount of processing power required by the computer system to display visual representation of hair of the second user.

In some embodiments, the first degree of visual fidelity includes displaying the representation of hair (e.g., **1002*k* and/or 1002*l*) using a plurality of particles with a first average particle size (e.g., a higher resolution and/or a larger number of pixels when compared to the second particle size) and the second degree of visual fidelity includes displaying the representation of hair (e.g., 1002*k* and/or 1002*l***) using a plurality of particles with a second average particle size (e.g., a reduced resolution and/or a reduced number of pixels when compared to the first particle size), greater than the first average particle size. The second degree of visual fidelity including a second average particle size that is greater than the first average particle size reduces an amount of processing power required by the computer system to display visual representation of hair of the second user.

In some embodiments, the first degree of visual fidelity includes a first amount of opacity (e.g., zero transparency and/or the first portion of the representation of hair is displayed to fully block one or more portions of the representation of the second user positioned behind the first portion of the representation of hair) and the second degree of visual fidelity includes a second amount of opacity (e.g., a non-zero amount of transparency and/or the second portion of the representation of hair is displayed to partially cover and/or obscure one or more portions of the representation of the second user and/or one or more objects and/or visual elements within the extended reality environment that are positioned behind the second portion of the representation of hair), less than the first amount of opacity. The second degree of visual fidelity including a second amount of opacity that is less than the first amount of opacity reduces an amount of processing power required by the computer system to display visual representation of hair of the second user.

In some embodiments, the visual representation of hair (e.g., **1002*l*) of the second user (e.g., 1004) is a visual representation of facial hair (e.g., 1004*l*) of the second user (e.g., 1004) (e.g., an image indicative of a beard, mustache, goatee, and/or other hair on and/or extending from a face of the second user) and the visual representation of facial hair (e.g., 1002*l*) of the second user (e.g., 1004**) is partially transparent (e.g., the visual representation of facial hair includes a non-zero amount of transparency, such that one or more portions of the representation of the second user and/or one or more objects and/or visual elements within the extended reality environment are at least partially visible through the visual representation of facial hair). Displaying the visual representation of facial hair of the second user as being partially transparent reduces an amount of processing power required by the computer system to display visual representation of hair of the second user.

In some embodiments, the respective body part (e.g., **1004*g*) of the second user (e.g., 1004) is a face (e.g., 1002*g*) of the second user (e.g., 1004**) (e.g., a visual indication of a physical face of the second user) and the first degree of visual fidelity includes a first amount of transparency (e.g., zero transparency and/or a non-zero amount of transparency that is less than the second amount of transparency) and the second degree of visual fidelity includes a second amount of transparency (e.g., a non-zero amount of transparency that is greater than the first amount of transparency), greater than the first amount of transparency. The second degree of visual fidelity including a second amount of transparency that is greater than the first amount of transparency allows the first computer system to display the visual representation of hair of the second user without obscuring and/or blocking a portion of the representation of the second user corresponding to the face of the second user, thereby improving communication between the first user and the second user via the first computer system and the second computer system.

In some embodiments, the respective body part (e.g., **1004*m*) of the second user (e.g., 1004) is a neck (e.g., 1002*m*) of the second user (e.g., 1004**) (e.g., a visual indication of a physical neck of the second user) and the first degree of visual fidelity includes a first amount of transparency (e.g., zero transparency and/or a non-zero amount of transparency that is less than the second amount of transparency) and the second degree of visual fidelity includes a second amount of transparency (e.g., a non-zero amount of transparency that is greater than the first amount of transparency), greater than the first amount of transparency. The second degree of visual fidelity including a second amount of transparency that is greater than the first amount of transparency allows the first computer system to display the visual representation of hair of the second user without obscuring and/or blocking a portion of the representation of the second user corresponding to the neck of the second user, thereby improving communication between the first user and the second user via the first computer system and the second computer system.

In some embodiments, in accordance with a determination that the hair (e.g., 1004*k* and/or 1004*l*) of the second user exceeds a predefined length (e.g., is a first length and/or a length measured from a portion of the representation of the second user that is indicative of a physical body part of the second user, such as a neck, a face, a cheek, a lip, and/or a chin) (in some embodiments, the first length is greater than a threshold length), the visual representation of hair (e.g., 1002*k* and/or 1002*l*) of the second user (e.g., 1004) includes a three-dimensional representation of hair (e.g., a volumetric representation that appears to extend along three separate axes (e.g., three dimensions) within the extended reality environment) that is separate from the representation of the second user (e.g., the three-dimensional representation is separable from at least a portion of the representation of the second user that is indicative of a face of the second user) (e.g., without applying a texture to a representation of the skin of the second user to represent the hair). In accordance with a determination that the hair (e.g., 1004*k* and/or 1004*l*) of the second user (e.g., 1004) does not exceed the predefined length (e.g., is a second length that is less than the first length and/or a length measured from a portion of the representation of the second user that is indicative of a physical body part of the second user, such as a neck, a face, a cheek, a lip, and/or a chin) (in some embodiments, the second length is less than a threshold length), the visual representation of hair (e.g., 1002*k* and/or 1002*l*) of the second user (e.g., 1004) includes a textured representation of hair that is applied on top of a representation of a face (e.g., 1002*g*) of the second user (e.g., 1004) without a corresponding three-dimensional representation of hair (e.g., applying a texture to a representation of the skin of the second user to represent the hair, without displaying a three-dimensional representation of the hair that is separate from the representation of the second user, and/or an image that does not extend along three axes (e.g., two dimensional) within the extended reality environment) (in some embodiments, the textured representation is not separable from other portions of the representation of the second user).

The visual representation of hair of the second user including a three-dimensional representation in accordance with a determination that the hair of the second user exceeds a predefined length and including a textured representation in accordance with a determination that the hair of the second user does not exceed the predefined length allows the first computer system to display the visual representation of hair of the second user without obscuring and/or blocking another portion of the representation of the second user and/or a portion of the extended reality environment, thereby improving communication between the first user and the second user via the first computer system and the second computer system.

FIG. 14 is a flow diagram of an exemplary method 1400 for displaying a portion of a representation of a user with a visual emphasis, in accordance with some embodiments. In some embodiments, method 1400 is performed at a first computer system (e.g., 101, 700, and/or 1000) (e.g., a smartphone, tablet, head-mounted display generation component) including one or more display generation components (e.g., 120, 704, 722, 722*b*, and/or 1000*a*) (e.g., a visual output device, a 3D display, a display having at least a portion that is transparent or translucent on which images can be projected (e.g., a see-through display), a projector, a heads-up display, a display controller) (in some embodiments, the first computer system is in communication with a second computer system that is associated with a second user (e.g., that is being operated by the second user (e.g., a user that is in a communication session (e.g., an extended reality and/or video conference) with the first user of the first computer system)). In some embodiments, the method 1400 is governed by instructions that are stored in a non-transitory (or transitory) computer-readable storage medium and that are executed by one or more processors of a computer system, such as the one or more processors 202 of computer system 101 (e.g., control 110 in FIG. 1A). Some operations in method 1400 are, optionally, combined and/or the order of some operations is, optionally, changed.

While the first computer system (e.g., 101, 700, and/or 1000) is being used by a first user (e.g., a user associated with second representation 1012) of the first computer system (e.g., 101, 700, and/or 1000), the first computer system (e.g., 101, 700, and/or 1000) displays (1402), via the one or more display generation components (e.g., 120, 704, 722, 722*b*, and/or 1000*a*), a representation (e.g., 1002) (e.g., an avatar; a virtual avatar (e.g., the avatar is a virtual representation of at least a portion of the first user)) of the second user (e.g., 1004) (e.g., a user of the external computer system) in an extended reality environment (e.g., 1008) (in some embodiments, the virtual avatar is displayed, in an extended reality environment, in lieu of the first user) (in some embodiments, the representation of the first user is displayed in the extended reality environment in response to receiving (e.g., based on user input at the computer system) a request to display the representation of the first user). The representation (e.g., 1002) of the second user (e.g., 1004) moves (e.g., moves within the extended reality environment) based on detected movement of the second user (e.g., 1004) (e.g., detected movement of the second user within a physical environment) detected by a second computer system during a live communication session with the first computer system (e.g., 101, 700, and/or 1000).

The representation (e.g., 1002) of the second user (e.g., 1004) includes a first portion (e.g., 1026*a* and/or 1026*c*) (1404) of the representation (e.g., 1002) of the second user (e.g., 1004) (e.g., an outer portion that includes at least a perimeter of a silhouette of the representation of the second user) that corresponds to a boundary between the representation (e.g., 1002) of the second user (e.g., 1004) and other portions of the extended reality environment (e.g., 1008) (e.g., an outer portion of a silhouette of the representation). The first portion (e.g., 1026*a* and/or 1026*c*) of the representation (e.g., 1002) of the second user (e.g., 1004) is displayed with a first visual appearance (e.g., an emphasized visual appearance that highlights, contrasts, and/or otherwise emphasizes the first portion of the representation of the second user as compared to the second portion of the representation of the second user). In some embodiments, the first computer system (e.g., 101, 700, and/or 1000) (e.g., the computer system receiving information) and/or the second computer system (e.g., the computer system receiving information) determine the first portion (e.g., 1026*a* and/or 1026*c*) of the representation (e.g., 1002) of the second user (e.g., 1004) that is displayed with the first visual appearance.

The representation (e.g., 1002) of the second user (e.g., 1004) includes a second portion (e.g., 1026*b* and/or 1026*d*)

(1406) of the representation (e.g., 1002) of the second user (e.g., 1004) (e.g., an interior portion of a silhouette of the representation of the second user that does not include the perimeter of the silhouette of the representation of the second user) that does not correspond to the boundary between the representation (e.g., 1002) of the second user (e.g., 1004) and other portions of the extended reality environment (e.g., 1008) (e.g., an interior portion and/or an interior of a silhouette of the representation). The second portion (e.g., 1026*b* and/or 1026*e*) of the representation (e.g., 1002) of the second user (e.g., 1004) is displayed with a second visual appearance (e.g., a non-emphasized and/or normal visual appearance that does not highlight, contrast, and/or otherwise emphasize the second portion of the representation of the second user as compared to the first portion of the representation of the second user), where the first visual appearance is emphasized as compared to the second visual appearance (e.g., the first visual appearance includes a visual emphasis (e.g., highlighting, increased brightness, increased clarity and/or visual fidelity, and/or a Fresnel visual effect) and the second visual appearance does not include the visual emphasis (e.g., the first portion of the representation of the second user is visually emphasized compared to the second portion of the representation of the second user)). In some embodiments, the first computer system (e.g., 101, 700, and/or 1000) (e.g., the computer system receiving information) and/or the second computer system (e.g., the computer system transmitting information) determine the second portion (e.g., 1026*b* and/or 1026*d*) of the representation (e.g., 1002) of the second user (e.g., 1004) that is displayed with the second visual appearance.

Displaying the representation of the second user including the first portion that corresponds to a boundary between the representation of the second user and other portions of the extended reality environment with a first visual appearance and including the second portion that does not correspond to the boundary between the representation of the second user and other portions of the extended reality environment with a second visual appearance allows the first computer system to contrast the representation of the second user from the other portions of the extended reality environment, thereby improving communication between the first user and the second user via the first computer system and the second computer system.

In some embodiments, displaying the representation (e.g., 1002) of the second user (e.g., 1004) in the extended reality environment (e.g., 1008) includes the first computer system (e.g., 101, 700, and/or 1000) displaying the representation (e.g., 1002) of the second user (e.g., 1004) during a real-time communication session with the first user. In some embodiments, the representation (e.g., 1002) of the second user (e.g., 1004) is displayed via a display generation component that is in communication with the second computer system (e.g., concurrently with the display of the representation of the second user via the one or more display generation components in communication with the first computer system). Displaying the representation of the second user in the extended reality environment during a real-time communication session allows the first computer system to contrast the representation of the second user from the other portions of the extended reality environment, thereby improving communication between the first user and the second user via the first computer system and the second computer system.

In some embodiments, while displaying the representation (e.g., 1002) of the second user (e.g., 1004) at a first orientation (e.g., 1023) (e.g., a first viewpoint with respect to the extended reality environment and/or with respect to one or more edges of the one or more display generation components of the first computer system) in the extended reality environment (e.g., 1008) and in accordance with a determination (e.g., a determination made by the first computer system and/or the second computer system) that that an orientation of the representation (e.g., 1002) of the second user (e.g., 1004) changes from the first orientation (e.g., 1023) to a second orientation (e.g., 1028) (e.g., a second viewpoint with respect to the extended reality environment and/or with respect to one or more edges of the one or more display generation components that is different from the first viewpoint), the first computer system (e.g., 101, 700, and/or 1000) displays, via the display generation component (e.g., 120, 704, 722, 722*b*, and/or 1000*a*), a third portion (e.g., 1026*c*) of the representation (e.g., 1002) of the second user (e.g., 1004) (e.g., an outer portion that includes at least a perimeter of a silhouette of the representation of the second user) that corresponds to a second boundary between the representation (e.g., 1002) of the second user (e.g., 1004) and other portions of the extended reality environment (e.g., 1008) (e.g., an outer portion of a silhouette of the representation). The third portion (e.g., 1026*c*) of the representation (e.g., 1002) of the second user (e.g., 1004) is displayed with the first visual appearance (e.g., an emphasized visual appearance that highlights, contrasts, and/or otherwise emphasizes the third portion of the representation of the second user as compared to the fourth portion of the representation of the second user). While displaying the representation (e.g., 1002) of the second user (e.g., 1004) at the first orientation (e.g., 1023) (e.g., a first viewpoint with respect to the extended reality environment and/or with respect to one or more edges of the one or more display generation components of the first computer system) in the extended reality environment (e.g., 1008) and in accordance with the determination (e.g., a determination made by the first computer system and/or the second computer system) that that the orientation of the representation (e.g., 1002) of the second user (e.g., 1004) changes from the first orientation (e.g., 1023) to the second orientation (e.g., 1028) (e.g., a second viewpoint with respect to the extended reality environment and/or with respect to one or more edges of the one or more display generation components that is different from the first viewpoint), the first computer system (e.g., 101, 700, and/or 1000) displays, via the display generation component (e.g., 120, 704, 722, 722*b*, and/or 1000*a*), a fourth portion (e.g., 1026*d*) of the representation (e.g., 1002) of the second user (e.g., 1004) (e.g., an interior portion of a silhouette of the representation of the second user that does not include the perimeter of the silhouette of the representation of the second user) that does not correspond to the second boundary between the representation (e.g., 1002) of the second user (e.g., 1004) and other portions of the extended reality environment (e.g., 1008) (e.g., an interior portion and/or an interior of a silhouette of the representation). The fourth portion (e.g., 1026*d*) of the representation (e.g., 1002) of the second user (e.g., 1004) is displayed with the second visual appearance (e.g., a non-emphasized and/or normal visual appearance that does not highlight, contrast, and/or otherwise emphasize the fourth portion of the representation of the second user as compared to the third portion of the representation of the second user), where the first visual appearance is emphasized as compared to the second visual appearance (e.g., the first visual appearance includes a visual emphasis (e.g., highlighting, increased brightness, increased clarity and/or visual fidelity, and/or a Fresnel visual effect) and the second visual appearance does not include the visual emphasis (e.g., the first portion of the representation of the second user is visually emphasized compared to the second portion of the representation of the second user)). While displaying the representation (e.g., 1002) of the second user (e.g., 1004) at the first orientation (e.g., 1023) (e.g., a first viewpoint with respect to the extended reality environment and/or with respect to one or more edges of the one or more display generation components of the first computer system) in the extended reality environment (e.g., 1008) and in accordance with a determination (e.g., a determination made by the first computer system and/or the second computer system) that the orientation of the representation (e.g., 1002) of the second user (e.g., 1004) does not change (e.g., the representation of the second user is displayed as being maintained at the first orientation and/or the first viewpoint with respect to the extended reality environment and/or with respect to one or more edges of the one or more display generation components), the first computer system (e.g., 101, 700, and/or 1000) maintains display of the representation (e.g., 1002) of the second user (e.g., 1004) at the first orientation (e.g., 1023) in the extended reality environment (e.g., 1008) (e.g., maintaining displaying the representation of the second user with the first portion of the representation of the second user and the second portion of the representation of the user).

Displaying the representation of the second user including the third portion that corresponds to a second boundary between the representation of the second user and other portions of the extended reality environment with the first visual appearance and including the fourth portion that does not correspond to the second boundary between the representation of the second user and other portions of the extended reality environment with the second visual appearance allows the first computer system to contrast the representation of the second user from the other portions of the extended reality environment even as a viewpoint of the representation of the second user changes within the extended reality environment, thereby improving communication between the first user and the second user via the first computer system and the second computer system.

In some embodiments, the orientation of the representation (e.g., 1002) of the second user (e.g., 1004) changes from the first orientation (e.g., 1023) to the second orientation (e.g., 1028) based on a change in a viewpoint of the first user (e.g., the user associated with second representation 1012) (e.g., the viewpoint of the first user changes based on movement of the representation of the second user within the extended reality environment, based on movement of the second user within a physical environment in which the second user is located, based on movement of the first computer system, based on movement of the second computer system of the second user, and/or based on an adjustment of a viewpoint of the extended reality environment (e.g., the adjustment of the viewpoint of the extended reality environment occurs based on one or more user inputs detected via the first computer system and/or the second computer system)). Displaying the representation of the second user including the third portion that corresponds to a second boundary between the representation of the second user and other portions of the extended reality environment with the first visual appearance and including the fourth portion that does not correspond to the second boundary between the representation of the second user and other portions of the extended reality environment with the second visual appearance allows the first computer system to contrast the representation of the second user from the other portions of the extended reality environment even as the viewpoint of the representation of the second user changes, thereby improving communication between the first user and the second user via the first computer system and the second computer system.

In some embodiments, the orientation of the representation (e.g., 1002) of the second user (e.g., 1004) changes from the first orientation (e.g., 1023) to the second orientation (e.g., 1028) based on movement of the representation (e.g., 1002) of the second user (e.g., 1004) in the extended reality environment (e.g., 1008) (e.g., the representation of the second user moves within the extended reality environment and, optionally, the view of the extended reality environment is maintained). In some embodiments, movement of the representation (e.g., 1002) of the second user (e.g., 1004) in the extended reality environment (e.g., 1008) occurs based on detected movement of the second user (e.g., 1004) within a physical environment (e.g., 1014) in which the second user (e.g., 1004) is located (e.g., detected via one or more sensors in communication with the second computer system). Displaying the representation of the second user including the third portion that corresponds to a second boundary between the representation of the second user and other portions of the extended reality environment with the first visual appearance and including the fourth portion that does not correspond to the second boundary between the representation of the second user and other portions of the extended reality environment with the second visual appearance allows the first computer system to contrast the representation of the second user from the other portions of the extended reality environment even as the representation of the second user moves within the extended reality environment, thereby improving communication between the first user and the second user via the first computer system and the second computer system.

In some embodiments, while displaying the representation (e.g., 1002) of the second user (e.g., 1004) at a first angle (e.g., 1023 and/or 1027) (e.g., a first posture, orientation, pose, and/or stature that forms a first angle with respect to at least one object of the extended reality environment) in the extended reality environment (e.g., 1008), the first computer system (e.g., 101, 700, and/or 1000) displays, via the one or more display generation components (e.g., 120, 704, 722, 722*b*, and/or 1000*a*), a fifth portion of the representation (e.g., 1002) of the second user (e.g., 1004) (e.g., a portion of the representation of the second user that is partially obscured and/or partially visible based on the first angle at which the representation of the second user is displayed and/or positioned within the extended reality environment) that has a respective visual effect applied that decreases the visual emphasis of the fifth portion of the representation (e.g., 1002) of the second user (e.g., 1004) (e.g., relative to a sixth portion of the representation of the second user) (e.g., an amount of blurriness, opacity, color, attenuation/density, and/or resolution that indicates a first estimated state of the fifth portion of the representation based on information about the state of the body of the second user). In response to the representation (e.g., 1002) of the second user (e.g., 1004) being displayed at a second angle (e.g., 1028 and/or 1030) (e.g., a second posture, orientation, pose, and/or stature that forms a second angle with respect to at least one object of the extended reality environment) in the extended reality environment (e.g., 1008), different from the first angle (e.g., 1023 and/or 1027), the first computer system (e.g., 101, 700, and/or 1000) displays, via the one or more display generation components (e.g., 120, 704, 722, 722*b*, and/or 1000*a*), a sixth portion of the representation (e.g., 1002) of the second user (e.g., 1004)

(e.g., a portion of the representation of the second user that is partially obscured and/or partially visible based on the second angle at which the representation of the second user is displayed and/or positioned within the extended reality environment), different from the fifth portion of the representation (e.g., 1002) of the second user (e.g., 1004), with the respective visual effect applied that decreases the visual emphasis of the sixth portion of the representation of the second user (e.g., relative to the visual emphasis of the fifth portion of the representation of the second user) (e.g., an amount of blurriness, opacity, color, attenuation/density, and/or resolution that indicates a first estimated state of the sixth portion of the representation based on information about the state of the body of the second user).

Displaying the representation of the second user including the fifth portion with the respective visual effect applied while the representation of the second user is at a first angle and including the sixth portion with the respective visual effect applied in response to the representation of the second user being displayed at a second angle allows the first computer system to contrast the representation of the second user from the other portions of the extended reality environment while the angle of the representation of the second user changes with respect to the extended reality environment, thereby improving communication between the first user and the second user via the first computer system and the second computer system.

In some embodiments, displaying the sixth portion of the representation (e.g., 1002) of the second user (e.g., 1004) with the respective visual effect applied that decreases the visual emphasis of the sixth portion of the representation (e.g., 1002) of the second user (e.g., 1004) includes the first computer system (e.g., 101, 700, and/or 1000) displaying a gradual transition (e.g., gradually changing the appearance of the representation of the second user from the fifth portion of the representation of the second user having the respective visual effect applied to the sixth portion of the representation of the second user having the respective visual effect applied) from the fifth portion of the representation (e.g., 1002) of the second user (e.g., 1004) that includes the respective visual effect applied that decreases the visual emphasis of the fifth portion of the representation (e.g., 1002) of the second user (e.g., 1004) to the sixth portion of the representation (e.g., 1002) of the second user (e.g., 1004) that includes the respective visual effect applied that decreases the visual emphasis of the sixth portion of the representation (e.g., 1002) of the second user (e.g., 1004). Displaying the gradual transition from the fifth portion of the representation of the second user that includes the respective visual effect to the sixth portion of the representation of the second user that includes the respective visual effect allows the first computer system to contrast the representation of the second user from the other portions of the extended reality environment, thereby improving communication between the first user and the second user via the first computer system and the second computer system.

In some embodiments, while displaying the representation (e.g., 1002) of the second user (e.g., 1004) at frontward orientation (e.g., 1023, 1027, 1028, and/or 1030) from the viewpoint of the first user in the extended reality environment (e.g., 1008) (e.g., a front representation of the representation of the second user is being displayed within the extended reality environment such that a face representation of the representation of the second user is being displayed), the first computer system (e.g., 101, 700, and/or 1000) displays the representation (e.g., 1002) of the second user (e.g., 1004) with one or more anthropomorphic features (e.g., 1002*a*-1002*f*) (e.g., a face and/or hands). In response to the representation (e.g., 1002) of the second user (e.g., 1004) being displayed at rearward orientation (e.g., 1032 and/or 1034) from the viewpoint of the first user in the extended reality environment (e.g., 1008) (e.g., a back representation of the representation of the second user is being displayed within the extended reality environment such that a face representation of the representation of the second user is not being displayed), the first computer system (e.g., 101, 700, and/or 1000) displays, via the one or more display generation components (e.g., 120, 704, 722, 722*b*, and/or 1000*a*), the representation (e.g., 1002) of the second user (e.g., 1004) without a respective anthropomorphic feature of the one or more anthropomorphic features (e.g., 1002*a*-1002*f*) (e.g., a face and/or hands). In some embodiments, displaying the representation (e.g., 1002) of the second user (e.g., 1004) without the respective anthropomorphic features (e.g., 1002*a*-1002*f*) includes the first computer system (e.g., 101, 700, and/or 1000) displaying the representation (e.g., 1002) of the second user (e.g., 1004) in a presentation mode (e.g., an audio presence mode; a mode in which the first user is represented in the extended reality environment by a rendering (e.g., an icon, a monogram) that does not have anthropomorphic features and/or is an inanimate object), where the representation (e.g., 1002) of the second user (e.g., 1004), while in the presentation mode, has a shape (e.g., appearance; geometry (e.g., a disk, or spherical shape; a cube; a rectangular prism)) that is not visually reactive to changes in movement of the second user (e.g., 1004) (e.g., when in the presentation mode, the representation of the second user is not visually reactive in response to movement of the second user's hand(s) that is detected in the physical environment and/or extended reality environment).

Displaying the representation of the second user without the respective anthropomorphic feature of the one or more anthropomorphic features in response to the representation of the second user being displayed at a rearward orientation in the extended reality environment reduces an amount of processing power required by the first computer system to display the representation of the second user.

In some embodiments, while displaying the representation (e.g., 1002) of the second user (e.g., 1004) at rearward orientation (e.g., 1032 and/or 1034) from the viewpoint of the first user in the extended reality environment (e.g., 1008) (e.g., a back representation of the representation of the second user is being displayed within the extended reality environment such that a face representation of the representation of the second user is not being displayed), the first computer system (e.g., 101, 700, and/or 1000) displays, via the one or more display generation components (e.g., 120, 704, 722, 722*b*, and/or 1000*a*), the representation (e.g., 1002) of the second user (e.g., 1004) without a respective anthropomorphic feature of one or more anthropomorphic features (e.g., 1002*a*-1002*f*) (e.g., a face and/or hands). In response to the representation (e.g., 1002) of the second user (e.g., 1004) being displayed at a frontward orientation (e.g., 1023, 1027, 1028, and/or 1030) from the viewpoint of the first user in the extended reality environment (e.g., 1008) (e.g., a front representation of the representation of the second user is being displayed within the extended reality environment such that a face representation of the representation of the second user is being displayed), the first computer system (e.g., 101, 700, and/or 1000) displays the representation (e.g., 1002) of the second user (e.g., 1004) with the respective anthropomorphic feature of the one or more anthropomorphic features (e.g., 1002*a*-1002*f*) (e.g., a face and/or hands). In some embodiments, displaying the representation (e.g., 1002) of the second user (e.g., 1004) without the respective anthropomorphic features (e.g., 1002*a*-1002*f*) includes the first computer system (e.g., 101, 700, and/or 1000) displaying the representation (e.g., 1002) of the second user (e.g., 1004) in a presentation mode (e.g., an audio presence mode; a mode in which the first user is represented in the extended reality environment by a rendering (e.g., an icon, a monogram) that does not have anthropomorphic features and/or is an inanimate object), where the representation (e.g., 1002) of the second user (e.g., 1004), while in the presentation mode, has a shape (e.g., appearance; geometry (e.g., a disk, or spherical shape; a cube; a rectangular prism)) that is not visually reactive to changes in movement of the second user (e.g., 1004) (e.g., when in the presentation mode, the representation of the second user is not visually reactive in response to movement of the second user's hand(s) that is detected in the physical environment and/or extended reality environment).

Displaying the representation of the second user without the respective anthropomorphic feature of the one or more anthropomorphic features when the representation of the second user is being displayed at a rearward orientation in the extended reality environment reduces an amount of processing power required by the first computer system to display the representation of the second user.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

As described above, one aspect of the present technology is the gathering and use of data available from various sources to improve XR experiences of users. The present disclosure contemplates that in some instances, this gathered data may include personal information data that uniquely identifies or can be used to contact or locate a specific person. Such personal information data can include demographic data, location-based data, telephone numbers, email addresses, twitter IDs, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to improve an XR experience of a user. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of XR experiences, the present technology can be configured to allow users to select to "opt in" or "opt out" of participation in the collection of personal information data during registration for services or anytime thereafter. In another example, users can select not to provide data for customization of services and/or for generating representations of the users. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, an XR experience can generated by inferring preferences and/or using generic representations of users based on non-personal information data or a bare minimum amount of personal information, such as the content being requested by the device associated with a user, other non-personal information available to the service, or publicly available information.

What is claimed is:

1. A computer system that is configured to communicate with one or more display generation components, the computer system comprising:

one or more processors; and memory storing one or more programs configured to be executed by the one or more processors, the one or more programs including instructions for:

while the computer system is placed on a body of a user, displaying, via the one or more display generation components, a prompt instructing to remove the computer system from the body of the user and to use the computer system to capture information related to an appearance of the user;

subsequent to displaying the prompt instructing to remove the computer system from the body of the user, detecting that the computer system has been removed from the body of the user; and after detecting that the computer system has been removed from the body of the user, capturing, via one or more sensors in communication with the computer system, information related to the appearance of the user, wherein the computer system is configured to use the information captured via the one or more sensors to generate a representation of the user, wherein:

the information captured via the one or more sensors includes information about an appearance of a respective portion of the user; and the representation of the user that is generated based on the information captured via the one or more sensors has an appearance that is automatically determined based on the appearance of the respective portion of the user that is represented by the information captured via the one or more sensors.

2. The computer system of claim 1, wherein the representation of the user is configured to be displayed in an augmented reality environment and/or a virtual reality environment.

3. The computer system of claim 1, wherein the computer system is configured to generate the representation of the user stereoscopically.

4. The computer system of claim 1, wherein the one or more programs further include instructions for:

prior to detecting that the computer system has been removed from the body of the user, providing instructions for using the computer system to capture the information related to the appearance of the user.

5. The computer system of claim 4, wherein providing the instructions includes displaying, via the one or more display generation components, an animation that demonstrates using the computer system to capture the information related to the appearance of the user.

6. The computer system of claim 1, wherein the one or more programs further include instructions for:

prior to detecting that the computer system has been removed from the body of the user:

in accordance with a determination that a set of criteria is met, displaying, via the one or more display generation components, an indication associated with a condition affecting the capturing of information related to the appearance of the user; and in accordance with a determination that the set of criteria is not met, forgoing displaying the indication associated with the condition affecting the capturing of information related to the appearance of the user.

7. The computer system of claim 6, wherein the indication associated with the condition affecting the capturing of information related to the appearance of the user includes information about taking action that would help to correct the condition.

8. The computer system of claim 1, wherein the one or more programs further include instructions for:

in response to detecting that the computer system has been removed from the body of the user, initiating a process for capturing the information related to the appearance of the user.

9. The computer system of claim 1, wherein the one or more programs further include instructions for:

after detecting that the computer system has been removed from the body of the user, providing a second prompt including instructions for capturing the information related to the appearance of the user.

10. The computer system of claim 9, wherein providing the second prompt includes displaying, via the one or more display generation components, a visual prompt with one or more enrollment instructions.

11. The computer system of claim 10, wherein:

the prompt instructing to remove the computer system from the body of the user and to use the computer system to capture information related to the appearance of the user is displayed via a first display generation component of the one or more display generation components; and the visual prompt is displayed via a second display generation component, different from the first display generation component, of the one or more display generation components.

12. The computer system of claim 9, wherein providing the second prompt includes outputting, via an audio device in communication with the computer system, an audio prompt with one or more enrollment instructions.

13. The computer system of claim 9, wherein providing the second prompt includes providing an indication instructing the user to orient a portion of the body of the user within a target location with respect to the computer system.

14. The computer system of claim 9, wherein providing the second prompt includes providing an indication instructing the user to adjust a condition affecting the capturing of information related to the appearance of the user.

15. The computer system of claim 9, wherein providing the second prompt includes providing an indication instructing the user to move a position of a head of the user.

16. The computer system of claim 9, wherein providing the second prompt includes providing an indication instructing the user to position a set of one or more facial features of the user in a predefined set of one or more facial expressions.

17. The computer system of claim 9, wherein providing the second prompt includes providing an indication instructing the user to adjust a position of the computer system to orient the computer system toward a predefined portion of a body of the user.

18. The computer system of claim 1, wherein the prompt instructing to remove the computer system from the body of the user and to use the computer system to capture information related to the appearance of the user is displayed, via a first display generation component of the one or more display generation components, and wherein the one or more programs further include instructions for:

after capturing the information related to the appearance of the user, displaying, via a second display generation component, different from the first display generation component, of the one or more display generation components, a preview of the representation of the user.

19. The computer system of claim 1, wherein the one or more programs further include instructions for:

after capturing the information related to the appearance of the user, detecting that the computer system has been placed on the body of the user; and after detecting that the computer system has been placed on the body of the user, displaying, via the one or more display generation components, a preview of the representation of the user.

20. The computer system of claim 1, wherein capturing the information related to the appearance of the user includes capturing first information about a first portion of a body of the user, and wherein the one or more programs further include instructions for:

after capturing the first information related to the first portion of the body of the user, detecting that the computer system has been placed on the body of the user; and after detecting that the computer system has been placed on the body of the user, initiating a process for capturing second information related to a second portion of the body of the user, different from the first portion of the body of the user.

21. The computer system of claim 20, wherein initiating the process for capturing the second information related to the second portion of the body of the user includes displaying, via the one or more display generation components, a visual indication indicating a location for the user to position the second portion of the body of the user.

22. The computer system of claim 20, wherein initiating the process for capturing the second information related to the second portion of the body of the user includes providing a second prompt instructing the user to adjust an orientation of the second portion of the body of the user.

23. The computer system of claim 20, wherein the one or more programs further include instructions for:

after capturing the second information related to the second portion of the body of the user, displaying, via the one or more display generation components, the representation of the user in an extended reality environment.

24. The computer system of claim 1, wherein the one or more sensors include a sensor selected from the group consisting of: a camera, an image sensor, and a depth sensor.

25. A non-transitory computer-readable storage medium storing one or more programs configured to be executed by one or more processors of a computer system that is in communication with one or more display generation components, the one or more programs including instructions for:

while the computer system is placed on a body of a user, displaying, via the one or more display generation components, a prompt instructing to remove the computer system from the body of the user and to use the computer system to capture information related to an appearance of the user;

subsequent to displaying the prompt instructing to remove the computer system from the body of the user, detecting that the computer system has been removed from the body of the user; and after detecting that the computer system has been removed from the body of the user, capturing, via one or more sensors in communication with the computer system, information related to the appearance of the user, wherein the computer system is configured to use the information captured via the one or more sensors to generate a representation of the user, wherein:

the information captured via the one or more sensors includes information about an appearance of a respective portion of the user; and the representation of the user that is generated based on the information captured via the one or more sensors has an appearance that is automatically determined based on the appearance of the respective portion of the user that is represented by the information captured via the one or more sensors.

26. The non-transitory computer-readable storage medium of claim 25, wherein the representation of the user is configured to be displayed in an augmented reality environment and/or a virtual reality environment.

27. The non-transitory computer-readable storage medium of claim 25, wherein the computer system is configured to generate the representation of the user stereoscopically.

28. The non-transitory computer-readable storage medium of claim 25, wherein the one or more programs further include instructions for:

prior to detecting that the computer system has been removed from the body of the user, providing instructions for using the computer system to capture the information related to the appearance of the user.

29. The non-transitory computer-readable storage medium of claim 25, wherein the one or more programs further include instructions for:

prior to detecting that the computer system has been removed from the body of the user:

in accordance with a determination that a set of criteria is met, displaying, via the one or more display generation components, an indication associated with a condition affecting the capturing of information related to the appearance of the user; and in accordance with a determination that the set of criteria is not met, forgoing displaying the indication associated with the condition affecting the capturing of information related to the appearance of the user.

30. The non-transitory computer-readable storage medium of claim 25, wherein the one or more programs further include instructions for:

in response to detecting that the computer system has been removed from the body of the user, initiating a process for capturing the information related to the appearance of the user.

31. The non-transitory computer-readable storage medium of claim 25, wherein the one or more programs further include instructions for:

after detecting that the computer system has been removed from the body of the user, providing a second prompt including instructions for capturing the information related to the appearance of the user.

32. The non-transitory computer-readable storage medium of claim 25, wherein the prompt instructing to remove the computer system from the body of the user and to use the computer system to capture information related to the appearance of the user is displayed, via a first display generation component of the one or more display generation components, and wherein the one or more programs further include instructions for:

after capturing the information related to the appearance of the user, displaying, via a second display generation component, different from the first display generation component, of the one or more display generation components, a preview of the representation of the user.

33. The non-transitory computer-readable storage medium of claim 25, wherein the one or more programs further include instructions for:

after capturing the information related to the appearance of the user, detecting that the computer system has been placed on the body of the user; and after detecting that the computer system has been placed on the body of the user, displaying, via the one or more display generation components, a preview of the representation of the user.

34. The non-transitory computer-readable storage medium of claim 25, wherein capturing the information related to the appearance of the user includes capturing first information about a first portion of a body of the user, and wherein the one or more programs further include instructions for:

after capturing the first information related to the first portion of the body of the user, detecting that the computer system has been placed on the body of the user; and after detecting that the computer system has been placed on the body of the user, initiating a process for capturing second information related to a second portion of the body of the user, different from the first portion of the body of the user.

35. The non-transitory computer-readable storage medium of claim 25, wherein the one or more sensors include a sensor selected from the group consisting of: a camera, an image sensor, and a depth sensor.

36. A method, comprising:

at a computer system that is in communication with one or more display generation components:

while the computer system is placed on a body of a user, displaying, via the one or more display generation components, a prompt instructing to remove the computer system from the body of the user and to use the computer system to capture information related to an appearance of the user;

subsequent to displaying the prompt instructing to remove the computer system from the body of the user, detecting that the computer system has been removed from the body of the user; and after detecting that the computer system has been removed from the body of the user, capturing, via one or more sensors in communication with the computer system, information related to the appearance of the user, wherein the computer system is configured to use the information captured via the one or more sensors to generate a representation of the user, wherein:

the information captured via the one or more sensors includes information about an appearance of a respective portion of the user; and the representation of the user that is generated based on the information captured via the one or more sensors has an appearance that is automatically determined based on the appearance of the respective portion of the user that is represented by the information captured via the one or more sensors.

37. The method of claim 36, wherein the representation of the user is configured to be displayed in an augmented reality environment and/or a virtual reality environment.

38. The method of claim 36, wherein the computer system is configured to generate the representation of the user stereoscopically.

39. The method of claim 36, further comprising:

prior to detecting that the computer system has been removed from the body of the user, providing instructions for using the computer system to capture the information related to the appearance of the user.

40. The method of claim 36, further comprising:

prior to detecting that the computer system has been removed from the body of the user:

in accordance with a determination that a set of criteria is met, displaying, via the one or more display generation components, an indication associated with a condition affecting the capturing of information related to the appearance of the user; and in accordance with a determination that the set of criteria is not met, forgoing displaying the indication associated with the condition affecting the capturing of information related to the appearance of the user.

41. The method of claim 36, further comprising:

in response to detecting that the computer system has been removed from the body of the user, initiating a process for capturing the information related to the appearance of the user.

42. The method of claim 36, further comprising:

after detecting that the computer system has been removed from the body of the user, providing a second prompt including instructions for capturing the information related to the appearance of the user.

43. The method of claim 36, wherein the prompt instructing to remove the computer system from the body of the user and to use the computer system to capture information related to the appearance of the user is displayed, via a first display generation component of the one or more display generation components, the method further comprising:

after capturing the information related to the appearance of the user, displaying, via a second display generation component, different from the first display generation component, of the one or more display generation components, a preview of the representation of the user.

44. The method of claim 36, further comprising:

after capturing the information related to the appearance of the user, detecting that the computer system has been placed on the body of the user; and after detecting that the computer system has been placed on the body of the user, displaying, via the one or more display generation components, a preview of the representation of the user.

45. The method of claim 36, wherein capturing the information related to the appearance of the user includes capturing first information about a first portion of a body of the user, the method further comprising:

after capturing the first information related to the first portion of the body of the user, detecting that the computer system has been placed on the body of the user; and after detecting that the computer system has been placed on the body of the user, initiating a process for capturing second information related to a second portion of the body of the user, different from the first portion of the body of the user.

46. The method of claim 36, wherein the one or more sensors include a sensor selected from the group consisting of: a camera, an image sensor, and a depth sensor.

* * * * *